US012540134B2

(12) United States Patent
Delbeck et al.

(10) Patent No.: US 12,540,134 B2
(45) Date of Patent: Feb. 3, 2026

(54) INHIBITORS OF ADRENORECEPTOR ADRAC2

(71) Applicant: Bayer Aktiengesellschaft, Leverkusen (DE)

(72) Inventors: Martina Delbeck, Heiligenhaus (DE); Michael Hahn, Langenfeld (DE); Thomas Müller, Langenfeld (DE); Lisa Dietz, Wuppertal (DE); Magdalena Platzk, Brookline, MA (US); Daniel Meibom, Wuppertal (DE); Philipp Buchgraber, Berlin (DE); Niels Lindner, Wuppertal (DE); Eva Maria Becker-Pelster, Wuppertal (DE); Carsten Schmeck, Wuppertal (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 886 days.

(21) Appl. No.: 17/774,459

(22) PCT Filed: Nov. 5, 2020

(86) PCT No.: PCT/EP2020/081097
§ 371 (c)(1),
(2) Date: May 4, 2022

(87) PCT Pub. No.: WO2021/089683
PCT Pub. Date: May 14, 2021

(65) Prior Publication Data
US 2023/0115270 A1 Apr. 13, 2023

(30) Foreign Application Priority Data
Nov. 6, 2019 (EP) ..................... 19207536

(51) Int. Cl.
*C07D 417/12* (2006.01)
*C07D 277/28* (2006.01)
*C07D 413/12* (2006.01)

(52) U.S. Cl.
CPC ......... *C07D 417/12* (2013.01); *C07D 277/28* (2013.01); *C07D 413/12* (2013.01)

(58) Field of Classification Search
CPC ... C07D 417/12; C07D 413/12; C07D 277/28
See application file for complete search history.

(56) References Cited

U.S. PATENT DOCUMENTS

| | | | |
|---|---|---|---|
| 5,082,665 | A | 1/1992 | Verny et al. |
| 7,705,043 | B2 | 4/2010 | Alonso-alija et al. |
| 7,781,470 | B2 | 8/2010 | Alonso-alija et al. |
| 9,993,476 | B2 | 6/2018 | Follmann et al. |
| 2018/0370965 | A1 | 12/2018 | Delbeck et al. |
| 2019/0062326 | A1 | 2/2019 | Delbeck et al. |

FOREIGN PATENT DOCUMENTS

| | | |
|---|---|---|
| CA | 3031136 A1 | 1/2018 |
| CN | 104771398 A | 7/2015 |
| WO | 1998051310 A1 | 11/1998 |
| WO | 0006568 A1 | 2/2000 |
| WO | 0006569 A1 | 2/2000 |
| WO | 0119355 A2 | 3/2001 |
| WO | 0119776 A2 | 3/2001 |
| WO | 0119778 A1 | 3/2001 |
| WO | 0119780 A2 | 3/2001 |
| WO | 0242301 A1 | 5/2002 |
| WO | 02070462 A1 | 9/2002 |
| WO | 02070510 A2 | 9/2002 |
| WO | 03095451 A1 | 11/2003 |
| WO | 2008052934 A1 | 5/2008 |
| WO | 2008060568 A2 | 5/2008 |
| WO | 2011147809 A1 | 12/2011 |
| WO | 2012028647 A1 | 3/2012 |
| WO | 2012059549 A1 | 5/2012 |
| WO | 2012004258 A9 | 6/2012 |
| WO | 2015017305 A1 | 2/2015 |
| WO | 2015091415 A1 | 6/2015 |
| WO | 2015091420 A1 | 6/2015 |
| WO | 2017097671 A1 | 6/2017 |
| WO | 2017097792 A1 | 6/2017 |
| WO | 2018015196 A1 | 1/2018 |

(Continued)

OTHER PUBLICATIONS

Miliotou, Biomolecules, vol. 15, 12, 1-20, 2025. (Year: 2025).*
Arens, C. et al. (2015) "Position paper of the German Society of Oto-Rhino-Laryngology, Head and Neck Surgery and the German Society of Phoniatrics and Pediatric Audiology—Current State of Clinical and Endoscopic Diagnostics, Evaluation, and Therapy of Swallowing Disorders in Children and Adults," Laryngo-Rhino-Otol; 94:S306-S354.
Cheng, YC et al. (1973) "Relationship Between the Inhibition Constant (KI) and the Concentration of Inhibitor Which Causes 50 Per Cent Inhibition (150) of an Enzymatic Reaction *," Biochemical Pharmacology, 22:3099-3108.

(Continued)

*Primary Examiner* — D Margaret M Seaman
(74) *Attorney, Agent, or Firm* — MORRISON & FOERSTER LLP

(57) ABSTRACT

The present application relates to novel substituted heterocyclic carboxamides, to processes for their preparation, to their use alone or in combinations for the treatment and/or prevention of diseases and to their use for producing medicaments for the treatment and/or prevention of diseases, in particular for the treatment and/or prevention of breathing difficulties including sleep-induced breathing difficulties such as central and obstructive sleep apnoea, snoring (primary and obstructive snoring), dysphagia, peripheral and cardiac vascular disorders including diabetic microangiopathies and disorders of the peripheral and central nervous system including neurodegenerative and neuroinflammatory disorders.

25 Claims, No Drawings

(56) References Cited

FOREIGN PATENT DOCUMENTS

| WO | 2018228907 A1 | 12/2018 |
|---|---|---|
| WO | 2018228909 A1 | 12/2018 |

OTHER PUBLICATIONS

Chotani, M.A. et al. (2000) "Silent a2C-adrenergic receptors enable cold-induced vasoconstriction in cutaneous arteries," Am J Physiol Heart Circ Physiol, 278:H1075-H1083.

Chotani, M.A. et al. (Sep. 2, 2004) "Distinct cAMP signaling pathways differentially regulate 2C-adrenoceptor expression: role in serum induction in human arteriolar smooth muscle cells," Am J Physiol Heart Circ Physiol 288:H69-H76.

Eckert D. J. et al. (Feb. 2017). "Central Sleep Apnea." Chest 131(2): 595-607.

Greene, T. (1999) "Protective Group in Organic Synthesis," Third Editions, 799 pages.

Gyires, K. et al. (2009) "a2-Adrenoceptor subtypes-mediated physiological, pharmacological actions," Neurochemistry International 55:447-453.

Hein, L. et al. (1999) "Two functionally distinct α2-adrenergic receptors regulate sympathetic neurotransmission," Nature 402 (6758): 181-184.

Hollandt, J.H. et al. (2000) "Upper Airway Resistance Syndrome? (UARS)—Obstructive Snoring," HNO 48: 628-634.

Horner, R.L. (2008) "Neuromodulation of hypoglossal motoneurons during sleep," Respiratory Physiology & Neurobiology 164: 179-196.

Jordan, A.S., et al. (2009) "Airway Dilator Muscle Activity and Lung Volume During Stable Breathing in Obstructive Sleep Apnea." Sleep 32(3): 361-368.

Kanagy, N.L. (2005) "α2-Adrenergic receptor signalling in hypertension," Clinical Science, 109:431-437.

Karkos PD et al. (2009) "Current evaluation of the dysphagic patient," Hippokratia, 13(3): 141-146.

Keenan, E. J. et al. (Aug. 1983) "a2 Adrenergic receptors in platelets from patients with Raynaud's syndrome," Surgery, 94(2):204-209.

Kocienski, P.J. et al. (2005) "Protecting Groups," 3rd edition, University of Leeds.

Tan C.M. et al.(2005) "The α2-Adrenergic Receptors: The Receptors: The Adrenergic Receptors: In the 21st Century," pp. 241-265.

Vrints et al. (2013) "Cardiovascular Mechanisms and Consequences of Obstructive Sleep Aponea," Acta Clinica Belgica 68(3): 169-178.

Wirth, K.J., et al. (2013) "Sensitization of Upper Airway Mechanoreceptors as a New Pharmacologic Principle to Treat Obstructive Sleep Apnea: Investigations with AVE0118 in Anesthetized Pigs," Sleep 36(5): 699-708.

Wunder, F. et al. (2008) "Functional Cell-Based Assays in Microliter Volumes for Ultra-High Throughput Screening," Combinatorial Chemistry & High Throughput Screening, 11:495-504.

Yamanishi, T. et al. (2010) "α2-Adrenoceptors CoordinateSwallowing and Respiration," J Dent Res 89(3):258-263.

Boltromeyuk, V. (2012), "Obshhaja khimija [General Chemistry]", Minsk, Vysshaya shkola, p. 65.

Freedman, R. R. et al. (Sep. 15, 1995). "Blockade Of Vasospastic Attacks By α2-Adrenergic But Not α1-Adrenergic Antagonists In Idiopathic Raynaud's Disease," Circulation 92(6):1448-1451, 9 pages.

Rinne, J. O. et al. (Dec. 8, 2016). "Tolerability Of ORM-12741 And Effects On Episodic Memory In Patients With Alzheimer's Disease," Alzheimer's & Dementia: Translational Research & Clinical Interventions 3(1):1-9.

Uys, M. M. et al. (Aug. 14, 2017). "Therapeutic Potential Of Selectively Targeting The α2c-Adrenoceptor In Cognition, Depression, And Schizophrenia—New Developments And Future Perspective," Frontiers In Psychiatry 8 (144):1-23.

\* cited by examiner

INHIBITORS OF ADRENORECEPTOR ADRAC2

CROSS REFERENCE TO RELATED APPLICATIONS

This application is a national stage application under 35 U.S.C. § 371 of International Application No. PCT/EP2020/081097, filed internationally on Nov. 5, 2020, which claims the benefit of European Application No. 19207536.4, filed Nov. 6, 2019.

The present application relates to novel substituted heterocyclic carboxamides, to processes for their preparation, to their use alone or in combinations for the treatment and/or prevention of diseases and to their use for producing medicaments for the treatment and/or prevention of diseases, in particular for the treatment and/or prevention of breathing difficulties including sleep-induced breathing difficulties such as central and obstructive sleep apnoea, snoring (primary and obstructive snoring), dysphagia, peripheral and cardiac vascular disorders including diabetic microangiopathies and disorders of the peripheral and central nervous system including neurodegenerative and neuroinflammatory disorders.

$\alpha_2$-Adrenergic receptors ($\alpha_2$-ARs) belong to the family of the G-protein-coupled receptors. They bind to the pertussis toxin-sensitive inhibitory G proteins $G_1$ and $G_0$ and reduce adenylate cyclase activity. They are involved in the mediation of diverse physiological effects in various tissues following stimulation by endogenous catecholamines (adrenaline, noradrenaline) which are either released by synapses or reach the site of action via the blood. $\alpha_2$-AR play an important physiological role, mainly for the cardiovascular system and in the central nervous system. Biochemical, physiological and pharmacological studies have shown that, in addition to various $\alpha_1$-AR subtypes, there are three $\alpha_2$-AR subtypes ($\alpha_{2A}$, $\alpha_{2B}$ and $\alpha_{2C}$) in many target cells and tissues of cardiovascular relevance and neuronal target cells and tissues, which makes them attractive target proteins for therapeutic interventions. However, the elucidation of the precise physiological task of the receptor subtypes remains difficult to date because of a lack of highly selective ligands and/or antagonists of the respective $\alpha_2$-AR [Gyires et al., $\alpha_2$-Adrenoceptor subtypes-mediated physiological, pharmacological actions, Neurochemistry International 55, 447-453, 2009; Tan and Limbird, The $\alpha_2$-Adrenergic Receptors: Adrenergic Receptors in the 21st Century/Receptors, 2005, 241-265].

Obstructive sleep apnoea (OSA) is a sleep-related respiratory disorder which is characterized by repeat episodes of obstruction of the upper airways.

When breathing in, the patency of the upper airways is ensured by the interaction of two opposite forces. The dilative effects of the musculature of the upper airways counteract the negative intraluminal pressure, which constricts the lumen. The active contraction of the diaphragm and the other auxiliary respiratory muscles generates a negative pressure in the airways, thus constituting the driving force for breathing. The stability of the upper airways is substantially determined by the coordination and contraction property of the dilating muscles of the upper airways.

It is assumed that collapse of the upper airways in OSA occurs early during sleep, since the activity of several dilator muscles of the upper airways is reduced, which results in anatomically susceptible airways no longer remaining open. However, some dilator muscles of the upper airways including the genioglossus muscle, which is the most important extensors of the upper airways and is innervated by the hypoglossal nerve, can increase activity during sleep as a reaction to breathing stimuli and possibly counteract some of these changes during early sleep. It has been observed that OSA patients have apnoea-free intervals in which the activity of the genioglossus muscle is only 25-40% higher compared to sleep phases with frequent obstructive apnoea [Jordan A S, White D P, Lo Y L et al., Airway dilator muscle activity and lung volume during stable breathing in obstructive sleep apnoea. Sleep 2009, 32(3): 361-8]. Noradrenaline is a neuromodulator of hypoglossal motor neuron activity [Horner R. L. Neuromodulation of hypoglossal motoneurons during sleep. Respir Physiol Neurobiol 2008, 164 (1-2): 179-196]. It is assumed that reduced noradrenergic stimulation leads to sleep-induced reduction of the excitability of hypoglossal motor neurons, which results in a reduced activity of the dilatory muscles of the upper airways, in particular a reduced activity of the genioglossus.

Patients suffering from obstructive sleep apnoea have high mortality and morbidity as a result of cardiovascular disorders such as hypertension, myocardial infarction and stroke [Vrints et al., Acta Clin Belg., 68, 169-78 (2013)].

$\alpha_{2C}$-adrenergic receptors regulate release of noradrenaline from central noradrenergic neurons. They are autoreceptors involved in the inhibition of presynaptic feedback of noradrenaline [Hein L. et al, Two functionally distinct alpha2-adrenergic receptors regulate sympathetic neurotransmission Nature 1999, 402(6758): 181-184].

Increased activity of the motor neurons of the hypoglossal nerve via alpha2c adrenoceptor antagonism may stabilize the upper airways and protect against collapse and occlusion. In addition, snoring may also be suppressed via stabilisation of the upper airways.

In the case of primary snoring, there is no obstruction of the upper airways. However, owing to the constriction of the upper airways, the flow rate of the air that is inhaled and exhaled increases. This, combined with the relaxed musculature, causes the soft tissues of the oral cavity and the pharynx to flutter in the stream of air. This gentle vibration then generates the typical snoring noises.

Obstructive snoring (upper airway resistance syndrome, heavy snoring, hypopnea syndrome) is caused by repeat partial obstruction of the upper airways during sleep. This results in an increased airway resistance and thus in an increase in work of breathing with considerable fluctuations in intrathoracic pressure. During inspiration, the negative intrathoracic pressure may reach values similar to those that are encountered as a result of complete airway obstruction during obstructive sleep apnoea. The pathophysiological consequences for heart, circulation and sleep quality correspond to those of obstructive sleep apnoea. As in obstructive sleep apnoea, the pathogenesis is assumed to be an impaired activity of the pharynx-dilating muscles during inspiration when sleeping. Frequently, obstructive snoring is the preliminary stage of obstructive sleep apnoea [Hollandt et al., HNO, 48, 628-634 (2000)].

Central sleep apnoea (CSA) occurs when brain function or control of breathing are impaired. CSA is characterized by lack of breathing stimuli whilst sleeping, resulting in recurring episodes of insufficient breathing or no breathing and impaired gas exchange. There are various manifestations of CSA. These include periodic breathing at high altitudes, idiopathic CSA (ICSA), central apnoea induced by narcotics, hypoventilation syndrome (OHS) and Cheyne-Stokes breathing (CSB). The exact mechanisms in the different types of CSA may vary considerably; however, one main characteristic is unstable breathing stimulation during sleep

[Eckert D. J. et al., *Central sleep apnoea: Pathophysiology and treatment*. Chest 2007, 131(2): 595-607].

Dysphagia is a difficulty in swallowing which may have various causes. The complex regulation of swallowing takes place in various structures of the brain. The is a two-way connection between the cerebral cortex, the corticobulbar tract, the brain stem and the peripheral swallowing musculature. Regulation and execution of the act of swallowing involves essentially five cranial nerves (the trigeminal nerve (V), the facial nerve (VII), the glossopharyngeal nerve (IX), the vagus nerve (X) and the hypoglossal nerve (XII)) and more than 25 muscle pairs [Arens C., *Position paper of the German Society of Oto-Rhino-Laryngology, Head and Neck Surgery and the German Society of Phoniatrics and Pediatric Audiology—current state of clinical and endoscopic diagnostics, evaluation, and therapy of swallowing disorders in children and adults*. Laryngorhinootologie, 2015 March; 94 Suppl 1: 306-54].

Dysphagia may have very different causes, for example structural disorders of oral cavity and/or larynx, psychogenic causes and neurological disorders (neurogenic dysphagia), such as, inter alia, Parkinson's disease, myotonic dystrophy, amyotrophe lateral sclerosis, cerebral infarction, traumatic brain injury, brain stem laesions, myositides and neuromuscular disorders [Karkos P D, *Current evaluation of the dysphagic patient*. Hippokratia. 2009 July; 13(3):141-6].

Noradrenergic neurons and $\alpha_2$-AR play a role in the coordination of swallowing and breathing [Yamanishi T., *Alpha2-adrenoceptors coordinate swallowing and respiration*. J Dent Res 2010, 89 (3): 258-2639].

$\alpha_2$-AR also plays an important role in cardiovascular changes. For example, the regulation of the contractility of the heart is regulated, firstly, by the central modulation of the sympathetic efferent nerves. Furthermore, the sympathetic efferent system also regulates direct effects on smooth muscle cells and vascular endothelial cells. Thus, the sympathetic system is involved in the regulation of the output performance of the heart, but also in the control of local perfusion of various vascular beds. This is also controlled via $\alpha_2$-ARs involved in the regulation of the peripheral resistance. Thus, blood vessels are innervated by sympathetic nerve fibres which run in the adventitia and whose endings are provided with varicosities for the release of noradrenaline. Released noradrenaline modulates, via the $\alpha_2$-AR in endothelial cells and smooth muscle cells, the respective local vascular tone.

In addition to the effects on the sympathetic efferent nerves, the peripheral cardiovascular function is also regulated by pre- and postsynaptic $\alpha_2$-AR. Smooth muscle cells and endothelial cells express different $\alpha_2$-AR subtypes. The activation of $\alpha_{2A}$, $\alpha_{2B}$ and $\alpha_{2C}$ receptors on smooth muscle cells leads to contraction with resulting vasoconstriction [Kanagy, *Clinical Science* 109: 431-437, (2005)]. However, the distribution of the respective receptor subtypes varies in the different vascular beds, between the species and between different vessel sizes. Thus, $\alpha_{2A}$-AR appear to be expressed virtually exclusively in large arteries, whereas $\alpha_{2B}$-AR contribute more to the vascular tone in small arteries and veins. AR$\alpha_{2B}$ appears to play a role in salt-induced hypertension [Gyires et al., $\alpha_2$-*Adrenoceptor subtypes-mediated physiological, pharmacological actions*, Neurochemistry International 55, 447-453, (2009)]. The role of AR$\alpha_{2C}$ on haemodynamics is not yet completely understood; however, AR$\alpha_{2C}$ receptors appear to mediate venous vasoconstriction. They are also involved in cold-induced enhancement of adrenoceptor-induced vasoconstriction [Chotani et al., *Silent $\alpha_{2C}$ adrenergic receptors enable cold-induced vasoconstriction in cutaneous arteries*. Am J Physiol 278:H1075-H1083, 2000; Gyires et al., $\alpha_2$-*Adrenoceptor subtypes-mediated physiological, pharmacological actions*, Neurochemistry International 55, 447-453, (2009)]. Cold and other factors (e.g. tissue proteins, oestrogen) regulate the functional coupling of AR$\alpha_{2C}$ to intracellular signal pathways [Chotani et al., *Distinct cAMP signaling pathways differentially regulate $\alpha_{2C}$ adrenenoxceptor expression: role in serum induction in human arteriolar smooth muscle cells*. Am J Physiol Heart Circ Physiol 288: H69-H76, (2005)].

Under pathophysiological conditions, the adrenergic system may be activated, which can lead, for example, to hypertension, heart failure, increased platelet activation, endothelial dysfunction, atherosclerosis, angina pectoris, myocardial infarction, thromboses, peripheral circulatory disturbances, stroke and sexual dysfunction. Thus, for example, the pathophysiology of Raynaud's syndrome and scleroderma is substantially unclear, but is associated with a changed adrenergic activity. Thus, patients suffering from spastic Raynaud's syndrome show, for example, a significantly elevated expression of AR$\alpha_2$ receptoren on their platelets. This may be connected with the vasospastic attacks observed in these patients [Keenan and Porter, $\alpha_2$-*Adrenergic receptors in platelets from patients with Raynaud's syndrome*, Surgery, V94(2), (1983)].

By virtue of the expected high efficiency and low level of side effects, a possible treatment for such disorders targeting the modulation of the activated adrenergic system in organisms is a promising approach. In particular in diabetics, who frequently have elevated catecholamine levels, peripheral circulatory disturbances (microangiopathies) such as diabetic retinopathy, nephropathy or else pronounced wound healing disorders (diabetic foot ulcers) play a large role. In peripheral occlusive disease, diabetes is one of the most important comorbidities and also plays a crucial role in the progression of the disease (micro- and macroangiopathy). Higher expression of the adrenoreceptor $\alpha_{2C}$ receptors associated with elevated catecholamine levels may be involved in these pathophysiological processes in diabetics.

In 2011 there were 350 million diabetics world-wide ($\approx$6.6% of the population), and this number is expected to double by 2028. Diabetic foot ulcers are the most frequent cause of hospitalizations of diabetics. The risk of a diabetic developing a diabetic foot ulcer in his or her lifetime is 15-25%, 15% of all diabetic foot ulcers lead to amputation. World-wide, 40-70% of all non-traumatic amputations are carried out on diabetics. Risk factors for diabetic foot ulcers are traumata, poor metabolic control, sensory, motoric and autonomous polyneuropathy, inappropriate footwear, infections and peripheral arterial disorders. The treatment of diabetic foot ulcers requires interdisciplinary teams and employs a multifactor approach: weight loss, revascularization (in the case of peripheral arterial occlusive disease, PAOD), improvements in metabolic control, wound excision, dressings, dalteparin, Regranex (PDGF) and amputation. The treatment costs per diabetic foot ulcer (without amputation) are 7000-10 000 USD. 33% of all diabetic foot ulcers do not heal within 2 years, and there is a high relapse rate (34% within the first year, 61% over 3 years).

The compounds of the present application are suitable for the prevention and treatment of diseases caused by activation or by an activated $\alpha_{2C}$-adrenergic receptor, and of diseases secondary to $\alpha_{2C}$-adrenergic receptor-related damage.

Disorders which may be mentioned in this context are in particular breathing difficulties, sleep-induced breathing difficulties such as central and obstructive sleep apnoea, mixed sleep apnoea, Cheyne-Stokes respiration, snoring (primary and obstructive snoring), disrupted central respiratory drive, sudden infant death, postoperative hypoxia and apnoea, muscular respiratory disorders, respiratory disorders following long-term ventilation, respiratory disorders during adaptation in high mountains, dysphagia, acute and chronic pulmonary diseases with hypoxia and hypercapnia, peripheral circulatory disturbances (microangiopathies) such as diabetic retinopathy, diabetic nephropathy and wound healing disorders (diabetic foot ulcers), disorders of the peripheral and central nervous system, in particular dementia, depression, schizophrenia, attention deficit disorder with or without hyperaktivity (ADHS), Tourette syndrome, post-traumatic stress disorder, obsessive-compulsive disorder, blepharospasm or other focal dystonias, drug-induced psychosis, temporal lobe epilepsy with psychosis, panic disorder, disorders caused by changes in sexual hormones, multiple sclerosis, Alzheimer's disease, Parkinson's disease, Huntington's disease.

Accordingly, the object of the present invention is to provide novel substances which act as potent and selective antagonists of the $\alpha_{2C}$-adrenergic receptor and as such are suitable for the treatment and/or prevention of breathing difficulties, sleep-induced breathing difficulties such as obstructive and central sleep apnoea, snoring, dysphagia, disorders of the peripheral and central nervous system and peripheral circulatory disturbances (microangiopathies) such as diabetic retinopathy, diabetic nephropathy and wound healing disorders (diabetic foot ulcers).

The present invention provides compounds of the general formula (I)

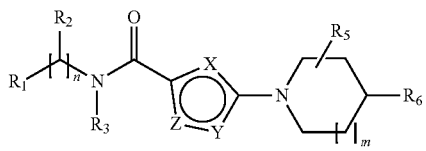

(I)

in which
X represents S, N or O;
Y represents N, S or O,
  where, if X represents S, then Y represents N;
  where, if X represents O, then Y represents N;
Z represents $CR_4$, O or $NR_4$,
  where, if X represents N and Y represents N, then Z represents O;
  where, if X represents S, then Z represents $CR_4$ or $NR_4$
$R_1$ represents 5- or 6-membered heteroaryl, phenyl,
  where 5- to 6-membered heteroaryl may be substituted by 1 to 2 substituents independently of one another selected from the group of $(C_1-C_4)$-alkyl, $(C_1-C_4)$-alkoxy, halogen;
    where $(C_1-C_4)$-alkyl may be up to trisubstituted by halogen,
    where $(C_1-C_4)$-alkoxy may be up to trisubstituted by halogen,
  where phenyl may be substituted by 1 to 2 substituents independently of one another selected from the group of $(C_1-C_4)$-alkyl, $(C_3-C_5)$-cycloalkyl, $(C_1-C_4)$-alkoxy, cyano, hydroxy, halogen;
    where $(C_1-C_4)$-alkyl may be up to trisubstituted by halogen, $R_2$ represents hydrogen, $(C_1-C_4)$-alkyl;
  where $(C_1-C_4)$-alkyl may be up to trisubstituted by halogen,
  or
  together with the carbon atom to which $R_2$ is attached forms a $(C_3-C_4)$-cycloalkyl ring,
$R_3$ represents hydrogen, $(C_1-C_4)$-alkyl,
  where $(C_1-C_4)$-alkyl may be up to trisubstituted by halogen,
$R_4$ in $CR_4$ represents hydrogen, $(C_1-C_4)$-alkyl, $(C_3-C_4)$-cycloalkyl, phenyl, halogen;
  where $(C_1-C_4)$-alkyl may be up to trisubstituted by halogen and phenyl may be substituted by halogen,
  in $NR_4$ represents hydrogen, $(C_1-C_4)$-alkyl, $(C_3-C_4)$-cycloalkyl, phenyl;
  where $(C_1-C_4)$-alkyl may be up to trisubstituted by halogen and phenyl may be substituted by halogen,
$R_5$ represents hydrogen, $(C_1-C_4)$-alkyl, $(C_1-C_4)$-alkoxy, halogen,
$R_6$ represents a group of formula a), b), c), d), e), f) or g)

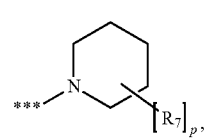

a)

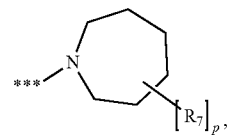

b)

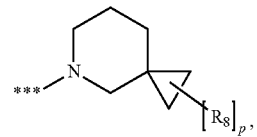

c)

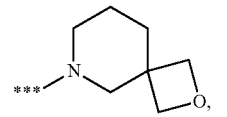

d)

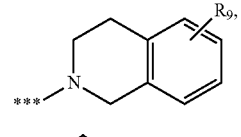

e)

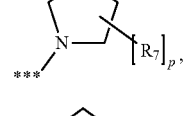

f)

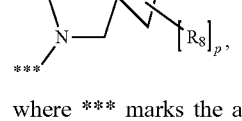

g)

where *** marks the attachment to the adjacent piperidine ring,
where $R_7$ represents hydrogen, $(C_1-C_4)$-alkyl, $(C_3-C_4)$-cycloalkyl, $(C_1-C_4)$-alkoxy, $(C_3-C_4)$-cycloalkoxy, phenyl,
  where $(C_1-C_4)$-alkyl may be substituted by $(C_3-C_4)$-cycloalkyl, $(C_1-C_4)$-alkoxy, $(C_3-C_4)$-cycloalkoxy and up to trisubstituted by halogen, where (C₁-C₄)-alkoxy may be substituted by (C₃-C₄)-cycloalkyl and up to trisubstituted by halogen,
where (C₃-C₄)-cycloalkyl may be substituted by monofluoromethyl, difluoromethyl or trifluoromethyl and up to disubstituted by halogen,
where (C₁-C₄)-alkoxy may be substituted by (C₃-C₄)-cycloalkyl and up to trisubstituted by halogen,
where (C₃-C₄)-cycloalkyl may be mono- or disubstituted by halogen,
where (C₃-C₄)-cycloalkoxy may be up to disubstituted by halogen,
where $R_8$ represents hydrogen or fluorine,
where $R_9$ represents hydrogen, (C₁-C₄)-alkyl, (C₁-C₄)-alkoxy, halogen;
where (C₁-C₄)-alkyl may be substituted by (C₁-C₄)-alkoxy,
n represents 0 or 1,
m represents 0, 1 or 2,
p represents 0, 1 or 2 and
q represents 0, 1 or 2,
and the salts, solvates and solvates of the salts thereof.

The present invention provides compounds of the general formula (I)

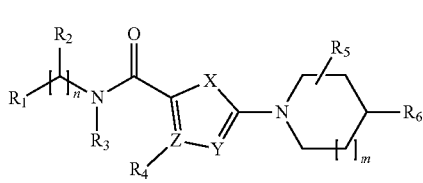

(I)

in which
X represents S, N, O;
Y represents N, S, O,
where, if X represents S, then Y represents N;
Z represents C, O, N,
where, if X represents N and Y represents N, then Z represents O;
$R_1$ represents 5- or 6-membered heteroaryl, phenyl,
where 5- to 6-membered heteroaryl may be substituted by 1 to 2 substituents independently of one another selected from the group of (C₁-C₄)-alkyl, (C₁-C₄)-alkoxy, halogen;
where (C₁-C₄)-alkyl may be up to trisubstituted by halogen,
where (C₁-C₄)-alkoxy may be up to trisubstituted by halogen,
where phenyl may be substituted by 1 to 2 substituents independently of one another selected from the group of (C₁-C₄)-alkyl, (C₃-C₅)-cycloalkyl, (C₁-C₄)-alkoxy, cyano, hydroxy, halogen;
where (C₁-C₄)-alkyl may be up to trisubstituted by halogen,
$R_2$ represents hydrogen, (C₁-C₄)-alkyl;
where (C₁-C₄)-alkyl may be up to trisubstituted by halogen,
or
together with the carbon atom to which $R_2$ is attached forms a (C₃-C₄)-cycloalkyl ring,
$R_3$ represents hydrogen, (C₁-C₄)-alkyl,
where (C₁-C₄)-alkyl may be up to trisubstituted by halogen, $R_4$ represents hydrogen, (C₁-C₄)-alkyl, (C₃-C₄)-cycloalkyl, phenyl, halogen;
where (C₁-C₄)-alkyl may be up to trisubstituted by halogen and phenyl may be substituted by halogen,
$R_5$ represents hydrogen, (C₁-C₄)-alkyl, (C₁-C₄)-alkoxy, halogen,
$R_6$ represents a group of formula a), b), c), d), e), f) or g)

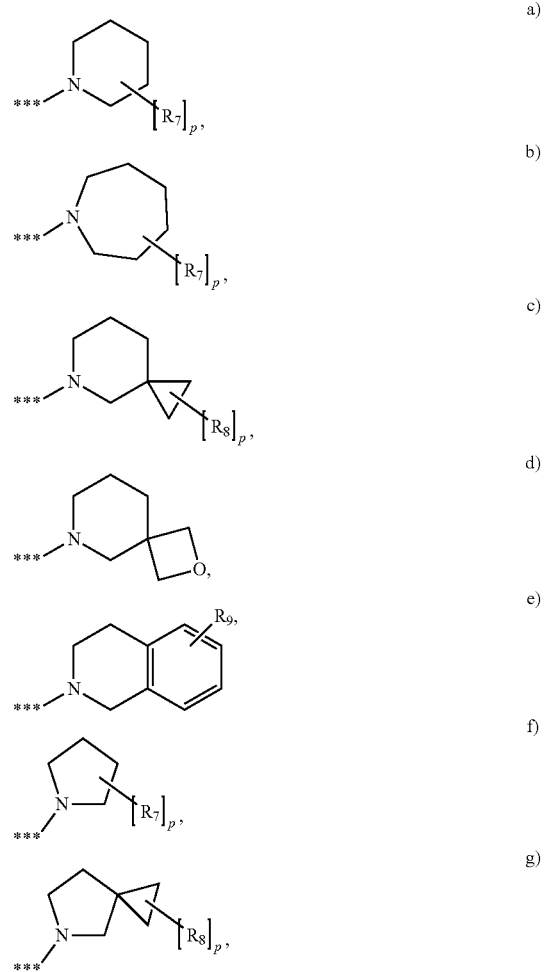

where *** marks the attachment to the adjacent piperidine ring,
where $R_7$ represents hydrogen, (C₁-C₄)-alkyl, (C₃-C₄)-cycloalkyl, (C₁-C₄)-alkoxy, (C₃-C₄)-cycloalkoxy, phenyl,
where (C₁-C₄)-alkyl may be substituted by (C₃-C₄)-cycloalkyl, (C₁-C₄)-alkoxy, (C₃-C₄)-cycloalkoxy and up to trisubstituted by halogen,
where (C₁-C₄)-alkoxy may be substituted by (C₃-C₄)-cycloalkyl and up to trisubstituted by halogen,
where (C₃-C₄)-cycloalkyl may be substituted by monofluoromethyl, difluoromethyl or trifluoromethyl and up to disubstituted by halogen,
where (C₁-C₄)-alkoxy may be substituted by (C₃-C₄)-cycloalkyl and up to trisubstituted by halogen,
where (C₃-C₄)-cycloalkyl may be mono- or disubstituted by halogen,
where (C₃-C₄)-cycloalkoxy may be up to disubstituted by halogen, where $R_8$ represents hydrogen or fluorine,
where $R_9$ represents hydrogen, $(C_1-C_4)$-alkyl, $(C_1-C_4)$-alkoxy, halogen;
where $(C_1-C_4)$-alkyl may be substituted by $(C_1-C_4)$-alkoxy,
n represents 0 or 1,
m represents 0, 1 or 2,
p represents 0, 1 or 2 and
q represents 0, 1 or 2,
and the salts, solvates and solvates of the salts thereof.

Compounds of the invention are the compounds of the formula (I) and the salts, solvates and solvates of the salts thereof, the compounds that are encompassed by formula (I) and are of the formulae mentioned below and the salts, solvates and solvates of the salts thereof and the compounds that are encompassed by formula (I) and are cited below as working examples and the salts, solvates and solvates of the salts thereof if the compounds that are encompassed by formula (I) and are mentioned below are not already salts, solvates and solvates of the salts.

Compounds of the invention are likewise N-oxides and S-oxides of the compounds of the formula (I) and the salts, solvates and solvates of the salts thereof.

Preferred salts in the context of the present invention are physiologically acceptable salts of the compounds according to the invention. Also encompassed are salts which are not themselves suitable for pharmaceutical applications but can be used, for example, for the isolation, purification or storage of the compounds of the invention.

A suitable pharmaceutically acceptable salt of the compounds of the present invention may be, for example, an acid-addition salt of a compound of the present invention bearing a sufficiently basic nitrogen atom in a chain or in a ring, such as an acid-addition salt with an inorganic acid, or "mineral acid", such as hydrochloric acid, hydrobromic acid, hydroiodic acid, sulfuric acid, sulfamic acid, bisulfuric acid, phosphoric acid or nitric acid, for example, or with an organic acid such as formic acid, acetic acid, acetoacetic acid, pyruvic acid, trifluoroacetic acid, propionic acid, butyric acid, hexanoic acid, heptanoic acid, undecanoic acid, lauric acid, benzoic acid, salicylic acid, 2-(4-hydroxybenzoyl)benzoic acid, camphoric acid, cinnamic acid, cyclopentanepropionic acid, digluconic acid, 3-hydroxy-2-naphthoic acid, nicotinic acid, pamoic acid, pectinic acid, 3-phenylpropionic acid, pivalic acid, 2-hydroxyethanesulfonic acid, itaconic acid, trifluoromethanesulfonic acid, dodecylsulfuric acid, ethanesulfonic acid, benzenesulfonic acid, para-toluenesulfonic acid, methanesulfonic acid, 2-naphthalenesulfonic acid, naphthalenedisulfonic acid, camphorsulfonic acid, citric acid, tartaric acid, stearic acid, lactic acid, oxalic acid, malonic acid, succinic acid, malic acid, adipic acid, alginic acid, maleic acid, fumaric acid, D-gluconic acid, mandelic acid, ascorbic acid, glucoheptanoic acid, glycerophosphoric acid, aspartic acid, sulfosalicylic acid or thiocyanic acid, for example.

Further, another suitable pharmaceutically acceptable salt of a sufficiently acidic compound of the present invention is an alkali metal salt, for example a sodium or potassium salt, an alkaline earth metal salt, for example a calcium, magnesium or strontium salt, or an aluminum or zinc salt, or an ammonium salt derived from ammonia or from an organic primary, secondary or tertiary amine having 1 to 20 carbon atoms, such as ethylamine, diethylamine, triethylamine, ethyldiisopropylamine, monoethanolamine, diethanolamine, triethanolamine, dicyclohexylamine, dimethylaminoethanol, diethylaminoethanol, tris(hydroxymethyl)aminomethane, procaine, dibenzylamine, N-methylmorpholine, arginine, lysine, 1,2-ethylenediamine, N-methylpiperidine, N-methylglucamine, N,N-dimethylglucamine, N-ethylglucamine, 1,6-hexanediamine, glucosamine, sarcosine, serinol, 2-amino-1,3-propanediol, 3-amino-1,2-propanediol, 4-amino-1,2,3-butanetriol, or a salt with a quaternary ammonium ion having 1 to 20 carbon atoms, such as tetramethylammonium, tetraethylammonium, tetra(n-propyl)ammonium, tetra(n-butyl)ammonium, N-benzyl-N,N,N-trimethylammonium, choline or benzalkonium.

Those skilled in the art will further recognize that it is possible for acid addition salts of the claimed compounds to be prepared by reaction of the compounds with the appropriate inorganic or organic acid via any of a number of known methods. Alternatively, alkali and alkaline earth metal salts of acidic compounds of the present invention are prepared by reacting the compounds of the present invention with the appropriate base via a variety of known methods.

The present invention includes all possible salts of the compounds of the present invention as single salts, or as any mixture of said salts, in any ratio.

In the present text, in particular in the Experimental Section, for the synthesis of intermediates and of examples of the present invention, when a compound is mentioned as a salt form with the corresponding base or acid, the exact stoichiometric composition of said salt form, as obtained by the respective preparation and/or purification process, is, in most cases, unknown. Unless specified otherwise, suffixes to chemical names or structural formulae relating to salts, such as "hydrochloride", "trifluoroacetate", "sodium salt", or "x HCl", "x $CF_3COOH$", "x $Na^+$", for example, mean a salt form, the stoichiometry of this salt not being specified. This applies analogously to cases in which synthesis intermediates or example compounds or salts thereof have been obtained as solvates, for example hydrates, by the preparation and/or purification processes described.

Solvates in the context of the invention are described as those forms of the compounds according to the invention which form a complex in the solid or liquid state by coordination with solvent molecules. Hydrates are a specific form of the solvates in which the coordination is with water. Solvates preferred in the context of the present invention are hydrates.

The compounds of the invention may, depending on their structure, exist in different stereoisomeric forms, i.e. in the form of configurational isomers or else, if appropriate, as conformational isomers (enantiomers and/or diastereomers, including those in the case of atropisomers). The present invention therefore encompasses the enantiomers and diastereomers, and the respective mixtures thereof. It is possible to isolate the stereoisomerically homogeneous constituents from such mixtures of enantiomers and/or diastereomers in a known manner. Preference is given to employing chromatographic methods for this purpose, especially HPLC chromatography on achiral or chiral separation phases. In the case of carboxylic acids as intermediates or end products, separation is alternatively also possible via diastereomeric salts using chiral amine bases.

In the context of the present invention, the term "enantiomerically pure" is understood to the effect that the compound in question with respect to the absolute configuration of the chiral centers is present in an enantiomeric excess of more than 95%, preferably more than 98%. The enantiomeric excess, ee, is calculated here by evaluating an HPLC analysis chromatogram on a chiral phase using the formula below:

$$ee = \left| \frac{\text{Enantiomer 1 (Area percentage)} - \text{Enantiomer 2 (Area percentage)}}{\text{Enantiomer 1 (Area percentage)} + \text{Enantiomer 2 (Area percentage)}} \right| \times 100\%.$$

If the compounds of the invention can occur in tautomeric forms, the present invention encompasses all the tautomeric forms.

The present invention also encompasses all suitable isotopic variants of the compounds of the invention. An isotopic variant of a compound according to the invention is understood here to mean a compound in which at least one atom within the compound according to the invention has been exchanged for another atom of the same atomic number, but with a different atomic mass from the atomic mass which usually or predominantly occurs in nature ("unnatural fraction"). The expression "unnatural fraction" is understood to mean a fraction of such an isotope higher than its natural frequency. The natural frequencies of isotopes to be employed in this connection can be found in "Isotopic Compositions of the Elements 1997", Pure Appl. Chem., 70(1), 217-235, 1998. Examples of isotopes which can be incorporated into a compound according to the invention are those of hydrogen, carbon, nitrogen, oxygen, phosphorus, sulfur, fluorine, chlorine, bromine and iodine, such as $^2$H (deuterium), $^3$H (tritium) $^{13}$C, $^{14}$C, $^{15}$N, $^{17}$O, $^{18}$O, $^{32}$P, $^{33}$P, $^{33}$S, $^{34}$S, $^{35}$S, $^{36}$S, $^{18}$F, $^{36}$Cl, $^{82}$Br, $^{123}$I, $^{124}$I, $^{129}$I and $^{131}$I. Particular isotopic variants of a compound according to the invention, especially those in which one or more radioactive isotopes have been incorporated, may be beneficial, for example, for the examination of the mechanism of action or of the active ingredient distribution in the body; due to the comparatively easy preparability and detectability, especially compounds labeled with $^3$H or $^{14}$C isotopes are suitable for this purpose. In addition, the incorporation of isotopes, for example of deuterium, can lead to particular therapeutic benefits as a consequence of greater metabolic stability of the compound, for example an extension of the half-life in the body or a reduction in the active dose required; such modifications of the compounds of the invention may therefore possibly also constitute a preferred embodiment of the present invention. With regard to the treatment and/or prophylaxis of the disorders specified here, the isotopic variant(s) of the compounds of the general formula (I) preferably contain deuterium ("deuterium-containing compounds of the general formula (I)"). Isotopic variants of the compounds of the general formula (I) into which one or more radioactive isotopes such as $^3$H or $^{14}$C have been incorporated are beneficial, for example, in medicament and/or substrate tissue distribution studies. Because of their easy incorporability and detectability, these isotopes are particularly preferred. It is possible to incorporate positron-emitting isotopes such as $^{18}$F or $^{11}$C into a compound of the general formula (I). These isotopic variants of the compounds of the general formula (I) are suitable for use in in vivo imaging applications. Deuterium-containing and $^{13}$C-containing compounds of the general formula (I) can be used within the scope of preclinical or clinical studies in mass spectrometry analyses (H. J. Leis et al., Curr. Org. Chem., 1998, 2, 131). Isotopic variants of the compounds of the invention can be prepared by commonly used processes known to those skilled in the art, for example by the methods described further down and the procedures described in the working examples, by using corresponding isotopic modifications of the respective reagents and/or starting compounds.

Isotopic variants of the compounds of the general formula (I) can generally be prepared by processes known to those skilled in the art as described in the schemes and/or examples described here, by replacing a reagent with an isotopic variant of the reagent, preferably a deuterium-containing reagent. According to the deuteration sites desired, it is possible in some cases to incorporate deuterium from D$_2$O either directly into the compounds or into reagents which can be used for the synthesis of such compounds (Esaki et al., Tetrahedron, 2006, 62, 10954; Esaki et al., Chem. Eur. 1, 2007, 13, 4052). A photochemical deuteration and tritiation method has also been described (Y. Y. Loh et al., Science 10.1126/science.aap9674 (2017). Another useful reagent for incorporation of deuterium into molecules is deuterium gas. A rapid route for incorporation of deuterium is the catalytic deuteration of olefinic bonds (H. J. Leis et al., Curr. Org. Chem., 1998, 2, 131; J. R. Morandi et al., J. Org. Chem., 1969, 34 (6), 1889) and acetylenic bonds (N. H. Khan, J. Am. Chem. Soc., 1952, 74 (12), 3018; S. Chandrasekhar et al., Tetrahedron, 2011, 52, 3865). For direct exchange of hydrogen for deuterium in hydrocarbons containing functional groups, it is also possible to use metal catalysts (i.e. Pd, Pt and Rh) in the presence of deuterium gas (J. G. Atkinson et al., U.S. Pat. No. 3,966,781). Various deuterated reagents and synthesis units are commercially available from companies like, for example, C/D/N Isotopes, Quebec, Canada; Cambridge Isotope Laboratories Inc., Andover, MA, USA; and CombiPhos Catalysts, Inc., Princeton, NJ, USA. Further information relating to the prior art with regard to deuterium-hydrogen exchange can be found, for example, in Hanzlik et al., J. Org. Chem., 1990, 55, 3992-3997; R. P. Hanzlik et al., Biochem. Biophys. Res. Commun., 1989, 160, 844; P. J. Reider et al., J. Org. Chem., 1987, 52, 3326-3334; M. Jarman et al., Carcinogenesis, 1993, 16(4), 683-688; J. Atzrodt et al., Angew. Chem., Int. Ed. 2007, 46, 7744; K. Matoishi et al., 2000, J. Chem. Soc, Chem. Commun., 1519-1520; K. Kassahun et al., WO 2012/112363.

The term "deuterium-containing compound of the general formula (I)" is defined as a compound of the general formula (I) in which one or more hydrogen atoms have been replaced by one or more deuterium atoms and in which the frequency of deuterium in every deuterated position in the compound of the general formula (I) is higher than the natural frequency of deuterium, which is about 0.015%. More particularly, in a deuterium-containing compound of the general formula (I), the frequency of deuterium in every deuterated position in the compound of the general formula (I) is higher than 10%, 20%, 30%, 40%, 50%, 60%, 70% or 80%, preferably higher than 90%, 95%, 96% or 97%, even further preferably higher than 98% or 99%, in this position or these positions. It will be apparent that the frequency of deuterium in every deuterated position is independent of the frequency of deuterium in other deuterated positions.

The selective incorporation of one or more deuterium atoms into a compound of the general formula (I) can alter the physicochemical properties (for example acidity [A. Streitwieser et al., J. Am. Chem. Soc., 1963, 85, 2759; C. L. Perrin et al., J. Am. Chem. Soc., 2007, 129, 4490], basicity [C. L. Perrin, et al., J. Am. Chem. Soc., 2003, 125, 15008; C. L. Perrin in Advances in Physical Organic Chemistry, 44, 144; C. L. Perrin et al., J. Am. Chem. Soc., 2005, 127, 9641], lipophilicity [B. Testa et al., Int. J. Pharm., 1984, 19(3), 271]) and/or the metabolic profile of the molecule, and cause changes in the ratio of parent compound to metabolites or the amounts of metabolites formed. Such changes may lead to particular therapeutic benefits and therefore be preferable under particular circumstances. Reduced rates of metabolism and metabolic switching, where the ratio of metabolites is changed, have been reported (D. J. Kushner et al., Can. J. Physiol. Pharmacol., 1999, 77, 79; A. E. Mutlib et al., Toxicol. Appl. Pharmacol., 2000, 169, 102). These changes in the exposure to parent compound and metabolites can have important consequences with respect to the pharmacodynamics, tolerability and efficacy of a deuterium-containing compound of the general formula (I). In some cases deuterium substitution reduces or eliminates the formation of an undesired or toxic metabolite and enhances the formation of a desired metabolite (e.g. Nevirapine: A. M. Sharma et al., Chem. Res. Toxicol., 2013, 26, 410; Uetrecht et al., Chemical Research in Toxicology, 2008, 21, 9, 1862; Efavirenz: A. E. Mutlib et al., Toxicol. Appl. Pharmacol., 2000, 169, 102). In other cases the major effect of deuteration is to reduce the rate of systemic clearance. As a result, the biological half-life of the compound is increased. The potential clinical benefits would include the ability to maintain similar systemic exposure with decreased peak levels and increased trough levels. This could result in lower side effects and enhanced efficacy, depending on the particular compound's pharmacokinetic/pharmacodynamic relationship. Indiplon (A. J. Morales et al., Abstract 285, The 15$^{th}$ North American Meeting of the International Society of Xenobiotics, San Diego, CA, Oct. 12-16, 2008), ML-337 (C. J. Wenthur et al., J. Med. Chem., 2013, 56, 5208), and Odanacatib (K. Kassahun et al., WO2012/112363) are examples for this deuterium effect. Still other cases have been reported in which reduced rates of metabolism result in an increase in exposure of the drug without changing the rate of systemic clearance (e.g. Rofecoxib: F. Schneider et al., Arzneim. Forsch. Drug. Res., 2006, 56, 295; Telaprevir: F. Maltais et al., J. Med. Chem., 2009, 52, 7993). Deuterated drugs showing this effect may have reduced dosing requirements (e.g. lower number of doses or lower dosage to achieve the desired effect) and/or may produce lower metabolite loads.

A compound of general formula (I) may have multiple potential sites of attack for metabolism. To optimize the above-described effects on physicochemical properties and metabolic profile, deuterium-containing compounds of general formula (I) having a certain pattern of one or more deuterium-hydrogen exchange(s) can be selected. Particularly, the deuterium atom(s) of deuterium-containing compound(s) of general formula (I) is/are attached to a carbon atom and/or is/are located at those positions of the compound of general formula (I), which are sites of attack for metabolizing enzymes such as e.g. cytochrome $P_{450}$.

The present invention additionally also encompasses prodrugs of the compounds of the invention. The term "prodrugs" refers here to compounds which may themselves be biologically active or inactive, but are converted while present in the body, for example by a metabolic or hydrolytic route, to compounds of the invention.

In the context of the present invention, unless specified otherwise, the substituents are defined as follows:

Alkyl in the context of the invention is a straight-chain or branched alkyl radical having the particular number of carbon atoms specified. Examples include: methyl, ethyl, n-propyl, isopropyl, n-butyl, isobutyl, 1-methylpropyl, tert-butyl, n-pentyl, isopentyl, 1-ethylpropyl, 1-methylbutyl, 2-methylbutyl, 3-methylbutyl, n-hexyl, 1-methylpentyl, 2-methylpentyl, 3-methylpentyl, 4-methylpentyl, 3,3-dimethylbutyl, 1-ethylbutyl, 2-ethylbutyl, 1,4-dimethylpentyl, 4,4-dimethylpentyl and 1,4,4-trimethylpentyl.

Alkoxy in the context of the invention is a straight-chain or branched alkoxy radical having 1 to 4 carbon atoms. Examples include: methoxy, ethoxy, n-propoxy, isopropoxy, 1-methylpropoxy, n-butoxy, isobutoxy and tert-butoxy.

Cycloalkoxy in the context of the invention is a cyclic alkoxy radical having 3 to 4 carbon atoms. Examples include: cyclopropoxy or cyclobutoxy.

Cycloalkyl or carbocycle in the context of the invention is a mono-, poly- or spirocyclic, preferably mono- or bicyclic, saturated carbocycle having a total of 3 to 8 ring atoms. A monocyclic saturated carbocycle is referred to synonymously as cycloalkyl. Examples include: cyclopropyl, cyclobutyl, cyclopentyl, cyclohexyl, cycloheptyl, cyclopentenyl, cyclohexenyl, cyclohexadienyl, cycloheptenyl, cycloheptadienyl, spiro[2.3]hexyl, spiro[2.4]heptyl, spiro[2.5]octyl, bicyclo[1.1.1]pentyl, bicyclo[2.2.1]heptyl, bicyclo[4.1.0]heptyl, bicyclo[2.2.2]octyl, tricyclo[3.3.1.13,7]decyl Monocyclic cycloalkyl having 3 to 5 carbon atoms is preferred. Examples include: cyclopropyl, cyclobutyl or cyclopentyl.

5- or 6-membered heteroaryl in the context of the invention is a monocyclic aromatic heterocycle (heteroaromatic) which has a total of 5 or 6 ring atoms, contains up to three identical or different ring heteroatoms from the series N, O and/or S and is attached via a ring carbon atom or optionally via a ring nitrogen atom. Examples include: furyl, pyrrolyl, thienyl, pyrazolyl, imidazolyl, thiazolyl, oxazolyl, isoxazolyl, isothiazolyl, triazolyl, oxadiazolyl, thiadiazolyl, tetrazolyl, pyridyl, pyrimidinyl, pyridazinyl or pyrazinyl.

In general, and unless stated otherwise, the heteroaryl groups include all possible isomeric forms, for example tautomers and positional isomers in relation to the attachment point to the rest of the molecule. Thus, the term pyridyl embraces, as non-limiting examples, 2-pyridyl, 3-pyridyl and 4-pyridyl, or the term thienyl embraces 2-thienyl and 3-thienyl.

Halogen in the context of the invention includes fluorine, chlorine, bromine and iodine. Preference is given to chlorine or fluorine.

When radicals in the compounds of the invention are substituted, the radicals may be mono- or polysubstituted, unless specified otherwise. In the context of the present invention, all radicals which occur more than once are defined independently of one another. When radicals in the compounds of the invention are substituted, the radicals may be mono- or polysubstituted, unless specified otherwise. Substitution by one substituent or by two identical or different substituents is preferred.

In the context of the present invention, the term "treatment" or "treating" includes inhibition, retardation, checking, alleviating, attenuating, restricting, reducing, suppressing, repelling or healing of a disease, a condition, a disorder, an injury or a health problem, or the development, the course or the progression of such states and/or the symptoms of such states. The term "therapy" is understood here to be synonymous with the term "treatment".

The terms "prevention", "prophylaxis" and "preclusion" are used synonymously in the context of the present invention and refer to the avoidance or reduction of the risk of contracting, experiencing, suffering from or having a disease, a condition, a disorder, an injury or a health problem, or a development or advancement of such states and/or the symptoms of such states.

The treatment or prevention of a disease, a condition, a disorder, an injury or a health problem may be partial or complete.

Preference is given in the context of the present invention to compounds of the formula (I) in which
X represents S or N;
Y represents N, S or O,
where, if X represents S, then Y represents N;
Z represents $CR_4$, N or O,
where, if X represents N and Y represents N, then Z represents O;
where, if X represents S, then Z represents N or $CR_4$
$R_1$ represents pyridinyl, pyrazolyl, thiazolyl, thienyl, phenyl,
where pyridinyl may be substituted by 1 to 2 substituents independently of one another selected from the group of $(C_1-C_2)$-alkyl, fluorine, chlorine, trifluoromethyl, trifluoromethoxy,
where pyrazolyl may be substituted by 1 to 2 substituents independently of one another selected from the group of $(C_1-C_2)$-alkyl, fluorine, chlorine, trifluoromethyl,
where thiazolyl may be substituted by 1 to 2 substituents independently of one another selected from the group of fluorine, chlorine,
where thienyl may be substituted by 1 to 2 substituents independently of one another selected from the group of fluorine, chlorine,
where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
$R_2$ represents hydrogen, $(C_1-C_2)$-alkyl,
or
together with the carbon atom to which $R_2$ is attached forms a cyclopropyl ring,
$R_3$ represents hydrogen, $(C_1-C_2)$-alkyl;
$R_4$ represents hydrogen, $(C_1-C_2)$-alkyl, $(C_3-C_4)$-cycloalkyl, trifluoromethyl, bromine, chlorine, phenyl;
where phenyl may be substituted by halogen,
$R_5$ represents hydrogen, $(C_1-C_2)$-alkyl, methoxy, fluorine;
$R_6$ represents a group of the formula a), b), c) or e),

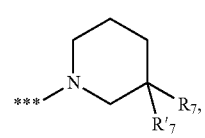  a)

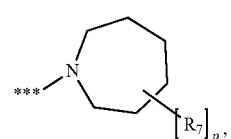  b)

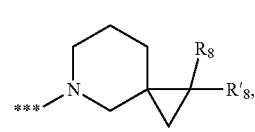  c)

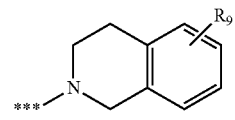  e)

where *** marks the attachment to the adjacent piperidine ring,
where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl,
where $(C_1-C_4)$-alkyl may be substituted by methoxy, n-butoxy, cyclopropyl, cyclobutoxy and up to disubstituted by fluorine,
where methoxy may be substituted by cyclopropyl, cyclobutyl, trifluoromethyl,
where cyclopropyl may be substituted by monofluoromethyl, difluoromethyl, trifluoromethyl,
where cyclobutyl may be up to disubstituted by fluorine,
where n-butoxy may be up to disubstituted by fluorine,
where $(C_1-C_2)$-alkoxy may be substituted by cyclopropyl, cyclobutyl, cyclobutoxy, trifluoromethyl and
where cyclopropyl and cyclobutyl may be up to disubstituted by fluorine,
where $(C_3-C_4)$-cycloalkoxy may be up to disubstituted by fluorine,
where $R_8$ or $R'_8$ independently of one another represent hydrogen or fluorine,
where $R_9$ represents hydrogen, $(C_1-C_4)$-alkyl, $(C_1-C_2)$-alkoxy, methoxyethyl, fluorine, chlorine;
n represents 0 or 1 and
m represents 1 or 2,
q represents 0 or 2,
and the salts, solvates and solvates of the salts thereof.
Preference is given in the context of the present invention to compounds of the formula (I) in which
X represents S, N;
Y represents N, S, O,
where, if X represents S, then Y represents N;
Z represents C, O,
where, if X represents N and Y represents N, then Z represents O;
$R_1$ represents pyridinyl, pyrazolyl, thiazolyl, thienyl, phenyl,
where pyridinyl may be substituted by 1 to 2 substituents independently of one another selected from the group of $(C_1-C_2)$-alkyl, fluorine, chlorine, trifluoromethyl, trifluoromethoxy,
where pyrazolyl may be substituted by 1 to 2 substituents independently of one another selected from the group of $(C_1-C_2)$-alkyl, fluorine, chlorine, trifluoromethyl,
where thiazolyl may be substituted by 1 to 2 substituents independently of one another selected from the group of fluorine, chlorine,
where thienyl may be substituted by 1 to 2 substituents independently of one another selected from the group of fluorine, chlorine,
where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
$R_2$ represents hydrogen, $(C_1-C_2)$-alkyl,
or
together with the carbon atom to which $R_2$ is attached forms a cyclopropyl ring, $R_3$ represents hydrogen, $(C_1-C_2)$-alkyl;
$R_4$ represents hydrogen, $(C_1-C_2)$-alkyl, $(C_3-C_4)$-cycloalkyl, trifluoromethyl, bromine, chlorine, phenyl;
where phenyl may be substituted by halogen,
$R_5$ represents hydrogen, $(C_1-C_2)$-alkyl, methoxy, fluorine;
$R_6$ represents a group of the formula a), b), c) or e),

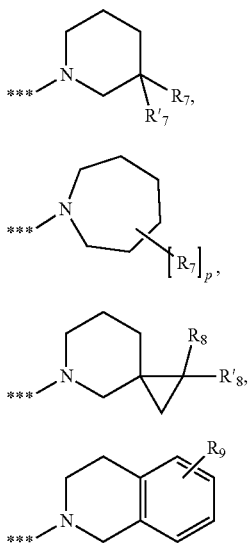

where *** marks the attachment to the adjacent piperidine ring,
where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl,
where $(C_1-C_4)$-alkyl may be substituted by methoxy, n-butoxy, cyclopropyl, cyclobutoxy and up to disubstituted by fluorine,
where methoxy may be substituted by cyclopropyl, cyclobutyl, trifluoromethyl,
where cyclopropyl may be substituted by monofluoromethyl, difluoromethyl, trifluoromethyl,
where cyclobutyl may be up to disubstituted by fluorine,
where n-butoxy may be up to disubstituted by fluorine,
where $(C_1-C_2)$-alkoxy may be substituted by cyclopropyl, cyclobutyl, cyclobutoxy, trifluoromethyl and
where cyclopropyl and cyclobutyl may be up to disubstituted by fluorine,
where $(C_3-C_4)$-cycloalkoxy may be up to disubstituted by fluorine,
where $R_8$ or $R'_8$ independently of one another represent hydrogen or fluorine,
where $R_9$ represents hydrogen, $(C_1-C_4)$-alkyl, $(C_1-C_2)$-alkoxy, methoxyethyl, fluorine, chlorine;
n represents 0 or 1 and
m represents 1 or 2,
q represents 0 or 2,
and the salts, solvates and solvates of the salts thereof.

In the context of the present invention, preference is given to compounds of the formula (I)
in which
X, Y and Z are selected such that the aromatic 5-membered ring has the structural formula h), i), j), k) or (r),

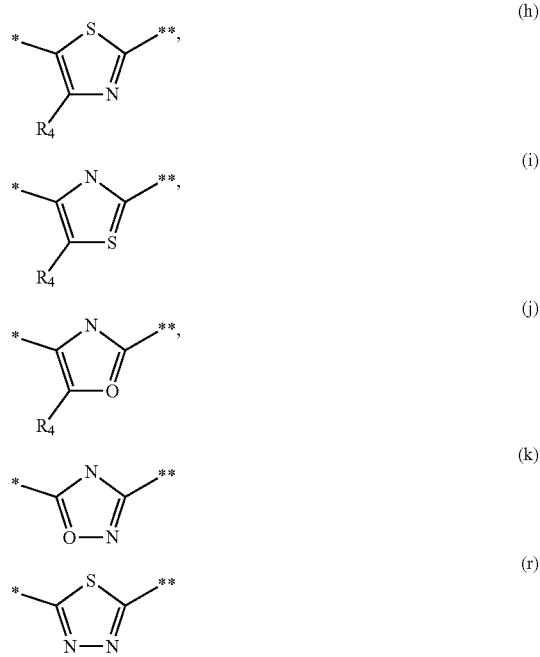

where * marks the attachment to the carbonyl group and ** marks the attachment to the nitrogen atom of the adjacent piperidine ring and
$R_1$ represents pyridinyl, pyrazolyl, thiazolyl, thienyl, phenyl,
where pyridinyl may be substituted by 1 to 2 substituents independently of one another selected from the group of $(C_1-C_2)$-alkyl, fluorine, chlorine, trifluoromethyl, trifluoromethoxy,
where pyrazolyl may be substituted by 1 to 2 substituents independently of one another selected from the group of $(C_1-C_2)$-alkyl, fluorine, chlorine, trifluoromethyl,
where thiazolyl may be substituted by chlorine,
where thienyl may be substituted by fluorine,
where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
$R_2$ represents hydrogen, methyl,
or
together with the carbon atom to which $R_2$ is attached forms a cyclopropyl ring,
$R_3$ represents hydrogen, $(C_1-C_2)$-alkyl;
$R_4$ represents hydrogen, methyl, ethyl, cyclopropyl, trifluoromethyl, bromine, chlorine, phenyl;
where phenyl may be substituted by chlorine,
$R_5$ represents hydrogen, fluorine;

$R_6$ represents a group of the formula a), b'), b"), c'), c") or e), a)
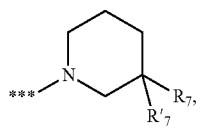

b')
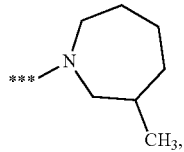

b")
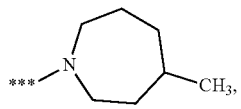

c')
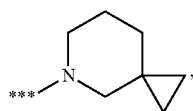

c")
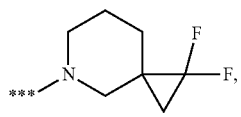

e)
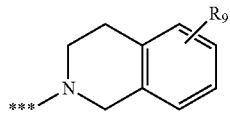

where *** marks the attachment to the adjacent piperidine ring,
where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl,
where $(C_1-C_4)$-alkyl may be substituted by methoxy, n-butoxy, cyclopropyl, cyclobutoxy and up to disubstituted by fluorine,
where methoxy may be substituted by cyclopropyl, cyclobutyl, trifluoromethyl,
where cyclopropyl may be substituted by monofluoromethyl, difluoromethyl, trifluoromethyl,
where cyclobutyl may be up to disubstituted by fluorine,
where n-butoxy may be up to disubstituted by fluorine,
where $(C_1-C_2)$-alkoxy may be substituted by cyclopropyl, cyclobutyl, cyclobutoxy, trifluoromethyl and
where cyclopropyl and cyclobutyl may be up to disubstituted by fluorine,
where $(C_3-C_4)$-cycloalkoxy may be up to disubstituted by fluorine,
where $R_9$ represents hydrogen, methyl, tert-butyl, methoxy, methoxymethyl, fluorine, chlorine;
n represents 0 or 1 and
m represents 1 or 2,
and the salts, solvates and solvates of the salts thereof.

In the context of the present invention, preference is given to compounds of the formula (I)
in which
X, Y and Z represent a group of the formula h), i), j), k) or (r), (h)
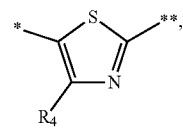

(i)
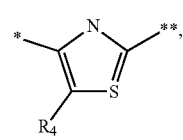

(j)
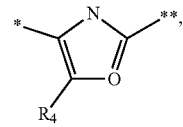

(k)
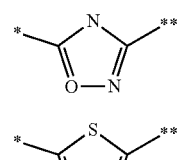

(r)
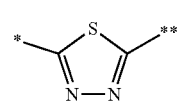

where * marks the attachment to the carbonyl group and ** marks the attachment to the nitrogen atom of the adjacent piperidine ring and
$R_1$ represents pyridinyl, pyrazolyl, thiazolyl, thienyl, phenyl,
where pyridinyl may be substituted by 1 to 2 substituents independently of one another selected from the group of $(C_1-C_2)$-alkyl, fluorine, chlorine, trifluoromethyl, trifluoromethoxy,
where pyrazolyl may be substituted by 1 to 2 substituents independently of one another selected from the group of $(C_1-C_2)$-alkyl, fluorine, chlorine, trifluoromethyl,
where thiazolyl may be substituted by chlorine,
where thienyl may be substituted by fluorine,
where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
$R_2$ represents hydrogen, methyl,
or
together with the carbon atom to which $R_2$ is attached forms a cyclopropyl ring,
$R_3$ represents hydrogen, $(C_1-C_2)$-alkyl;
$R_4$ represents hydrogen, methyl, ethyl, cyclopropyl, trifluoromethyl, bromine, chlorine, phenyl;
where phenyl may be substituted by chlorine,
$R_5$ represents hydrogen, fluorine;

$R_6$ represents a group of the formula a), b'), b"), c'), c") or e),

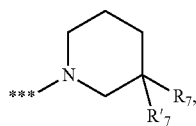
a)

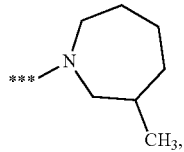
b')

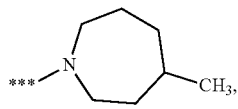
b")

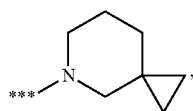
c')

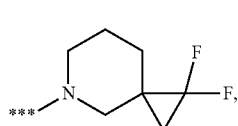
c")

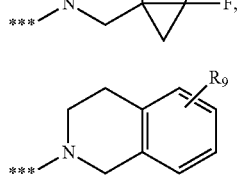
e)

where *** marks the attachment to the adjacent piperidine ring,
where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl,
where $(C_1-C_4)$-alkyl may be substituted by methoxy, n-butoxy, cyclopropyl, cyclobutoxy and up to disubstituted by fluorine,
where methoxy may be substituted by cyclopropyl, cyclobutyl, trifluoromethyl,
where cyclopropyl may be substituted by monofluoromethyl, difluoromethyl, trifluoromethyl,
where cyclobutyl may be up to disubstituted by fluorine,
where n-butoxy may be up to disubstituted by fluorine,
where $(C_1-C_2)$-alkoxy may be substituted by cyclopropyl, cyclobutyl, cyclobutoxy, trifluoromethyl and
where cyclopropyl and cyclobutyl may be up to disubstituted by fluorine,
where $(C_3-C_4)$-cycloalkoxy may be up to disubstituted by fluorine,
where $R_9$ represents hydrogen, methyl, tert-butyl, methoxy, methoxymethyl, fluorine, chlorine;
n represents 0 or 1 and
m represents 1 or 2,
and the salts, solvates and solvates of the salts thereof.

In the context of the present invention, preference is given to compounds of the formula (I)
in which
X, Y and Z are selected such that the aromatic 5-membered ring has the structural formula h'), i'), j') or k),

(h')

(i')

(j')

(k)

$R_1$ represents pyridinyl, 2-ethylpyridinyl, 4,6-dimethylpyridinyl, 3,5-difluoropyridinyl, 3-fluoropyridinyl, 4-trifluoromethylpyridinyl, 6-trifluoromethylpyridinyl, 5-chloro-3-fluoropyridinyl, 3-chloro-5-fluoropyridinyl, 3-methylpyridinyl, 4-methylpyridinyl, 6-methylpyridinyl, 3-chloropyridinyl, 5-chloropyridinyl, 6-trifluoromethoxypyridinyl, phenyl, 2-methylphenyl, 3-methylphenyl, 4-methylphenyl, 3-methoxyphenyl, 4-trifluoromethylphenyl, 2-chlorophenyl, 3-chlorophenyl, 4-chlorophenyl, 2-fluorophenyl, 3-fluorophenyl, 4-fluorophenyl, 3-hydroxyphenyl, 2,5-difluorophenyl, 5-chloro-2-hydroxyphenyl, 5-fluoro-2-methoxyphenyl, 5-chloro-2-fluorophenyl, 2-chloro-5-fluorophenyl, 2-chloro-4-fluorophenyl, 3-cyano-4-fluorophenyl, 2-cyclopropylphenyl, 4-chloro-1-methyl-1H-pyrazolyl, 5-chloro-1,3-thiazolyl, 5-fluoro-2-thienyl;
$R_2$ represents hydrogen or methyl;
$R_3$ represents hydrogen, methyl;
$R_4$ represents hydrogen, ethyl, trifluoromethyl;
$R_5$ represents hydrogen, fluorine;
$R_6$ represents a group of the formula a), c'), or c")

a)

c')

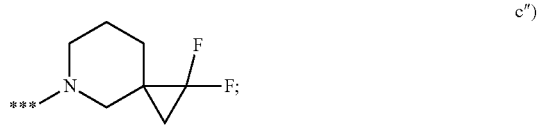
c");

where *** marks the attachment to the adjacent piperidine ring, where $R_7$ and $R'_7$ independently of one another represent hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine;

n represents 0 or 1 and m represents 1, and the salts, solvates and solvates of the salts thereof.

Preference is given in the context of the present invention to compounds of the formula (I) in which X, Y and Z represent 1,3-thiazolyl, 1,3-oxazolyl, 1,2,4-oxadiazolyl;

$R_1$ represents pyridinyl, 2-ethylpyridinyl, 4,6-dimethylpyridinyl, 3,5-difluoropyridinyl, 3-fluoropyridinyl, 4-trifluoromethylpyridinyl, 6-trifluoromethylpyridinyl, 5-chloro-3-fluoropyridinyl, 3-chloro-5-fluoropyridinyl, 3-methylpyridinyl, 4-methylpyridinyl, 6-methylpyridinyl, 3-chloropyridinyl, 5-chloropyridinyl, 6-trifluoromethoxypyridinyl, phenyl, 2-methylphenyl, 3-methylphenyl, 4-methylphenyl, 3-methoxyphenyl, 4-trifluoromethylphenyl, 2-chlorophenyl, 3-chlorophenyl, 4-chlorophenyl, 2-fluorophenyl, 3-fluorophenyl, 4-fluorophenyl, 3-hydroxyphenyl, 2,5-difluorophenyl, 5-chloro hydroxyphenyl, 5-fluoro-2-methoxyphenyl, 5-chloro-2-fluorophenyl, 2-chloro fluorophenyl, 2-chloro-4-fluorophenyl, 3-cyano-4-fluorophenyl, 2-cyclopropylphenyl, 4-chloro-1-methyl-1H-pyrazolyl, 5-chloro-1,3-thiazolyl, 5-fluoro-2-thienyl;

$R_2$ represents hydrogen or methyl;

$R_3$ represents hydrogen, methyl;

$R_4$ represents hydrogen or methyl, ethyl, trifluoromethyl;

$R_5$ represents hydrogen, fluorine;

$R_6$ represents a group of the formula a), c') or c")

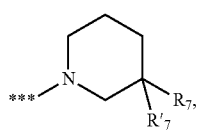

a)

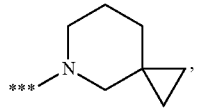

c')

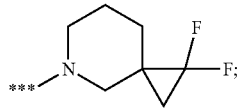

c")

where *** marks the attachment to the adjacent piperidine ring, where $R_7$ and $R'_7$ independently of one another represent hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine;

n represents 0 or 1 and m represents 1, and the salts, solvates and solvates of the salts thereof.

In the context of the present invention, preference is given to compounds of the formula (I) in which X, Y and Z are selected such that the aromatic 5-membered ring has the structural formula h')

(h')

$R_1$ represents pyridinyl, 2-ethylpyridinyl, 4,6-dimethylpyridinyl, 3,5-difluoropyridinyl, 3-fluoropyridinyl, 4-trifluoromethylpyridinyl, 6-trifluoromethylpyridinyl, 5-chloro fluoropyridinyl, 3-chloro-5-fluoropyridinyl, 3-methylpyridinyl, 4-methylpyridinyl, 6-methylpyridinyl, 3-chloropyridinyl, 5-chloropyridinyl, 6-trifluoromethoxypyridinyl, phenyl, 2-methylphenyl, 3-methylphenyl, 4-methylphenyl, 3-methoxyphenyl, 4-trifluoromethylphenyl, 2-chlorophenyl, 3-chlorophenyl, 4-chlorophenyl, 2-fluorophenyl, 3-fluorophenyl, 4-fluorophenyl, 3-hydroxyphenyl, 2,5-difluorophenyl, 5-chloro-2-hydroxyphenyl, 5-fluoro-2-methoxyphenyl, 5-chloro-2-fluorophenyl, 2-chloro-5-fluorophenyl, 2-chloro-4-fluorophenyl, 3-cyano-4-fluorophenyl, 2-cyclopropylphenyl, 4-chloro-1-methyl-1H-pyrazolyl, 5-chloro-1,3-thiazolyl, 5-fluoro-2-thienyl;

$R_2$ represents hydrogen or methyl;

$R_3$ represents hydrogen;

$R_5$ represents hydrogen, fluorine;

$R_6$ represents a group of the formula a), c') or c")

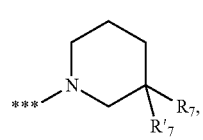

a)

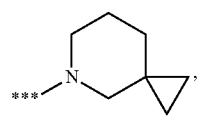

c')

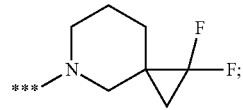

c")

where *** marks the attachment to the adjacent piperidine ring, where $R_7$ and $R'_7$ independently of one another represent hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine;

n represents 0 or 1 and m represents 1, and the salts, solvates and solvates of the salts thereof.

A particular embodiment of the present invention relates to compounds of the formula (I) in which X, Y and Z are selected such that the aromatic 5-membered ring has the structural formula h), i), j), k) or (r);

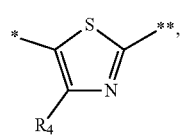
(h)

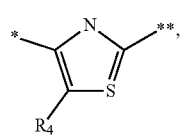
(i)

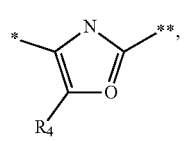
(j)

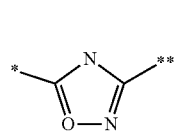
(k)

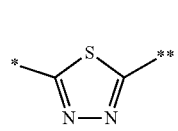
(r)

where * marks the attachment to the carbonyl group and ** marks the attachment to the nitrogen atom of the adjacent piperidine ring and $R_4$ represents hydrogen, methyl, ethyl, cyclopropyl, trifluoromethyl, bromine, chlorine, phenyl;

where phenyl may be substituted by chlorine, and the salts, solvates and solvates of the salts thereof.

A particularly preferred embodiment of the present invention relates to compounds of the formula (I) in which X, Y and Z represent a group of the formula (h) or (i);

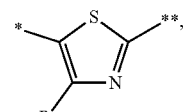
(h)

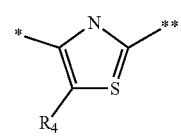
(i)

where * marks the attachment to the carbonyl group and ** marks the attachment to the nitrogen atom of the adjacent piperidine ring and $R_4$ represents hydrogen, methyl, ethyl, cyclopropyl, trifluoromethyl, bromine, chlorine, phenyl;

where phenyl may be substituted by chlorine, and the salts, solvates and solvates of the salts thereof.

A particularly preferred embodiment of the present invention relates to compounds of the formula (I) in which X, Y and Z are selected such that the aromatic 5-membered ring has the structural formula (h) or i);

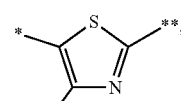
(h)

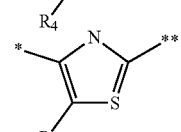
(i)

where * marks the attachment to the carbonyl group and ** marks the attachment to the nitrogen atom of the adjacent piperidine ring and $R_4$ represents hydrogen, methyl, ethyl, cyclopropyl, trifluoromethyl, bromine, chlorine, phenyl;

where phenyl may be substituted by chlorine, and the salts, solvates and solvates of the salts thereof.

A very particularly preferred embodiment of the present invention relates to compounds of the formula (I) in which X, Y and Z represent a group of the formula (h);

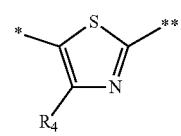
(h)

where * marks the attachment to the carbonyl group and ** marks the attachment to the nitrogen atom of the adjacent piperidine ring and $R_4$ represents hydrogen, methyl, ethyl, trifluoromethyl, and the salts, solvates and solvates of the salts thereof.

A very particularly preferred embodiment of the present invention relates to compounds of the formula (I) in which
X, Y and Z are selected such that the aromatic 5-membered ring has the structural formula h);

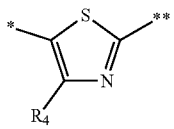

(h)

where * marks the attachment to the carbonyl group and ** marks the attachment to the nitrogen atom of the adjacent piperidine ring and
$R_4$ represents hydrogen, methyl, ethyl, trifluoromethyl,
and the salts, solvates and solvates of the salts thereof.

A very particularly preferred embodiment of the present invention relates to compounds of the formula (I) in which
X, Y and Z are selected such that the aromatic 5-membered ring has the structural formula h);

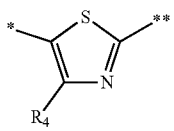

(h)

where * marks the attachment to the carbonyl group and ** marks the attachment to the nitrogen atom of the adjacent piperidine ring and
$R_4$ represents hydrogen,
and the salts, solvates and solvates of the salts thereof.

A particular embodiment of the present invention relates to compounds of the formula (I) in which
$R_1$ represents pyridinyl, pyrazolyl, thiazolyl, thienyl, phenyl;
where pyridinyl may be substituted by 1 to 2 substituents independently of one another selected from the group of $(C_1-C_2)$-alkyl, fluorine, chlorine, trifluoromethyl, trifluoromethoxy,
where pyrazolyl may be substituted by 1 to 2 substituents independently of one another selected from the group of methyl, chlorine,
where thiazolyl may be substituted by chlorine,
where thienyl may be substituted by fluorine,
where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
and the salts, solvates and solvates of the salts thereof.

A particularly preferred embodiment of the present invention relates to compounds of the formula (I) in which
$R_1$ represents pyridinyl, phenyl,
where pyridinyl may be substituted by 1 to 2 substituents independently of one another selected from the group of methyl, ethyl, fluorine, chlorine, trifluoromethyl, trifluoromethoxy,
where phenyl may be substituted by 1 to 2 substituents independently of one another selected from the group of methyl, cyclopropyl, methoxy, cyano, hydroxy, fluorine, chlorine, trifluoromethyl;
and the salts, solvates and solvates of the salts thereof.

A very particularly preferred embodiment of the present invention relates to compounds of the formula (I) in which
$R_1$ represents a group of the formula (f);

(f)

where # marks the attachment to the adjacent —[$CHR_2$]$_n$—$NR_3CO$— group,
and the salts, solvates and solvates of the salts thereof.

A particular embodiment of the present invention relates to compounds of the formula (I) in which
$R_2$ represents hydrogen, $(C_1-C_4)$-alkyl;
where $(C_1-C_4)$-alkyl may be up to trisubstituted by halogen,
or together with the carbon atom to which $R_2$ is attached forms a $(C_3-C_4)$-cycloalkyl ring,
and the salts, solvates and solvates of the salts thereof.

A particularly preferred embodiment of the present invention relates to compounds of the formula (I) in which
$R_2$ represents hydrogen, methyl or together with the carbon atom to which $R_2$ is attached forms a cyclopropyl ring;
and the salts, solvates and solvates of the salts thereof.

A very particularly preferred embodiment of the present invention relates to compounds of the formula (I) in which
$R_2$ represents hydrogen;
and the salts, solvates and solvates of the salts thereof.

A particular embodiment of the present invention relates to compounds of the formula (I) in which
$R_3$ represents hydrogen, $(C_1-C_4)$-alkyl,
where $(C_1-C_4)$-alkyl may be up to trisubstituted by halogen,
and the salts, solvates and solvates of the salts thereof.

A particularly preferred embodiment of the present invention relates to compounds of the formula (I) in which
$R_3$ represents hydrogen, methyl;
and the salts, solvates and solvates of the salts thereof.

A very particularly preferred embodiment of the present invention relates to compounds of the formula (I) in which
$R_3$ represents hydrogen;
and the salts, solvates and solvates of the salts thereof.

A particular embodiment of the present invention relates to compounds of the formula (I) in which
$R_4$ represents hydrogen, methyl, ethyl, cyclopropyl, trifluoromethyl, bromine, chlorine, phenyl;
where phenyl may be substituted by chlorine,
and the salts, solvates and solvates of the salts thereof.

A particularly preferred embodiment of the present invention relates to compounds of the formula (I) in which
$R_4$ represents hydrogen, methyl, ethyl, trifluoromethyl,
and the salts, solvates and solvates of the salts thereof.

A very particularly preferred embodiment of the present invention relates to compounds of the formula (I) in which
$R_4$ represents hydrogen,
and the salts, solvates and solvates of the salts thereof.

A particular embodiment of the present invention relates to compounds of the formula (I) in which
$R_5$ represents hydrogen, $(C_1-C_4)$-alkyl, $(C_1-C_4)$-alkoxy, halogen,
and the salts, solvates and solvates of the salts thereof.

A particularly preferred embodiment of the present invention relates to compounds of the formula (I) in which
$R_5$ represents hydrogen, fluorine,
and the salts, solvates and solvates of the salts thereof.

A very particularly preferred embodiment of the present invention relates to compounds of the formula (I) in which R₅ represents hydrogen, and the salts, solvates and solvates of the salts thereof.

A particular embodiment of the present invention relates to compounds of the formula (I) in which R₆ represents a group of the formula a), b'), b") or c'), c") or e),

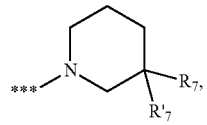

a)

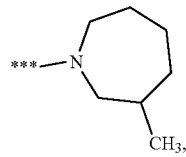

b')

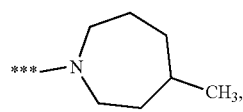

b")

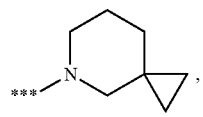

c')

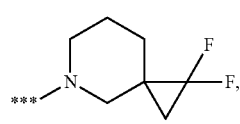

c")

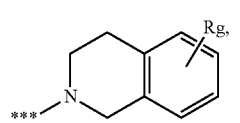

e)

where *** marks the attachment to the adjacent piperidine ring and

R₇ represents hydrogen or methyl,

R'₇ represents hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine, R₉ represents hydrogen, methyl, tert-butyl, methoxy, methoxymethyl, fluorine, chlorine;

and the salts, solvates and solvates of the salts thereof.

A particularly preferred embodiment of the present invention relates to compounds of the formula (I) in which R₆ represents a group of the formula a), c') or c"),

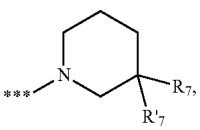

a)

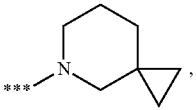

c')

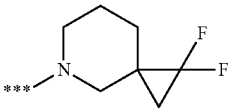

c")

where *** marks the attachment to the adjacent piperidine ring and

R₇ represents hydrogen,

R'₇ represents hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine, and the salts, solvates and solvates of the salts thereof.

A very particularly preferred embodiment of the present invention relates to compounds of the formula (I) in which R₆ represents a group of the formula a),

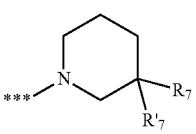

a)

where *** marks the attachment to the adjacent piperidine ring and

R₇ represents hydrogen,

R'₇ represents methyl, ethyl, isopropyl, propyl, ethoxy, methoxymethyl, monofluoromethyl, difluoromethyl, trifluoromethyl, 3,3-difluorocyclobutylmethoxy, 2,2,2-trifluoroethoxymethyl, cyclopropylmethyl, 1-fluoromethylcyclopropylmethoxymethyl, 1-difluoromethylcyclopropylmethoxymethyl, 1-trifluoromethylcyclopropylmethoxymethyl, cyclobutylmethoxy, cyclopropylmethoxy, cyclobutyloxymethyl, cyclopropylmethoxymethyl, 3,3-difluorocyclobutylmethoxymethyl, 3-fluorobutyloxymethyl, 2,2-difluorocyclopropylmethoxy, cyclobutyloxy, 3,3-difluorocyclobutyloxy, 2-fluoroethyl, cyclopropyl, cyclobutyl, 2-methoxyethyl, tert-butyl, and the salts, solvates and solvates of the salts thereof.

A particular embodiment of the present invention relates to compounds of the formula (I) in which
n represents 0 or 1,
and the salts, solvates and solvates of the salts thereof.

A particularly preferred embodiment of the present invention relates to compounds of the formula (I) in which
n represents 1,
and the salts, solvates and solvates of the salts thereof.

A particular embodiment of the present invention relates to compounds of the formula (I) in which
m represents 1 or 2,
and the salts, solvates and solvates of the salts thereof.

A particularly preferred embodiment of the present invention relates to compounds of the formula (I) in which
m represents 1,
and the salts, solvates and solvates of the salts thereof.

A particular embodiment of the present invention relates to compounds of the formula (I) in which
p represents 0, 1 or 2,
and the salts, solvates and solvates of the salts thereof.

A particularly preferred embodiment of the present invention relates to compounds of the formula (I) in which
p represents 1.

A particular embodiment of the present invention relates to compounds of the formula (I) in which
q represents 0 or 2,
and the salts, solvates and solvates of the salts thereof.

A particularly preferred embodiment of the present invention relates to compounds of the formula (I) in which
q represents 2,
and the salts, solvates and solvates of the salts thereof.

The individual radical definitions specified in the respective combinations or preferred combinations of radicals are, independently of the respective combinations of the radicals specified, also replaced as desired by radical definitions of other combinations.

Very particular preference is given to combinations of two or more of the abovementioned preferred ranges.

The invention further provides a process for preparing the compounds of the formula (I), or the salts thereof, solvates thereof or the solvates of the salts thereof, wherein

[A] compounds of the formula (II)

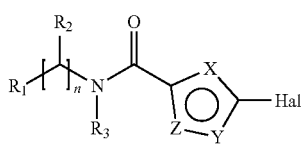

in which
X, Y, Z, $R_1$, $R_2$, $R_3$ and $R_4$ and n have the meanings given above,
Hal represents a leaving group, preferably chlorine, bromine, iodine, or methylsulfonyl,
are reacted in the presence of a base with compounds of the formula (III)

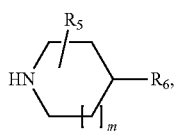

in which
$R_5$ and $R_6$ and m have the meanings given above,
to give compounds of the formula (I-A)

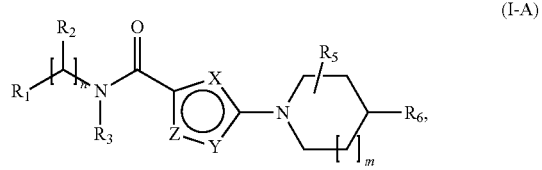

or

[B] compounds of the formula (IV)

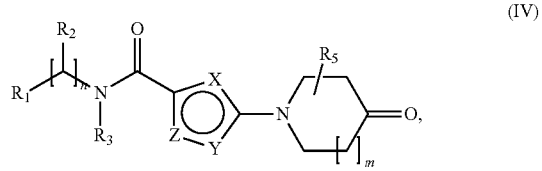

in which
X, Y, Z, $R_1$, $R_2$, $R_3$, $R_4$ and $R_5$ and n and m have the meanings given above,
are reacted with compounds of the formula (V)

in which
$R_6$ has the meaning given above,
in the presence of a reducing agent and optionally an acid, preferably alkali metal borohydrides and acetic acid, to give compounds of the formula (I-B)

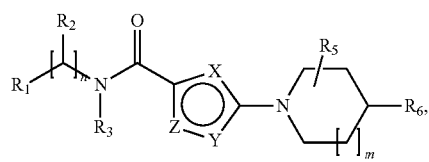

or

[C] compounds of the formula (VI)

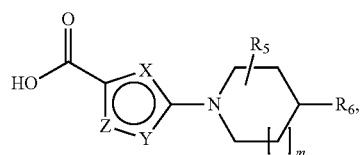

in which
X, Y, Z, $R_4$, $R_5$ and $R_6$ and n and m have the meanings given above, are reacted with compounds of the formula (VII)

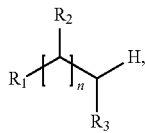

(VIII)

in which

R₁, R₂ and R₃ and n have the meanings given above,
in the presence of a condensating or activating agent,
preferably a phosphorus compound, to give compounds
of the formula (I-C)

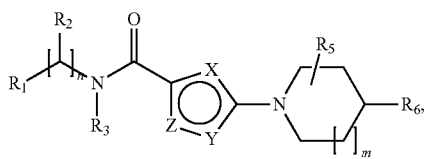

(I-C)

and the compounds of the formulae (I-A), (I-B), (I-C) thus obtained are optionally separated into their enantiomers and/or diastereomers and/or optionally converted with the appropriate (i) solvents and/or (ii) acids to the solvates, salts and/or solvates of the salts thereof.

The reaction of compound (II) with compound (III) in Process step [A] to give compound (I-A) is a substitution of the Hal group in compound (II) by the nitrogen atom of the piperidine ring of the compound (III), where the reaction, depending on the reactivities in the individual case, may be carried out, for example, by heating in a solvent or dispersant.

Suitable bases for process step [A] are in particular alkali metal carbonates such as sodium carbonate, potassium carbonate or caesium carbonate, a tertiary amine base such as triethylamine, N,N-diisopropylethylamine, N-methylmorpholine (NMM), N-methylpiperidine (NMP), pyridine, 1,8-diazabicyclo[5.4.0]undec-7-ene (DBU), 1,10-o-phenanthroline or 4-N,N-dimethylaminopyridin (DMAP). The base used is preferably sodium carbonate, potassium carbonate or caesium carbonate. The addition of an alkylation catalyst, for example lithium bromide, sodium iodide, potassium iodide, tetra-n-butylammonium bromide, copper(I) iodide or benzyltriethylammonium chloride, may be advantageous.

The base is preferably employed in an equimolar amount or in excess, usually in 1 to 5 times, preferably in 5 times, the molar amount.

Furthermore, the reaction may also proceed with palladium catalysis using Pd₂(dba)₃, caesium carbonate as auxiliary base and the following ligands: 1,1'-[1,1'-binaphthalene]-2,2'-diylbis[1,1-diphenylphosphine] or 1, 1'-(9,9-dimethyl-9H-xanthene-4,5-diyl)bis[1,1-diphenylphosphine] (literature see WO 2008052934 or WO 2015017305).

Suitable inert solvents for the process step [A] are, for example, ethers such as diethyl ether, diisopropyl ether, methyl tert-butyl ether, tetrahydrofuran, 1,4-dioxane, 1,2-dimethoxyethane or bis(2-methoxyethyl) ether, hydrocarbons such as benzene, toluene, xylene, pentane, hexane, heptane, cyclohexane or mineral oil fractions, or dipolar aprotic solvents such as acetone, methyl ethyl ketone, acetonitrile, N,N-dimethylformamide (DMF), N,N-dimethylacetamide (DMA), dimethyl sulphoxide (DMSO), N,N'-dimethylpropyleneurea (DMPU) or N-methylpyrrolidinone (NMP). It is also possible to use mixtures of such solvents. Preference is given to using acetonitrile or dimethylformamide.

The reaction (II)+(III)→(I-A) is generally carried out in a temperature range of from 0° C. to +150° C., preferably at from +20° C. to +100° C.

The reaction of the compound (IV) with (V) to give compound (I-B) in Process step [B] is a reductive amination. Suitable reducing agents for reductive aminations alkali metal borohydrides customary for such purposes such as sodium borohydride, sodium cyanoborohydride or sodium triacetoxyborohydride; preference is given to using sodium triacetoxyborohydride. The addition of an acid, such as acetic acid in particular, and/or of a dehydrating agent, for example molecular sieve or trimethyl orthoformate or triethyl orthoformate, may be advantageous in these reactions.

Suitable solvents for these reactions are especially alcohols such as methanol, ethanol, n-propanol or isopropanol, ethers such as diisopropyl ether, methyl tert-butyl ether, tetrahydrofuran, 1,4-dioxane or 1,2-dimethoxyethane, polar aprotic solvents such as acetonitrile or N,N-dimethylformamide (DMF) or mixtures of such solvents; preference is given to using tetrahydrofuran. The reactions are generally effected within a temperature range of 0° C. to +50° C.

The protecting group PG used in compound (XI) or (XI') may be a standard amino protecting group, for example tert-butoxycarbonyl (Boc), benzyloxycarbonyl (Z) or (9H-fluoren-9-ylmethoxy)carbonyl (Fmoc); preference is given to using tert-butoxycarbonyl (Boc). The removal of the protecting group in process step takes place by known methods. Thus, the tert-butoxycarbonyl group is typically cleaved by treatment with a strong acid such as hydrogen chloride, hydrogen bromide or trifluoroacetic acid, in an inert solvent such as diethyl ether, 1,4-dioxane, dichloromethane or acetic acid. In the case of benzyloxycarbonyl as protecting group, this is preferably removed by hydrogenolysis in the presence of a suitable palladium catalyst such as palladium on activated carbon. The (9H-fluoren-9-ylmethoxy)carbonyl group is generally detached with the aid of a secondary amine base such as diethylamine or piperidine [see, for example, T. W. Greene and P. G. M. Wuts, *Protective Groups in Organic Synthesis*, Wiley, New York, 1999; P. J. Kocienski, *Protecting Groups*, 3$^{rd}$ edition, Thieme, 2005].

The process step [B] (VI)+(VII)→(I-C) [amide formation] is carried out by known methods with the aid of a condensing or activating agent. Suitable such agents are, for example, carbodiimides such as N,N'-diethyl-, N,N'-dipropyl-, N,N'-diisopropyl-, N,N'-dicyclohexylcarbodiimide (DCC) or N-(3-dimethylaminopropyl)-N'-ethylcarbodiimide hydrochloride (EDC), phosgene derivatives such as N,N'-carbonyldiimidazole (CDI) or isobutyl chloroformate, 1,2-oxazolium compounds such as 2-ethyl-5-phenyl-1,2-oxazolium 3-sulfate or 2-tert-butyl-5-methylisoxazolium perchlorate, acylamino compounds such as 2-ethoxy-1-ethoxycarbonyl-1,2-dihydroquinoline, α-chloroenamines such as 1-chloro-N,N,2-trimethylprop-1-ene-1-amine, 1,3,5-triazine derivatives such as 4-(4,6-dimethoxy-1,3,5-triazin-2-yl)-4-methylmorpholinium chloride, phosphorus compounds such as n-propanephosphonic anhydride (PPA, T3P®), diethyl cyanophosphonate, diphenylphosphoryl azide (DPPA), bis(2-oxo-3-oxazolidinyl)phosphoryl chloride, benzotriazol-1-yloxytris(dimethylamino)phosphonium hexafluorophosphate or benzotriazol-1-yloxytris(pyrrolidino)phosphonium hexafluorophosphate (PyBOP), or uronium compounds such as O-(benzotriazol-1-yl)-N,N,N',N'-tetramethyluronium tetrafluoroborate (TBTU), O-(1H-1- chlorobenzotriazol-1-yl)-1,1,3,3-tetramethyluronium tetrafluoroborate (TCTU), O-(benzotriazol-1-yl)-N,N,N',N'-tetramethyluronium hexafluorophosphate (HBTU), O-(7-azabenzotriazol-1-yl)-N,N,N',N'-tetramethyluronium hexafluorophosphate (HATU) or 2-(2-oxo-1-(2H)-pyridyl)-1,1,3,3-tetramethyluronium tetrafluoroborate (TPTU), optionally in combination with further auxiliaries such as 1-hydroxybenzotriazole (HOBt) or N-hydroxysuccinimide (HOSu), and suitable bases are alkali metal carbonates, for example sodium carbonate or potassium carbonate, or tertiary amine bases such as triethylamine, N-methylmorpholine (NMM), N-methylpiperidine (NMP), DIPEA, pyridine or 4-N,N-dimethylaminopyridine (DMAP). The condensing agent or activating agent used with preference is O-(7-azabenzotriazol-1-yl)-N,N,N',N'-tetramethyluronium hexafluorophosphate (HATU) in combination with N,N-diisopropylethylamine as base.

Suitable inert solvents for these amide-forming reactions are, for example, ethers such as diethyl ether, diisopropyl ether, methyl tert-butyl ether, tetrahydrofuran, 1,4-dioxane, 1,2-dimethoxyethane or bis(2-methoxyethyl) ether, hydrocarbons such as benzene, toluene, xylene, pentane, hexane or cyclohexane, halohydrocarbons such as dichloromethane, trichloromethane, carbon tetrachloride, 1,2-dichloroethane, trichloroethylene or chlorobenzene, or polar aprotic solvents such as acetone, methyl ethyl ketone, ethyl acetate, acetonitrile, butyronitrile, pyridine, dimethyl sulfoxide (DMSO), N,N-dimethylformamide (DMF), N,N'-dimethylpropyleneurea (DMPU) or N-methylpyrrolidinone (NMP); it is also possible to use mixtures of such solvents. Preference is given to using dichloromethane, 1,2-dichloroethane, tetrahydrofuran, N,N-dimethylformamide or mixtures of these solvents. The reactions are generally conducted within a temperature range of from −20° C. to +60° C., preferably at from 0° C. to +40° C.

For their part, the compounds of the formula (II) can be prepared by processes known from the literature [amide formation] by reacting the amine (VII)

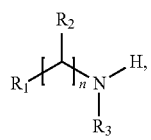

(VII)

in which
R$_1$, R$_2$ and R$_3$ and n have the meanings given above,
under the influence of a condensing or activating agent with a compound of the formula (X)

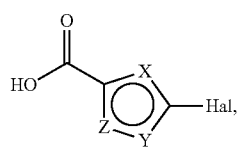

(X)

in which
X, Y, Z, R$_4$ and Hal have the meanings given above, to give a compound of the formula (II)

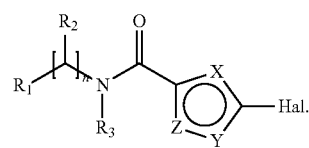

(II)

The compounds of the formula (III) can be prepared by processes known from the literature [reductive amination] by reacting the amine (V)

H—R$_6$ (V), in which
R$_6$ has the meaning given above,
with a protected piperidine derivative of the formula (XI)

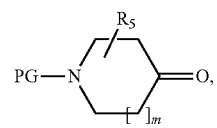

(XI)

in which
R$_5$ and m have the meanings given above and
PG represents a suitable amino protecting group, preferably tert-butoxycarbonyl, benzyloxycarbonyl or (9H-fluoren-9-ylmethoxy)carbonyl
to give compounds of the formula (III')

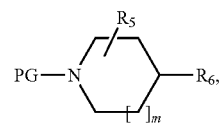

(III')

in which PG and R$_5$ and R$_6$ and m have the meanings given above,
followed by removal of the protecting group PG to give the compounds of the formula (III)

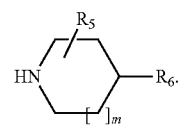

(III)

The compounds of the formula (IV) can be prepared by a process known from the literature [alkylation] by reacting compounds of the formula (II)

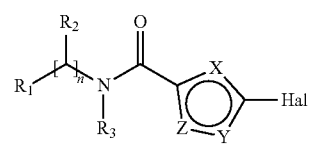

(II)

in which X, Y, Z, $R_1$, $R_2$, $R_3$ and $R_4$ and Hal and n have the meanings given above,
in the presence of a base with compounds of the formula (XII)

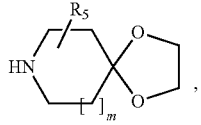

in which $R_5$ and m have the meanings given above,
followed by cleavage under acidic conditions to give compound (IV)

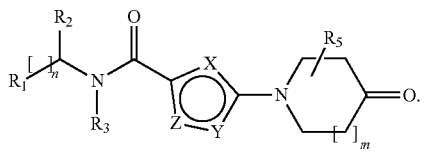

For their part, the compounds of the formula (VI) can be prepared by a process known from the literature [alkylation] by reacting compounds of the formula (XIII)

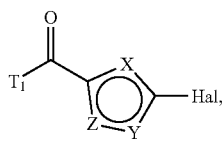

in which X, Y, Z, $R_4$ and Hal have the meanings given above and
$T_1$ represents —O—$(C_1-C_4)$-alkyl,
in the presence of a base with compounds of the formula (III)

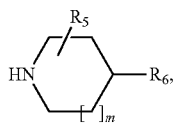

in which $R_5$, $R_6$ and m have the meanings given above, and hydrolysing under conditions known from the literature to give compounds of the formula (VI)

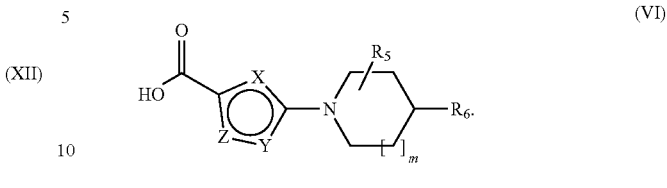

The hydrolysis of the ester group $T_1$ is carried out by customary methods, by treating the esters in inert solvents with acids or bases, where in the latter variant the salts initially formed are converted into the free carboxylic acids by treatment with acid. In the case of the tert-butyl esters, the ester hydrolysis is preferably effected with acids.

Suitable inert solvents for these reactions are water or the organic solvents customary for ester cleavage. These preferably include alcohols such as methanol, ethanol, n-propanol, isopropanol, n-butanol or tert-butanol, ethers such as diethyl ether, tetrahydrofuran, 1,4-dioxane or 1,2-dimethoxyethane, or other solvents such as dichloromethane, acetone, methyl ethyl ketone, N,N-dimethylformamide or dimethyl sulphoxide. It is equally possible to use mixtures of these solvents. In the case of a basic ester hydrolysis, preference is given to using mixtures of water with dioxane, tetrahydrofuran, methanol, ethanol and/or dimethylformamide. In the case of the reaction with trifluoroacetic acid, preference is given to using dichloromethane, and in the case of the reaction with hydrogen chloride preference is given to using tetrahydrofuran, diethyl ether, dioxane or water.

Suitable bases are the customary inorganic bases. These especially include alkali metal or alkaline earth metal hydroxides, for example lithium hydroxide, sodium hydroxide, potassium hydroxide or barium hydroxide, or alkali metal or alkaline earth metal carbonates, such as sodium carbonate, potassium carbonate or calcium carbonate. Preference is given to lithium hydroxide, sodium hydroxide or potassium hydroxide.

Suitable acids for the ester hydrolysis are generally sulfuric acid, hydrogen chloride/hydrochloric acid, hydrogen bromide/hydrobromic acid, phosphoric acid, acetic acid, trifluoroacetic acid, toluenesulfonic acid, methanesulfonic acid or trifluoromethanesulfonic acid, or mixtures thereof, optionally with addition of water. Preference is given to hydrogen chloride or trifluoroacetic acid in the case of the tert-butyl esters and to hydrochloric acid in the case of the methyl esters.

The ester hydrolysis is generally carried out within a temperature range from $-20°$ C. to $+120°$ C., preferably at $0°$ C. to $+80°$ C.

The preparation of the compounds according to the invention can be illustrated by way of example by the following reaction scheme:

Scheme 1

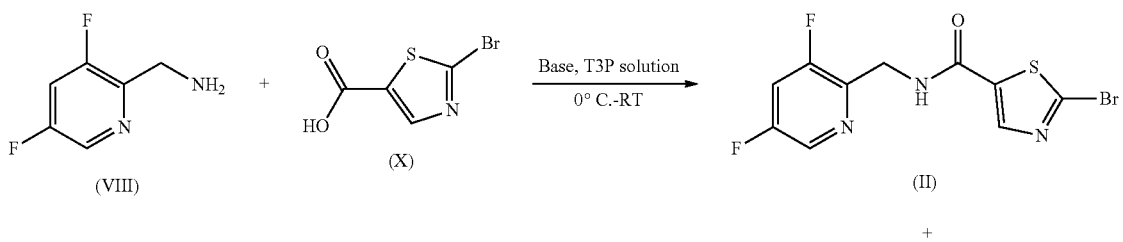

+

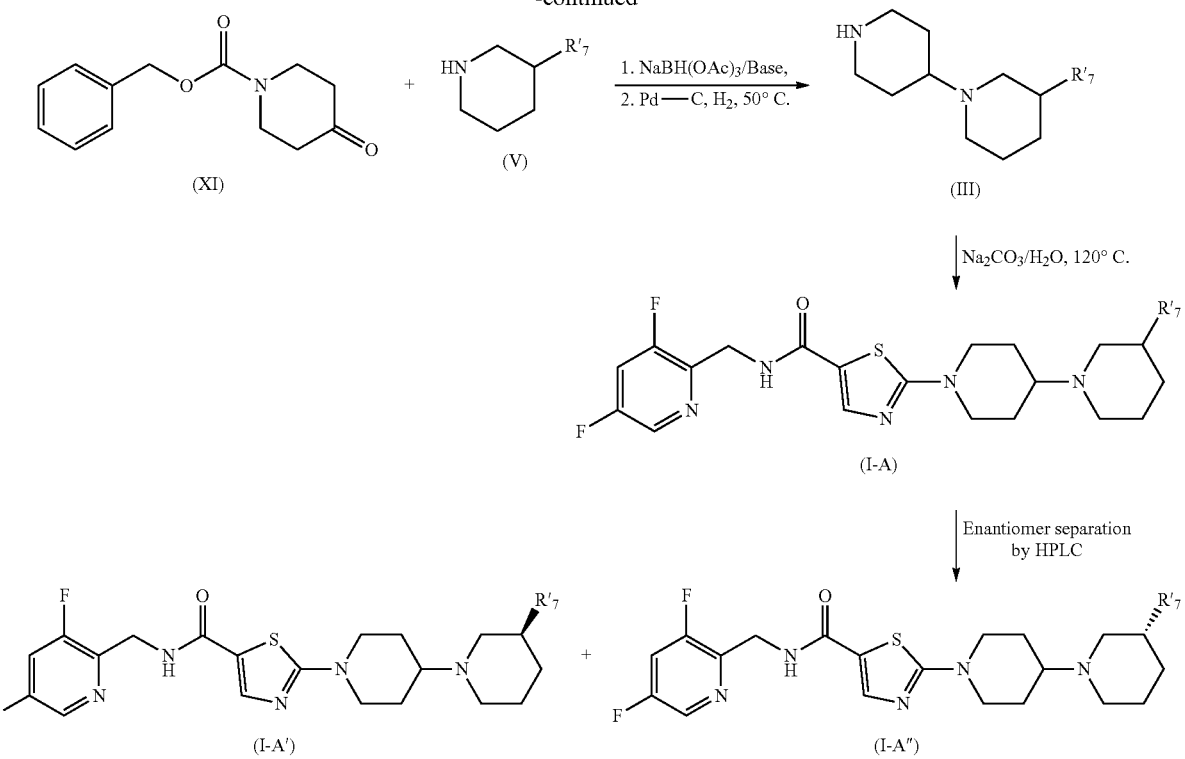
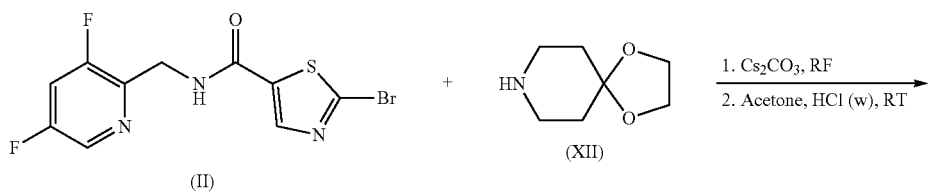
Scheme 2
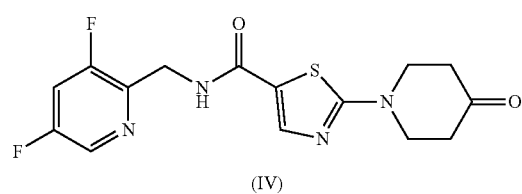
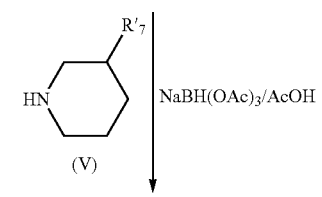

-continued

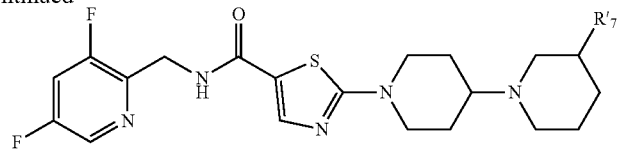
(I-B)

Enantiomer separation by HPLC

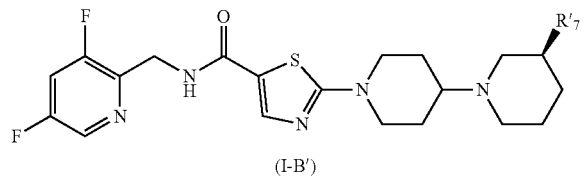 + 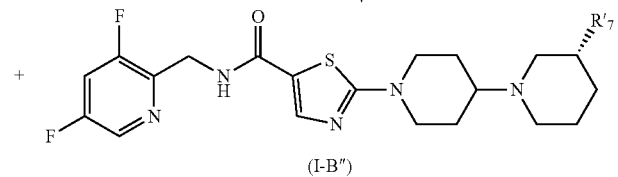

(I-B') (I-B'')

Scheme 3

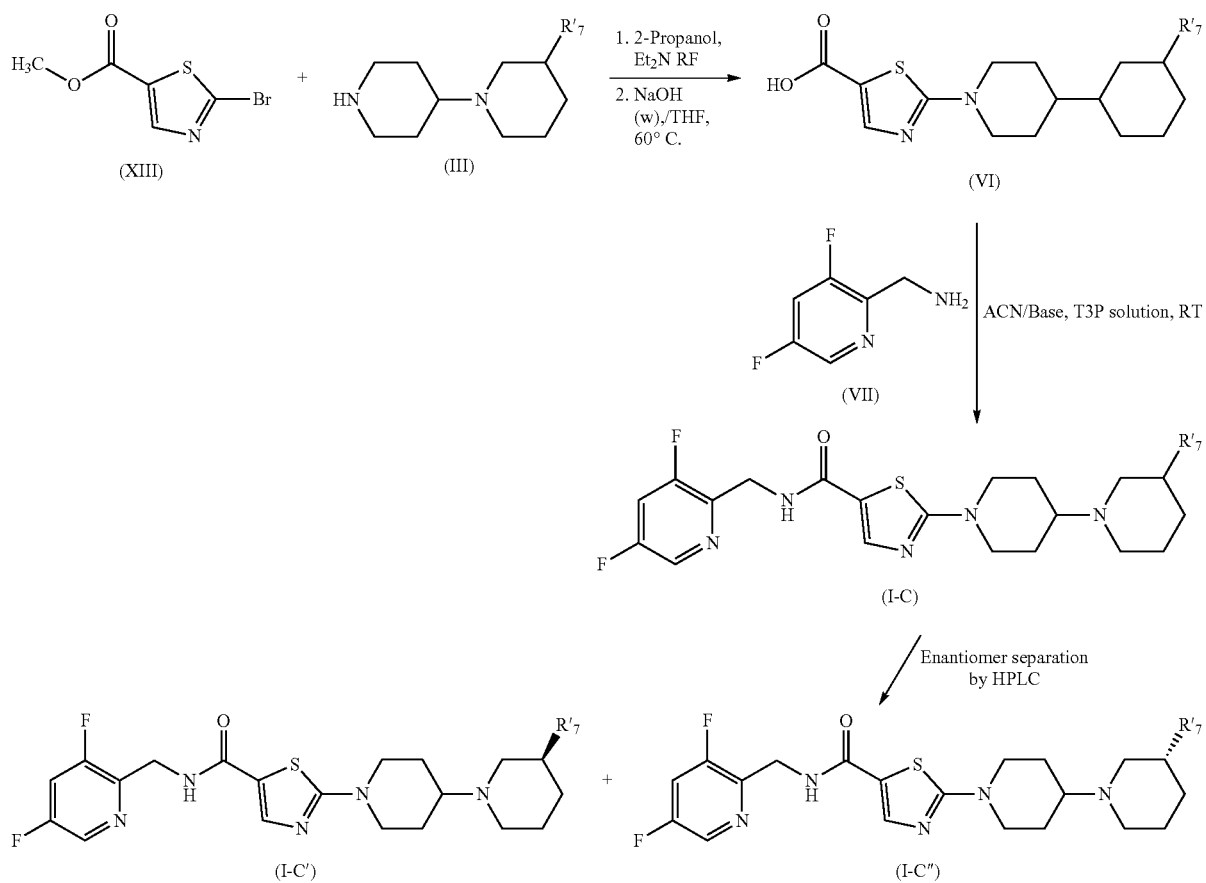

The compounds of the invention have valuable pharmacological properties and can be used for prevention and treatment of diseases in humans and animals.

The compounds according to the invention are potent and selective antagonists of the $\alpha_{2C}$-adrenergic receptor and are therefore suitable for the treatment and/or prevention of disorders and pathological processes, in particular those caused by activation or by an activated $\alpha_{2C}$-adrenergic receptor, and of diseases secondary to $\alpha_{2C}$-adrenergic receptor-related damage.

The compounds according to the invention are employed in a method for the treatment and/or prevention of breathing difficulties, dysphagia, peripheral and cardiac vascular disorders and disorders of the peripheral and central nervous system.

The compounds according to the invention are also employed in a method for the treatment and/or prevention of breathing difficulties including sleep-induced breathing difficulties such as central and obstructive sleep apnoea, snoring (primary and obstructive snoring), dysphagia, peripheral and cardiac vascular disorders including diabetic microangiopathies and disorders of the peripheral and central nervous system including neurodegenerative and neuroinflammatory disorders.

In the context of the present invention, these include in particular disorders such as breathing difficulties and sleep-induced breathing difficulties such as, inter alia, obstructive sleep apnoea (in adults and children), primary snoring, obstructive snoring (upper airway resistance syndrome, heavy snoring, hypopnea syndrome), central sleep apnoea, Cheyne-Stokes respiration, primary sleep apnoea of infancy, apparent life-threatening event, central sleep apnoea as a result of the use of medicaments or the use of other substances, obesity hypoventilation syndrome, disrupted central respiratory drive, sudden infant death, primary alveolar hypoventilation syndrome, postoperative hypoxia and apnoea, muscular respiratory disorders, respiratory disorders following long-term ventilation, respiratory disorders during adaptation in high mountains, acute and chronic pulmonary diseases with hypoxia and hypercapnia, sleep-related non-obstructive alveolar hypoventilation and the congenital central alveolar hypoventilation syndrome, and dysphagia.

The compounds according to the invention are preferably employed in a method for the treatment and/or prevention of breathing difficulties including sleep-induced breathing difficulties such as, inter alia, obstructive sleep apnoea (in adults and children), primary snoring, obstructive snoring (upper airway resistance syndrome, heavy snoring, hypopnea syndrome), central sleep apnoea, Cheyne-Stokes respiration, primary sleep apnoea of infancy, apparent life-threatening event, central sleep apnoea as a result of the use of medicaments or the use of other substances, obesity hypoventilation syndrome, disrupted central respiratory drive, sudden infant death, primary alveolar hypoventilation syndrome, postoperative hypoxia and apnoea, muscular respiratory disorders, respiratory disorders following long-term ventilation, respiratory disorders during adaptation in high mountains, acute and chronic pulmonary diseases with hypoxia and hypercapnia, sleep-related non-obstructive alveolar hypoventilation and the congenital central alveolar hypoventilation syndrome, and dysphagia.

In the context of the present invention, peripheral and cardiac vascular disorders include diabetic microangiopathies, diabetic ulcers at the extremities, in particular for promoting wound healing of diabetic foot ulcers, diabetic heart failure, diabetic coronary microvascular cardiac disorders, thromboembolic disorders and ischaemias, peripheral circulatory disorders, Raynaud's phenomenon, systemic scleroderma, CREST syndrome, microcirculation disorders and intermittent claudication.

Likewise with preference, the compounds according to the invention are employed in a method for the treatment and/or prevention of peripheral and cardiac vascular disorders including diabetic microangiopathies, diabetic ulcers at the extremities, in particular for promoting wound healing of diabetic foot ulcers, diabetic heart failure, diabetic coronary microvascular cardiac disorders, thromboembolic disorders and ischaemias, peripheral circulatory disorders, Raynaud's phenomenon, systemic scleroderma, CREST syndrome, microcirculation disorders and intermittent claudication.

In addition, the compounds according to the invention can be employed in a method for the treatment and/or prevention of disorders of the peripheral and central nervous system such as dementia, depression, schizophrenia, attention deficit disorder with or without hyperaktivity (ADHS), Tourette syndrome, post-traumatic stress disorder, obsessive-compulsive disorder, blepharospasm or other focal dystonias, drug-induced psychosis, temporal lobe epilepsy with psychosis, panic disorder, disorders caused by changes in sexual hormones, multiple sclerosis, Alzheimer's disease, Parkinson's disease and Huntington's disease, Pick's disease, Wilson's disease, progressive supranuclear paresis, corticobasal degeneration, tauopathy, frontotemporal dementia and parkinsonism linked to chromosome 17, multisystem atrophy, spinocerebellar ataxias, spinobulbar muscular atrophy of the Kennedy type, Friedreich's ataxia, dentatorubral-pallidoluysian atrophy, amyotrophic lateral sclerosis, primary lateral sclerosis, spinal muscular atrophy, Creutzfeldt-Jakob disease and variants of Creutzfeldt-Jakob disease, infantile neuroaxonal dystrophy, neurodegeneration with brain iron accumulation, frontotemporal lobar degeneration with ubiquitin proteasome system and familial encephalopathy with neuroserpin inclusions.

The compounds according to the invention are preferably employed in a method for the treatment and/or prevention of disorders of the peripheral and central nervous system, including dementia, depression, schizophrenia, attention deficit disorder with or without hyperaktivity (ADHS), Tourette syndrome, post-traumatic stress disorder, obsessive-compulsive disorder, blepharospasm or other focal dystonias, drug-induced psychosis, temporal lobe epilepsy with psychosis, panic disorder, disorders caused by changes in sexual hormones, multiple sclerosis, Alzheimer's disease, Parkinson's disease, Huntington's disease.

The compounds according to the invention are also employed in a method for the treatment and/or prevention of disorders of the peripheral and central nervous system such as dementia, depression, schizophrenia, attention deficit disorder with or without hyperaktivity (ADHS), Tourette syndrome, post-traumatic stress disorder, obsessive-compulsive disorder, blepharospasm or other focal dystonias, drug-induced psychosis, temporal lobe epilepsy with psychosis, panic disorder, disorders caused by changes in sexual hormones, multiple sclerosis, Alzheimer's disease, Parkinson's disease and Huntington's disease, Pick's disease, Wilson's disease, progressive supranuclear paresis, corticobasal degeneration, tauopathy, frontotemporal dementia and parkinsonism linked to chromosome 17, multisystem atrophy, spinocerebellar ataxias, spinobulbar muscular atrophy of the Kennedy type, Friedreich's ataxia, dentatorubral-pallidoluysian atrophy, amyotrophic lateral sclerosis, primary lateral sclerosis, spinal muscular atrophy, Creutzfeldt-Jakob disease and variants of Creutzfeldt-Jakob disease, infantile neuroaxonal dystrophy, neurodegeneration with brain iron accumulation, frontotemporal lobar degeneration with ubiquitin proteasome system and familial encephalopathy with neuroserpin inclusions.

The compounds of the invention are moreover also suitable for treatment and/or prevention of cardiovascular disorders such as, for example, arrhythmias, atrial and ventricular arrhythmias and impaired conduction such as, for example, atrioventricular blocks degrees I-III, supraventricular tachyarrhythmia, atrial fibrillation, atrial flutter, ventricular fibrillation, ventricular flutter, ventricular tachyarrhythmia, Torsade de pointes tachycardia, atrial and ventricular extrasystoles, AV-junctional extrasystoles, sick sinus syndrome, syncopes, AV-nodal re-entry tachycardia, high blood pressure (hypertension), heart failure, coronary heart disease, stable and unstable angina pectoris, renal hypertension, peripheral and cardial vascular disorders, Wolff-Parkinson-White syndrome, acute coronary syndrome (ACS), autoimmune cardiac disorders (pericarditis, endocarditis, valvolitis, aortitis, cardiomyopathies), boxer cardiomyopathy, aneurysms, shock such as cardiogenic shock, septic shock and anaphylactic shock, furthermore for treatment and/or prevention of thromboembolic disorders and ischemias such as myocardial ischemia, myocardial infarction, stroke, cardiac hypertrophy, transient and ischemic attacks, preeclampsia, inflammatory cardiovascular disorders, spasms of the coronary arteries and peripheral arteries, edema formation such as, for example, pulmonary edema, cerebral edema, renal edema or edema caused by heart failure, peripheral circulatory disturbances, reperfusion damage, arterial and venous thromboses, microalbuminuria, myocardial insufficiency, endothelial dysfunction, micro- and macrovascular damage (vasculitis), and also to prevent restenoses, for example after thrombolysis therapies, percutaneous transluminal angioplasties (PTA), percutaneous transluminal coronary angioplasties (PTCA), heart transplants, bypass operations, pulmonary arterial hypertension (PAH) and other forms of pulmonary hypertension (PH).

In the context of the present invention, the term "heart failure" encompasses both acute and chronic forms of heart failure, and also specific or related disease types thereof, such as acute decompensated heart failure, right heart failure, left heart failure, global failure, ischaemic cardiomyopathy, dilatative cardiomyopathy, hypertrophic cardiomyopathy, idiopathic cardiomyopathy, congenital heart defects, heart valve defects, heart failure associated with heart valve defects, mitral valve stenosis, mitral valve insufficiency, aortic valve stenosis, aortic valve insufficiency, tricuspid valve stenosis, tricuspid valve insufficiency, pulmonary valve stenosis, pulmonary valve insufficiency, combined heart valve defects, myocardial inflammation (myocarditis), chronic myocarditis, acute myocarditis, viral myocarditis, diabetic heart failure, alcoholic cardiomyopathy, cardiac storage disorders and diastolic and systolic heart failure.

The compounds of the invention can also be used for treatment and/or prevention of asthmatic disorders of varying severity with intermittent or persistent characteristics (refractive asthma, bronchial asthma, allergic asthma, intrinsic asthma, extrinsic asthma, medicament- or dust-induced asthma), of various forms of bronchitis (chronic bronchitis, infectious bronchitis, eosinophilic bronchitis), of bronchiectasis, pneumonia, farmer's lung and related disorders, coughs and colds (chronic inflammatory cough, iatrogenic cough), inflammation of the nasal mucosa (including medicament-related rhinitis, vasomotoric rhinitis and seasonal allergic rhinitis, for example hay fever) and of polyps.

In addition, the compounds of the invention are suitable for treatment and/or prevention of renal disorders, in particular renal insufficiency and kidney failure. In the context of the present invention, the terms "renal insufficiency" and "kidney failure" encompass both acute and chronic manifestations thereof and also underlying or related renal disorders such as renal hypoperfusion, intradialytic hypotension, obstructive uropathy, glomerulopathies, glomerulonephritis, acute glomerulonephritis, glomerulosclerosis, tubulointerstitial diseases, nephropathic disorders such as primary and congenital kidney disease, nephritis, immunological kidney disorders such as kidney transplant rejection and immunocomplex-induced kidney disorders, nephropathy induced by toxic substances, nephropathy induced by contrast agents, diabetic and non-diabetic nephropathy, pyelonephritis, renal cysts, nephrosclerosis, hypertensive nephrosclerosis and nephrotic syndrome which can be characterized diagnostically, for example by abnormally reduced creatinine and/or water excretion, abnormally elevated blood concentrations of urea, nitrogen, potassium and/or creatinine, altered activity of renal enzymes, for example glutamyl synthetase, altered urine osmolarity or urine volume, elevated microalbuminuria, macroalbuminuria, lesions on glomerulae and arterioles, tubular dilatation, hyperphosphatemia and/or need for dialysis. The present invention also encompasses the use of the compounds of the invention for treatment and/or prevention of sequelae of renal insufficiency, for example hypertension, pulmonary edema, heart failure, uremia, anemia, electrolyte disturbances (for example hyperkalemia, hyponatremia) and disturbances in bone and carbohydrate metabolism.

In addition, the compounds of the invention are suitable for treatment and/or prevention of disorders of the urogenital system, for example benign prostate syndrome (BPS), benign prostate hyperplasia (BPH), benign prostate enlargement (BPE), bladder outlet obstruction (BOO), lower urinary tract syndromes (LUTS), neurogenic overactive bladder (OAB), incontinence, for example mixed urinary incontinence, urge urinary incontinence, stress urinary incontinence or overflow urinary incontinence (MUI, UUI, SUI, OUI), pelvic pain, and also erectile dysfunction and female sexual dysfunction.

The compounds of the invention are further suitable for treatment and/or prevention of inflammatory disorders and autoimmune disorders such as, for example, rheumatoid disorders, inflammatory eye disorders, sepsis (SIRS), chronic obstructive pulmonary disease (COPD), acute respiratory distress syndrome (ARDS), acute lung injury (ALI), alpha-1-antitrypsin deficiency (AATD), pulmonary emphysema (e.g. pulmonary emphysema induced by cigarette smoke), cystic fibrosis (CF), multiple organ failure (MODS, MOF), inflammatory disorders of the kidney, chronic intestinal inflammations (IBD, Crohn's disease, ulcerative colitis), pancreatitis, peritonitis, cystitis, urethritis, prostatitis, epidimytitis, oophoritis, salpingitis, vulvovaginitis, and also for the treatment and/or prevention of fibrotic disorders of internal organs such as, for example, the lung, the heart, the kidney, the bone marrow and especially the liver, and also of dermatological fibroses and fibrotic disorders of the eye. In the context of the present invention, the term "fibrotic disorders" includes in particular disorders such as hepatic fibrosis, cirrhosis of the liver, pulmonary fibrosis, endomyocardial fibrosis, nephropathy, glomerulonephritis, interstitial renal fibrosis, fibrotic damage resulting from diabetes, bone marrow fibrosis, peritoneal fibrosis and similar fibrotic disorders, scleroderma, morphea, keloids, hypertrophic scarring, nevi, diabetic retinopathy, proliferative vitroretinopathy and disorders of the connective tissue (for example sarcoidosis). The compounds of the invention can likewise be used for promotion of wound healing, for controlling postoperative scarring, for example following glaucoma operations and cosmetically for aging or keratinized skin.

Moreover, the compounds of the invention are suitable for the treatment and/or prophylaxis of neoplastic disorders such as, for example, skin cancer, breast cancer, lung cancer, colon cancer and prostate cancer.

In addition, the compounds of the invention can be used for treatment and/or prevention of arteriosclerosis, impaired lipid metabolism and dyslipidaemias (hypolipoproteinaemia, hypertriglyceridaemias, hyperlipidaemia, combined hyperlipidaemias, hypercholesterolaemia, abetalipoproteinaemia, sitosterolaemia), xanthomatosis, Tangier disease, adiposity, obesity, metabolic disorders (metabolic syndrome, hyperglycaemia, insulin-dependent diabetes, non-insulin-dependent diabetes, gestation diabetes, hyperinsulinaemia, insulin resistance, glucose intolerance and diabetic sequelae, such as retinopathy, nephropathy and neuropathy), of anaemias such as haemolytic anaemias, haemoglobinopathies such as sickle cell anaemia and thalassaemias, megaloblastic anaemias, iron deficiency anaemias, anaemias owing to acute blood loss, displacement anaemias and aplastic anaemias, of disorders of the gastrointestinal tract and the abdomen (glossitis, gingivitis, periodontitis, esophagitis, eosinophilic gastroenteritis, mastocytosis, Crohn's disease, colitis, proctitis, anus pruritis, diarrhea, celiac disease, hepatitis, hepatic fibrosis, cirrhosis of the liver, pancreatitis and cholecystitis), of disorders of the central nervous system and neurodegenerative disorders (stroke, epilepsy, depressions), immune disorders, thyroid disorders (hyperthyreosis), skin disorders (psoriasis, acne, eczema, neurodermitis, various forms of dermatitis, and also keratitis, bullosis, vasculitis, cellulitis, panniculitis, lupus erythematosus, erythema, lymphomas, skin cancer, Sweet syndrome, Weber-Christian syndrome, scar formation, wart formation, chilblains), of eye inflammation diseases (saccoidosis, blepharitis, conjunctivitis, iritis, uveitis, chorioiditis, ophthalmitis), viral diseases (caused by influenza, adeno and corona viruses, such as, for example, HPV, HCMV, HIV, SARS), of disorders of the skeletal bone and the joints and also the skeletal muscle, of inflammatory changes of the arteries (multifarious forms of arteritis, such as, for example, endarteritis, mesarteritis, periarteritis, panarteritis, arteritis rheumatica, arteritis deformans, arteritis temporalis, arteritis cranialis, arteritis gigantocellularis and arteritis granulomatosa, and also Horton syndrome, Churg-Strauss syndrome and Takayasu arteritis), of Muckle-Well syndrome, of Kikuchi disease, of polychondritis, dermatosclerosis and also other disorders having an inflammatory or immunological component, such as, for example, cataract, cachexia, osteoporosis, gout, incontinence, lepra, Sezary syndrome and paraneoplastic syndrome, for rejection reactions after organ transplants and for wound healing and angiogenesis in particular in the case of chronic wounds.

By virtue of their property profile, the compounds according to the invention. are particularly suitable for the treatment and/or prevention of breathing difficulties including sleep-induced breathing difficulties such as central and obstructive sleep apnoea, snoring (primary and obstructive snoring), dysphagia, peripheral and cardiac vascular disorders including diabetic microangiopathies and disorders of the peripheral and central nervous system including neurodegenerative and neuroinflammatory disorders.

The aforementioned well-characterized diseases in humans can also occur with comparable etiology in other mammals and can likewise be treated therein with the compounds of the present invention.

In the context of the present invention, the term "treatment" or "treating" includes inhibition, retardation, checking, alleviating, attenuating, restricting, reducing, suppressing, repelling or healing of a disease, a condition, a disorder, an injury or a health problem, or the development, the course or the progression of such states and/or the symptoms of such states. The term "therapy" is understood here to be synonymous with the term "treatment".

The terms "prevention", "prophylaxis" and "preclusion" are used synonymously in the context of the present invention and refer to the avoidance or reduction of the risk of contracting, experiencing, suffering from or having a disease, a condition, a disorder, an injury or a health problem, or a development or advancement of such states and/or the symptoms of such states.

The treatment or prevention of a disease, a condition, a disorder, an injury or a health problem may be partial or complete.

The present invention thus further provides for the use of the compounds of the invention for treatment and/or prevention of disorders, especially of the aforementioned disorders.

The present invention further provides for the use of the compounds of the invention for production of a medicament for treatment and/or prevention of disorders, especially of the aforementioned disorders.

The present invention further provides a medicament comprising at least one of the compounds of the invention for treatment and/or prevention of disorders, especially of the aforementioned disorders.

The present invention further provides for the use of the compounds of the invention in a method for treatment and/or prevention of disorders, especially of the aforementioned disorders.

The present invention further provides a method of treatment and/or prevention of disorders, especially of the aforementioned disorders, using an effective amount of at least one of the compounds of the invention.

The compounds of the invention can be used alone or, if required, in combination with one or more other pharmacologically active substances, provided that this combination does not lead to undesirable and unacceptable side effects. The present invention therefore further provides medicaments comprising at least one of the compounds of the invention and one or more further active ingredients, especially for treatment and/or prevention of the aforementioned disorders. Preferred examples of combination active ingredients suitable for this purpose include:

TASK1 channel and TASK3 channel blockers such as, by way of example and with preference, those disclosed in WO 2017/097792 A1, WO 2017/097671 A1, WO 2018/015196 A1, WO 2018/228907 A1, WO 2018/228909 A1;

P2X3 receptor antagonists such as, by way of example and with preference, gefapixant;

respiratory stimulants such as, by way of example and with preference, theophylline, doxapram, nikethamide, caffeine;

psychostimulants such as, by way of example and with preference, modafinil, armodafinil;

amphetamines and amphetamine derivatives such as, by way of example and with preference, amphetamine, methamphetamine, methylphenidate;

serotonin reuptake inhibitors such as, by way of example and with preference, fluoxetine, paroxetine, citalopram, escitalopram, sertraline, fluvoxamine, trazodone;

serotonin precursors such as, by way of example and with preference, L-tryptophan;

selective serotonin noradrenaline reuptake inhibitors such as, by way of example and with preference, venlafaxine, duloxetine;

noradrenergic and specific serotonergic antidepressants such as, by way of example and with preference, mirtazapine;

selective noradrenaline reuptake inhibitors such as, by way of example and with preference, atomoxetine and reboxetine;

muscarine receptor antagonists such as, by way of example and with preference, oxybutynin;

tricyclic antidepressants such as, by way of example and with preference, amitriptyline, protriptyline, doxepine, trimipramine, imipramine, clomipramine, desipramine;

GABA agonists such as, by way of example and with preference, baclofen;

alpha sympathomimetics such as, by way of example and with preference, xylometazoline, oxymetazoline, phenylephrine, naphazoline, tetrazoline, tramazoline;

glucocorticoids such as, by way of example and with preference, fluticasone, budesonide, beclometasone, mometasone, tixocortol pivalate, triamcinolone acetonide;

cannabinoid receptor agonists and antagonists;

carboanhydrase inhibitors such as, by way of example and with preference, acetazolamide, methazolamide and diclofenamide;

opioid and benzodiazepine receptor antagonists such as, by way of example and with preference, flumazenil, naloxone, naltrexone;

cholinesterase inhibitors such as, by way of example and with preference, neostigmine, pyridostigmine, physostigmine donepezil, galantamine, rivastigmine;

N-methyl-D-aspartate and glutamate antagonists, by way of example and with preference amantadine, memantine, sabeluzole;

nicotine receptor agonists;

leukotriene receptor antagonists such as, by way of example and with preference, montelukast, tripelukast;

dopamine receptor antagonists such as, by way of example and with preference, dromperidone, metoclopramide, benzamide, butyrophenone, phenothiazine;

appetite suppressants such as, by way of example and with preference, sibutramine, topiramate, lipase inhibitors, cannabinoid receptor antagonists, phentermine;

proton pump inhibitors such as, by way of example and with preference, pantoprazole, omeprazole, esomeprazole, lansoprazole, rabeprazole;

hypotensive active compounds, by way of example and with preference from the group of the calcium antagonists, angiotensin AII antagonists, ACE inhibitors, vasopeptidase inhibitors, endothelin antagonists, renin inhibitors, alpha receptor blockers, beta receptor blockers, mineralocorticoid receptor antagonists and also the diuretics;

active compounds that alter lipid metabolism, by way of example and with preference from the group of the thyroid receptor agonists, cholesterol synthesis inhibitors such as, by way of example and preferably, HMG-CoA reductase inhibitors or squalene synthesis inhibitors, the ACAT inhibitors, CETP inhibitors, MTP inhibitors, PPAR-alpha, PPAR-gamma and/or PPAR-delta agonists, cholesterol absorption inhibitors, lipase inhibitors, polymeric bile acid adsorbents, bile acid reabsorption inhibitors and lipoprotein(a) antagonists;

azoorganic nitrates and NO donors, for example sodium nitroprusside, nitroglycerin, isosorbide mononitrate, isosorbide dinitrate, molsidomine or SIN-1, and inhaled NO;

compounds which inhibit the degradation of cyclic guanosine monophosphate (cGMP) and/or cyclic adenosine monophosphate (cAMP), for example inhibitors of phosphodiesterases (PDE) 1, 2, 3, 4 and/or 5, especially PDE 5 inhibitors such as sildenafil, vardenafil, tadalafil, udenafil, dasantafil, avanafil, mirodenafil or lodenafil;

NO- and haem-independent activators of soluble guanylate cyclase (sGC), such as in particular the compounds described in WO 01/19355, WO 01/19776, WO 01/19778, WO 01/19780, WO 02/070462 and WO 02/070510;

NO-independent but haem-dependent stimulators of soluble guanylate cyclase (sGC), such as in particular riociguat and the compounds described in WO 00/06568, WO 00/06569, WO 02/42301, WO 03/095451, WO 2011/147809, WO 2012/004258, WO 2012/028647 and WO 2012/059549;

compounds which influence the energy metabolism of the heart, by way of example and with preference etomoxir, dichloroacetate, ranolazine or trimetazidine;

antithrombotic agents, by way of example and with preference from the group of platelet aggregation inhibitors, the anticoagulants and the profibrinolytic substances;

anti-obstructive agents as used, for example, for treatment of chronic obstructive pulmonary disease (COPD) or bronchial asthma, by way of example and with preference from the group of the inhalatively or systemically administered agonists of the beta-adrenergic receptor (beta-mimetics) and the inhalatively administered antimuscarinergic substances;

antiinflammatory, immunomodulating, immunosuppressive and/or cytotoxic agents, by way of example and with preference from the group of the systemically or inhalatively administered corticosteroids and also dimethyl fumarate, fingolimod, glatiramer acetate, beta-interferons, natalizumab, teriflunomide, mitoxantrone, immunoglobulins, acetylcysteine, montelukast, tripelukast, azathioprine, cyclophosphamide, hydroxycarbamide, azithromycin, IFN-γ, pirfenidone or etanercept;

compounds which inhibit the signal transduction cascade, by way of example and with preference from the group of the kinase inhibitors, in particular from the group of the tyrosine kinase and/or serine/threonine kinase inhibitors, by way of example and with preference nintedanib, dasatinib, nilotinib, bosutinib, regorafenib, sorafenib, sunitinib, cediranib, axitinib, telatinib, imatinib, brivanib, pazopanib, vatalanib, gefitinib, erlotinib, lapatinib, canertinib, lestaurtinib, pelitinib, semaxanib or tandutinib;

prostacyclin analogues and IP receptor agonists, by way of example and with preference iloprost, beraprost, treprostinil, epoprostenol or selexipag;

endothelin receptor antagonists, by way of example and with preference bosentan, darusentan, ambrisentan or sitaxsentan;

compounds which inhibit human neutrophile elastase (HNE), by way of example and with preference sivelestat or DX-890 (reltran);

compounds which inhibit the degradation and alteration of the extracellular matrix, by way of example and with preference inhibitors of the matrix metalloproteases (MMPs), especially inhibitors of stromelysin, collagenases, gelatinases and aggrecanases (in this context particularly of MMP-1, MMP-3, MMP-8, MMP-9, MMP-10, MMP-11 and MMP-13) and of metalloelastase (MMP-12);

compounds which block the binding of serotonin to its receptors, by way of example and with preference antagonists of the 5-HT2B receptor such as PRX-08066;

antagonists of growth factors, cytokines and chemokines, by way of example and with preference antagonists of TGF-β, CTGF, IL-1, IL-4, IL-5, IL-6, IL-8, IL-13 and integrins;

Rho kinase-inhibiting compounds, by way of example and with preference fasudil, Y-27632, SLx-2119, BF-66851, BF-66852, BF-66853, KI-23095 or BA-1049; and/or antifibrotic agents, by way of example and with preference pirfenidone, lysophosphatidic acid receptor 1 (LPA-1) antagonists, CTGF inhibitors, IL-4 antagonists, IL-13 antagonists, TGF-.antagonists;

In a particularly preferred embodiments of the invention, the compounds of the invention are administered in combination with one or more further active compounds selected from the group consisting of respiratory stimulants, psychostimulants, serotonin reuptake inhibitors, noradrenergic, serotonergic and tricyclic antidepressants, P2X3 antagonists, sGC stimulators, mineralocorticoid receptor antagonists, antiinflammatory drugs, immunomodulators, immunosuppressives and cytotoxic drugs.

In a preferred embodiment of the invention, the compounds of the invention are administered in combination with a beta-adrenergic receptor agonist, by way of example and with preference albuterol, isoproterenol, metaproterenol, terbutalin, fenoterol, formoterol, reproterol, salbutamol or salmeterol.

In a preferred embodiment of the invention, the compounds of the invention are administered in combination with an antimuscarinergic substance, by way of example and with preference ipratropium bromide, tiotropium bromide or oxitropium bromide.

In a preferred embodiment of the invention, the compounds of the invention are administered in combination with a corticosteroid, by way of example and with preference prednisone, prednisolone, methylprednisolone, triamcinolone, dexamethasone, beclomethasone, betamethasone, flunisolide, budesonide or fluticasone.

Antithrombotic agents are preferably understood to mean compounds from the group of the platelet aggregation inhibitors, the anticoagulants and the profibrinolytic substances.

In a preferred embodiment of the invention, the compounds of the invention are administered in combination with a platelet aggregation inhibitor, by way of example and with preference aspirin, clopidogrel, ticlopidine or dipyridamole.

In a preferred embodiment of the invention, the compounds of the invention are administered in combination with a thrombin inhibitor, by way of example and with preference ximelagatran, melagatran, dabigatran, bivalirudin or clexane.

In a preferred embodiment of the invention, the compounds of the invention are administered in combination with a GPIIb/IIIa antagonist, by way of example and with preference tirofiban or abciximab.

In a preferred embodiment of the invention, the compounds of the invention are administered in combination with a factor Xa inhibitor, by way of example and with preference rivaroxaban, apixaban, fidexaban, razaxaban, fondaparinux, idraparinux, DU-176b, PMD-3112, YM-150, KFA-1982, EMD-503982, MCM-17, MLN-1021, DX 9065a, DPC 906, JTV 803, SSR-126512 or SSR-128428.

In a preferred embodiment of the invention, the compounds of the invention are administered in combination with heparin or with a low molecular weight (LMW) heparin derivative.

In a preferred embodiment of the invention, the compounds of the invention are administered in combination with a vitamin K antagonist, by way of example and with preference coumarin.

Hypotensive agents are preferably understood to mean compounds from the group of the calcium antagonists, angiotensin AII antagonists, ACE inhibitors, endothelin antagonists, renin inhibitors, alpha-receptor blockers, beta-receptor blockers, mineralocorticoid receptor antagonists, and the diuretics.

In a preferred embodiment of the invention, the compounds of the invention are administered in combination with a calcium antagonist, by way of example and with preference nifedipine, amlodipine, verapamil or diltiazem.

In a preferred embodiment of the invention, the compounds of the invention are administered in combination with an alpha-1 receptor blocker, by way of example and with preference prazosin.

In a preferred embodiment of the invention, the compounds of the invention are administered in combination with a beta receptor blocker, by way of example and with preference propranolol, atenolol, timolol, pindolol, alprenolol, oxprenolol, penbutolol, bupranolol, metipranolol, nadolol, mepindolol, carazalol, sotalol, metoprolol, betaxolol, celiprolol, bisoprolol, carteolol, esmolol, labetalol, carvedilol, adaprolol, landiolol, nebivolol, epanolol or bucindolol.

In a preferred embodiment of the invention, the compounds of the invention are administered in combination with an angiotensin AII antagonist, by way of example and with preference losartan, candesartan, valsartan, telmisartan or embursatan.

In a preferred embodiment of the invention, the compounds of the invention are administered in combination with an ACE inhibitor, by way of example and with preference enalapril, captopril, lisinopril, ramipril, delapril, fosinopril, quinopril, perindopril or trandopril.

In a preferred embodiment of the invention, the compounds of the invention are administered in combination with an endothelin antagonist, by way of example and with preference bosentan, darusentan, ambrisentan or sitaxsentan.

In a preferred embodiment of the invention, the compounds of the invention are administered in combination with a renin inhibitor, by way of example and with preference aliskiren, SPP-600 or SPP-800.

In a preferred embodiment of the invention, the compounds of the invention are administered in combination with a mineralocorticoid receptor antagonist, by way of example and with preference spironolactone, eplerenone or finerenone.

In a preferred embodiment of the invention, the compounds of the invention are administered in combination with a diuretic, by way of example and with preference furosemide, bumetanide, torsemide, bendroflumethiazide, chlorothiazide, hydrochlorothiazide, hydroflumethiazide, methyclothiazide, polythiazide, trichlormethiazide, chlorthalidone, indapamide, metolazone, quinethazone, acetazolamide, dichlorphenamide, methazolamide, glycerol, isosorbide, mannitol, amiloride or triamterene.

Lipid metabolism modifiers are preferably understood to mean compounds from the group of the CETP inhibitors, thyroid receptor agonists, cholesterol synthesis inhibitors such as HMG-CoA reductase inhibitors or squalene synthesis inhibitors, the ACAT inhibitors, MTP inhibitors, PPAR-alpha, PPAR-gamma and/or PPAR-delta agonists, cholesterol absorption inhibitors, polymeric bile acid adsorbers, bile acid reabsorption inhibitors, lipase inhibitors and the lipoprotein(a) antagonists.

In a preferred embodiment of the invention, the compounds of the invention are administered in combination with a CETP inhibitor, by way of example and with preference torcetrapib (CP-529 414), JJT-705 or CETP vaccine (Avant).

In a preferred embodiment of the invention, the compounds of the invention are administered in combination with a thyroid receptor agonist, by way of example and with preference D-thyroxine, 3,5,3'-triiodothyronine (T3), CGS 23425 or axitirome (CGS 26214).

In a preferred embodiment of the invention, the compounds of the invention are administered in combination with an HMG-CoA reductase inhibitor from the class of statins, by way of example and with preference lovastatin, simvastatin, pravastatin, fluvastatin, atorvastatin, rosuvastatin or pitavastatin.

In a preferred embodiment of the invention, the compounds of the invention are administered in combination with a squalene synthesis inhibitor, by way of example and with preference BMS-188494 or TAK-475.

In a preferred embodiment of the invention, the compounds of the invention are administered in combination with an ACAT inhibitor, by way of example and with preference avasimibe, melinamide, pactimibe, eflucimibe or SMP-797.

In a preferred embodiment of the invention, the compounds of the invention are administered in combination with an MTP inhibitor, by way of example and with preference implitapide, BMS-201038, R-103757 or JTT-130.

In a preferred embodiment of the invention, the compounds of the invention are administered in combination with a PPAR-gamma agonist, by way of example and with preference pioglitazone or rosiglitazone.

In a preferred embodiment of the invention, the compounds of the invention are administered in combination with a PPAR-delta agonist, by way of example and with preference GW 501516 or BAY 68-5042.

In a preferred embodiment of the invention, the compounds of the invention are administered in combination with a cholesterol absorption inhibitor, by way of example and with preference ezetimibe, tiqueside or pamaqueside.

In a preferred embodiment of the invention, the compounds of the invention are administered in combination with a lipase inhibitor, by way of example and with preference orlistat.

In a preferred embodiment of the invention, the compounds of the invention are administered in combination with a polymeric bile acid adsorber, by way of example and with preference cholestyramine, colestipol, colesolvam, CholestaGel or colestimide.

In a preferred embodiment of the invention, the compounds of the invention are administered in combination with a bile acid reabsorption inhibitor, by way of example and with preference ASBT (=IBAT) inhibitors, for example AZD-7806, S-8921, AK-105, BARI-1741, SC-435 or SC-635.

In a preferred embodiment of the invention, the compounds of the invention are administered in combination with a lipoprotein(a) antagonist, by way of example and with preference gemcabene calcium (CI-1027) or nicotinic acid.

Particular preference is given to combinations of the compounds of the invention with one or more further active compounds selected from the group of respiratory stimulants, psychostimulants, serotonin reuptake inhibitors, noradrenergic, serotonergic and tricyclic antidepressants, sGC stimulators, mineralocorticoid receptor antagonists, antiinflammatory drugs, immunomodulators, immunosuppressives and cytotoxic drugs.

If required, the compounds of the invention can be used in combination with one or more other medical means, provided that this combination does not lead to undesirable and unacceptable side effects. Preferred examples of medical means suitable for this purpose include:

devices for positive airway pressure ventilation such as, by way of example and with preference, CPAP (continuous positive airway pressure) devices, BiPAP (bi-level positive airway pressure) devices and IPPV (intermittent positive pressure ventilation) devices neurostimulators of the Nervus hypoglossus intraoral means such as, by way of example and with preference, protrusion braces nasal disposable valves nasal stents The present invention further provides medicaments which comprise at least one compound of the invention, typically together with one or more inert, non-toxic, pharmaceutically suitable excipients, and for the use thereof for the aforementioned purposes.

The compounds of the invention can act systemically and/or locally. For this purpose, they can be administered in a suitable manner, for example by the oral, parenteral, pulmonal, nasal, pharyngeal, sublingual, lingual, buccal, rectal, dermal, transdermal, conjunctival or otic route, or as an implant or stent.

The compounds of the invention can be administered in administration forms suitable for these administration routes.

Suitable administration forms for oral administration are those which work according to the prior art and release the compounds of the invention rapidly and/or in a modified manner and which contain the compounds of the invention in crystalline and/or amorphized and/or dissolved form, for example tablets (uncoated or coated tablets, for example with gastric juice-resistant or retarded-dissolution or insoluble coatings which control the release of the compound of the invention), tablets or films/oblates which disintegrate rapidly in the oral cavity, films/lyophilizates, capsules (for example hard or soft gelatin capsules), sugar-coated tablets, granules, pellets, powders, emulsions, suspensions, aerosols or solutions.

Parenteral administration can bypass an absorption step (e.g. take place intravenously, intraarterially, intracardially, intraspinally or intralumbally) or include an absorption (e.g. take place inhalatively, intramuscularly, subcutaneously, intracutaneously, percutaneously or intraperitoneally). Administration forms suitable for parenteral administration include inter alia preparations for injection and infusion in the form of solutions, suspensions, emulsions, lyophilizates or sterile powders.

For the other administration routes, suitable examples are inhalable medicament forms (including powder inhalers, nebulizers, metered aerosols), nasal drops, solutions or sprays, throat sprays, tablets, films/oblates or capsules for lingual, sublingual or buccal administration, suppositories, ear or eye preparations, vaginal capsules, aqueous suspensions (lotions, shaking mixtures), lipophilic suspensions, ointments, creams, transdermal therapeutic systems (e.g. patches), milk, pastes, foams, sprinkling powders, implants or stents.

Oral, parenteral and local administration are preferred, in particular oral, intravenous, intranasal and pharyngeal administration.

The compounds of the invention can be converted to the administration forms mentioned. This can be accomplished in a manner known per se by mixing with inert, non-toxic, pharmaceutically suitable excipients. These excipients include inter alia carriers (for example microcrystalline cellulose, lactose, mannitol), solvents (e.g. liquid polyethylene glycols), emulsifiers and dispersing or wetting agents (for example sodium dodecylsulfate, polyoxysorbitan oleate), binders (for example polyvinylpyrrolidone), synthetic and natural polymers (for example albumin), stabilizers (e.g. antioxidants, for example ascorbic acid), colourants (e.g. inorganic pigments, for example iron oxides) and flavour and/or odour correctors.

In general, it has been found to be advantageous in the case of parenteral administration to administer amounts of about 0.001 to 1 mg/kg, preferably about 0.01 to 0.5 mg/kg body weight to achieve effective results. In the case of oral administration the dosage is about 0.01 to 100 mg/kg, preferably about 0.01 to 20 mg/kg and most preferably 0.1 to 10 mg/kg body weight. In the case of intrapulmonary administration, the amount is generally about 0.1 to 50 mg per inhalation.

It may nevertheless be necessary in some cases to deviate from the stated amounts, and specifically as a function of body weight, route of administration, individual response to the active ingredient, nature of the preparation and time at which or interval over which administration takes place. Thus in some cases it may be sufficient to manage with less than the aforementioned minimum amount, while in other cases the upper limit mentioned must be exceeded. In the case of administration of greater amounts, it may be advisable to divide them into several individual doses over the day.

The working examples which follow illustrate the invention. The invention is not restricted to the examples.

A. EXAMPLES

Abbreviations and Acronyms abs. absolute
Ac acetyl
aq. aqueous, aqueous solution
Boc tert-butoxycarbonyl
br. broad (in NMR signal)
Ex. Example
Bu butyl
c concentration
cat. catalytic
CI chemical ionization (in MS)
d doublet (in NMR)
d day(s)
DCI direct chemical ionization (in MS)
dd doublet of doublets (in NMR)
diamix diastereomer mixture
DMF N,N-dimethylformamide
DMSO dimethyl sulfoxide
dq doublet of quartets (in NMR)
dt doublet of triplet (in NMR)
o. t. of theory (in chemical yield)
EI electron impact ionization (in MS)
eq. equivalent(s)
ESI electrospray ionization (in MS)
Et ethyl
h hour(s)
HATU O-(7-azabenzotriazol-1-yl)-N,N,N',N'-tetramethyluronium hexafluorophosphate
HOBt 1-hydroxy-1H-benzotriazole hydrate
HPLC high-pressure, high-performance liquid chromatography
iPr isopropyl
conc. concentrated (in the case of a solution)
LC liquid chromatography
LC-MS liquid chromatography-coupled mass spectrometry
lit. literature (reference)
m multiplet (in NMR)
Me methyl
min minute(s)
MS mass spectrometry
NMR nuclear magnetic resonance spectrometry
Ph phenyl
Pr propyl
q quartet (in NMR)
quant. quantitative (in chemical yield)
RP reverse phase (in HPLC)
RT room temperature
$R_t$ retention time (in HPLC, LC-MS)
s singlet (in NMR)
t triplet (in NMR)
tBu tert-butyl
TFA trifluoroacetic acid
THF tetrahydrofuran
UV ultraviolet spectrometry
v/v volume to volume ratio (of a solution)
tog. together LC-MS, GC-MS and HPLC Methods Method 1 (LC-MS):

MS instrument type: Thermo Scientific FT-MS; instrument type UHPLC+: Thermo Scientific UltiMate 3000; column: Waters, HSST3, 2.1×75 mm, C18 1.8 um; mobile phase A: 1 l of water+0.01% formic acid; mobile phase B: 1 l of acetonitrile+0.01% formic acid; gradient: 0.0 min 10% B→2.5 min 95% B→3.5 min 95% B; oven: 50° C.; flow rate: 0.90 ml/min; UV detection: 210 nm/optimum integration path 210-300 nm.

Method 2 (LC-MS):

MS instrument type: Waters TOF instrument; UPLC instrument type: Waters Acquity I-CLASS; column: Waters Acquity UPLC HSS T3 1.8 μm 50×1 mm; mobile phase A: 1 l of water+0.100 ml of 99% strength formic acid; mobile phase B: 1 l of acetonitrile+0.100 ml of 99% strength formic acid; gradient: 0.0 min 90% A→1.2 min 5% A→2.0 min 5% A; oven: 50° C.; flow rate: 0.40 ml/min; UV detection: 210 nm.

Method 3 (GC-MS):

Instrument: Thermo Scientific DSQII, Thermo Scientific Trace GC Ultra; column: Restek RTX-35MS, 15 m×200 μm×0.33 μm; constant flow rate with helium: 1.20 ml/min; oven: 60° C.; inlet: 220° C.; gradient: 60° C., 30° C./min→300° C. (maintain for 3.33 min).

Method 4 (LC-MS):

Instrument: Waters ACQUITY SQD UPLC System; column: Waters Acquity UPLC HSS T3 1.8 μm 50×1 mm; mobile phase A: 1 l of water+0.25 ml of 99% strength formic acid, mobile phase B: 1 l of acetonitrile+0.25 ml of 99% strength formic acid; gradient: 0.0 min 90% A→1.2 min 5% A→2.0 min 5% A; oven: 50° C.; flow rate: 0.40 ml/min; UV detection: 210 nm.

Method 5 (LC-MS):
Instrument: Waters Single Quad MS System; instrument Waters UPLC Acquity; column: Waters BEH C18 1.7µ 50×2.1 mm; mobile phase A: 1 l of water+1.0 ml of (25% strength ammonia)/1, mobile phase B: 1l of acetonitrile; gradient: 0.0 min 92% A→0.1 min 92% A→1.8 min 5% A→3.5 min 5% A; oven: 50° C.; flow rate: 0.45 ml/min; UV detection: 210 nm.

Method 6 (LC-MS):
MS instrument: Waters SQD2 HPLC instrument: Waters UPLC; column: Zorbax SB-Aq (Agilent), 50 mm×2.1 mm, 1.8 µm; mobile phase A: water+0.025% formic acid, mobile phase B: acetonitrile (ULC)+0.025% formic acid; gradient: 0.0 min 98% A-0.9 min 25% A-1.0 min 5% A-1.4 min 5% A-1.41 min 98% A-1.5 min 98% A; oven: 40° C.; flow rate: 0.600 ml/min; UV detection: DAD; 210 nm.

Method 7 (Preparative HPLC):
Instrument: Waters Prep LC/MS System, column: XBridge C18 5 µm 100×30 mm.
Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection).
Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time.

Method 8 (Preparative HPLC):
Instrument: Waters Prep LC/MS System, column: XBridge C18 5 µm 100×30 mm.
Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection).
Gradient profile: mobile phase A 0 to 2 min 63 ml, mobile phase B 0 to 2 min 7 ml, mobile phase A 2 to 10 min from 63 ml to 39 ml and mobile phase B from 7 ml to 31 ml, 10 to 12 min 0 ml of mobile phase A and 70 ml of mobile phase B. Mobile phase C and mobile phase D constant flow rate of 5 ml/min each over the entire running time.

Method 9 (Preparative HPLC):
Instrument: Waters Prep LC/MS System, column: XBridge C18 5 µm 100×30 mm.
Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection).
Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time.

Method 10 (Preparative HPLC):
Instrument: Waters Prep LC/MS System, column: XBridge C18 5 µm 100×30 mm.
Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection).
Gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time.

Method 11 (Preparative HPLC):
Instrument: Abimed Gilson 305; column: Reprosil C18 10 µm, 250 mm×30 mm; mobile phase A: water, mobile phase B: acetonitrile; gradient: 0-3 min 10% B, 3-27 min 10% B→95% B, 27-34.5 min 95% B, 34.5-35.5 min 95% B→10% B, 35.5-36.5 min 10% B; flow rate: 50 ml/min; room temperature; UV detection: 210 nm.

Method 12 (LC-MS):
Instrument: Waters ACQUITY SQD UPLC System; column: Waters Acquity UPLC HSS T3 1.8 µm 50×1 mm; mobile phase A: 1 l of water+0.25 ml of 99% strength formic acid, mobile phase B: 1 l of acetonitrile+0.25 ml of 99% strength formic acid; gradient: 0.0 min 95% A→6.0 min 5% A→7.5 min 5% A; oven: 50° C.; flow rate: 0.35 ml/min; UV detection: 210 nm.

Further Details:
The descriptions of the coupling patterns of $^1$H NMR signals which follow are guided by the visual appearance of the signals in question and do not necessarily correspond to a strict, physically correct interpretation. In general, the stated chemical shift refers to the center of the signal in question; in the case of broad multiplets, an interval is generally given.

All figures in $^1$H NMR spectra indicate the chemical shifts δ [ppm]=in ppm.

The multiplicities of proton signals in $^1$H NMR spectra that are given in the paragraphs that follow indicate the signal shape observed in each case and do not take account of higher-order signal phenomena. In general, the statement of the chemical shift relates to the centre of the signal in question. In the case of broad multiplets, an interval is given. Signals that are concealed by solvents or water were either assigned tentatively or are not listed. Significantly broadened signals—caused, for example, by rapid rotation of parts of molecules or owing to exchanging protons—were likewise assigned tentatively (often referred to as a broad multiplet or broad singlet) or are not listed.

The $^1$H NMR data of selected synthesis intermediates and working examples are stated in the form of $^1$H NMR peak lists. For each signal peak, first the δ [ppm] value in ppm and then the signal intensity in round brackets are listed. The δ [ppm] value/signal intensity number pairs for different signal peaks are listed with separation from one another by commas. The peak list for an example therefore takes the following form: δ [ppm] (intensity$_1$), δ [ppm]2 (intensity$_2$), . . . , δ [ppm]i (intensity$_i$), . . . , δ [ppm]$_n$ (intensity$_n$).

The intensity of sharp signals correlates with the height of the signals in a printed example of an NMR spectrum in cm and shows the true ratios of the signal intensities in comparison with other signals. In the case of broad signals, several peaks or the middle of the signal and the relative intensity thereof may be shown in comparison to the most intense signal in the spectrum. The lists of the $^1$H NMR peaks are similar to the conventional $^1$H NMR printouts and thus usually contain all peaks listed in a conventional NMR interpretation. In addition, like conventional $^1$H NMR printouts, they may show solvent signals, signals of stereoisomers of the target compounds which are likewise provided by the invention, and/or peaks of impurities. The peaks of stereoisomers of the target compounds and/or peaks of impurities usually have a lower intensity on average than the peaks of the target compounds (for example with a purity of >90%). Such stereoisomers and/or impurities may be typical of the particular preparation process. Their peaks can thus help in identifying reproduction of our preparation process with reference to "by-product fingerprints". An expert calculating the peaks of the target compounds by known methods (MestreC, ACD simulation, or using empirically evaluated expected values) can, if required, isolate the peaks of the target compounds, optionally using additional intensity filters. This isolation would be similar to the peak picking in question in conventional $^1$H NMR interpretation. A detailed description of the presentation of NMR data in the form of peak lists can be found in the publication "Citation of NMR Peaklist Data within Patent Applications" (cf. Research Disclosure Database Number 605005, 2014, 1 Aug. 2014 or http://www.researchdisclosure.com/searching-disclosures). In the peak picking routine described in Research Disclosure Database Number 605005, the parameter "MinimumHeight" can be set between 1% and 4%. Depending on the type of chemical structure and/or depending on the concentration of the compound to be analysed, it may be advisable to set the parameter "MinimumHeight" to values of <1%.

Melting points and melting ranges, if stated, are uncorrected.

In cases where the reaction products were obtained by trituration, stirring or recrystallization, it was frequently possible to isolate further amounts of product from the respective mother liquor by chromatography. However, a description of this chromatography is dispensed with hereinbelow unless a large part of the total yield could only be isolated in this step.

All reactants or reagents whose preparation is not described explicitly hereinafter were purchased commercially from generally accessible sources. For all other reactants or reagents whose preparation is likewise not described hereinafter and which were not commercially obtainable or were obtained from sources which are not generally accessible, a reference is given to the published literature in which their preparation is described.

Starting Materials and Intermediates

Example 1A

2-Bromo-N-[(3,5-difluoropyridin-2-yl)methyl]-1,3-thiazole-5-carboxamide

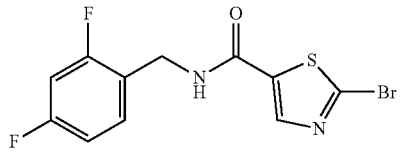 [SMILES: O=C(NCc1ccc(F)cc1F)c1cnc(Br)s1]

50.24 ml (288.41 mmol) of N,N-diisopropylethylamine were added to a solution of 20 g (96.14 mmol) of 2-bromo-1,3-thiazole-5-carboxylic acid and 29.21 g (134.59 mmol) of 1-(3,5-difluoropyridin-2-yl)methanamine dihydrochloride in 450 ml of acetonitrile, the mixture was cooled to 0° C. using an ice bath and 74.4 ml (124.98 mmol) of a 50% strength solution of T3P (2,4,6-tripropyl-1,3,5,2,4,6-trioxatriphosphorinane 2,4,6-trioxide) in ethyl acetate were then added dropwise to the reaction solution. After the addition had ended, the reaction solution was warmed to room temperature and stirred at this temperature for 4 h. About 250 ml of water were then added to the solution. The resulting aqueous phase was then extracted 3× with ethyl acetate. The combined organic phases were subsequently filtered through a hydrophobic filter (pleated filter MN 616 WA 1/4, D=12.5 cm), dried and concentrated to dryness under reduced pressure. The residue obtained was triturated with diethyl ether and then air-dried. This gave 27.3 g (81.7 mmol, 85% of theory) of the target product as a light-beige solid. The recovered mother liquor was evaporated to dryness under reduced pressure and the resulting residue was purified further by column chromatography on silica gel (Isolera Biotage SNAP-Ultra 100 g column; mobile phase: cyclohexane/ethyl acetate 9:1→gradient over 15 CV (CV=column volumes)→cyclohexane/ethyl acetate 1:1). This gave a further 2.1 g (6.28 mmol, 6.5% of theory) of the target compound as a white solid.

$^1$H-NMR (600 MHz, DMSO-d$_6$, δ/ppm): 4.59 (d, 2H), 7.90-7.95 (m, 1H), 8.27 (s, 1H), 8.48 (d, 1H), 9.32 (br. t, 1H).

LC-MS (method 1): R$_t$=1.38 min; m/z=333/335 (M+H)$^+$.

Analogously to Example 1A, the following compounds Example 2A to 8A were prepared from the starting materials stated in each case:

| Example | Name/Structure/Starting materials | Analytical data |
|---|---|---|
| 2A | 2-bromo-N-[(3,5-difluoropyridin-2-yl)methyl]-4-methyl-1,3-thiazole-5-carboxamide<br><br>from 2-bromo-4-methyl-1,3-thiazole-5-carboxylic acid and 1-(3,5-difluoropyridin-2-yl)methanamine dihydrochloride | $^1$H-NMR (600 MHz, DMSO-d$_6$, δ/ppm): 2.48-2.56 (s, 3H, partially obscured by DMSO), 4.56 (d, 2H), 7.91-7.97 (m, 1H), 8.48 (d, 1H), 8.83 (br. t, 1H).<br>LC-MS (method 1):<br>R$_t$ = 1.55 min; m/z = 349/347 (M + H)$^+$. |

-continued

| Example | Name/Structure/Starting materials | Analytical data |
|---|---|---|
| 3A | 2-bromo-N-[(3,5-difluoropyridin-2-yl)methyl]-5-methyl-1,3-thiazole-4-carboxamide<br>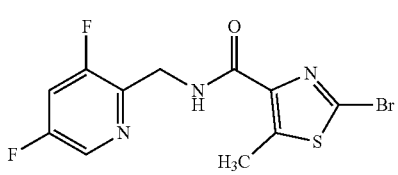<br>from 2-bromo-5-methyl-1,3-thiazole-4-carboxylic acid and 1-(3,5-difluoropyridin-2-yl)methanamine dihydrochloride | $^1$H-NMR (600 MHz, DMSO-d$_6$, δ/ppm): 2.48-2.56 (s, 3H, partially obscured by DMSO), 4.56 (d, 2H), 7.90-7.97 (m, 1H), 8.48 (d, 1H), 8.83 (br. t, 1H).<br>LC-MS (method 1):<br>R$_t$ = 1.51 min; m/z = 349/347 (M + H)$^+$. |
| 4A | 2-bromo-N-[(3,5-difluoropyridin-2-yl)methyl]-1,3-thiazole-4-carboxamide<br>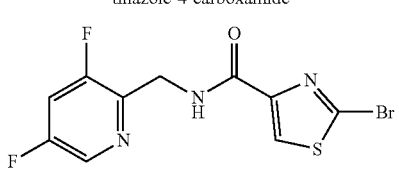<br>from 2-bromo-1,3-thiazole-4-carboxylic acid and 1-(3,5-difluoropyridin-2-yl)methanamine dihydrochloride | $^1$H-NMR (600 MHz, DMSO-d$_6$, δ/ppm): 4.60 (d, 2H), 7.89-7.96 (m, 1H), 8.31 (s, 1H), 8.47 (d, 1H), 8.89 (br. t, 1H).<br>LC-MS (method 1):<br>R$_t$ = 1.56 min; m/z = 333/335 (M + H)$^+$. |
| 5A | 2-bromo-N-[(3,5-difluoropyridin-2-yl)methyl]-4-(trifluoromethyl)-1,3-thiazole-5-carboxamide<br>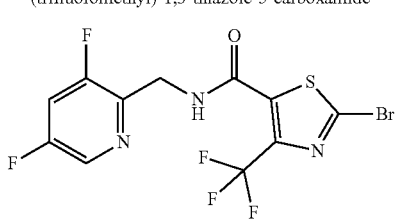<br>from 2-bromo-4-(trifluoromethyl)-1,3-thiazole-5-carboxylic acid and 1-(3,5-difluoropyridin-2-yl)methanamine dihydrochloride | LC-MS (method 1):<br>R$_t$ = 1.71 min; m/z = 401/403 (M + H)$^+$. |
| 6A | 2-bromo-N-[(3,5-difluoropyridin-2-yl)methyl]-5-ethyl-1,3-thiazole-4-carboxamide<br>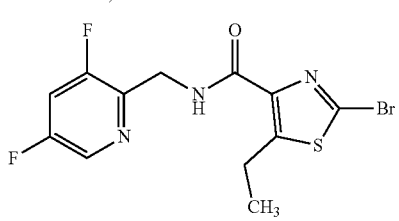<br>from 2-bromo-5-ethyl-1,3-thiazole-4-carboxylic acid and 1-(3,5-difluoropyridin-2-yl)methanamine dihydrochloride | $^1$H-NMR (600 MHz, DMSO-d$_6$, δ/ppm): 1.20 (t, 3H), 3.23 (q, 2H), 4.58 (d, 2H), 7.89-7.96 (m, 1H), 8.47 (d, 1H), 8.73 (br. t, 1H).<br>LC-MS (method 1):<br>R$_t$ = 2.06 min; m/z = 361/363 (M + H)$^+$. |

-continued

| Example | Name/Structure/Starting materials | Analytical data |
|---|---|---|
| 7A | 2-bromo-N-[(3,5-difluoropyridin-2-yl)methyl]-1,3-oxazole-4-carboxamide<br>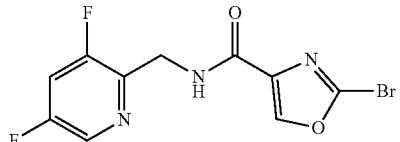<br>from 2-bromo-1,3-oxazole-4-carboxylic acid and 1-(3,5-difluoropyridin-2-yl)methanamine dihydrochloride | $^1$H-NMR (600 MHz, DMSO-d$_6$, δ/ppm): 4.57 (d, 2H), 7.89-7.95 (m, 1H), 8.46 (d, 1H), 8.77 (s, 1H), 8.81 (br. t, 1H).<br>LC-MS (method 1):<br>R$_t$ = 1.37 min; m/z = 317/319 (M + H)$^+$. |
| 8A | 2-bromo-N-[(3,5-difluoropyridin-2-yl)methyl]-1,3-oxazole-4-carboxamide<br>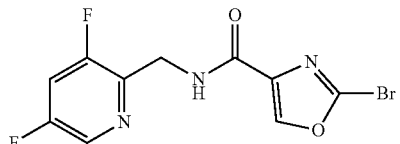<br>from 2-bromo-1,3-oxazole-4-carboxylic acid and 1-(3,5-difluoropyridin-2-yl)methanamine dihydrochloride | $^1$H-NMR (600 MHz, DMSO-d$_6$, δ/ppm): 2.56 (s, 3H), 4.54 (d, 2H), 7.88-7.94 (m, 1H), 8.46 (d, 1H), 8.85 (br. t, 1H).<br>LC-MS (method 1):<br>R$_t$ = 1.64 min; m/z = 331/333 (M + H)$^+$. |

Example 9A

N-[(3,5-Difluoropyridin-2-yl)methyl]-2-(1,4-dioxa-8-azaspiro[4.5]decan-8-yl)-1,3-thiazole-5-carboxamide

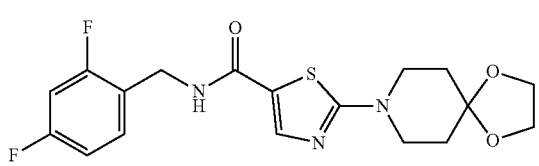 [SMILES: O=C(NCc1ccc(F)cc1F)c1cnc(N2CCC3(CC2)OCCO3)s1]

2 g (5.99 mmol) of 2-bromo-N-[(3,5-difluoropyridin-2-yl)methyl]-1,3-thiazole-5-carboxamide were dissolved in 30 ml of THF, and 4.88 g (14.96 mmol) of caesium carbonate were added. 1.29 g (8.98 mmol) of 1,4-dioxa-8-azaspiro[4.5]decane were then metered into the reaction solution which was subsequently stirred at reflux temperature overnight. After cooling, the reaction mixture was applied directly to silica gel and purified by column chromatography on silica gel (Isolera Biotage SNAP-Ultra 50 g column; mobile phase: cyclohexane/ethyl acetate 85:15→gradient over 15 CV (CV=column volumes)→ethyl acetate). The product fractions obtained were then combined, concentrated on a rotary evaporator and dried under reduced pressure. This gave 1.40 g (3.53 mmol, 99% of theory) of the target compound as a light-beige solid.

$^1$H-NMR (600 MHz, DMSO-d$_6$, δ/ppm): 1.71 (t, 4H), 3.56 (t, 4H), 3.92 (s, 4H), 4.53 (br. d, 2H), 7.84 (s, 1H), 7.89-7.94 (m, 1H), 8.47 (d, 1H), 8.74 (t, 1H).

LC-MS (method 2): R$_t$=0.73 min; m/z=397 (M+H)$^+$.

Example 10A

N-[(3,5-Difluoropyridin-2-yl)methyl]-2-(4-oxopiperidin-1-yl)-1,3-thiazole-5-carboxamide

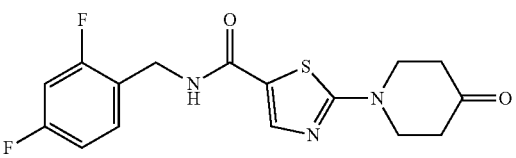 [SMILES: O=C1CCN(c2ncc(C(=O)NCc3ccc(F)cc3F)s2)CC1]

2.3 g (5.80 mmol) of N-[(3,5-difluoropyridin-2-yl)methyl]-2-(1,4-dioxa-8-azaspiro[4.5]decan-8-yl)-1,3-thiazole-5-carboxamide were dissolved in 15 ml of acetone, and 15 ml of semiconcentrated aqueous hydrochloric acid were added. The reaction solution was then stirred at room temperature overnight. The reaction mixture was then concentrated on a rotary evaporator and subsequently taken up in water. The aqueous solution was then adjusted to pH 7 using a saturated sodium bicarbonate solution. The resulting precipitate was filtered off with suction, repeatedly washed with water and dried under reduced pressure. This gave 1.96 g (5.49 mmol, 95% of theory) of the target compound as a white solid.

$^1$H-NMR (600 MHz, DMSO-d$_6$, δ/ppm): 2.48-2.56 (t, 4H, partially obscured by DMSO), 3.82 (t, 4H), 4.54 (br. d, 2H), 7.89 (s, 1H), 7.90-7.94 (m, 1H), 8.48 (d, 1H), 8.78 (t, 1H).

LC-MS (method 1): R$_t$=1.09 min; m/z=353 (M+H)$^+$.

Example 11A

3-[(3,3-Difluorocyclobutyl)methoxy]pyridine

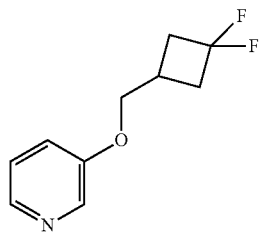 [SMILES: FC1(F)CC(COc2cccnc2)C1]

2 g (21.03 mmol) of pyridin-3-ol were dissolved in 40 ml of THF, and 7.17 g (27.34 mmol) of triphenylphosphine were added. The clear solution was then cooled to 0° C. A further 30 ml of THF were added to the resulting suspension. 5.53 g (27.34 mmol) of diisopropyl azodicarboxylate were added to this suspension and the mixture was stirred at this temperature for 5 min. 3.34 g (27.34 mmol) of (difluorocyclobutyl)methanol, dissolved in 10 ml of THF, were then added dropwise and after the end of the addition the ice bath was removed. After about one hour of stirring at room temperature a clear yellow solution had formed, which was stirred at this temperature overnight. Water was then added, and the reaction solution was extracted three times with ethyl acetate. The combined organic phases were washed with saturated sodium chloride solution, separated off and filtered through a hydrophobic filter (pleated filter MN 616 WA 1/4, D=12.5 cm), dried and concentrated to dryness under reduced pressure. The residue obtained was stirred with about 150 ml of cyclohexane. The precipitated triphenylphosphine oxide was then filtered off with suction and washed repeatedly with cyclohexane. The filtrates obtained were combined and concentrated to dryness under reduced pressure. This gave 3.69 g (18.52 mmol, 88% of theory) of the target compound as a yellow oil. The target compound obtained was reacted further without further purification.

$^1$H-NMR (600 MHz, DMSO-d$_6$, δ/ppm): 2.42-2.55 (m, 2H, partially obscured by DMSO), 2.55-2.64 (m, 1H), 2.68-2.78 (m, 2H). 4.11 (d, 2H), 7.30-7.36 (m, 1H), 7.37-7.43 (m, 1H), 8.18 (dd, 1H), 8.30 (d, 1H).

LC-MS (method 1): $R_t$=1.12 min; m/z=200 (M+H)$^+$.

Example 12A

3-[(3,3-Difluorocyclobutyl)methoxy]piperidine acetate (1:1) (Racemate)

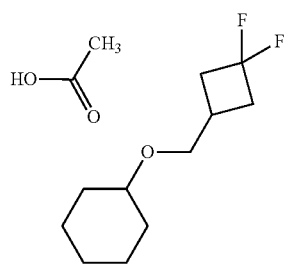

2.5 g (12.55 mmol) of 3-[(3,3-difluorocyclobutyl)methoxy]pyridine were dissolved in 20 ml of glacial acetic acid and hydrogenated using an H-Cube (ThalesNano H-Cube Pro™-1.7).

Reaction Conditions:

catalyst: Pd/C 10%; solvent: glacial acetic acid; cartridge pressure: 80 bar of hydrogen; flow rate: 1 ml/min; temperature: 80° C.

After the reaction had gone to completion, the reaction mixture was concentrated to dryness. The residue obtained was dried under reduced pressure at room temperature overnight. This gave 4.2 g of the target compound as a yellow oil. The target compound was reacted further without further purification.

GC-MS (method 3): $R_t$=3.87 min; m/z=205 (M−C$_2$H$_4$O$_2$)$^+$.

Example 13A

Benzyl 3-(difluoromethyl)[1,4'-bipiperidine]-1'-carboxylate (Racemate)

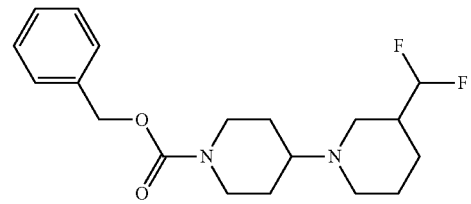 [SMILES: O=C(OCc1ccccc1)N1CCC(N2CCCC(C(F)F)C2)CC1]

1 g (4.29 mmol) of benzyl 4-oxopiperidine-1-carboxylate, 883 mg (5.14 mmol) of 3-(difluoromethyl)piperidine hydrochloride (1:1) and 0.9 ml (5.14 mmol) of N,N-diisopropylethylamine in 15 ml of dichloromethane (a small amount of 4 Å molecular sieve was additionally added to the reaction solution) was stirred at room temperature for 1 h. 1.363 g (6.43 mmol) of sodium acetoxyborohydride were then added and stirring of the reaction mixture was then continued at room temperature overnight. The molecular sieve was then filtered off and washed with dichloromethane and the resulting filtrate was washed twice with sodium bicarbonate solution and once with saturated sodium chloride solution. The organic phase was finally separated off and the organic solution obtained was then filtered through hydrophobic filters (pleated filter MN 616 WA 1/4, D=12.5 cm), dried and concentrated to dryness under reduced pressure. This gave 1.39 g (3.54 mmol, purity 89%, 83% of theory) of the target compound as a clear colourless oil. The target compound was reacted further without further purification.

LC-MS (method 1): $R_t$=1.04 min; m/z=353 (M+H)$^+$.

Analogously to Example 13A, the following compounds of Examples 14A to 17A were prepared from the starting materials stated in each case:

| Example | Name/Structure/Starting materials | Analytical data |
|---|---|---|
| 14A | Benzyl 3-(trifluoromethyl)[1,4'-bipiperidine]-1'-carboxylate (racemate)<br><br>from benzyl 4-oxopiperidine-1-carboxylate and 3-(trifluoromethyl)piperidine | $^1$H-NMR (600 MHz, DMSO-$d_6$, δ/ppm): 1.15-1.24 (m, 1H), 1.24-1.38 (m, 2H), 1.38-1.48 (m, 1H), 1.69 (br. d, 3H), 1.84 (br. d, 1H), 2.06-2.17 (m, 2H), 2.31-2.42 (m, 1H), 2.48-2.58 (m, 1H, partially obscured by DMSO), 2.68-2.88 (m, 3H), 2.92 (br. d, 1H), 4.16 (br. d, 2H), 5.06 (s, 2H), 7.29-7.41 (m, 5H).<br>LC-MS (method 4):<br>$R_t$ = 0.62 min; m/z = 371 (M + H)$^+$. |
| 15A | benzyl 3-(fluoromethyl)[1,4'-bipiperidine]-1'-carboxylate (racemate)<br><br>from benzyl 4-oxopiperidine-1-carboxylate and 3-(fluoromethyl)piperidine hydrochloride (1:1) | $^1$H-NMR (600 MHz, DMSO-$d_6$, δ/ppm): 0.96-1.04 (m, 1H), 1.25-1.35 (m, 2H), 1.37-1.46 (m, 1H), 1.60 (br. d, 2H), 1.68 (br. d, 2H), 1.77-1.89 (m, 1H), 2.00 (t, 1H), 2.13 (t, 1H), 2.39-2.47 (m, 1H), 2.64-2.88 (m, 4H), 4.02 (br. d, 2H), 4.22-4.29 (m, 1H), 4.30-4.37 (m, 1H), 5.05 (s, 2H), 7.29-7.40 (m, 5H).<br>LC-MS (method 1):<br>$R_t$ = 1.02 min; m/z = 355(M + H)$^+$. |
| 16A | benzyl 3-[(3,3-difluorocyclobutyl)methoxy][1,4'-bipiperidine]-1'-carboxylate (racemate)<br><br>from benzyl 4-oxopiperidine-1-carboxylate and 3-[(3,3-difluorocyclobutyl)methoxy]piperidine acetate (1:1) (racemate) | $^1$H-NMR (600 MHz, DMSO-$d_6$, δ/ppm): 1.00-1.12 (m, 1H), 1.25-1.40 (m, 3H), 1.57-1.73 (m, 3H), 1.85-1.92 (m, 1H), 1.96 (t, 1H), 2.08 (t, 1H), 2.22-2.36 (m, 3H), 2.46 (t, 1H), 2.48-2.66 (m, 3H, partially obscured by DMSO), 2.66-2.87 (m, 2H), 2.92 (br. d, 1H), 3.21-3.29 (m, 1H), 3.40-3.50 (m, 2H), 4.03 (br. d, 2H), 5.06 (s, 2H), 7.28-7.40 (m, 5H).<br>LC-MS (method 4):<br>$R_t$ = 0.69 min; m/z = 423 (M + H)$^+$. |
| 17A | benzyl 3-(cyclopropylmethyl)[1,4'-bipiperidine]-1'-carboxylate (racemate)<br><br>from benzyl 4-oxopiperidine-1-carboxylate and 3-(cyclopropylmethyl)piperidine (racemate) | LC-MS (method 4):<br>$R_t$ = 0.68 min; m/z = 357 (M + H)$^+$. |

Example 18A rac-Benzyl 3-(hydroxymethyl)[1,4'-bipiperidine]-1'-carboxylate

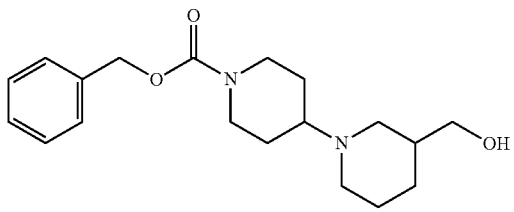 [SMILES: O=C(OCc1ccccc1)N1CCC(N2CCCC(CO)C2)CC1]

Acetic acid (1.8 ml, 32 mmol) was added to a solution of rac-benzyl 4-oxopiperidine-1-carboxylate (5.00 g, 21.4 mmol) and piperidin-3-ylmethanol (4.94 g, 42.9 mmol) in 50 ml of dichloromethane, and the mixture was stirred at room temperature overnight. Sodium triacetoxyborohydride (5.45 g, 25.7 mmol) was then added to the reaction and stirring was continued at room temperature. After 2 h, sat. NaHCO$_3$ solution was added and the reaction mixture was extracted with dichloromethane. The organic phase was washed with water and dried over Na$_2$SO$_4$. The drying agent was filtered off with suction, the filtrate was concentrated and the residue was applied to Isolute®. The mixture was then purified by column chromatography (Biotage® Isolera One; column: Snap Ultra 100 g; DCM/MeOH gradient: 2% MeOH-20% MeOH; flow rate 100 ml/min). The product-containing fractions were combined and concentrated and the residue was dried under high vacuum. This gave 4.37 g (purity 100%, 61% of theory) of the target compound.

LC-MS (method 1): R$_t$=0.92 min; MS (ESIpos): m/z=333 [M+H]$^+$.

Example 19A rac-Benzyl 3-{[(methylsulfonyl)oxy]methyl}[1,4'-bipiperidine]-1'-carboxylate

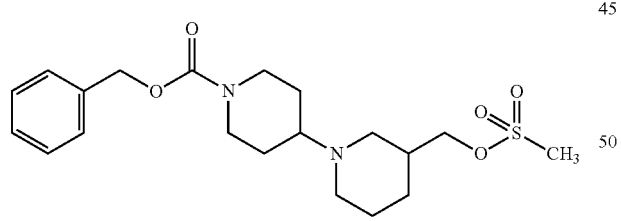

Under argon, rac-benzyl 3-(hydroxymethyl)[1,4'-bipiperidine]-1'-carboxylate (5.42 g, 16.3 mmol) was initially charged in 65 ml of dichloromethane, triethylamine (3.0 ml, 21 mmol) was added and the mixture was cooled to 0° C. At this temperature, methanesulfonyl chloride (1.5 ml, 20 mmol) was added dropwise. The mixture was then stirred at 0° C. for 15 min, after which the ice bath was removed and stirring was continued at room temperature. After 15 min, the reaction mixture was diluted with dichloromethane and washed successively with 1 N hydrochloric acid, sat. NaHCO$_3$ solution and sat. NaCl solution. The organic phase was dried over Na$_2$SO$_4$, filtered and concentrated. The residue was dried under high vacuum and reacted further without further purification. This gave 6.16 g (purity 100%, 92% of theory) of the target compound.

LC-MS (method 12): R$_t$=1.39 min; MS (ESIpos): m/z=411 [M+H]$^+$.

Example 20A rac-Benzyl 3-(methoxymethyl)[1,4'-bipiperidine]-1'-carboxylate

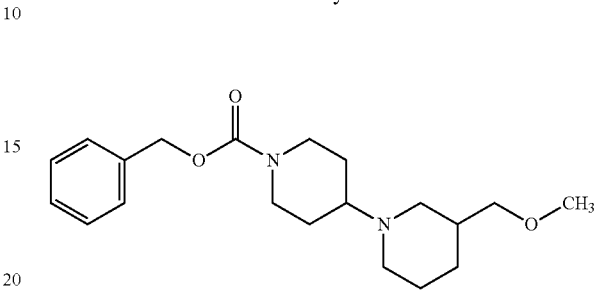

Sodium methoxide solution (840 µl, 25% in methanol, 3.7 mmol) was added to a solution of rac-benzyl 3-{[(methylsulfonyl)oxy]methyl}[1,4'-bipiperidine]-1'-carboxylate (500 mg, 1.22 mmol) in 10 ml of DMF, and the mixture was stirred at 50° C. overnight. The solvent was removed on a rotary evaporator and the residue was taken up in ethyl acetate and washed successively with water and sat. NaCl solution. The organic phase was dried over Na$_2$SO$_4$, filtered and concentrated. The residue was applied to Isolute® and the mixture was purified by column chromatography (Biotage® Isolera One; column: Snap Ultra 25 g; DCM/MeOH gradient: 2% MeOH-20% MeOH; flow rate 75 ml/min). The product-containing fractions were combined and concentrated and the residue was dried under high vacuum. This gave 146 mg (purity 100%, 35% of theory) of the target compound.

LC-MS (method 4): R$_t$=0.59 min; MS (ESIpos): m/z=347 [M+H]$^+$.

Example 21A diamix-Benzyl (3R)-3'-fluoro-3-methyl[1,4'-bipiperidine]-1'-carboxylate

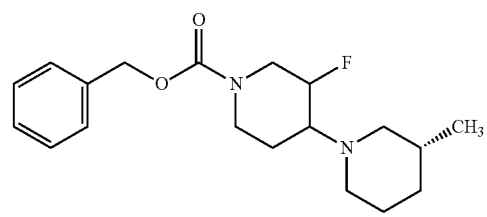 [SMILES: C[C@@H]1CCCN(C2CCN(C(=O)OCc3ccccc3)CC2F)C1]

Acetic acid (1.71 ml, 29.85 mmol) was added to a solution of rac-benzyl 3-fluoro-4-oxopiperidine-1-carboxylate (5 g, 19.9 mmol) and (3R)-3-methylpiperidine (5.4 g, 39.8 mmol) in 200 ml of dichloromethane, and the mixture was stirred at room temperature for 4 h. Subsequently, sodium triacetoxyborohydride (5.06 g, 23.88 mmol) was added and the mixture was stirred at room temperature overnight. The reaction mixture was diluted with dichloromethane and washed successively with sat. NaHCO$_3$ solution, water and sat. NaCl solution. The organic phase was dried over Na₂SO₄, filtered and concentrated on a rotary evaporator. The residue was applied to Isolute® and purified by column chromatography (Biotage® Isolera One; column: Snap Ultra 100 g; DCM/MeOH gradient: 2% MeOH-20% MeOH; flow rate 100 ml/min). The product-containing fractions were combined and concentrated and the residue was dried under high vacuum. This gave 5.13 g (purity 55%, 42% of theory) of the target compound.

LC-MS (method 1): $R_t$=1.05 min; MS (ESIpos): m/z=335 [M+H]⁺.

Example 22A diamix-tert-Butyl (3R)-3'-fluoro-3-methyl[1,4'-bipiperidine]-1'-carboxylate

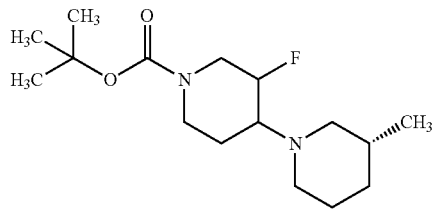 [SMILES: C[C@@H]1CCCN(C2CCN(C(=O)OC(C)(C)C)CC2F)C1]

(3R)-3-Methylpiperidine hydrochloride (6.24 g, 46.0 mmol) was initially charged in 250 ml of 1,2-dichloroethane. N,N-Diisopropylethylamine (8.0 ml, 46 mmol) was added and the mixture was stirred at room temperature for 5 min. rac-tert-Butyl 3-fluoro-4-oxopiperidine-1-carboxylate (5.00 g, 23.0 mmol) and acetic acid (2.0 ml, 35 mmol) were added and the mixture was stirred at room temperature for 4 h. Subsequently, sodium triacetoxyborohydride (5.85 g, 27.6 mmol) was added and the reaction mixture was then stirred at room temperature overnight. The reaction mixture was diluted with dichloromethane and washed successively with sat. NaHCO₃ solution, water and sat. NaCl solution. The organic phase was dried over Na₂SO₄, filtered and concentrated. The residue was purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated on a rotary evaporator, and the residue was dried under high vacuum. This gave 5.30 g (purity 100%, 77% of theory) of the target compound.

LC-MS (method 4): $R_t$=0.52 min; MS (ESIpos): m/z=301 [M+H]⁺.

Example 23A rac-Benzyl 3-[(2,2,2-trifluoroethoxy)methyl][1,4'-bipiperidine]-1'-carboxylate

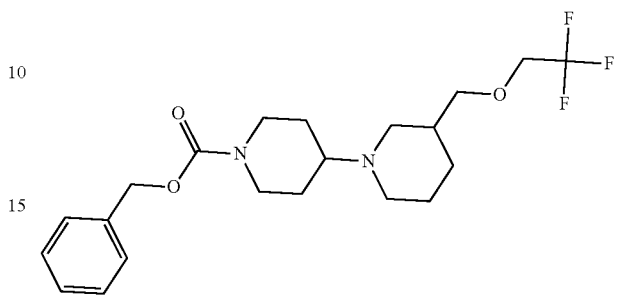

Under argon, 2,2,2-trifluoroethanol (66 µl, 910 µmol) was initially charged in 5 ml of DMF, and the mixture was cooled in an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. After 6 h, water was added and the reaction mixture was extracted with ethyl acetate. The organic phase was washed with water and sat. NaCl solution, dried over Na₂SO₄, filtered and concentrated. The residue was dried under high vacuum. This gave 218 mg (purity 81%, 70% of theory) of the target compound.

LC-MS (method 1): $R_t$=1.33 min; MS (ESIpos): m/z=415 [M+H]⁺.

Example 24A rac-Benzyl 3-({[1-(fluoromethyl)cyclopropyl]methoxy}methyl)[1,4'-bipiperidine]-1'-carboxylate

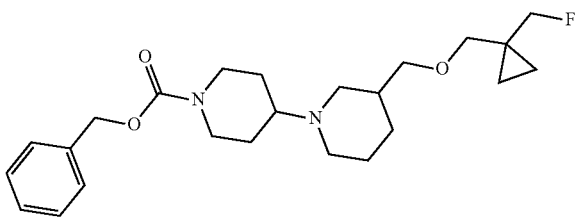 [SMILES: O=C(OCc1ccccc1)N1CCC(N2CCCC(COCC3(CF)CC3)C2)CC1]

Under argon, [1-(fluoromethyl)cyclopropyl]methanol (95.1 mg, 913 µmol) was initially charged in 5 ml of DMF, and the mixture was cooled with an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. overnight. Water was then added, and the reaction mixture was extracted with ethyl acetate. The organic phase was washed with water and sat. NaCl solution, dried over Na₂SO₄, filtered and concentrated. The residue was dried under high vacuum. This gave 204 mg (purity 40%, 32% of theory) of the target compound.

LC-MS (method 1): $R_t$=1.36 min; MS (ESIpos): m/z=419 [M+H]$^+$.

Example 25A rac-Benzyl 3-({[1-(difluoromethyl)cyclopropyl]methoxy}methyl)[1,4'-bipiperidine]-1'-carboxylate

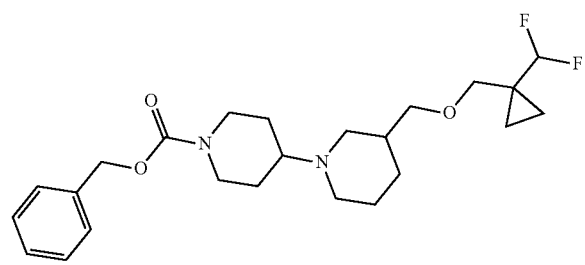 [SMILES: O=C(OCc1ccccc1)N1CCC(N2CCCC(COCC3(C(F)F)CC3)C2)CC1]

Under argon, [1-(difluoromethyl)cyclopropyl]methanol (112 mg, 913 µmol) was initially charged in 5 ml of DMF, and the mixture was cooled in an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. After 6 h, water was added and the reaction mixture was extracted with ethyl acetate. The organic phase was washed with water and sat. NaCl solution, dried over Na$_2$SO$_4$, filtered and concentrated. The residue was dried under high vacuum. This gave 197 mg (purity 51%, 37% of theory) of the target compound.

LC-MS (method 1): $R_t$=1.41 min; MS (ESIpos): m/z=437 [M+H]$^+$.

Example 26A rac-Benzyl 3-({[1-(trifluoromethyl)cyclopropyl]methoxy}methyl)[1,4'-bipiperidine]-1'-carboxylate

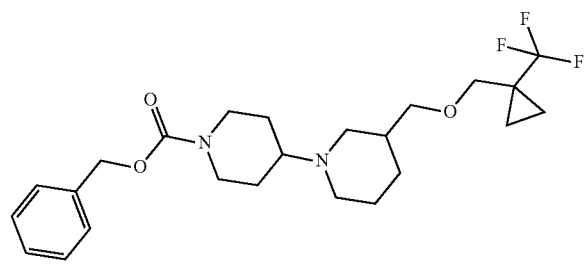 [SMILES: O=C(OCc1ccccc1)N1CCC(N2CCCC(COCC3(C(F)(F)F)CC3)C2)CC1]

Under argon, [1-(trifluoromethyl)cyclopropyl]methanol (128 mg, 913 µmol) was initially charged in 5 ml of DMF, and the mixture was cooled with an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. After 6 h, water was added and the reaction mixture was extracted with ethyl acetate. The organic phase was washed with water and sat. NaCl solution, dried over Na$_2$SO$_4$, filtered and concentrated. The residue was dried under high vacuum. This gave 212 mg (purity 58%, 44% of theory) of the target compound.

LC-MS (method 1): $R_t$=1.48 min; MS (ESIpos): m/z=455 [M+H]$^+$.

Example 27A

Benzyl 3,3-dimethyl[1,4'-bipiperidine]-1'-carboxylate

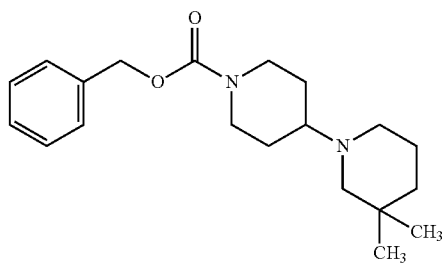 [SMILES: CC1(C)CCCN(C2CCN(C(=O)OCc3ccccc3)CC2)C1]

Acetic acid (74 µl, 1.3 mmol) was added to a solution of benzyl 4-oxopiperidine-1-carboxylate (200 mg, purity 58%, 857 µmol) and 3,3-dimethylpiperidine (240 µl, 1.7 mmol) in 7 ml of dichloromethane, and the mixture was stirred at room temperature for 5 h. Subsequently, sodium triacetoxyborohydride (218 mg, 1.03 mmol) was added to the reaction and the mixture was stirred at room temperature overnight. Sat. NaHCO$_3$ solution was added and the reaction mixture was extracted with dichloromethane. The organic phase was washed with water and sat. NaCl solution and dried over Na$_2$SO$_4$. The drying agent was filtered off, the filtrate was concentrated and the residue was dried under high vacuum. This gave 280 mg (purity 81%, 80% of theory) of the target compound.

LC-MS (method 1): $R_t$=1.18 min; MS (ESIpos): m/z=331 [M+H]$^+$.

Example 28A

Benzyl 4-(5-azaspiro[2.5]octan-5-yl)piperidine-1-carboxylate

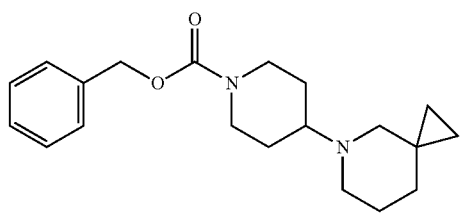 [SMILES: O=C(OCc1ccccc1)N1CCC(N2CCCC3(CC3)C2)CC1]

Acetic acid (110 µl, 1.9 mmol) was added to a solution of benzyl 4-oxopiperidine-1-carboxylate (300 mg, 1.29 mmol) and 5-azaspiro[2.5]octane (286 mg, 2.57 mmol) in 10 ml of dichloromethane, and the mixture was stirred at room temperature for 5 h. Subsequently, sodium triacetoxyborohydride (327 mg, 1.54 mmol) was added to the reaction and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off, the filtrate was concentrated and the residue was dried under high vacuum. This gave 368 mg (purity 40%, 35% of theory) of the target compound.

LC-MS (method 1): R$_t$=1.12 min; MS (ESIpos): m/z=329 [M+H]$^+$.

Example 29A rac-Benzyl 4-(1,1-difluoro-5-azaspiro[2.5]octan-5-yl)piperidine-1-carboxylate

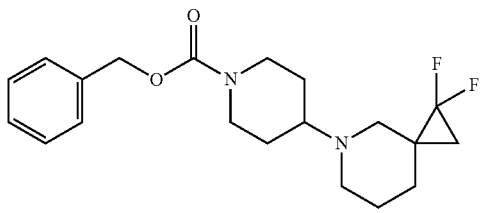 [SMILES: O=C(OCc1ccccc1)N1CCC(N2CCCC3(C2)CC3(F)F)CC1]

Acetic acid (110 µl, 1.9 mmol) was added to a solution of benzyl 4-oxopiperidine-1-carboxylate (300 mg, 1.29 mmol) and rac-1,1-difluoro-5-azaspiro[2.5]octane hydrochloride (354 mg, 1.93 mmol) in 10 ml of dichloromethane, and the mixture was stirred at room temperature for 4 h. Subsequently, sodium triacetoxyborohydride (327 mg, 1.54 mmol) was added to the reaction and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off, the filtrate was concentrated on a rotary evaporator and the residue was dried under high vacuum. This gave 405 mg (purity 61%, 53% of theory) of the target compound.

LC-MS (method 1): R$_t$=1.14 min; MS (ESIpos): m/z=365 [M+H]$^+$.

Example 30A rac-Benzyl 3-hydroxy[1,4'-bipiperidine]-1'-carboxylate

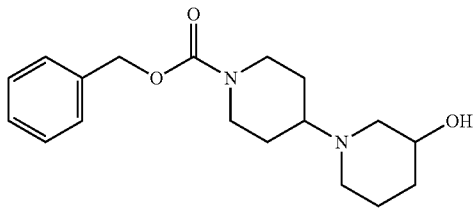 [SMILES: O=C(OCc1ccccc1)N1CCC(N2CCCC(O)C2)CC1]

Triethylamine (1.8 ml, 13 mmol) and acetic acid (740 µl, 13 mmol) were added to a solution of benzyl 4-oxopiperidine-1-carboxylate (2.00 g, 8.57 mmol) and piperidin-3-ol (1.73 g, 17.1 mmol) in 100 ml of dichloromethane, and the mixture was stirred at room temperature for 4 h. Subsequently, sodium triacetoxyborohydride (2.18 g, 10.3 mmol) was added to the reaction and the mixture was stirred at room temperature for 48 h. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was applied to Isolute® and the mixture was purified by column chromatography (Biotage® Isolera One; column: Snap Ultra 50 g; DCM/MeOH gradient: 2% MeOH-20% MeOH; flow rate 100 ml/min). The product-containing fractions were combined and concentrated and the residue was dried under high vacuum. This gave 1.87 g (purity 100%, 68% of theory) of the target compound.

LC-MS (method 1): R$_t$=0.88 min; MS (ESIpos): m/z=319 [M+H]$^+$.

Example 31A rac-Benzyl 3-(cyclopropylmethoxy)[1,4'-bipiperidine]-1'-carboxylate

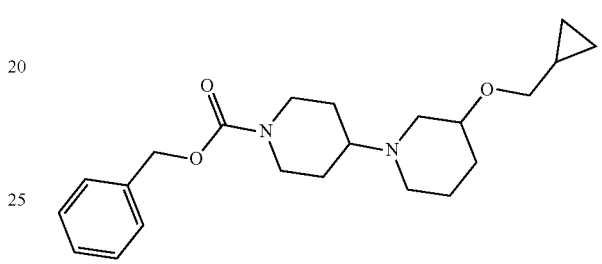

Under argon, rac-benzyl 3-hydroxy[1,4'-bipiperidine]-1'-carboxylate (250 mg, 785 µmol) was initially charged in 5 ml of THF, and the mixture was cooled with an ice bath to 0° C. At this temperature, sodium hydride (47.1 mg, purity 60%, 1.18 mmol) was added and the mixture was stirred at room temperature for 30 min. Subsequently, (bromomethyl)cyclopropane (110 µl, 1.2 mmol) was added and the reaction mixture was stirred at 60° C. overnight. (Bromomethyl)cyclopropane (110 µl, 1.2 mmol) and sodium hydride (47.1 mg, purity 60%, 1.18 mmol) were added and the mixture was stirred at 60° C. for a further 24 h. Subsequently, the product was isolated by preparative HPLC (column: Chromatorex C18 10 µm, 250×30 mm, mobile phase A=water, B=acetonitrile; gradient: 0.0 min 5% B; 3 min 5% B; 20 min 50% B; 23 min 100% B; 26 min 5% B; flow rate: 50 ml/min; 0.1% formic acid). The product-containing fractions were combined and concentrated on a rotary evaporator, and the residue was dried under high vacuum. This gave 68.0 mg (purity 68%, 16% of theory) of the target compound.

LC-MS (method 1): R$_t$=1.25 min; MS (ESIpos): m/z=373 [M+H]$^+$.

Example 32A rac-Benzyl 3-[(cyclobutyloxy)methyl][1,4'-bipiperidine]-1'-carboxylate

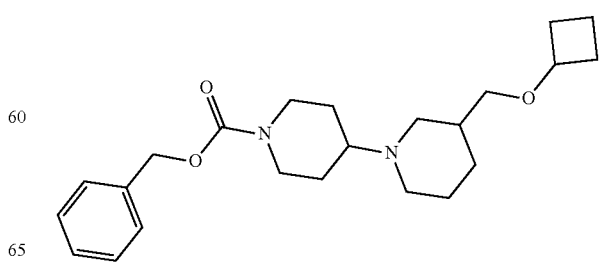

Under argon, cyclobutanol (72 µl, 910 µmol) was initially charged in 5 ml of DMF, and the mixture was cooled with an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. overnight. Water was then added, and the reaction mixture was extracted with ethyl acetate. The organic phase was washed with water and sat. NaCl solution, dried over $Na_2SO_4$, filtered and concentrated on a rotary evaporator. The residue was dried under high vacuum. This gave 290 mg (purity 46%, 57% of theory) of the target compound.

LC-MS (method 4): $R_t$=0.73 min; MS (ESIpos): m/z=387 $[M+H]^+$.

Example 33A rac-Benzyl 3-[(cyclopropylmethoxy)methyl][1,4'-bipiperidine]-1'-carboxylate

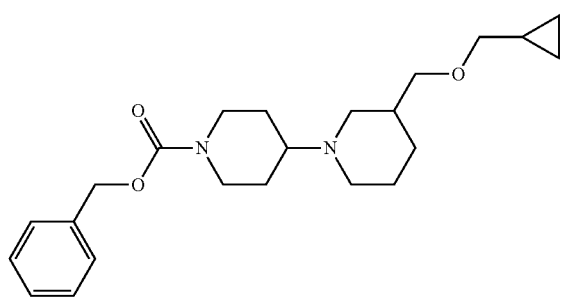 [SMILES: O=C(OCc1ccccc1)N1CCC(N2CCCC(COCC3CC3)C2)CC1]

Under argon, sodium hydride (268 mg, purity 60%, 6.70 mmol) was initially charged in 25 ml of DMF, and the mixture was cooled with an ice bath to 0° C. At this temperature, cyclopropylmethanol (540 µl, 6.7 mmol) was added and the mixture was stirred at room temperature for 30 min. Subsequently, rac-benzyl 3-{[(methylsulfonyl)oxy]methyl}[1,4'-bipiperidine]-1'-carboxylate (2.50 g, 6.09 mmol) was added and the reaction mixture was stirred at 55° C. overnight. Cyclopropylmethanol (540 µl, 6.7 mmol) and sodium hydride (268 mg, purity 60%, 6.70 mmol) were added and the mixture was stirred at 55° C. for a further 24 h. Water was then added, and the reaction mixture was extracted with ethyl acetate. The organic phase was washed with water and sat. NaCl solution, dried over $Na_2SO_4$, filtered and concentrated on a rotary evaporator. The residue was purified by preparative HPLC (instrument: Waters Prep LC/MS System, column: Phenomenex Kinetex C18 5 µm 100×30 mm; mobile phase A: water, mobile phase B: acetonitrile, mobile phase C: 2% strength formic acid in water, mobile phase D: acetonitrile/water (80% by volume/20% by volume); total flow rate: 80 ml/min; room temperature, wavelength 200-400 nm, complete injection; gradient profile: mobile phase A 0 to 2 min 63 ml, mobile phase B 0 to 2 min 7 ml, mobile phase A 2 to 10 min from 63 ml to 39 ml and mobile phase B from 7 ml to 31 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 241 mg (purity 78%, 8% of theory) of the target compound.

LC-MS (method 1): $R_t$=1.27 min; MS (ESIpos): m/z=387 $[M+H]^+$.

Example 34A tert-Butyl 4-[(3R)-3-methylpiperidin-1-yl]azepane-1-carboxylate

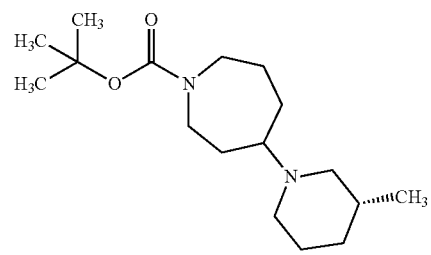 [SMILES: C[C@@H]1CCCN(C2CCCN(C(=O)OC(C)(C)C)CC2)C1]

Acetic acid (72 µl, 1.3 mmol) was added to a solution of tert-butyl 4-oxoazepane-1-carboxylate (179 mg, 840 µmol) and (3R)-3-methylpiperidine (167 mg, 1.68 mmol) in 5 ml of dichloromethane, and the mixture was stirred at room temperature. After 5 h, sodium triacetoxyborohydride (214 mg, 1.01 mmol) was added to the reaction and the mixture was stirred at room temperature overnight. Subsequently, sat. $NaHCO_3$ solution was added and the reaction mixture was extracted with dichloromethane. The organic phase was washed with water and dried over $Na_2SO_4$. The drying agent was filtered off with suction, the filtrate was concentrated on a rotary evaporator and the residue was dried under high vacuum. This gave 215 mg of a mixture which was reacted further without further purification and analysis.

Example 35A diamix-Benzyl 3-({[-2,2-difluorocyclopropyl]methoxy}methyl)[1,4'-bipiperidine]-1'-carboxylate

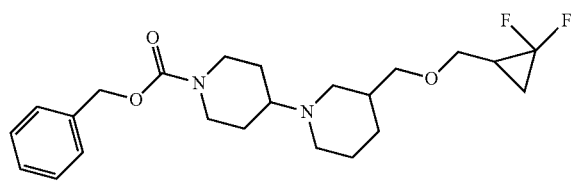 [SMILES: O=C(OCc1ccccc1)N1CCC(N2CCCC(COCC3CC3(F)F)C2)CC1]

Under argon, rac-(2,2-difluorocyclopropyl)methanol (98.7 mg, 913 µmol) was initially charged in 5 ml of DMF, and the mixture was cooled with an ice bath to 0° C. At this temperature, sodium hydride (36.5 mg, purity 60%, 913 µmol) was added and the mixture was stirred at room temperature for 30 min. Subsequently, rac-benzyl 3-{[(methylsulfonyl)oxy]methyl}[1,4'-bipiperidine]-1'-carboxylate (250 mg, 609 µmol) was added and the reaction mixture was stirred at 60° C. overnight. Water was added and the reaction mixture was extracted with ethyl acetate. The organic phase was washed with water and sat. NaCl solution, dried over $Na_2SO_4$, filtered and concentrated on a rotary evaporator. The residue was dried under high vacuum. This gave 343 mg (purity 56%, 74% of theory) of the target compound.

LC-MS (method 1): $R_t$=1.32 min; MS (ESIpos): m/z=423 [M+H]$^+$.

Example 36A rac-Benzyl 3-{[(3,3-difluorocyclobutyl)methoxy]methyl}[1,4'-bipiperidine]-1'-carboxylate

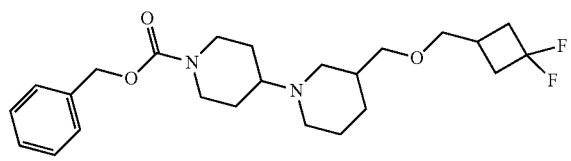 [SMILES: O=C(OCc1ccccc1)N1CCC(N2CCCC(COCC3CC(F)(F)C3)C2)CC1]

Under argon, (3,3-difluorocyclobutyl)methanol (112 mg, 913 µmol) was initially charged in 5 ml of DMF, and the mixture was cooled with an ice bath to 0° C. At this temperature, sodium hydride (36.5 mg, purity 60%, 913 µmol) was added and the mixture was stirred at room temperature for 30 min. Subsequently, rac-benzyl 3-[(methyl sulfonyl)oxy]methyl[1,4'-bipiperidine]-1'-carboxylate (250 mg, 609 µmol) was added and the reaction mixture was stirred at 60° C. After 6 h, water was added and the reaction mixture was extracted with ethyl acetate. The organic phase was washed with water and sat. NaCl solution, dried over $Na_2SO_4$, filtered and concentrated on a rotary evaporator. The residue was dried under high vacuum. This gave 287 mg (purity 33%, 36% of theory) of the target compound.

LC-MS (method 1): $R_t$=1.44 min; MS (ESIpos): m/z=437 [M+H]$^+$.

Example 37A 3-(Difluoromethyl)-1,4'-bipiperidine dihydrochloride (Racemate)

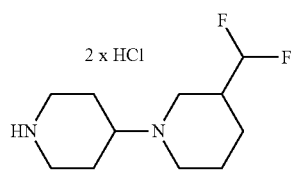 [SMILES: FC(F)C1CCCN(C2CCNCC2)C1]

1.35 g (3.83 mmol) of benzyl 3-(difluoromethyl)[1,4'-bipiperidine]-1'-carboxylate (racemate) were dissolved in 100 ml of ethanol and hydrogenated using an H-Cube (ThalesNano H-Cube Pro™-1.7).
Reaction Conditions:
catalyst: Pd/C 10%; solvent: ethanol; cartridge pressure: 1 bar of hydrogen; flow rate: 1 ml/min; temperature: 50° C.

After complete conversion, 4 N HCl (in dioxane) was added and the reaction mixture was concentrated to dryness. The residue obtained was dried under reduced pressure at room temperature overnight. This gave 1,107 g (3.80 mmol, 99% of theory) of the target compound as a white solid. The target compound was reacted further without further purification.

GC-MS (method 3): $R_t$=4.87 min; m/z=218 (M–2HCl)$^+$.

Example 38A

3-[(3,3-Difluorocyclobutyl)methoxy]-1,4'-bipiperidine (Racemate)

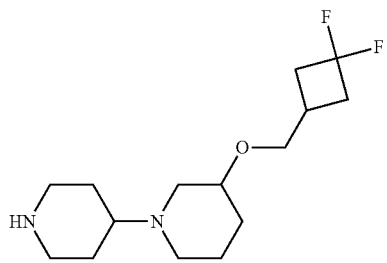 [SMILES: FC1(F)CC(COC2CCCN(C3CCNCC3)C2)C1]

2.7 g (6.39 mmol) of benzyl 3-[(3,3-difluorocyclobutyl)methoxy][1,4'-bipiperidine]-1'-carboxylate (racemate) were dissolved in 90 ml of ethanol and hydrogenated using an H-Cube (ThalesNano H-Cube Pro™-1.7).

Reaction Conditions:
catalyst: Pd/C 10%; solvent: ethanol; cartridge pressure: 50 bar of hydrogen; flow rate: 1 ml/min; temperature: 50° C.

After the reaction had gone to completion, the reaction mixture was concentrated to dryness. The residue obtained was dried under reduced pressure at room temperature overnight. This gave 1.27 g (4.40 mmol, 69% of theory) of the target compound as a yellow oil. The target compound was reacted further without further purification.

GC-MS (method 3): $R_t$=6.42 min; m/z=288 (M)$^+$.

Analogously to Examples 37A and 38A, the following compounds of Examples 39A to 41A were prepared from the starting materials stated in each case:

| Example | Name/Structure/Starting materials | Analytical data |
|---|---|---|
| 39A | 3-(trifluoromethyl)-1,4'-bipiperidine dihydrochloride (racemate)<br><br>from benzyl 3-(trifluoromethyl)[1,4'-bipiperidine]-1'-carboxylate (racemate) | GC-MS (method 3): $R_t$ = 4.33 min; m/z = 236 (M – 2HCl)$^+$. |
| 40A | 3-(trifluoromethyl)-1,4'-bipiperidine dihydrochloride (racemate)<br><br>from benzyl 3-(fluoromethyl)[1,4'-bipiperidine-]-1'-carboxylate (racemate) | GC-MS (method 3): $R_t$ = 5.07 min; m/z = 200 (M – 2HCl)$^+$. |

| Example | Name/Structure/Starting materials | Analytical data |
|---|---|---|
| 41A | 3-(cyclopropylmethyl)-1,4'-bipiperidine (racemate)<br>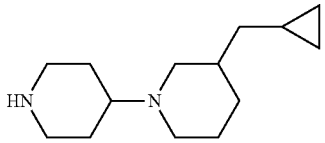 [SMILES: C1CC(CC2CC2)CN(C2CCNCC2)C1]<br>from benzyl 3-(cyclopropylmethyl)[1,4'-bipiperidine-]-1'-carboxylate (racemate) | GC-MS (method 3): $R_t$ = 5.81 min; m/z = 222 (M)$^+$. |

Example 42A rac-3-(Methoxymethyl)-1,4'-bipiperidine dihydrochloride

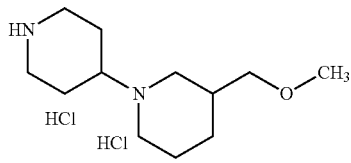

rac-Benzyl 3-(methoxymethyl)[1,4'-bipiperidine]-1'-carboxylate (145 mg, 419 µmol) was initially charged in 5 ml of THF, and palladium (50.0 mg; 10% on activated carbon) was added under argon. The mixture was then hydrogenated under a hydrogen atmosphere overnight. The catalyst was filtered off through kieselguhr and washed with THF. Hydrochloric acid in diethyl ether (310 µl, 2.0 M, 630 µmol) was added to the filtrate, and the precipitated solid was filtered off with suction, washed with diethyl ether and dried under high vacuum. This gave 92.0 mg (purity 76%, 59% of theory) of the target compound.

GC-MS (method 3): $R_t$=5.45 min; MS (ESIpos): m/z=212 [M−HCl]$^+$.

Example 43A diamix-(3R)-3'-Fluoro-3-methyl-1,4'-bipiperidine dihydrochloride

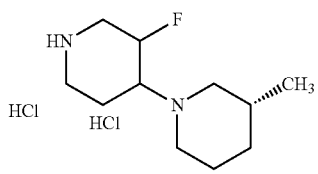

Synthesis Method 1:

diamix-Benzyl (3R)-3'-fluoro-3-methyl[1,4'-bipiperidine]-1'-carboxylate (5.13 g, purity 55%, 8.40 mmol) was initially charged in 250 ml of THF, and palladium (382 mg; 10% on activated carbon) was added under argon. The mixture was then hydrogenated under a hydrogen atmosphere overnight. The catalyst was filtered off through kieselguhr and washed with THF. Hydrochloric acid in diethyl ether (6.3 ml, 2.0 M, 13 mmol) was added to the filtrate and the mixture was concentrated on a rotary evaporator. The residue was stirred with dichloromethane, and the solid was filtered off with suction, washed with dichloromethane and dried under high vacuum. This gave 2.31 g (100% of theory) of the target compound.

LC-MS (method 4): MS (ESIpos): m/z=200 [M−2HCl]$^+$.

Synthesis Method 2:

4 M Hydrochloric acid in 1,4-dioxane (22 ml, 4.0 M, 88 mmol) was added to a solution of diamix-tert-butyl (3R)-3'-fluoro-3-methyl[1,4'-bipiperidine]-1'-carboxylate (5.30 g, 17.6 mmol) in 250 ml of dichloromethane, and the mixture was stirred at room temperature for 48 h. The precipitated solid was filtered off with suction, washed with dichloromethane and dried in a vacuum drying cabinet at 40° C. overnight. This gave 3.47 g (purity 100%, 72% of theory) of the target compound.

GC-MS (method 3): MS (ESIpos): m/z=200 [M−2HCl]$^+$.

Example 44A rac-3-[(2,2,2-Trifluoroethoxy)methyl]-1,4'-bipiperidine dihydrochloride

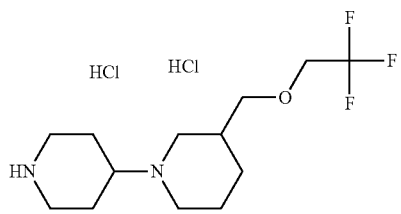 [SMILES: FC(F)(F)COCC1CCCN(C2CCNCC2)C1 ; Cl ; Cl]

rac-Benzyl 3-[(2,2,2-trifluoroethoxy)methyl][1,4'-bipiperidine]-1'-carboxylate (218 mg, purity 81%, 526 µmol) was initially charged in 12 ml of THF, and palladium (63 mg; 10% on activated carbon) was added under argon. The mixture was then hydrogenated under a hydrogen atmosphere. After 3.5 h the catalyst was filtered off through kieselguhr and washed with THF. Hydrochloric acid in diethyl ether (390 µl, 2.0 M, 790 µmol) was added to the filtrate and the mixture was concentrated on a rotary evaporator. This gave 164 mg (purity 74%, 66% of theory) of the target compound.

GC-MS (method 3): $R_t$=5.26 min; MS (full ms): m/z=280 [M−2HCl]$^+$.

Example 45A rac-3-({[1-(Fluoromethyl)cyclopropyl]methoxy}methyl)-1,4'-bipiperidine dihydrochloride

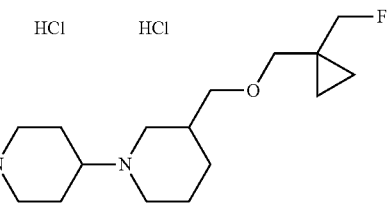

rac-Benzyl 3-({[1-(fluoromethyl)cyclopropyl]methoxy}methyl)[1,4'-bipiperidine]-1'-carboxylate (204 mg, purity 40%, 487 µmol) was initially charged in 10 ml of THF, and palladium (58 mg; 10% on activated carbon) was added under argon. The mixture was then hydrogenated under a hydrogen atmosphere. After 2 h the catalyst was filtered off through kieselguhr and washed with THF. Hydrochloric acid in diethyl ether (370 µl, 2.0 M, 740 µmol) was added to the filtrate and the mixture was concentrated on a rotary evaporator. This gave 133 mg of a mixture which was reacted without further purification and analysis.

Example 46A rac-3-({[1-(Difluoromethyl)cyclopropyl]methoxy}methyl)-1,4'-bipiperidine dihydrochloride

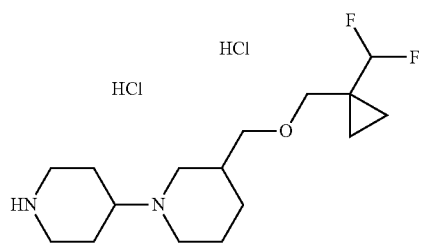 [SMILES: FC(F)C1(COCC2CCCN(C3CCNCC3)C2)CC1 ; Cl ; Cl]

rac-Benzyl 3-({[1-(difluoromethyl)cyclopropyl]methoxy}methyl)[1,4'-bipiperidine]-1'-carboxylate (197 mg, purity 51%, 451 µmol) was initially charged in 10 ml of THF, and palladium (54 mg; 10% on activated carbon) was added under argon. The mixture was then hydrogenated under a hydrogen atmosphere. After 1.5 h the catalyst was filtered off through kieselguhr and washed with THF. Hydrochloric acid in diethyl ether (374 µl, 2.0 M, 680 µmol) was added to the filtrate and the mixture was concentrated on a rotary evaporator. This gave 112 mg of a mixture which was reacted without further purification and analysis.

Example 47A rac-3-({[1-(Trifluoromethyl)cyclopropyl]methoxy}methyl)-1,4'-bipiperidine dihydrochloride

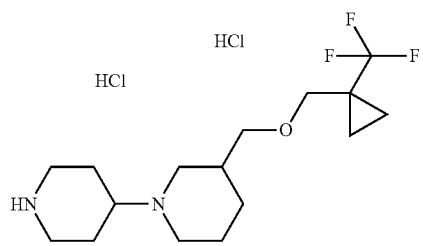 [SMILES: FC(F)(F)C1(COCC2CCCN(C3CCNCC3)C2)CC1 ; Cl ; Cl]

rac-Benzyl 3-({[1-(trifluoromethyl)cyclopropyl]methoxy}methyl)[1,4'-bipiperidine]-1'-carboxylate (212 mg, purity 58%, 466 µmol) was initially charged in 10 ml of THF, and palladium (56 mg; 10% on activated carbon) was added under argon. The mixture was then hydrogenated under a hydrogen atmosphere. After 1.5 h the catalyst was filtered off through kieselguhr and washed with THF. Hydrochloric acid in diethyl ether (350 µl, 2.0 M, 700 µmol) was added to the filtrate and the mixture was concentrated on a rotary evaporator. This gave 129 mg of a mixture which was reacted further without further purification and analysis.

Example 48A 3,3-Dimethyl-1,4'-bipiperidine dihydrochloride

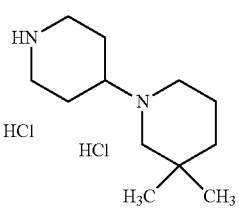

Benzyl 3,3-dimethyl[1,4'-bipiperidine]-1'-carboxylate (260 mg, purity 81%, 637 µmol) was initially charged in 18 ml of THF, and palladium (27 mg; 10% on activated carbon, 255 µmol) was added under argon. The mixture was then hydrogenated under a hydrogen atmosphere overnight. The catalyst was filtered off through kieselguhr and washed with THF. Hydrochloric acid in diethyl ether (478 µL 2.0 M, 956 µmol) was added to the filtrate and the mixture was concentrated on a rotary evaporator. The residue was stirred with dichloromethane, concentrated and dried under high vacuum. This gave 180 mg of a mixture which was reacted further without further purification and analysis.

Example 49A 5-(Piperidin-4-yl)-5-azaspiro[2.5]octane dihydrochloride

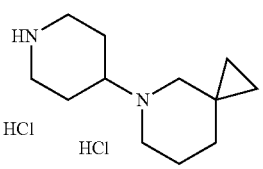 [SMILES: Cl ; C1CN(C2CCNCC2)CC2(C1)CC2 ; Cl]

Benzyl 4-(5-azaspiro[2.5]octan-5-yl)piperidine-1-carboxylate (368 mg, purity 40%, 1.12 mmol) was initially charged in 32 ml of THF, and palladium (51 mg, 10% on activated carbon) was added under argon. The mixture was then hydrogenated under a hydrogen atmosphere overnight. The catalyst was filtered off through kieselguhr and washed with THF. Hydrochloric acid in diethyl ether (840 µL 2.0 M, 1.7 mmol) was added to the filtrate and the mixture was concentrated on a rotary evaporator. The residue was stirred with dichloromethane. The precipitated solid was filtered off with suction, washed with dichloromethane and dried under high vacuum. This gave 185 mg of a mixture which was reacted further without further purification and analysis.

Example 50A rac-1,1-Difluoro-5-(piperidin-4-yl)-5-azaspiro[2.5]octane dihydrochloride

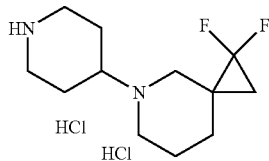

rac-Benzyl 4-(1,1-difluoro-5-azaspiro[2.5]octan-5-yl)piperidine-1-carboxylate (405 mg, purity 61%, 1.11 mmol) was initially charged in 32 ml of THF, and palladium (51 mg, 10% on activated carbon) was added under argon. The mixture was then hydrogenated under a hydrogen atmosphere overnight. The catalyst was filtered off through kieselguhr and washed with THF. Hydrochloric acid in diethyl ether (840 μl, 2.0 M, 1.7 mmol) was added to the filtrate and the mixture was concentrated on a rotary evaporator. The residue was stirred with dichloromethane, concentrated on a rotary evaporator and dried under high vacuum. This gave 280 mg of a mixture which was reacted further without further purification and analysis.

Example 51A rac-3-(Cyclopropylmethoxy)-1,4'-bipiperidine dihydrochloride

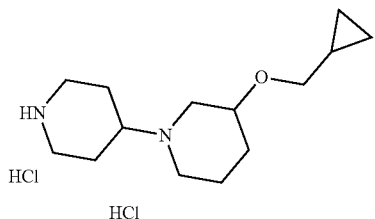 [SMILES: Cl ; C1CC(OCC2CC2)CN(C2CCNCC2)C1 ; Cl]

rac-Benzyl 3-(cyclopropylmethoxy)[1,4'-bipiperidine]-1'-carboxylate (68.0 mg, purity 68%, 124 μmol) was initially charged in 5 ml of THF, and palladium (22 mg; 10% on activated carbon) was added under argon. The mixture was then hydrogenated under a hydrogen atmosphere overnight. The catalyst was filtered off through kieselguhr and washed with THF. Hydrochloric acid in diethyl ether (93 μl, 2.0 M, 186 μmol) was added to the filtrate and the mixture was concentrated on a rotary evaporator. The residue was stirred with dichloromethane, concentrated and dried under high vacuum. This gave 51 mg of a mixture which was reacted further without further purification and analysis.

Example 52A rac-3-[(Cyclobutyloxy)methyl]-1,4'-bipiperidine dihydrochloride

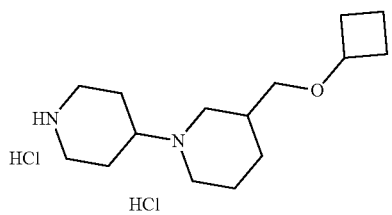 [SMILES: Cl ; C1CC(OCC2CCCN(C3CCNCC3)C2)C1 ; Cl]

rac-Benzyl 3-[(cyclobutyloxy)methyl][1,4'-bipiperidine]-1'-carboxylate (290 mg, purity 46%, 386 μmol) was initially charged in 15 ml of THF, and palladium (41 mg; 10% on activated carbon) was added under argon. The mixture was then hydrogenated under a hydrogen atmosphere overnight. The catalyst was filtered off through kieselguhr and washed with THF. Hydrochloric acid in diethyl ether (259 μl, 2.0 M, 518 μmol) was added to the filtrate and the mixture was concentrated on a rotary evaporator. This gave 225 mg of a mixture which was reacted further without further purification and analysis.

Example 53A rac-3-[(Cyclopropylmethoxy)methyl]-1,4'-bipiperidine dihydrochloride

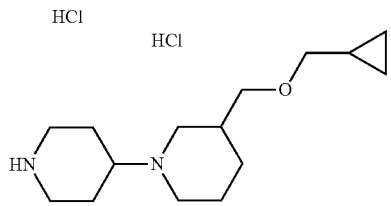 [SMILES: Cl ; C1CC(COCC2CC2)CN(C2CCNCC2)C1 ; Cl]

rac-Benzyl 3-[(cyclopropylmethoxy)methyl][1,4'-bipiperidine]-1'-carboxylate (241 mg, purity 78%, 486 μmol) was initially charged in 20 ml of THF, and palladium (58 mg; 10% on activated carbon) was added under argon. The mixture was then hydrogenated under a hydrogen atmosphere overnight. The catalyst was filtered off through kieselguhr and washed with THF. Hydrochloric acid in diethyl ether (360 μl, 2.0 M, 730 μmol) was added to the filtrate and the mixture was concentrated on a rotary evaporator. This gave 155 mg of a mixture which was reacted further without further purification and analysis.

Example 54A

4-[(3R)-3-Methylpiperidin-1-yl]azepane dihydrochloride

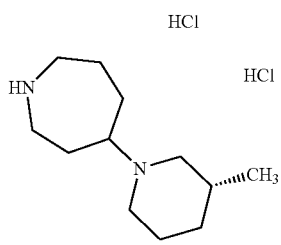

4 M Hydrochloric acid in 1,4-dioxane (2.2 ml, 4.0 M, 8.6 mmol) was added to a solution of tert-butyl 4-[(3R)-3-methylpiperidin-1-yl]azepane-1-carboxylate (215 mg) in 5.4 ml of dichloromethane, and the mixture was stirred at room temperature. After 2 h, the reaction mixture was concentrated on a rotary evaporator and the residue was dried under high vacuum. This gave 237 mg of a mixture which was reacted further without further purification and analysis.

Example 55A diamix-3-[(3-Fluorobutoxy)methyl]-1,4'-bipiperidine dihydrochloride

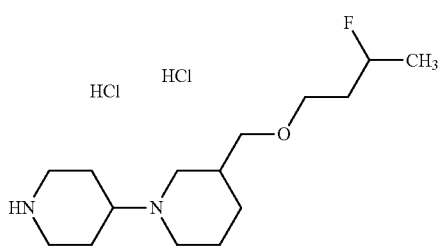 [SMILES: CC(F)CCOCC1CCCN(C2CCNCC2)C1 ; Cl ; Cl]

diamix-Benzyl 3-({[-2,2-difluorocyclopropyl]methoxy}methyl)[1,4'-bipiperidine]-1'-carboxylate (343 mg, purity 56%, 446 µmol) was initially charged in 25 ml of THF, and palladium (53 mg; 10% on activated carbon) was added under argon. The mixture was then hydrogenated under a hydrogen atmosphere overnight. The catalyst was filtered off through kieselguhr and washed with THF. Hydrochloric acid in diethyl ether (330 µl, 2.0 M, 670 µmol) was added to the filtrate and the mixture was concentrated on a rotary evaporator. This gave 218 mg of a mixture which was reacted further without further purification and analysis.

Example 56A rac-3-{[(3,3-Difluorocyclobutyl)methoxy]methyl}-1,4'-bipiperidine dihydrochloride

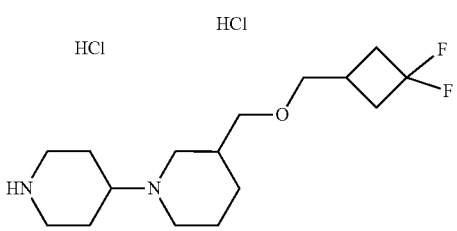 [SMILES: Cl ; FC1(F)CC(COCC2CCCN(C3CCNCC3)C2)C1 ; Cl]

rac-Benzyl 3-{[(3,3-difluorocyclobutyl)methoxy]methyl}[1,4'-bipiperidine]-1'-carboxylate (287 mg, purity 33%, 217 µmol) was initially charged in 15 ml of THF, and palladium (26 mg; 10% on activated carbon) was added under argon. The mixture was then hydrogenated under a hydrogen atmosphere overnight. The catalyst was filtered off through kieselguhr and washed with THF. Hydrochloric acid in diethyl ether (163 µl, 2.0 M, 325 µmol) was added to the filtrate and the mixture was concentrated on a rotary evaporator. This gave 286 mg of a mixture which was reacted further without further purification and analysis.

Example 57A

Methyl 2-[(3R)-3-methyl[1,4'-bipiperidin]-1'-yl]-1,3-thiazole-5-carboxylate

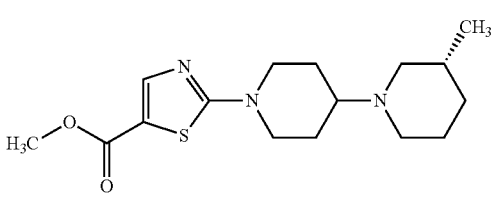

5 g (22.52 mmol) of methyl 2-bromo-1,3-thiazole-5-carboxylate, 4.926 g (22.52 mmol) of 1-(3,5-difluoropyridin-2-yl)methanamine dihydrochloride and 9.4 ml (67.55 mmol) of triethylamine in 30 ml of 2-propanol were heated to boiling point (oil bath temperature ~100° C.) and stirred at this temperature overnight. After cooling of the reaction mixture, the solution was concentrated to dryness using a rotary evaporator. This gave 14.29 g (crude product, purity ~34%) of the target product and the triethylamine salts. The mixture was reacted further without further purification.

LC-MS (method 4): $R_t$=0.51 min; m/z=324 (M+H)$^+$.

Example 58A

2-[(3R)-3-Methyl[1,4'-bipiperidin]-1'-yl]-1,3-thiazole-5-carboxylic acid dihydrochloride

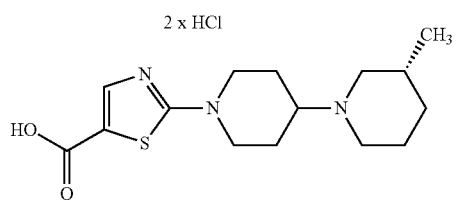 [SMILES: C[C@@H]1CCCN(C2CCN(c3ncc(C(=O)O)s3)CC2)C1]

14.29 g of the mixture of methyl 2-[(3R)-3-methyl[1,4'-bipiperidin]-1'-yl]-1,3-thiazole-5-carboxylate and triethylamine salts were dissolved in water, and 221 ml of a 1 N NaOH solution were added. A brown oil separated off, which was dissolved by addition of 50 ml of THF. The reaction mixture was then heated to 60° C. and stirred at this temperature for one hour. After cooling of the reaction mixture to room temperature, the solution was concentrated to dryness on a rotary evaporator, taken up in water and acidified with concentrated hydrochloric acid. The solution was then once more concentrated to dryness. This gave 20.54 g of a beige solid which was purified by column chromatography.

Conditions: The separation was carried out using 1 g portions. RP column Chromatorex C18, 10 μm; 125×30 mm, acetonitrile/water (+0.05% formic acid) 5/95→gradient over 20 min→acetonitrile/water (+0.05% formic acid) 95/5, flow rate 75 ml/min.

Finally, product-containing fractions were combined and concentrated to dryness under reduced pressure and dried. This gave 4.75 g (12.42 mmol, 83% of theory) of the target compound as a light-beige solid.

LC-MS (method 1): $R_t$=0.54 min; m/z=310 (M+H–2HCl)$^+$.

Example 59A

3-[(3R)-3-Methyl[1,4'-bipiperidin]-1'-yl]-1,2,4-oxadiazole-5-carboxylic acid

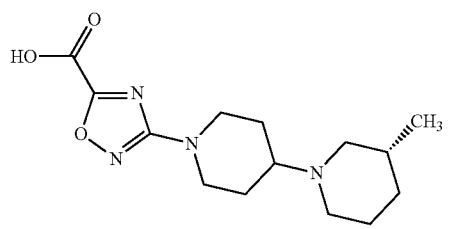 [SMILES: C[C@@H]1CCCN(C2CCN(c3noc(C(=O)O)n3)CC2)C1]

Ethyl 3-bromo-1,2,4-oxadiazole-5-carboxylate (100 mg, 452 μmol) and (3R)-3-methyl-1,4'-bipiperidine dihydrochloride (173 mg, 679 μmol) were stirred in 2 ml of sodium carbonate solution (2.0 ml, 2.0 M, 4.0 mmol) at 120° C. After 30 min, the reaction mixture was acidified with 2 N hydrochloric acid and purified by preparative HPLC (column: Chromatorex C18 10 μm, 250×30 mm, mobile phase A=water, B=acetonitrile; gradient: 0.0 min 5% B; 3 min 5% B; 20 min 50% B; 23 min 100% B; 26 min 5% B; flow rate: 50 ml/min; 0.1% formic acid). The product-containing fractions were combined and concentrated and the residue was dried under high vacuum. This gave 25 mg (purity 60%, 11% of theory) of the target compound.

LC-MS (method 1): $R_t$=0.47 min; MS (ESIpos): m/z=295 [M+H]$^+$.

Example 60A rac-3-[(2,2-Difluorocyclopropyl)methoxy]pyridine hydrochloride

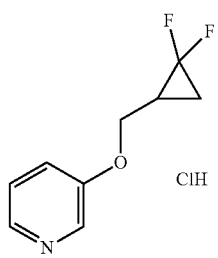 [SMILES: FC1(F)CC1COc1cccnc1 ; Cl]

Triphenylphosphine (2.43 g, 9.25 mmol) was added to a solution of pyridin-3-ol (677 mg, 7.12 mmol) in 25 ml of THF and the mixture was cooled in an ice bath to 0° C. At this temperature, diisopropyl azodicarboxylate (1.3 ml, 9.3 mmol) was added and the mixture was stirred at 0° C. for 5 min. Subsequently, a solution of rac-2,2-difluorocyclopropanemethanol (1.00 g, 9.25 mmol) in 5 ml of THF was added dropwise to the mixture. The ice bath was then removed and the mixture was stirred at room temperature overnight. Water was added and the reaction mixture was extracted with ethyl acetate. The organic phase was washed with sat. NaCl solution, dried over Na$_2$SO$_4$, filtered and concentrated. The oily residue was stirred with 75 ml of cyclohexane for 30 min. The precipitated solid was filtered off and the filtrate was concentrated to afford a residue. The residue was dissolved in 50 ml of MTBE, and 5 ml of hydrochloric acid (4N in 1,4-dioxane) were added. The precipitated solid was filtered off with suction, washed with MTBE and dried under high vacuum. This gave 698 mg (purity 93%, 41% of theory) of the target compound.

LC-MS (method 4): $R_t$=0.40 min; MS (ESIpos): m/z=186 [M–HCl]$^+$.

Example 61A diamix-3-[(2,2-Difluorocyclopropyl)methoxy]piperidine sulfate hydrochloride

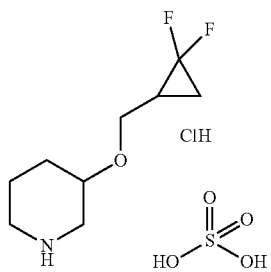 [SMILES: FC1(F)CC1COC1CCCNC1 ; O=S(=O)(O)O ; Cl]

Under argon, rac-3-[(2,2-difluorocyclopropyl)methoxy]pyridine hydrochloride (698 mg, purity 93%, 2.93 mmol) was dissolved in 35 ml of ethanol. Sulfuric acid (168 μL 3.15 mmol) and platinum(IV) oxide (179 mg, 0.79 mmol) were added and the mixture was hydrogenated under a hydrogen atmosphere overnight. The catalyst was filtered off through Celite and washed with ethanol. The filtrate was concentrated by evaporation and the residue was dried in high vacuum. This gave 761 mg (74% of theory) of the target compound.

LC-MS (method 5): MS (ESIpos): m/z=192 [M−HCl−H$_2$SO$_4$]$^+$.

Example 62A 3-(Cyclobutyloxy)pyridine hydrochloride

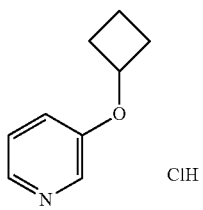 [SMILES: c1cncc(OC2CCC2)c1 ; Cl]

Triphenylphosphine (7.17 g, 27.3 mmol) was added to a solution of pyridin-3-ol (2.00 g, 21.0 mmol) in 70 ml of THF and the mixture was cooled in an ice bath to 0° C. At this temperature, diisopropyl azodicarboxylate (3.9 ml, 27 mmol) was added and the mixture was stirred at 0° C. for 5 min. Subsequently, a solution of cyclobutanol (2.1 ml, 27 mmol) in 10 ml of THF was added dropwise to the mixture. The ice bath was then removed and the mixture was stirred at room temperature over the weekend. Water was added and the reaction mixture was extracted with ethyl acetate. The organic phase was washed with sat. NaCl solution, dried over Na$_2$SO$_4$, filtered and concentrated. The oily residue was stirred with 150 ml of cyclohexane for 30 min. The solid was filtered off and the filtrate was concentrated to afford a residue. The residue was dissolved in 100 ml of MTBE, and 5 ml of hydrochloric acid (4N in 1,4-dioxane) were added. The precipitated solid was filtered off with suction, washed with MTBE and dried under high vacuum. This gave 2.02 g (purity 51%, 26% of theory) of the target compound.

LC-MS (method 5): R$_t$=1.34 min; MS (ESIpos): m/z=150 [M−HCl]$^+$.

Example 63A rac-3-(Cyclobutyloxy)piperidine sulfate hydrochloride

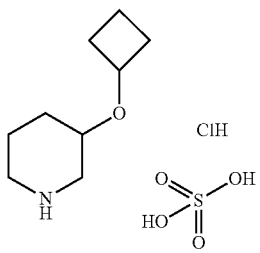 [SMILES: C1CC(OC2CCCNC2)C1 ; O=S(=O)(O)O ; Cl]

Under argon, 3-(cyclobutyloxy)pyridine hydrochloride (2.0 g, purity 51%, 5.51 mmol) was dissolved in 95 ml of ethanol. Sulfuric acid (550 μl, 10 mmol) and platinum(IV) oxide (612 mg, 2.6 mmol) were added and the mixture was hydrogenated under a hydrogen atmosphere overnight. The catalyst was filtered off through Celite and washed with ethanol. The filtrate was concentrated by evaporation and the residue was dried in high vacuum. This gave 2.52 g (157% of theory) of the target compound.

LC/MS (method 4): MS (ESIpos): m/z=156 [M−HCl−H$_2$SO$_4$]$^+$.

Example 64A

3-[(3,3-Difluorocyclobutyl)oxy]pyridine hydrochloride

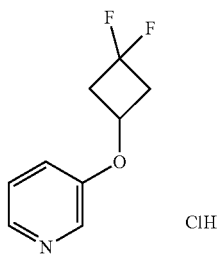 [SMILES: FC1(F)CC(Oc2cccnc2)C1 ; Cl]

Triphenylphosphine (2.43 g, 9.25 mmol) was added to a solution of pyridin-3-ol (677 mg, 7.12 mmol) in 25 ml of THF and the mixture was cooled in an ice bath to 0° C. At this temperature, diisopropyl azodicarboxylate (1.3 ml, 9.3 mmol) was added and the mixture was stirred at 0° C. for 5 min. Subsequently, a solution of 3,3-difluorocyclobutanol (1.00 g, 9.25 mmol) in 5 ml of THF was added dropwise to the mixture. The ice bath was then removed and the mixture was stirred at room temperature overnight. The reaction mixture was stirred at 80° C. for 5 h and then extracted between water and ethyl acetate. The organic phase was washed with sat. NaCl solution, dried over Na$_2$SO$_4$, filtered and concentrated. The oily residue was stirred with 150 ml of cyclohexane for 30 min. The precipitated solid was filtered off and the filtrate was concentrated to afford a residue. The residue was dissolved in 100 ml of MTBE, and 5 ml of hydrochloric acid (4N in 1,4-dioxane) were added. The precipitated solid was filtered off with suction, washed with MTBE and dried under high vacuum. This gave 289 mg (purity 94%, 17% of theory) of the target compound.

LC-MS (method 4): R$_t$=1.01 min; MS (ESIpos): m/z=186 [M−HCl]$^+$.

Example 65A rac-3-[(3,3-Difluorocyclobutyl)oxy]piperidine sulfate hydrochloride

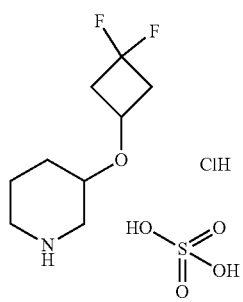 [SMILES: FC1(F)CC(OC2CCCNC2)C1 ; O=S(=O)(O)O ; Cl]

Under argon, 3-[(3,3-difluorocyclobutyl)oxy]pyridine hydrochloride (298 mg, 1.34 mmol) was dissolved in 12 ml of ethanol. Sulfuric acid (72 µl, 1.3 mmol) and platinum(IV) oxide (76.3 mg, 336 µmol) were added and the mixture was hydrogenated under a hydrogen atmosphere for 3 h. The catalyst was filtered off through Celite and washed with ethanol. The filtrate was concentrated by evaporation and the residue was dried in high vacuum. This gave 297 mg (68% of theory) of the target compound.

LC/MS (method 4): MS (ESIpos): m/z=192 [M−HCl−H$_2$SO$_4$]$^+$.

Example 66A

2-Chloro-N-[(3,5-difluoropyridin-2-yl)methyl]-1,3-oxazole-4-carboxamide

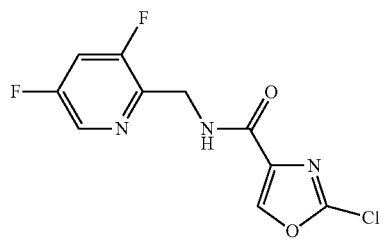 [SMILES: O=C(NCc1ncc(F)cc1F)c1coc(Cl)n1]

N,N-Diisopropylethylamine (680 µl, 3.9 mmol) and propylphosphonic anhydride (1.0 ml, 50% in ethyl acetate, 1.7 mmol) were added to a solution of 2-bromo-1,3-oxazole-4-carboxylic acid (250 mg, 1.30 mmol) and 1-(3,5-difluoropyridin-2-yl)methanamine dihydrochloride (283 mg, 1.30 mmol) in 10 ml of acetonitrile, and the mixture was stirred at room temperature overnight. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was applied to Isolute® and the mixture was purified by column chromatography (Biotage® Isolera One; column: Snap Ultra 10 g; Cy/EA gradient: 8% EA-66% EA; flow rate 36 ml/min). The product-containing fractions were combined and concentrated and the residue was dried under high vacuum. This gave 193 mg (46% of theory, purity 84%) of the target compound, which was reacted further without further purification.

LC-MS (method 1): R$_t$=1.32 min; MS (ESIpos): m/z=274 [M+H]$^+$.

Example 67A

2-Bromo-N-(5-chloro-2-fluorobenzyl)-1,3-thiazole-5-carboxamide

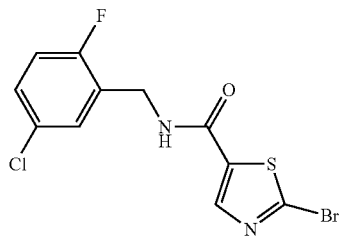 [SMILES: O=C(NCc1cc(Cl)ccc1F)c1cnc(Br)s1]

N,N-Diisopropylethylamine (630 µl, 3.6 mmol) and propylphosphonic anhydride (930 µl, 50% in ethyl acetate, 1.6 mmol) were added to a solution of 2-bromo-1,3-thiazole-5-carboxylic acid (250 mg, 1.20 mmol) and 1-(5-chloro-2-fluorophenyl)methanamine (192 mg, 1.20 mmol) in 10 ml of acetonitrile, and the mixture was stirred at room temperature overnight. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was applied to Isolute® and the mixture was purified by column chromatography (Biotage® Isolera One; column: Snap Ultra 10 g; Cy/EA gradient: 8% EA-66% EA; flow rate 36 ml/min). The product-containing fractions were combined and concentrated and the residue was dried under high vacuum. This gave 106 mg (purity 96%, 24% of theory) of the target compound.

LC-MS (method 1): R$_t$=1.85 min; MS (ESIpos): m/z=348 [M+H]$^+$.

Example 68A

Benzyl (3R)-3-hydroxy[1,4'-bipiperidine]-1'-carboxylate

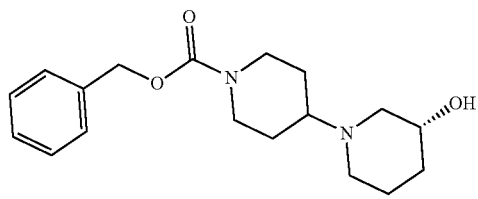 [SMILES: O=C(OCc1ccccc1)N1CCC(N2CCC[C@@H](O)C2)CC1]

Triethylamine (3.0 ml, 21 mmol) and acetic acid (740 µl, 13 mmol) were added to a solution of benzyl 4-oxopiperidine-1-carboxylate (2.00 g, 8.57 mmol) and (3R)-piperidin-3-ol hydrochloride (2.36 g, 17.1 mmol) in 100 ml of dichloromethane, and the mixture was stirred at room temperature for 1 h. Subsequently, sodium triacetoxyborohydride (2.18 g, 10.3 mmol) was added to the mixture and the mixture was stirred at room temperature for 48 h. Sat.

NaHCO$_3$ solution was added and the reaction mixture was extracted with dichloromethane. The organic phase was washed with water and dried over Na$_2$SO$_4$. The drying agent was filtered off and the filtrate was concentrated. The residue was applied to Isolute® and the mixture was purified by column chromatography (Biotage® Isolera One; column: Snap Ultra 50 g; DCM/MeOH gradient: 2% MeOH-20% MeOH; flow rate 100 ml/min). The product-containing fractions were combined and concentrated and the residue was dried under high vacuum. This gave 1.79 g (purity 100%, 66% of theory) of the target compound.

LC-MS (method 1): R$_t$=0.87 min; MS (ESIpos): m/z=319 [M+H]$^+$.

Example 69A

Benzyl (3R)-3-(cyclopropylmethoxy)[1,4'-bipiperidine]-1'-carboxylate

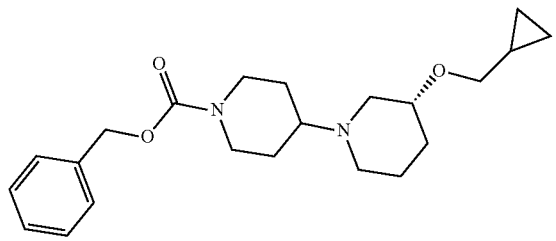 [SMILES: O=C(OCc1ccccc1)N1CCC(N2CCC[C@@H](OCC3CC3)C2)CC1]

Under argon, benzyl (3R)-3-hydroxy[1,4'-bipiperidine]-1'-carboxylate (1.79 g, 5.62 mmol) was initially charged in 40 ml of THF, and the mixture was cooled with an ice bath to 0° C. At this temperature, sodium hydride (337 mg, purity 60%, 8.43 mmol) was added and the mixture was stirred at room temperature for 30 min. Subsequently, (bromomethyl)cyclopropane (820 μl, 8.4 mmol) was added and the reaction mixture was stirred at 60° C. overnight. (Bromomethyl)cyclopropane (820 μl, 8.4 mmol) and sodium hydride (337 mg, purity 60%, 8.43 mmol) were added and the mixture was stirred at 60° C. for a further 24 h. Water was added and the reaction mixture was extracted with ethyl acetate. The organic phase was washed with water and sat. NaCl solution and dried over Na$_2$SO$_4$. The drying agent was filtered off and the filtrate was concentrated. The product was purified by preparative HPLC (instrument: Waters Prep LC/MS System, column: Phenomenex Kinetex C18 5 μm 100×30 mm. mobile phase A: water, mobile phase B: acetonitrile, mobile phase C: 2% strength formic acid in water, mobile phase D: acetonitrile/water (80% by volume/20% by volume) total flow rate: 80 ml/min, room temperature, wavelength 200-400 nm, complete injection. Gradient profile: mobile phase A 0 to 2 min 63 ml, mobile phase B 0 to 2 min 7 ml, mobile phase A 2 to 10 min from 63 ml to 39 ml and mobile phase B from 7 ml to 31 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 100.0 mg (purity 100%, 4.8% of theory) of the target compound.

LC-MS (method 1): R$_t$=1.19 min; MS (ESIpos): m/z=373 [M+H]$^+$.

Example 70A (3R)-3-(Cyclopropylmethoxy)-1,4'-bipiperidine dihydrochloride

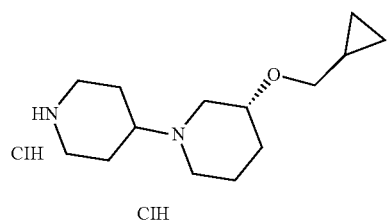

Benzyl (3R)-3-(cyclopropylmethoxy)[1,4'-bipiperidine]-1'-carboxylate (100 mg, 268 μmol) was initially charged in 7.5 ml of THF, and palladium (32.1 mg; 10% on activated carbon) was added under argon. The mixture was then hydrogenated under a hydrogen atmosphere for 2 h. The catalyst was filtered off through kieselguhr and washed with THF. Hydrochloric acid in diethyl ether (200 μl, 2.0 M, 400 μmol) was added to the filtrate and the mixture was concentrated on a rotary evaporator. The residue was stirred with dichloromethane, concentrated and dried under high vacuum. This gave 66 mg of a mixture which was reacted further without further purification and analysis.

Example 71A rac-2-Bromo-N-[1-(2,5-difluorophenyl)ethyl]-1,3-thiazole-5-carboxamide

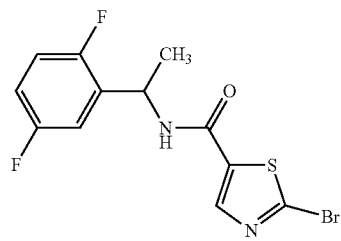 [SMILES: CC(NC(=O)c1cnc(Br)s1)c1cc(F)ccc1F]

N,N-Diisopropylethylamine (630 μL 3.6 mmol) and propylphosphonic anhydride (930 μL 50% in ethyl acetate, 1.6 mmol) were added to a solution of 2-bromo-1,3-thiazole-5-carboxylic acid (250 mg, 1.20 mmol) and rac-1-(2,5-difluorophenyl)ethanamine (189 mg, 1.20 mmol) in 10 ml of acetonitrile, and the mixture was stirred at room temperature overnight. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was applied to Isolute® and the mixture was purified by column chromatography (Biotage® Isolera One; column: Snap Ultra 10 g; Cy/EA gradient: 8% EA-66% EA; flow rate 36 ml/min). The product-containing fractions were combined and concentrated and the residue was dried under high vacuum. This gave 148 mg (purity 100%, 35% of theory) of the target compound.

LC-MS (method 1): R$_t$=1.81 min; MS (ESIpos): m/z=346 [M+H]$^+$.

Example 72A

Ethyl 4-(2-chlorophenyl)-2-[(3R)-3-methyl[1,4'-bipiperidin]-1'-yl]-1,3-thiazole-5-carboxylate

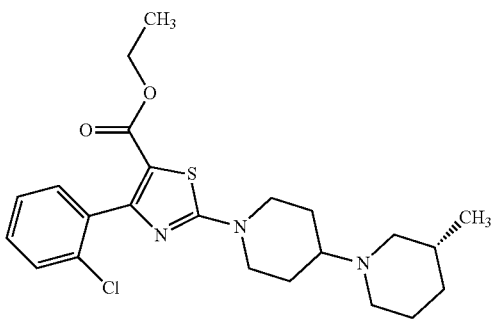 [SMILES: CCOC(=O)c1sc(N2CCC(N3CCC[C@@H](C)C3)CC2)nc1-c1ccccc1Cl]

Ethyl 2-bromo-4-(2-chlorophenyl)-1,3-thiazole-5-carboxylate (150 mg, 433 µmol) and (3R)-3-methyl-1,4'-bipiperidine dihydrochloride (166 mg, 649 µmol) were combined and stirred at 120° C. in sodium carbonate solution (870 µl, 2.0 M, 1.7 mmol) for 30 min. The reaction mixture was then diluted with water and extracted with dichloromethane. The organic phase was dried over $Na_2SO_4$ and filtered and the filtrate was concentrated on a rotary evaporator. The residue was dried under high vacuum. This gave 199 mg (purity 95%, 98% of theory) of the target compound.

LC-MS (method 1): $R_t$=1.34 min; MS (ESIpos): m/z=449 $[M+H]^+$.

Example 82A diamix-5-(3-Fluoropiperidin-4-yl)-5-azaspiro[2.5]octane dihydrochloride

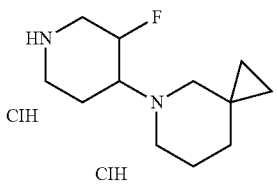 [SMILES: "CIH" ; FC1CNCCC1N1CCCC2(CC2)C1 ; "CIH"]

4 M hydrochloric acid in 1,4-dioxane (720 µl, 4.0 M, 2.9 mmol) was added to a solution of diamix-tert-butyl 4-(5-azaspiro[2.5]octan-5-yl)-3-fluoropiperidine-1-carboxylate (179 mg, 573 µmol) in 8 ml of dichloromethane, and the mixture was stirred at room temperature overnight. Subsequently, the reaction mixture was concentrated on a rotary evaporator and the residue was dried under high vacuum. This gave 162 mg of a mixture which was reacted further without further purification and analysis.

Example 73A 4-(2-Chlorophenyl)-2-[(3R)-3-methyl[1,4'-bipiperidin]-1'-yl]-1,3-thiazole-5-carboxylic acid

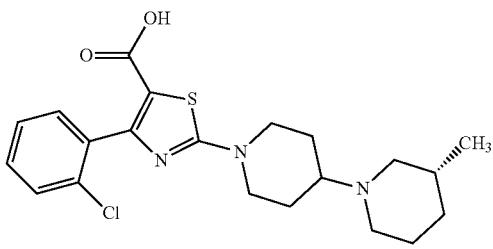 [SMILES: C[C@@H]1CCCN(C2CCN(c3nc(-c4ccccc4Cl)c(C(=O)O)s3)CC2)C1]

Ethyl 4-(2-chlorophenyl)-2-[(3R)-3-methyl[1,4'-bipiperidin]-1'-yl]-1,3-thiazole-5-carboxylate (199 mg, 444 µmol) was dissolved in 10 ml of THF. Aqueous sodium hydroxide solution (4 ml, 2.0 M, 8 mmol) was added to the solution and the mixture was stirred at room temperature for 5 days. The THF was removed on a rotary evaporator and the residue was acidified with hydrochloric acid. The precipitated solid was filtered off and dried under high vacuum. This gave 160 mg (purity 98%, 84% of theory) of the target compound.

LC-MS (method 1): $R_t$=0.97 min; MS (ESIpos): m/z=420 $[M+H]^+$.

Example 74A

4-Bromo-2-[(3R)-3-methyl[1,4'-bipiperidin]-1'-yl]-1,3-thiazole-5-carboxylic acid

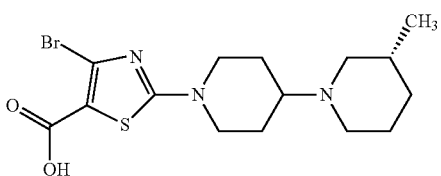 [SMILES: C[C@@H]1CCCN(C2CCN(c3nc(Br)c(C(=O)O)s3)CC2)C1]

2,4-Dibromo-1,3-thiazole-5-carboxylic acid (150 mg, 523 µmol) and (3R)-3-methyl-1,4'-bipiperidine dihydrochloride (133 mg, 523 µmol) were combined and stirred at 120° C. in sodium carbonate solution (1.0 ml, 2.0 M, 2.1 mmol) for 1 h. Subsequently, the reaction mixture was concentrated to dryness and stirred with DCM/MeOH 5:1. The insoluble salts were filtered off with suction. The filtrate was concentrated by evaporation and the residue was dried in high vacuum. This gave 240 mg (purity 100%, 118% of theory) of the target compound.

LC-MS (method 1): $R_t$=0.70 min; MS (ESIpos): m/z=388 $[M+H]^+$.

Example 75A

2-Bromo-4-chloro-N-[(3,5-difluoropyridin-2-yl)methyl]-1,3-thiazole-5-carboxamide

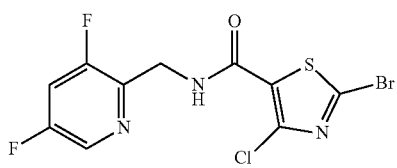 [SMILES: O=C(NCc1ncc(F)cc1F)c1sc(Br)nc1Cl]

N,N-Diisopropylethylamine (720 μL 4.1 mmol) and propylphosphonic anhydride (800 μL 50% in ethyl acetate, 1.3 mmol) were added to a solution of 2-bromo-4-chloro-1,3-thiazole-5-carboxylic acid (250 mg, 1.03 mmol) and 1-(3,5-difluoropyridin-2-yl)methanamine dihydrochloride (291 mg, 1.34 mmol) in 14 ml of acetonitrile, and the mixture was stirred at room temperature for 2 h. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was dried under high vacuum. This gave 250 mg (purity 95%, 62% of theory) of the target compound.

LC-MS (method 1): R$_t$=1.79 min; MS (ESIpos): m/z=367 [M+H]$^+$.

Example 76A

2-Bromo-4-cyclopropyl-N-[(3,5-difluoropyridin-2-yl)methyl]-1,3-thiazole-5-carboxamide

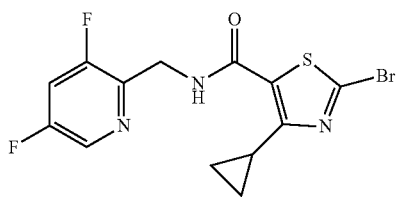 [SMILES: O=C(NCc1ncc(F)cc1F)c1sc(Br)nc1C1CC1]

N,N-Diisopropylethylamine (560 μL 3.2 mmol) and propylphosphonic anhydride (620 μL 50% in ethyl acetate, 1.0 mmol) were added to a solution of 2-bromo-4-cyclopropyl-1,3-thiazole-5-carboxylic acid (200 mg, 806 μmol) and 1-(3,5-difluoropyridin-2-yl)methanamine dihydrochloride (227 mg, 1.05 mmol) in 11 ml of acetonitrile, and the mixture was stirred at room temperature for 1 h. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was dried under high vacuum. This gave 239 mg (purity 78%, 62% of theory) of the target compound.

LC-MS (method 1): R$_t$=1.87 min; MS (ESIpos): m/z=373 [M+H]$^+$.

Example 77A

2-Bromo-4-ethyl-1,3-thiazole-5-carboxylic acid

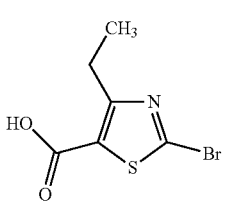

Methyl 2-bromo-4-ethyl-1,3-thiazole-5-carboxylate (150 mg, 600 μmol) was dissolved in 3 ml of THF. Aqueous sodium hydroxide solution (3 ml, 2.0 M, 6 mmol) was added to the solution and the mixture was stirred at room temperature overnight. The THF was removed on a rotary evaporator and the residue was acidified with 2 N hydrochloric acid. The precipitated solid was filtered off and dried under high vacuum. This gave 100 mg (purity 98%, 69% of theory) of the target compound.

LC-MS (method 1): R$_t$=1.30 min; MS (ESIpos): m/z=235 [M+H]$^+$.

Example 78A

2-Bromo-N-[(3,5-difluoropyridin-2-yl)methyl]-4-ethyl-1,3-thiazole-5-carboxamide

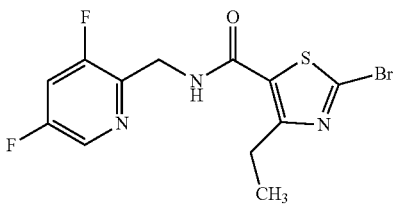 [SMILES: CCc1nc(Br)sc1C(=O)NCc1ncc(F)cc1F]

N,N-Diisopropylethylamine (300 μl, 1.7 mmol) and propylphosphonic anhydride (330 μl, 50% in ethyl acetate, 550 μmol) were added to a solution of 2-bromo-4-ethyl-1,3-thiazole-5-carboxylic acid (100 mg, 424 μmol) and 1-(3,5-difluoropyridin-2-yl)methanamine dihydrochloride (120 mg, 550 μmol) in 5.7 ml of acetonitrile, and the mixture was stirred at room temperature for 2 h. The reaction mixture was concentrated and the residue was taken up in ethyl acetate and washed with sat. NaHCO$_3$ solution, water and sat. NaCl solution. The organic phase was dried over Na$_2$SO$_4$. The drying agent was filtered off and the filtrate was concentrated. The residue was dried under high vacuum. This gave 150 mg (purity 95%, 93% of theory) of the target compound.

LC-MS (method 4): R$_t$=0.86 min; MS (ESIpos): m/z=364 [M+H]$^+$.

Example 79A diamix-tert-Butyl 4-(1,1-difluoro-5-azaspiro[2.5]octan-5-yl)-3-fluoropiperidine-1-carboxylate

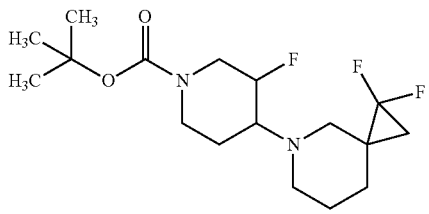 [SMILES: CC(C)(C)OC(=O)N1CCC(N2CCCC3(C2)CC3(F)F)C(F)C1]

N,N-Diisopropylethylamine (570 µl, 3.3 mmol) was added to a solution of rac-1,1-difluoro-5-azaspiro[2.5]octane hydrochloride (600 mg, 3.27 mmol) in 15 ml of 1,2-dichloroethane, and the mixture was stirred for 5 min, after which rac-tert-butyl 3-fluoro-4-oxopiperidine-1-carboxylate (355 mg, 1.63 mmol) and acetic acid (140 µl, 2.5 mmol) were added to the mixture. The mixture was then stirred at room temperature. After 5 h, sodium triacetoxyborohydride (416 mg, 1.96 mmol) was added to the mixture and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: Phenomenex Kinetex C18 5 µm 100×30 mm. Mobile phase A: water, mobile phase B: acetonitrile, mobile phase C: 2% strength formic acid in water, mobile phase D: acetonitrile/water (80% by volume/20% by volume) total flow rate: 80 ml/min, room temperature, wavelength 200-400 nm, complete injection. Gradient profile: mobile phase A 0 to 2 min 70 ml, mobile phase B 0 to 2 min 0 ml, mobile phase A 2 to 10 min from 70 ml to 55 ml and mobile phase B from 0 ml to 15 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 264 mg (purity 100%, 46% of theory) of the target compound.

LC-MS (method 4): R$_t$=0.56 min; MS (ESIpos): m/z=349 [M+H]$^+$.

Example 80A diamix-1,1-Difluoro-5-(3-fluoropiperidin-4-yl)-5-azaspiro[2.5]octane dihydrochloride

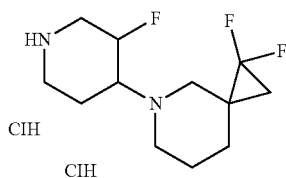 [SMILES: "CIH" ; FC1CNCCC1N1CCCC2(C1)CC2(F)F ; "CIH"]

4 M hydrochloric acid in 1,4-dioxane (950 µl, 4.0 M, 3.8 mmol) was added to a solution of diamix-tert-butyl 4-(1,1-difluoro-5-azaspiro[2.5]octan-5-yl)-3-fluoropiperidine-1-carboxylate (264 mg, 760 µmol) in 10 ml of dichloromethane, and the mixture was stirred at room temperature overnight. Subsequently, the reaction mixture was concentrated on a rotary evaporator and the residue was dried under high vacuum. This gave 246 mg of a mixture which was reacted further without further purification and analysis.

Example 81A diamix-tert-Butyl 4-(5-azaspiro[2.5]octan-5-yl)-3-fluoropiperidine-1-carboxylate

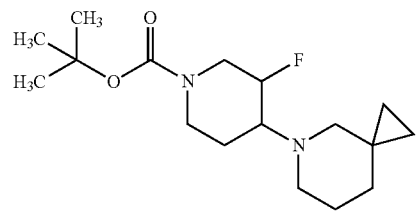 [SMILES: CC(C)(C)OC(=O)N1CCC(N2CCCC3(CC3)C2)C(F)C1]

N,N-Diisopropylethylamine (410 µl, 2.4 mmol) was added to a solution of 5-azaspiro[2.5]octane hydrochloride (350 mg, 2.37 mmol) in 10 ml of 1,2-dichloroethane, and the mixture was stirred for 5 min, after which rac-tert-butyl 3-fluoro-4-oxopiperidine-1-carboxylate (257 mg, 1.19 mmol) and acetic acid (100 µl, 1.8 mmol) were added to the mixture. The mixture was then stirred at room temperature. After 5 h, sodium triacetoxyborohydride (416 mg, 1.96 mmol) was added to the mixture and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: Phenomenex Kinetex C18 5 µm 100×30 mm. mobile phase A: water, mobile phase B: acetonitrile, mobile phase C: 2% strength formic acid in water, mobile phase D: acetonitrile/water (80% by volume/20% by volume) total flow rate: 80 ml/min, room temperature, wavelength 200-400 nm, complete injection. Gradient profile: mobile phase A 0 to 2 min 70 ml, mobile phase B 0 to 2 min 0 ml, mobile phase A 2 to 10 min from 70 ml to 55 ml and mobile phase B from 0 ml to 15 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 179 mg (purity 100%, 48% of theory) of the target compound.

LC-MS (method 4): R$_t$=0.53 min; MS (ESIpos): m/z=313 [M+H]$^+$.

Example 82A

Ethyl 5-[(3R)-3-methyl[1,4'-bipiperidin]-1'-yl]-1,3,4-thiadiazole-2-carboxylate

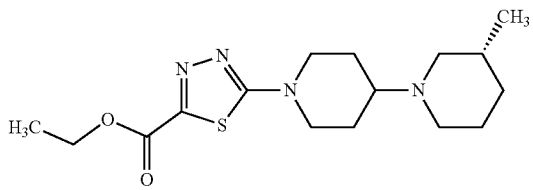 [SMILES: CCOC(=O)c1nnc(N2CCC(N3CCC[C@@H](C)C3)CC2)s1]

3.67 ml (21.09 mmol) of N,N-diisopropylethylamine were added to 1 g (4.22 mmol) of ethyl 5-bromo-1,3,4-thiadiazole-2-carboxylate and 1.077 g (4.22 mmol) of 1-(3,5-difluoropyridin-2-yl)methanamine dihydrochloride in 25 ml of acetonitrile, and the mixture was heated to 80° C. and stirred at this temperature overnight. After cooling of the reaction mixture, the solution was diluted with ethyl acetate and washed with water. The organic phase was finally separated off and the organic solution obtained was then filtered through hydrophobic filters (pleated filter MN 616 WA 1/4, D=12.5 cm), dried and concentrated to dryness under reduced pressure. This gave 1.29 g (3.81 mmol, 90% of theory) of the target compound as a red solid.

NMR (600 MHz, DMSO-d6) δ [ppm]: 0.77-0.87 (m, 4H, including at 0.82 (d, 3H)), 1.30 (t, 3H), 1.34-1.46 (m, 1H), 1.48-1.67 (m, 5H), 1.72-1.85 (m, 3H), 2.06 (br. t, 1H), 2.48-2.58 (m, 1H, partially obscured by DMSO), 2.74 (br. t, 2H), 3.24 (td, 2H), 3.98 (br. d, 2H), 4.34 (q, 2H).

LC-MS (method 1): $R_t$=0.82 min; m/z=339 (M+H)$^+$.

Example 83A

5-[(3R)-3-Methyl[1,4'-bipiperidin]-1'-yl]-1,3,4-thiadiazole-2-carboxylic acid

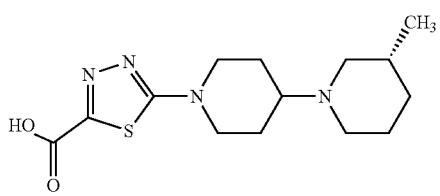 [SMILES: C[C@@H]1CCCN(C2CCN(c3nnc(C(=O)O)s3)CC2)C1]

1.52 g (4.49 mmol) of ethyl 5-[(3R)-3-methyl[1,4'-bipiperidin]-1'-yl]-1,3,4-thiadiazole-2-carboxylate were dissolved in 8 ml of THF, 538 mg (22.45 mmol) of lithium hydroxide were added and 5 ml of water were then added to the reaction solution. The reaction solution was then stirred at room temperature for several hours. After complete conversion, the reaction solution was adjusted to pH 7 with 1 N HCl and concentrated to dryness on a rotary evaporator. This gave 2.95 g of an amber oil which was purified by column chromatography.

Conditions: The separation was carried out using portions of about 1 g. RP column Chromatorex C18, 10 µm; 125×30 mm, acetonitrile/water 10/90→gradient over 38 min 4 acetonitrile/water 90/10, flow rate 75 ml/min.

Finally, product-containing fractions were combined and concentrated to dryness under reduced pressure and dried. This gave 487 mg (1.57 mmol, 35% of theory) of the target compound as a white solid.

LC-MS (method 1): $R_t$=0.39 min; m/z=311 (M+H)$^+$.

Example 84A rac-tert-Butyl 4-(5-azaspiro[2.5]octan-5-yl)azepane-1-carboxylate

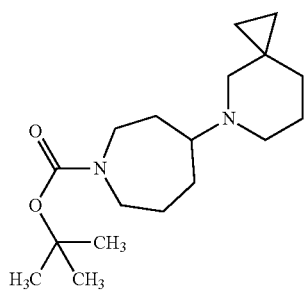 [SMILES: CC(C)(C)OC(=O)N1CCCC(N2CCCC3(CC3)C2)CC1]

To an initial charge of 5-azaspiro[2.5]octane hydrochloride (346 mg, 2.34 mmol) in 7 ml of 1,2-dichloroethane was added N,N-diisopropylethylamine (410 µl, 2.3 mmol) and the mixture was stirred for 5 min, before tert-butyl 4-oxoazepane-1-carboxylate (250 mg, 1.17 mmol) and acetic acid (100 µl, 1.8 mmol) were added. This was followed by stirring at room temperature for 5 h. After this time, sodium triacetoxyborohydride (298 mg, 1.41 mmol) was added to the mixture, which was stirred at room temperature overnight. The reaction mixture was diluted with dichloromethane and washed successively with sat. NaHCO$_3$ solution and water. The organic phase was dried over Na$_2$SO$_4$. The desiccant was filtered off and the filtrate was concentrated. The residue was dissolved in DMSO and purified by means of preparative HPLC (instrument: Waters Prep LC/MS System, column: Phenomenex Kinetex C18 5 µm 100×30 mm eluent A: water, eluent B: acetonitrile, eluent C: 2% formic acid in water, eluent D: acetonitrile/water (80% by vol./20% by vol.) total flow rate: 80 ml/min, room temperature, wavelength 200-400 nm, on-column injection (complete injection). gradient profile: eluent A 0 to 2 min 70 ml, eluent B 0 to 2 min 0 ml, eluent A 2 to 10 min from 70 ml to 0 ml and eluent B from 0 ml to 70 ml, 10 to 12 min 0 ml eluent A and 70 ml eluent B. Eluent C and eluent D at constant flow rate of 5 ml/min in each case over the entire run time). After the solvents had been removed, 140 mg (39% of theory) of the title compound was obtained.

LC-MS (method 4): MS (ESIpos): m/z=309 [M+H]$^+$.

Example 85A rac-5-(Azepan-4-yl)-5-azaspiro[2.5]octane hydrochloride

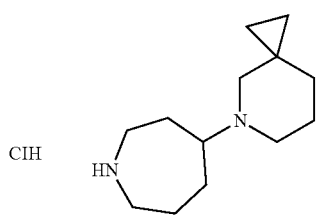 [SMILES: "CIH" ; C1CNCCC(N2CCCC3(CC3)C2)C1]

rac-tert-Butyl 4-(5-azaspiro[2.5]octan-5-yl)azepane-1-carboxylate (140 mg, 454 µmol) was dissolved in 4 ml of dichloromethane, HCl in dioxane (570 µL 4.0 M, 2.3 mmol) was added and the mixture was stirred at room temperature overnight. The reaction mixture was concentrated and the residue was dried under high vacuum. 139 mg (125% of theory) of the target compound was obtained.

LC-MS (method 4): MS (ESIpos): m/z=208 [M−HCl]⁺.

Example 86A diamix-tert-Butyl 4-(1,1-difluoro-5-azaspiro[2.5]octan-5-yl)azepane-1-carboxylate

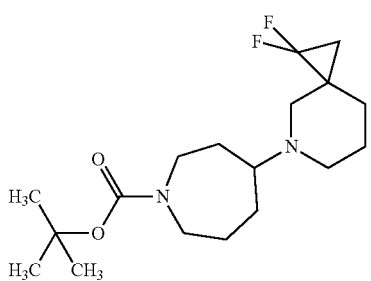 [SMILES: CC(C)(C)OC(=O)N1CCCC(N2CCCC3(C2)CC3(F)F)CC1]

To an initial charge of rac-1,1-difluoro-5-azaspiro[2.5]octane hydrochloride (500 mg, 2.72 mmol) in 10 ml 1,2-dichloroethane was added N,N-diisopropylethylamine (470 µL 2.7 mmol), and the mixture was stirred at room temperature for 5 min before tert-butyl 4-oxoazepane-1-carboxylate (290 mg, 1.36 mmol) and acetic acid (120 µl, 2.0 mmol) were added. The mixture was stirred at room temperature for 5 h. After this time, sodium triacetoxyborohydride (346 mg, 1.63 mmol) was added to the mixture, which was stirred at room temperature overnight. The reaction mixture was diluted with dichloromethane and washed successively with sat. NaHCO₃ solution and water. The organic phase was dried over Na₂SO₄. The desiccant was filtered off and the filtrate was concentrated. The residue was dissolved in DMSO and purified by means of preparative HPLC (instrument: Waters Prep LC/MS System, column: XBridge C18 5 µm 100×30 mm. Eluent A: water, eluent B: acetonitrile, eluent C: 2% formic acid in water, eluent D: acetonitrile/water (80% by vol./20% by vol.) total flow rate: 80 ml/min, room temperature, wavelength 200-400 nm, complete injection. gradient profile: eluent A 0 to 2 min 70 ml, eluent B 0 to 2 min 0 ml, eluent A 2 to 10 min from 70 ml to 0 ml and eluent B from 0 ml to 70 ml, 10 to 12 min 0 ml eluent A and 70 ml eluent B. Eluent C and eluent D constant flow rate of 5 ml/min in each case over the entire run time). The product-containing fractions were combined and lyophilized. 292 mg (62% of theory) of the target compound was obtained.

LC-MS (method 4): MS (ESIpos): m/z=345 [M+H]⁺.

Example 87A diamix-5-(Azepan-4-yl)-1,1-difluoro-5-azaspiro[2.5]octane dihydrochloride

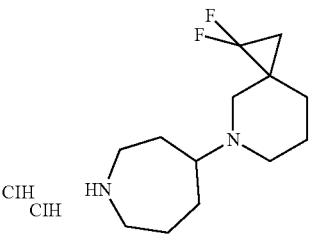 [SMILES: "CIH" ; "CIH" ; FC1(F)CC12CCCN(C1CCCNCC1)C2]

To a solution of diamix-tert-butyl 4-(1,1-difluoro-5-azaspiro[2.5]octan-5-yl)azepane-1-carboxylate (292 mg, 848 µmol) in 8 ml of dichloromethane was added HCl in dioxane (1.1 ml, 4.0 M, 4.2 mmol), and the mixture was stirred at room temperature overnight. Subsequently, the reaction mixture was concentrated on a rotary evaporator and the residue was dried under high vacuum. 194 mg (72% of theory) of the target compound was obtained.

LC-MS (method 4): MS (ESIpos): m/z=245 [M−2HCl]⁺.

Example 88A diamix-tert-Butyl (3R)-2',3-dimethyl[1,4'-bipiperidine]-1'-carboxylate

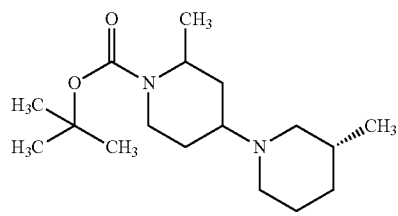 [SMILES: CC1CC(N2CCC[C@@H](C)C2)CCN1C(=O)OC(C)(C)C]

To (3R)-3-methylpiperidine hydrochloride (318 mg, 2.34 mmol) in 5.8 ml of 1,2-dichloroethane was added N,N-diisopropylethylamine (410 µl, 2.3 mmol), and the mixture was stirred at room temperature for 5 min, before rac-tert-butyl 2-methyl-4-oxopiperidine-1-carboxylate (250 mg, 1.17 mmol) and acetic acid (100 µl, 1.8 mmol) were added. Subsequently, the mixture was stirred at room temperature overnight. Then sodium triacetoxyborohydride (298 mg, 1.41 mmol) was added to the mixture, which was stirred at room temperature for a further 5 h. The reaction mixture was diluted with dichloromethane and washed successively with sat. NaHCO₃ solution and water. The organic phase was dried over Na₂SO₄. The desiccant was filtered off and the filtrate was concentrated. The residue (340 mg) was converted further without analysis.

Example 89A diamix-(3R)-2',3-Dimethyl-1,4'-bipiperidine dihydrochloride

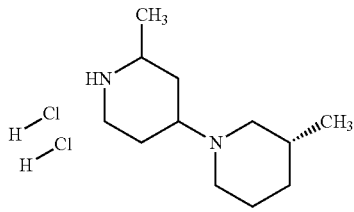

diamix-tert-Butyl (3R)-2',3-dimethyl[1,4'-bipiperidine]-1'-carboxylate (340 mg, 1.15 mmol) was dissolved in 16 ml of dichloromethane, HCl in dioxane (1.4 ml, 4.0 M, 5.7 mmol) was added, and the mixture was stirred at room temperature for 5 h. The reaction mixture was concentrated and the residue was dried under high vacuum. The residue (290 mg) was converted further without analysis.

Example 90A

N-[(3,5-Difluoropyridin-2-yl)methyl]-2-(3-ethyl-4-oxopiperidin-1-yl)-1,3-thiazole-5-carboxamide

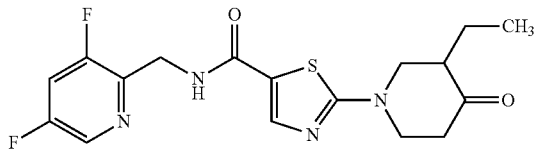 [SMILES: CCC1CN(c2ncc(C(=O)NCc3ncc(F)cc3F)s2)CCC1=O]

1 g (2.99 mmol) of 2-bromo-N-[(3,5-difluoropyridin-2-yl)methyl]-1,3-thiazole-5-carboxamide was added to 40 ml of water and admixed with 1.9 g (17.96 mmol) of sodium carbonate. 538 mg (3.29 mmol) of 3-ethylpiperidin-4-one hydrochloride was then metered into the reaction solution, which was subsequently stirred at reflux temperature overnight. After cooling, the reaction mixture was extracted with dichloromethane. The resulting organic phase was washed by means of sodium hydrogencarbonate solution, separated off and filtered through a water-repellent filter (MN 616 WA 1/4 fluted filter, D=12.5 cm). The resultant filtrate was then concentrated on a rotary evaporator and dried under reduced pressure. 1.1 g (2.89 mmol, 97% of theory) of the target compound was obtained as an amorphous solid, which, without further purification, was separated into the enantiomers by means of chiral preparative HPLC.

LC-MS (method 1): $R_t$=1.42 min; m/z=381 (M+H)$^+$.

Example 91A and Example 92A

N-[(3,5-Difluoropyridin-2-yl)methyl]-2-(3-ethyl-4-oxopiperidin-1-yl)-1,3-thiazole-5-carboxamide (Enantiomers 1 and 2)

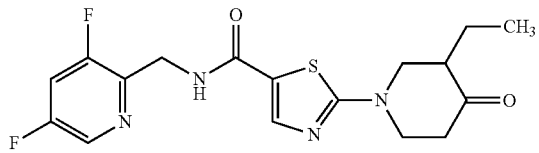 [SMILES: CCC1CN(c2ncc(C(=O)NCc3ncc(F)cc3F)s2)CCC1=O]

1.1 g (2.89 mmol) of racemic N-[(3,5-difluoropyridin-2-yl)methyl]-2-(3-ethyl-4-oxopiperidin-1-yl)-1,3-thiazole-5-carboxamide was separated into the enantiomers by preparative HPLC on a chiral phase [column: Daicel Chiralpak AY-H, 5 μm, 250 mm×20 mm (SFC); eluent: $CO_2$/2-propanol 55:45; pressure: 90 bar; flow rate: 95 g/min; UV detection: 210 nm; temperature: 40° C.]:

Example 91A (Enantiomer 1)

N-[(3,5-Difluoropyridin-2-yl)methyl]-2-(3-ethyl-4-oxopiperidin-1-yl)-1,3-thiazole-5-carboxamide Yield: 487 mg $R_t$=4.02 min; chemical purity >99%; >97% ee

[column: Chiraltek AY-3, 3 μm, 100 mm×4.6 mm; eluent: $CO_2$/ethanol) 90:10; flow rate: 3 ml/min;

pressure: 130 bar; temperature: 40° C.; UV detection: 210 nm].

LC-MS (method 1): $R_t$=1.41 min; m/z=381 (M+H)$^+$.

$^1$H-NMR (600 MHz, DMSO-$d_6$, δ/ppm): 0.89 (t, 3H), 1.25-1.33 (m, 1H), 1.65-1.75 (m, 1H), 2.41-2.48 (1, 2H), 2.48-2.56 (m, 1H, partly concealed by DMSO), 2.56-2.63 (m, 1H), 3.36 (dd, 1H), 3.60-3.67 (m, 1H), 3.96-4.04 (m, 1H), 4.05-4.11 (m, 1H), 4.55 (br. d, 2H), 7.87-7.94 (m, 2H), 7.93-8.47 (d, 1H), 8.76 (t, 1H).

$[\alpha]_D^{20}$=−14.69° (c=0.440, methanol).

Example 92A (Enantiomer 2)

N-[(3,5-Difluoropyridin-2-yl)methyl]-2-(3-ethyl-4-oxopiperidin-1-yl)-1,3-thiazole-5-carboxamide Yield: 476 mg $R_t$=5.98 min; chemical purity >99%; >97% ee

[column: Chiraltek AY-3, 3 μm, 100 mm×4.6 mm; eluent: $CO_2$/Ethanol) 90:10; flow rate: 3 ml/min; pressure: 130 bar; temperature: 40° C.; UV detection: 210 nm].

LC-MS (method 1): $R_t$=1.41 min; m/z=381 (M+H)$^+$.

$^1$H-NMR (600 MHz, DMSO-$d_6$, δ/ppm): 0.89 (t, 3H), 1.25-1.33 (m, 1H), 1.65-1.75 (m, 1H), 2.42-2.48 (1, 2H), 2.48-2.56 (m, 1H, partly concealed by DMSO), 2.55-2.63 (m, 1H), 3.36 (dd, 1H), 3.60-3.67 (m, 1H), 3.96-4.03 (m, 1H), 4.04-4.11 (m, 1H), 4.55 (br. d, 2H), 7.87-7.94 (m, 2H), 7.93-8.47 (d, 1H), 8.76 (t, 1H).

$[\alpha]_D^{20}$=+11.64° (c=0.435, methanol).

Example 93A

Diamix-cis-Benzyl (3R)-3,3'-dimethyl[1,4'-bipiperidin]-1'-carboxylate

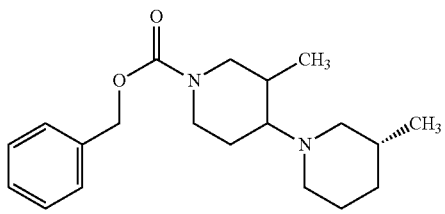 [SMILES: CC1CN(C(=O)OCc2ccccc2)CCC1N1CCC[C@@H](C)C1]

To an initial charge of (3R)-3-methylpiperidine hydrochloride (1000 mg, 4.04 mmol) in 25 ml of dichloromethane was added N,N-diisopropylethylamine (1.41 ml, 8.1 mmol), and the mixture was stirred at room temperature for 5 min before rac-benzyl 3-methyl-4-oxopiperidine-1-carboxylate (1.1 g, 8.1 mmol) and acetic acid (0.35 ml, 6.1 mmol) were added. Then sodium triacetoxyborohydride (1.03 g, 4.85 mmol) was added to the mixture, which was stirred at room temperature overnight. The reaction mixture was diluted with dichloromethane and washed successively with sat. $NaHCO_3$ solution and water. The organic phase was dried over $Na_2SO_4$. The desiccant was filtered off and the filtrate was concentrated. The residue obtained was dissolved in a mixture of 18 ml of acetonitrile+MeOH and purified by means of preparative HPLC.

Method: instrument: Waters Prep LC/MS System, column: XBridge C18 5 μm 100×30 mm.

eluent A: water, eluent B: acetonitrile, eluent C: 1% ammonia in water; total flow rate: 80 ml/min, 40° C., wavelength 210 nm.

Gradient profile: eluent A 0 to 4 min 25%, eluent B 0 to 4 min 70%, eluent C 0 to 4 min 5%. Eluent A 4 to 4.71 min 0%, eluent B 4 to 4.71 min 95%, eluent C 4 to 4.71 min 5%. Eluent A 4.71 to 4.78 min 25%, eluent B 4.71 to 4.78 min 70%, eluent C 4.71 to 4.78 min 5%.

After the solvents had been removed, 716 mg (2.13 mmol, 98% purity, 53% of theory) of the title compound was obtained.

$^1$H-NMR (600 MHz, DMSO-$d_6$, δ/ppm): 0.76 (d, 3H), 0.79-0.90 (m, 4H, including at 0.82 (d, 3H)), 1.22-1.33 (m, 1H), 1.33-1.44 (m, 1H), 1.44-1.55 (m, 2H), 1.55-1.66 (m, 2H), 1.66-1.78 (m, 2H), 1.98-2.16 (m, 2H), 2.60-2.96 (m, 4H), 3.88 (br. d, 1H), 4.07 (br. d, 1H), 5.06 (s, 2H), 7.27-7.41 (m, 5H).

Example 94A and Example 95A cis-Benzyl (3R)-3,3'-dimethyl[1,4'-bipiperidine]-1'-carboxylate (Diastereomer 1 and 2)

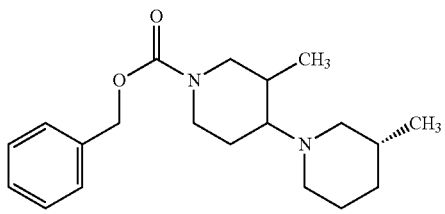 [SMILES: CC1CN(C(=O)OCc2ccccc2)CCC1N1CCC[C@@H](C)C1]

716 mg (2.17 mmol) of the cis diastereomer mixture diamix-cis-benzyl (3R)-3,3'-dimethyl[1,4'-bipiperidine]-1'-carboxylate was separated into the cis diastereomers 1 and 2 by preparative HPLC on a chiral phase [column: Daicel Chiralpak AY-H, 5 μm, 250 mm×20 mm; eluent: n-heptane/(ethanol+0.2% diethylamine) 95:5; flow rate: 15 ml/min; UV detection: 220 nm; temperature: 30° C.]:

Example 94A (Cis Diastereomer 1)

cis-Benzyl (3R)-3,3'-dimethyl[1,4'-bipiperidine]-1'-carboxylate

Yield: 287 mg $R_t$=7.44 min; chemical purity >99%; >99% de [column: Chiralpak AY-H, 5 μm, 250 mm×4.6 mm; eluent: n-heptane/(ethanol+0.2% diethylamine) 95:5; flow rate: 1 ml/min; temperature: 30° C.; UV detection: 220 nm].

LC-MS (method 1): $R_t$=1.02 min; m/z=331 (M+H)$^+$.

$^1$H-NMR (600 MHz, DMSO-$d_6$, δ/ppm): 0.76 (d, 3H), 0.79-0.90 (m, 4H, including at 0.82 (d, 3H)), 1.22-1.33 (m, 1H), 1.33-1.44 (m, 1H), 1.44-1.55 (m, 2H), 1.55-1.66 (m, 2H), 1.66-1.78 (m, 2H), 1.98-2.16 (m, 2H), 2.60-2.96 (m, 4H), 3.88 (br. d, 1H), 4.07 (br. d, 1H), 5.06 (s, 2H), 7.27-7.41 (m, 5H).

Example 95A (Cis Diastereomer 2)

cis-Benzyl (3R)-3,3'-dimethyl[1,4'-bipiperidine]-1'-carboxylate

Yield: 135 mg $R_t$=8.06 min; chemical purity >99%; >99% de [column: Chiralpak AY-H, 5 μm, 250 mm×4.6 mm; eluent: n-heptane/(ethanol+0.2% diethylamine) 95:5; flow rate: 1 ml/min; temperature: 30° C.; UV detection: 220 nm].

LC-MS (method 1): $R_t$=1.02 min; m/z=331 (M+H)$^+$.

$^1$H-NMR (600 MHz, DMSO-$d_6$, δ/ppm): 0.76 (d, 3H), 0.79-0.89 (m, 4H, including at 0.83 (d, 3H)), 1.22-1.32 (m, 1H), 1.33-1.43 (m, 1H), 1.46-1.55 (m, 2H), 1.55-1.67 (m, 2H), 1.67-1.76 (m, 2H), 2.00-2.15 (m, 2H), 2.62-2.99 (m, 4H), 3.88 (br. d, 1H), 4.07 (br. d, 1H), 5.06 (s, 2H), 7.27-7.40 (m, 5H).

Example 96A

Cis-(3R)-3,3'-Dimethyl-1,4'-bipiperidine dihydrobromide (Diastereomer 1)

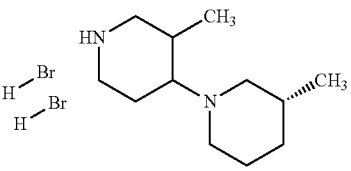

280 mg (0.85 mmol) of cis-benzyl (3R)-3,3'-dimethyl[1,4'-bipiperidine]-1'-carboxylate (diastereomer 1; Example 94A) was dissolved in 5 ml of an HBr/glacial acetic acid mixture while cooling with ice and stirred at 0° C. for 15 min. Subsequently, the ice bath was removed and the reaction mixture was stirred at room temperature for 2 h. The reaction mixture was admixed with diethyl ether, and the precipitate formed was filtered off with suction, washed repeatedly with diethyl ether and dried under high vacuum. 260 mg (0.73 mmol, 86% of theory) of the title compound was obtained, which has been converted further without further analysis.

Example 97A

Cis-(3R)-3,3'-Dimethyl-1,4'-bipiperidine dihydrobromide (Diastereomer 2)

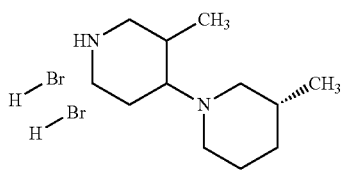

130 mg (0.39 mmol) of cis-benzyl (3R)-3,3'-dimethyl[1,4'-bipiperidine]-1'-carboxylate (diastereomer 2; Example 95A) was dissolved in 3 ml of an HBr/glacial acetic acid mixture while cooling with ice and stirred at 0° C. for 15 min. Subsequently, the ice bath was removed and the reaction mixture was stirred at room temperature for 2 h. The reaction mixture was admixed with diethyl ether, and the precipitate formed was filtered off with suction, washed repeatedly with diethyl ether and dried under high vacuum. 124 mg (0.35 mmol, 88% of theory) of the title compound was obtained, which has been converted further without further analysis.

WORKING EXAMPLES

Example 1

N-[(3,5-Difluoropyridin-2-yl)methyl]-2-[(3R)-3-methyl[1,4'-bipiperidin]-1'-yl]-1,3-thiazole-5-carboxamide

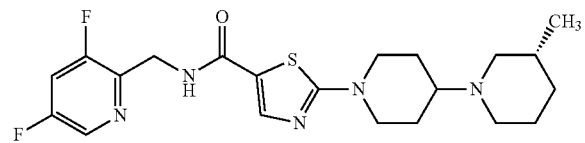

13 g (38.91 mmol) of 2-bromo-N-[(3,5-difluoropyridin-2-yl)methyl]-1,3-thiazole-5-carboxamide, 8.51 g (38.91 mmol) of (3R)-3-methyl-1,4'-bipiperidine hydrochloride (1:1) (WO2015091420 Example 1A; CAS Registry Number 1799475-27-6) and 20.62 g (194.53 mmol) of sodium carbonate in 200 ml of water were heated to 120° C. and stirred at this temperature overnight. After cooling of the reaction mixture, the solution was extracted with ethyl acetate. The separated organic phase was subsequently filtered through a hydrophobic filter (pleated filter MN 616 WA 1/4, D=12.5 cm), dried and concentrated to dryness on a rotary evaporator. The residue obtained was taken up in acetonitrile, heated to 80° C. and, with stirring, slowly cooled back to room temperature. The precipitated solid was filtered off with suction and washed with acetonitrile. The residue was then once more taken up in acetonitrile and recrystallized again. This gave 10.75 g (24.68 mmol, 63% of theory) of the target compound as a light-beige solid. The two mother liquors were combined and concentrated to dryness on a rotary evaporator. The residue obtained was purified further by column chromatography on silica gel (Isolera Biotage SNAP-Ultra 100 g column, mobile phase: dichloromethane-→gradient over 20 CV (CV=column volumes)→dichloromethane/methanol 9:1). The product fractions obtained were then combined, concentrated on a rotary evaporator and recrystallized from acetonitrile. This gave a further 3.28 g (7.48 mmol, 19% of theory) of the target compound as a light-beige solid.

$^1$H-NMR (600 MHz, DMSO-$d_6$, δ/ppm): 0.76-0.86 (m, 4H, including at 0.82 (d, 3H)), 1.34-1.66 (m, 6H), 1.71-1.81 (m, 3H), 2.01-2.09 (m, 1H), 2.44-2.56 (m, 1H, partially obscured by DMSO), 2.69-2.77 (m, 2H), 3.04 (td, 2H), 3.93 (br. d, 2H), 4.53 (br. d, 2H), 7.83 (s, 1H), 7.88-7.95 (m, 1H), 8.47 (d, 1H), 8.71 (t, 1H).

LC-MS (method 4): $R_t$=0.50 min; m/z=436 (M+H)$^+$.

$[α]_D^{20}$=−8.06° (c=0.430, methanol).

Example 2

N-[(3,5-Difluoropyridin-2-yl)methyl]-2-[4-(3,4-dihydroisoquinolin-2(1H)-yl)piperidin-1-yl]-1,3-thiazole-5-carboxamide

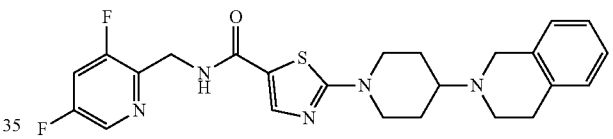

60 mg (0.18 mmol) of 2-bromo-N-[(3,5-difluoropyridin-2-yl)methyl]-1,3-thiazole-5-carboxamide, 51 mg (0.18 mmol) of 2-(piperidin-4-yl)-1,2,3,4-tetrahydroisoquinoline dihydrochloride and 95 mg (0.9 mmol) of sodium carbonate in 1 ml of water in a closed vessel were heated to 160° C. and stirred at this temperature for 30 min. After cooling of the reaction mixture, water was added and the solution was extracted with dichloromethane. The separated organic phase was subsequently filtered through a hydrophobic filter (pleated filter MN 616 WA 1/4, D=12.5 cm), dried and concentrated to dryness on a rotary evaporator. The residue obtained was purified further by column chromatography on silica gel (Isolera Biotage SNAP-Ultra 10 g column, mobile phase: ethyl acetate→gradient over 5 CV (CV=column volumes)→ethyl acetate/methanol 95:5). The product fractions obtained were then combined and concentrated to dryness on a rotary evaporator. This gave 62.7 mg (0.13 mmol, 74% of theory) of the target compound as a yellow solid.

$^1$H-NMR (600 MHz, DMSO-$d_6$, δ/ppm): 1.55-1.65 (m, 2H), 1.86-1.94 (m, 2H), 2.67-2.73 (m, 1H), 2.73-2.81 (m, 4H), 3.12 (br. t, 2H), 3.70 (s, 2H), 3.97 (br. d, 2H), 4.53 (br. d, 2H), 7.01-7.12 (m, 4H), 7.85 (s, 1H), 7.93 (td, 1H), 8.48 (d, 1H), 8.76 (t, 1H).

LC-MS (method 1): $R_t$=0.97 min; m/z=470 (M+H)$^+$.

Example 3

2-[3-(Cyclopropylmethyl)[1,4'-bipiperidin]-1'-yl]-N-[(3,5-difluoropyridin-2-yl)methyl]-1,3-thiazole-5-carboxamide (Racemate)

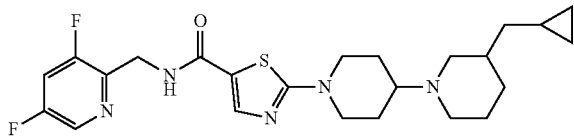 [SMILES: O=C(NCc1ncc(F)cc1F)c1cnc(N2CCC(N3CCCC(CC4CC4)C3)CC2)s1]

32 mg (0.10 mmol) of 2-bromo-N-[(3,5-difluoropyridin-2-yl)methyl]-1,3-thiazole-5-carboxamide, 22 mg (0.10 mmol) of 3-(cyclopropylmethyl)-1,4'-bipiperidine (racemate) and 31 mg (0.29 mmol) of sodium carbonate in 1 ml of water in a closed vessel were heated to 120° C. and stirred at this temperature for 30 min. After cooling of the reaction mixture the solution was extracted with dichloromethane. The separated organic phase was subsequently filtered through a hydrophobic filter (pleated filter MN 616 WA 1/4, D=12.5 cm), dried and concentrated to dryness on a rotary evaporator. The residue obtained was purified using the following method.

Method 7: instrument: Waters Prep LC/MS System, column: XBridge C18 5 μm 100×30 mm Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time.

This gave 40.8 mg (0.09 mmol, 88% of theory) of the target compound as a white lyophilisate.

$^1$H-NMR (400 MHz, DMSO-$d_6$, δ/ppm): −0.07-0.03 (m, 2H), 0.34-0.43 (m, 2H), 0.60-0.73 (m, 1H), 0.80-0.94 (m, 1H), 0.99-1.14 (m, 2H), 1.32-1.65 (m, 5H), 1.68-1.91 (m, 4H), 2.02-2.14 (m, 1H), 2.44-2.59 (m, 1H, partially obscured by DMSO), 2.73 (br. d, 1H), 2.83 (br. d, 1H), 3.04 (br. t, 2H), 3.94 (br. d, 2H), 4.52 (br. d, 2H), 7.83 (s, 1H), 7.87-7.96 (m, 1H), 8.47 (d, 1H), 8.71 (t, 1H).

LC-MS (method 1): $R_t$=1.13 min; m/z=476 (M+H)$^+$.

Analogously to Examples 1 to 3, the following compounds of Examples 4 to 14 were prepared from the starting materials stated in each case:

| Example | Name/Structure/Starting materials | Analytical data |
|---|---|---|
| 4 | 2-[3-(difluoromethyl)[1,4'-bipiperidin]-1'-yl]-N-[(3,5-difluoropyridin-2-yl)methyl]-1,3-thiazole-5-carboxamide (racemate)<br><br>from 2-bromo-N-[(3,5-difluoropyridin-2-yl)methyl]-1,3-thiazole-5-carboxamide and 3-(difluoromethyl)-1,4'-bipiperidine dihydrochloride (racemate) | $^1$H-NMR (600 MHz, DMSO-$d_6$, δ/ppm): 1.11-1.21 (m, 1H), 1.37-1.53 (m, 3H), 1.62-1.72 (m, 2H), 1.73-1.81 (m, 2H), 1.88-1.98 (m, 1H), 2.10-2.21 (m, 2H), 2.46-2.60 (m, 1H, partially obscured by DMSO), 2.72 (br. d, 1H), 2.79 (br. d, 1H), 3.05 (td, 2H), 3.94 (br. d, 2H), 4.53 (br. d, 2H), 5.82-6.06 (m, 1H), 7.84 (s, 1H), 7.93 (td, 1H), 8.47 (d, 1H), 8.75 (t, 1H). LC-MS (method 5): $R_t$ = 1.51 min; m/z = 472 (M + H)$^+$. |
| 5 | N-[(3,5-difluoropyridin-2-yl)methyl]-2-[3-(trifluoromethyl)[1,4'-bipiperidin]-1'-yl]-1,3-thiazole-5-carboxamide (racemate)<br><br>from 2-bromo-N-[(3,5-difluoropyridin-2-yl)methyl]-1,3-thiazole-5-carboxamide and 3-(trifluoromethyl)-1,4'-bipiperidine dihydrochloride (racemate) | $^1$H-NMR (500 MHz, DMSO-$d_6$, δ/ppm): 1.15-1.27 (m, 1H), 1.38-1.56 (m, 3H), 1.65-1.73 (m, 1H), 1.74-1.82 (m, 2H), 1.82-1.88 (m, 1H), 2.06-2.20 (m, 2H), 2.32-2.44 (m, 1H), 2.57-2.66 (m, 1H), 2.81 (br. d, 1H), 2.96 (br. d, 1H), 3.00-3.10 (m, 2H), 3.95 (br. d, 2H), 4.53 (br. d, 2H), 7.83 (s, 1H), 7.88-7.95 (m, 1H), 8.47 (d, 1H), 8.71 (t, 1H). LC-MS (method 5): $R_t$ = 1.63 min; m/z = 490 (M + H)$^+$. |
| 6 | N-[(3,5-difluoropyridin-2-yl)methyl]-2-[3-(fluoromethyl)[1,4'-bipiperidin]-1'-yl]-1,3-thiazole-5-carboxamide (racemate)<br><br>from 2-bromo-N-[(3,5-difluoropyridin-2-yl)methyl]-1,3-thiazole-5-carboxamide and 3-(difluoromethyl)-1,4'-bipiperidine dihydrochloride (racemate) | $^1$H-NMR (500 MHz, DMSO-$d_6$, δ/ppm): 0.95-1.07 (m, 1H), 1.37-1.54 (m, 3H), 1.61 (br. d, 2H), 1.73-1.91 (m, 3H), 2.02 (t, 1H), 2.15 (t, 1H), 2.47-2.57 (m, 1H, partially obscured by DMSO), 2.68-2.75 (m, 1H), 2.80 (br. d, 1H), 3.01-3.10 (m, 2H). 3.94 (br. d, 2H), 4.21-4.29 (m, 1H),4.31-4.39 (m, 1H), 4.53 (br. d, 2H), 7.83 (s, 1H), 7.88-7.94 (m, 1H), 8.47 (d, 1H), 8.71 (t, 1H). LC-MS (method 5): $R_t$ = 1.48 min; m/z = 454 (M + H)$^+$. |

-continued

| Example | Name/Structure/Starting materials | Analytical data |
|---|---|---|
| 7 | 2-{3-[(3,3-difluorocyclobutyl)methoxy][1,4'-bipiperidin]-1'-yl}-N-[(3,5-difluoropyridin-2-yl)methyl]-1,3-thiazole-5-carboxamide (racemate)<br>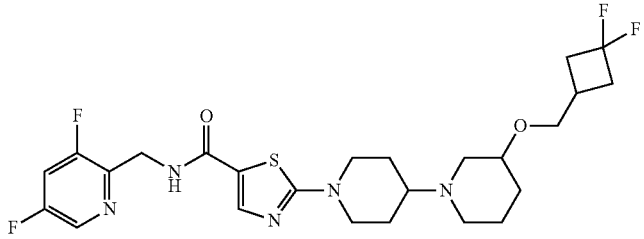 [SMILES: O=C(NCc1ncc(F)cc1F)c1cnc(N2CCC(N3CCCC(OCC4CC(F)(F)C4)C3)CC2)s1]<br>from 2-bromo-N-[(3,5-difluoropyridin-2-yl)methyl]-1,3-thiazole-5-carboxamide and 3-[(3,3-difluorocyclobutyl)methoxy]-1,4'-bipiperidine (racemate) | $^1$H-NMR (500 MHz, DMSO-$d_6$, δ/ppm): 1.02-1.12 (m, 1H), 1.30-1.40 (m, 1H), 1.44-1.54 (m, 2H), 1.60-1.67 (m, 1H), 1.73-1.80 (m, 2H), 1.87-1.93 (m, 1H), 1.98 (br. t, 1H), 2.06-2.14 (m, 1H); 2.24-2.35 (m, 3H), 2.48-2.62 (m, 3H, partially obscured by DMSO), 2.62-2.68 (m, 1H), 2.95 (br. d, 1H), 3.04 (br. t, 2H), 3.24-3.30 (m, 1H), 3.41-3.50 (m, 2H), 3.94 (br. d, 2H), 4.53 (br. d, 2H), 7.83 (s, 1H), 7.88-7.95 (m, 1H), 8.47 (d, 1H), 8.71 (t, 1H).<br>LC-MS (method 1):<br>$R_t$ = 1.11 min; m/z = 542 (M + H)$^+$. |
| 8 | N-[(3,5-difluoropyridin-2-yl)methyl]-4-methyl-2-[(3R)-3-methyl[1,4'-bipiperidin]-1'-yl]-1,3-thiazole-5-carboxamide<br>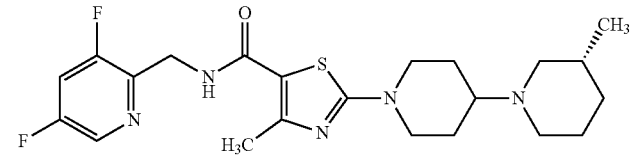<br>from 2-bromo-N-[(3,5-difluoropyridin-2-yl)methyl]-4-methyl-1,3-thiazole-5-carboxamide and (3R)-3-methyl-1,4'-bipiperidine dihydrochloride | $^1$H-NMR (500 MHz, DMSO-$d_6$, δ/ppm): 0.76-0.88 (m, 4H, including at 0.82 (d, 3H)), 1.34-1.67 (m, 6H), 1.71-1.82 (m, 3H), 2.05 (br. t, 1H), 2.38 (s, 3H), 2.44-2.56 (m, 1H, partially obscured by DMSO), 2.70-2.78 (m, 2H), 3.02 (br. t, 2H), 3.90 (br. d, 2H), 4.50 (br. d, 2H), 7.86-7.93 (m, 1H), 8.01 (t, 1H), 8.46 (d, 1H).<br>LC-MS (method 1):<br>$R_t$ = 0.98 min; m/z = 450 (M + H)$^+$. |
| 9 | N-[(3,5-difluoropyridin-2-yl)methyl]-5-methyl-2-[(3R)-3-methyl[1,4'-bipiperidin]-1'-yl]-1,3-thiazole-4-carboxamide<br>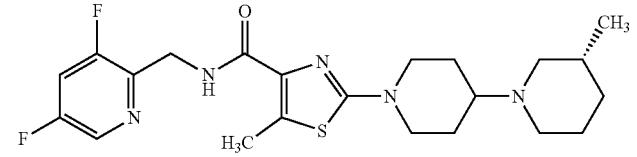 [SMILES: Cc1sc(N2CCC(N3CCC[C@@H](C)C3)CC2)nc1C(=O)NCc1ncc(F)cc1F]<br>from 2-bromo-N-[(3,5-difluoropyridin-2-yl)methyl]-1,3-thiazole-4-carboxamide and (3R)-3-methyl-1,4'-bipiperidine dihydrochloride | $^1$H-NMR (400 MHz, DMSO-$d_6$, δ/ppm): 0.73-0.92 (m, 4H, including at 0.82 (d, 3H)), 1.32-1.68 (m, 6H), 1.70-1.86 (m, 3H), 1.97-2.14 (m, 1H), 2.38 (s, 3H), 2.44-2.58 (m, 1H, partially obscured by DMSO), 2.69-2.82 (m, 2H), 3.03 (br. t, 2H), 3.90 (br. d, 2H), 4.50 (br. d, 2H), 7.86-7.95 (m, 1H), 8.02 (br. t, 1H), 8.46 (d, 1H).<br>LC-MS (method 1):<br>$R_t$ = 0.92 min; m/z = 450 (M + H)$^+$. |
| 10 | N-[(3,5-difluoropyridin-2-yl)methyl]-2-[(3R)-3-methyl[1,4'-bipiperidin]-1'-yl]-1,3-thiazole-4-carboxamide<br>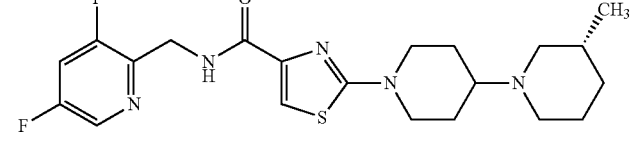<br>from 2-bromo-N-[(3,5-difluoropyridin-2-yl)methyl]-1,3-thiazole-4-carboxamide and (3R)-3-methyl-1,4'-bipiperidine dihydrochloride | $^1$H-NMR (600 MHz, DMSO-$d_6$, δ/ppm): 0.76-0.87 (m, 4H, including at 0.82 (d, 3H)), 1.36-1.45 (m, 1H), 1.46-1.55 (m, 3H), 1.56-1.67 (m, 2H), 1.73-1.84 (m, 3H), 2.06 (br. t, 1H). 2.44-2.56 (m, 1H, partially obscured by DMSO), 2.71-2.80 (m, 2H), 3.02 (td, 2H), 3.97 (br. d, 2H), 4.58 (d, 2H), 7.38 (s, 1H), 7.89-7.95 (m, 1H), 8.46 (d, 1H), 8.48 (t, 1H).<br>LC-MS (method 4):<br>$R_t$ = 0.56 min; m/z = 436 (M + H)$^+$. |
| 11 | N-[(3,5-difluoropyridin-2-yl)methyl]-2-[(3R)-3-methyl[1,4'-bipiperidin]-1-yl]-4-(trifluoromethyl)-1,3-thiazole-5-carboxamide<br>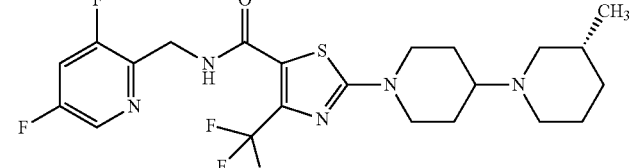<br>from 2-bromo-N-[(3,5-difluoropyridin-2-yl)methyl]-4-(trifluoromethyl)-1,3-thiazole-5-carboxamide and (3R)-3-methyl-1,4'-bipiperidine dihydrochloride | $^1$H-NMR (600 MHz, DMSO-$d_6$, δ/ppm): 0.77-0.86 (m, 4H, including at 0.82 (d, 3H)), 1.34-1.45 (m, 1H), 1.45-1.55 (m, 3H), 1.55-1.66 (m, 2H), 1.75 (t, 1H), 1.80 (br. d, 2H), 2.05 (td, 1H), 2.45-2.56 (m, 1H, partially obscured by DMSO), 2.69-2.79 (m, 2H), 3.09 (td, 2H), 3.88 (br. d, 2H), 4.52 (br. d, 2H), 7.89-7.97 (m, 1H), 8.47 (d, 1H), 8.90 (t, 1H).<br>LC-MS (method 1):<br>$R_t$ = 1.24 min; m/z = 504 (M + H)$^+$. |

| Example | Name/Structure/Starting materials | Analytical data |
|---|---|---|
| 12 | N-[(3,5-difluoropyridin-2-yl)methyl]-5-ethyl-2-[(3R)-3-methyl[1,4'-bipiperidin]-1'-yl]-1,3-thiazole-4-carboxamide<br>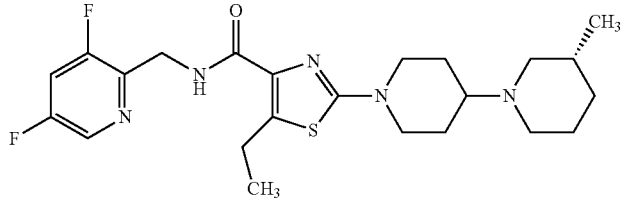 [SMILES: CCc1sc(N2CCC(N3CCC[C@@H](C)C3)CC2)nc1C(=O)NCc1ncc(F)cc1F]<br>from 2-bromo-N-[(3,5-difluoropyridin-2-yl)methyl]-5-ethyl-1,3-thiazole-4-carboxamide and (3R)-3-methyl-1,4'-bipiperidine dihydrochloride | $^1$H-NMR (600 MHz, DMSO-d$_6$, δ/ppm): 0.77-0.87 (m, 4H, including at 0.82 (d, 3H)), 1.13 (t, 3H), 1.35-1.45 (m. 1H), 1.45-1.56 (m, 3H), 1.56-1.67 (m, 2H), 1.71-1.80 (m, 3H), 2.06 (br. t, 1H). 2.42-2.52 (m, 1H, partially obscured by DMSO), 2.75 (br. t, 2H), 2.96 (td, 2H), 3.10 (q, 2H), 3.91 (br. d, 2H), 4.56 (d, 2H), 7.88-7.95 (m, 1H), 8.44 (t, 1H), 8.46 (d, 1H).<br>LC-MS (method 4):<br>R$_t$ = 0.68 min; m/z = 464 (M + H)$^+$. |
| 13 | N-[(3,5-difluoropyridin-2-yl)methyl]-2-[(3R)-3-methyl[1,4'-bipiperidin]-1'-yl]-1,3-oxazole-4-carboxamide<br>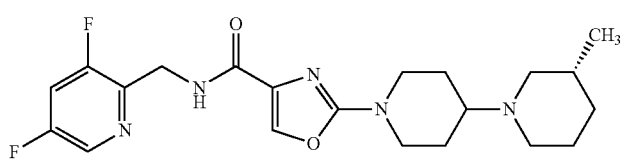 [SMILES: C[C@@H]1CCCN(C2CCN(c3nc(C(=O)NCc4ncc(F)cc4F)co3)CC2)C1]<br>from 2-bromo-N-[(3,5-difluoropyridin-2-yl)methyl]-1,3-oxazole-4-carboxamide and (3R)-3-methyl-1,4'-bipiperidine dihydrochloride | 1H-NMR (600 MHz, DMSO-d$_6$, δ/ppm): 0.76-0.88 (m, 4H, including at 0.82 (d, 3H)), 1.33-1.67 (m, 6H), 1.71-1.82 (m, 3H), 2.01-2.10 (m, 1H), 2.40-2.56 (m, 1H, partially obscured by DMSO), 2.69-2.79 (m, 2H), 2.97 (br. t, 2H), 3.99 (br. d, 2H), 4.56 (d, 2H), 7.89-7.95 (m, 1H), 8.02 (s, 1H), 8.24 (t, 1H), 8.47 (d, 1H).<br>LC-MS (method 4):<br>R$_t$ = 0.52 min; m/z = 420 (M + H)$^+$. |
| 14 | N-[(3,5-difluoropyridin-2-yl)methyl]-5-methyl-2-[(3R)-3-methyl[1,4'-bipiperidin]-1'-yl]-1,3-oxazole-4-carboxamide<br>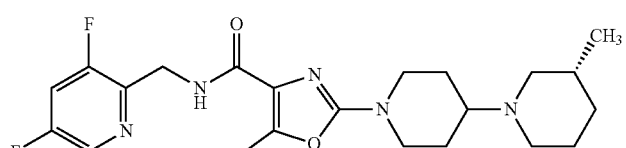<br>from 2-bromo-N-[(3,5-difluoropyridin-2-yl)methyl]-5-methyl-1,3-oxazole-4-carboxamide and (3R)-3-methyl-1,4'-bipiperidine dihydrochloride | $^1$H-NMR (600 MHz, DMSO-d$_6$, δ/ppm): 0.77-0.87 (m, 4H, including at 0.82 (d, 3H)), 1.35-1.67 (m, 6H), 1.76 (br. d, 3H), 2.05 (br. t, 1H), 2.36-2.58 (m, 4H, partially obscured by DMSO, including at 2.50 (br. s, 3H)), 2.70-2.80 (m, 2H), 2.92 (br. t, 2H), 3.94 (br. d, 2H), 4.54 (br. d, 2H), 7.91 (br. t, 1H), 8.09 (br. t, 1H), 8.47 (br. s, 1H).<br>LC-MS (method 4):<br>R$_t$ = 0.57 min; m/z = 434 (M + H)$^+$. |

Example 15

N-[(3,5-difluoropyridin-2-yl)methyl]-2-[(3R)-3-methoxy[1,4'-bipiperidin]-1'-yl]-1,3-thiazole-5-carboxamide

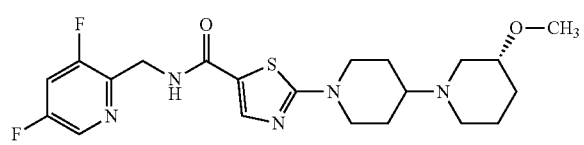

100 mg (0.28 mmol) of N-[(3,5-difluoropyridin-2-yl)methyl]-2-(4-oxopiperidin-1-yl)-1,3-thiazole-5-carboxamide were dissolved in 5 ml of dichloromethane, and 65 mg (0.57 mmol) of (3R)-3-methoxypiperidine and 24 μl (0.43 mmol) of glacial acetic acid were added. 72 mg (0.34 mmol) of sodium acetoxyborohydride were then metered in and stirring of the reaction solution was then continued at room temperature overnight. Subsequently, the reaction mixture was diluted with dichloromethane and washed with sodium hydrogencarbonate solution. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.

Method 8:

Instrument: Waters Prep LC/MS System, column: XBridge C18 5 μm 100×30 mm

Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 63 ml, mobile phase B 0 to 2 min 7 ml, mobile phase A 2 to 10 min from 63 ml to 39 ml and mobile phase B from 7 ml to 31 ml, 10 to 12 min 0 ml of mobile phase A and 70 ml of mobile phase B. Mobile phase C and mobile phase D constant flow rate of 5 ml/min each over the entire running time.

This gave 62 mg (0.14 mmol, 48% of theory) of the target compound as a white lyophylisate.

$^1$H-NMR (600 MHz, DMSO-d$_6$, δ/ppm): 1.00-1.11 (m, 1H), 1.30-1.40 (m, 1H), 1.43-1.54 (m, 2H), 1.59-1.66 (m, 1H), 1.77 (br. d, 2H), 1.86-1.93 (m, 1H), 1.98 (t, 1H), 2.11 (t, 1H), 2.47-2.58 (m, 1H, partially obscured by DMSO), 2.64 (br. d, 1H), 2.94 (br. d, 1H), 3.04 (br. t, 2H), 3.12-3.19

(m, 1H), 3.23 (s, 3H), 3.94 (br. d, 2H), 4.53 (br. d, 2H), 7.83 (s, 1H), 7.91 (td, 1H), 8.47 (d, 1H), 8.71 (t, 1H).

LC-MS (method 1): $R_t$=0.83 min; m/z=452 (M+H)$^+$.

Example 16

2-[3-(Difluoromethoxy)[1,4'-bipiperidin]-1'-yl]-N-[(3,5-difluoropyridin-2-yl)methyl]-1,3-thiazole-5-carboxamide (Racemate)

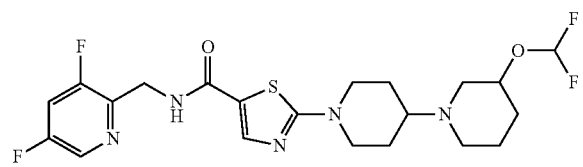 [SMILES: O=C(NCc1ncc(F)cc1F)c1cnc(N2CCC(N3CCCC(OC(F)F)C3)CC2)s1]

100 mg (0.28 mmol) of N-[(3,5-difluoropyridin-2-yl)methyl]-2-(4-oxopiperidin-1-yl)-1,3-thiazole-5-carboxamide were dissolved in 5 ml of dichloromethane, and 86 mg (0.57 mmol) of 3-(difluoromethoxy)piperidine (racemate) and 24 µl (0.43 mmol) of glacial acetic acid were added. 72 mg (0.34 mmol) of sodium acetoxyborohydride were then metered in and stirring of the reaction solution was then continued at room temperature overnight. Subsequently, the reaction mixture was diluted with dichloromethane and washed with sodium hydrogencarbonate solution. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.

Method 9:

Instrument: Waters Prep LC/MS System, column: XBridge C18 5 µm 100×30 mm

Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time.

This gave 60 mg (0.12 mmol, 44% of theory) of the target compound as a white lyophylisate.

$^1$H-NMR (600 MHz, DMSO-d$_6$, δ/ppm): 1.27-1.36 (m, 1H), 1.36-1.53 (m, 3H), 1.62-1.69 (m, 1H), 1.73-1.81 (m, 2H), 1.85-1.93 (m, 1H), 2.13-2.25 (m, 2H), 2.54-2.67 (m, 2H), 2.90 (br. d, 1H), 3.05 (br. t, 2H), 3.94 (br. d, 2H), 4.01-4.08 (m, 1H), 4.53 (d, 2H), 6.57-6.88 (m, 1H), 7.83 (s, 1H), 7.91 (t, 1H), 8.47 (d, 1H), 8.72 (t, 1H).

LC-MS (method 1): $R_t$=0.91 min; m/z=488 (M+H)$^+$.

Example 17

N-[(3,5-Difluoropyridin-2-yl)methyl]-2-(3-ethyl[1,4'-bipiperidin]-1'-yl)-1,3-thiazole-5-carboxamide (Racemate)

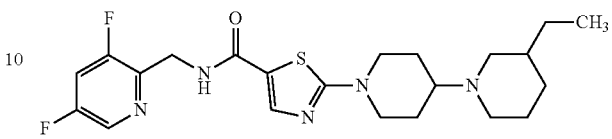

100 mg (0.28 mmol) of N-[(3,5-difluoropyridin-2-yl)methyl]-2-(4-oxopiperidin-1-yl)-1,3-thiazole-5-carboxamide were dissolved in 5 ml of dichloromethane, and 64 mg (0.57 mmol) of 3-ethylpiperidine (racemate) and 24 µl (0.43 mmol) of glacial acetic acid were added. 72 mg (0.34 mmol) of sodium acetoxyborohydride were then metered in and stirring of the reaction solution was then continued at room temperature overnight. Subsequently, the reaction mixture was diluted with dichloromethane and washed with sodium hydrogencarbonate solution. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.

Method 7:

Instrument: Waters Prep LC/MS System, column: XBridge C18 5 µm 100×30 mm

Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time.

This gave 46 mg (0.10 mmol, 36% of theory) of the target compound as a white lyophylisate.

$^1$H-NMR (600 MHz, DMSO-d$_6$, δ/ppm): 0.76-0.87 (m, 4H, including at 0.85 (t, 3H)), 1.09-1.25 (m, 2H), 1.26-1.34 (m, 1H), 1.34-1.43 (m, 1H), 1.44-1.53 (m, 2H), 1.55-1.62 (m, 1H), 1.65-1.71 (m, 1H), 1.73-1.83 (m, 3H), 2.08 (br. t 1H), 2.46-2.56 (m, 1H, partially obscured by DMSO), 2.70-2.79 (m, 2H), 3.04 (br. t, 2H), 3.94 (br. d, 2H), 4.53 (br. d, 2H), 7.82 (s, 1H), 7.89 (br. t, 1H), 8.46 (d, 1H), 8.67 (t, 1H).

LC-MS (method 1): $R_t$=0.99 min; m/z=450 (M+H)$^+$.

Example 18

2-[(3R)-3-Methyl[1,4'-bipiperidin]-1'-yl]-N-{[4-(trifluoromethyl)pyridin-2-yl]methyl}-1,3-thiazole-5-carboxamide

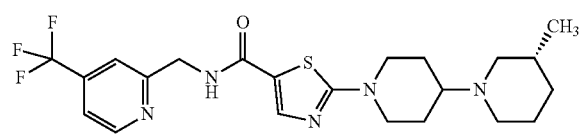 [SMILES: C[C@@H]1CCCN(C2CCN(c3ncc(C(=O)NCc4cc(C(F)(F)F)ccn4)s3)CC2)C1]

0.46 ml (2.62 mmol) of N,N-diisopropylethylamine was added to 200 mg (0.52 mmol) of 2-[(3R)-3-methyl[1,4'-bipiperidin]-1'-yl]-1,3-thiazole-5-carboxylic acid dihydrochloride and 122 mg (0.58 mmol) of 1-[4-(trifluoromethyl)pyridin-2-yl]methanamine hydrochloride (1:1) in 20 ml of acetonitrile, and 0.34 ml (0.58 mmol) of a 50% strength solution of T3P (2,4,6-tripropyl-1,3,5,2,4,6-trioxatriphosphorinane 2,4,6-trioxide) in ethyl acetate was then added dropwise to the reaction solution at room temperature. After the addition had ended, the reaction solution was stirred at room temperature overnight. The reaction mixture was then extracted with water and with dichloromethane. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.

Method 7:

Instrument: Waters Prep LC/MS System, column: XBridge C18 5 μm 100×30 mm

Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time.

This gave 55 mg (0.12 mmol, 23% of theory) of the target compound as a white lyophylisate.

$^1$H-NMR (400 MHz, DMSO-$d_6$, δ/ppm): 0.74-0.89 (m, 4H, including at 0.82 (d, 3H)), 1.34-1.68 (m, 6H), 1.70-1.84 (m, 3H), 1.99-2.11 (m, 1H), 2.44-2.58 (m, 1H, partially obscured by DMSO), 2.69-2.80 (m, 2H), 3.06 (td, 2H), 3.95 (br. d, 2H), 4.59 (d, 2H), 7.62 (s, 1H), 7.67 (d, 1H), 7.87 (s, 1H), 8.81 (d, 1H), 8.89 (t, 1H).

LC-MS (method 1): $R_t$=1.05 min; m/z=469 (M+H)$^+$.

Example 19

2-[(3R)-3-Methyl[1,4'-bipiperidin]-1'-yl]-N-[3-(trifluoromethyl)benzyl]-1,3-thiazole-5-carboxamide

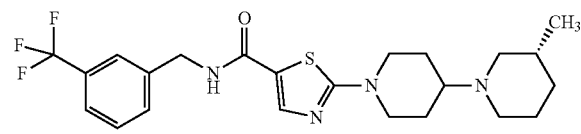

100 mg (0.26 mmol) of 2-[(3R)-3-methyl[1,4'-bipiperidin]-F-yl]-1,3-thiazole-5-carboxylic acid dihydrochloride were dissolved in 10 ml of dichloromethane, 56 mg (0.42 mmol) of 1-chloro-N,N,2-trimethylprop-1-en-1-amine were added and the mixture was stirred at room temperature for 30 min. Subsequently, 60 μl of pyridine and then 46 mg (0.26 mmol) of 1-[3-(trifluoromethyl)phenyl]methanamine were metered into the reaction solution and the mixture was stirred at room temperature overnight. After addition of water, the resulting precipitate was filtered off with suction. The biphasic filtrate obtained was separated off and the resulting organic phase was filtered through hydrophobic filters (pleated filter MN 616 WA 1/4, D=12.5 cm), dried and concentrated to dryness under reduced pressure. The residue obtained was purified using the following method.

Method 11:

Instrument: Abimed Gilson 305; column: Reprosil C18 10 μm, 250 mm×30 mm; mobile phase A: water, mobile phase B: acetonitrile; gradient: 0-3 min 10% B, 3-27 min 10% B→95% B, 27-34.5 min 95% B, 34.5-35.5 min 95% B→10% B, 35.5-36.5 min 10% B; flow rate: 50 ml/min; room temperature; UV detection: 210 nm.

This gave 45 mg (0.10 mmol, 37% of theory) of the target compound.

$^1$H-NMR (600 MHz, DMSO-$d_6$, δ/ppm): 0.78-0.91 (m, 4H, including at 0.83 (d, 3H)), 1.37-1.69 (m, 6H), 1.73-1.94 (m, 3H), 2.05-2.23 (m, 1H), 2.56-2.67 (m, 1H), 2.73-2.90 (m, 2H), 3.06 (br. t, 2H), 3.96 (br. d, 2H), 4.48 (d, 2H), 7.54-7.65 (m, 4H), 7.84 (s, 1H), 8.84 (t, 1H).

LC-MS (method 1): $R_t$=1.31 min; m/z=467 (M+H)$^+$.

Example 20

N-[(3-Fluoropyridin-2-yl)methyl]-2-[(3R)-3-methyl[1,4'-bipiperidin]-1'-yl]-1,3-thiazole-5-carboxamide

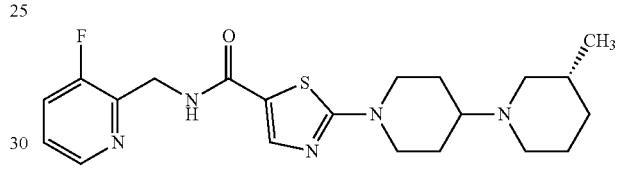

0.18 ml (1.05 mmol) of N,N-diisopropylethylamine was added to 100 mg (0.26 mmol) of 2-[(3R)-3-methyl[1,4'-bipiperidin]-1'-yl]-1,3-thiazole-5-carboxylic acid dihydrochloride and 47 mg (0.29 mmol) of 1-(3-fluoropyridin-2-yl)methanamine hydrochloride (1:1) in 10 ml of acetonitrile, and 0.17 ml (0.29 mmol) of a 50% strength solution of T3P (2,4,6-tripropyl-1,3,5,2,4,6-trioxatriphosphorinane 2,4,6-trioxide) in ethyl acetate was then metered into the reaction solution at room temperature. After the addition had ended, the reaction solution was stirred at room temperature overnight. The reaction mixture was then extracted with water and with dichloromethane. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.

Method 9:

Instrument: Waters Prep LC/MS System, column: XBridge C18 5 μm 100×30 mm

Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time.

This gave 5.4 mg (0.01 mmol, 5% of theory) of the target compound as a white lyophylisate.

$^1$H-NMR (400 MHz, DMSO-$d_6$, δ/ppm): 0.75-0.89 (m, 4H, including at 0.82 (d, 3H)), 1.33-1.68 (m, 6H), 1.71-1.83

(m, 3H), 2.05 (br. t, 1H), 2.44-2.58 (m, 1H, partially obscured by DMSO), 2.69-2.80 (m, 2H), 3.05 (td, 2H), 3.94 (br. d, 2H), 4.56 (dd, 2H), 7.36-7.43 (m, 1H), 7.64-7.72 (m, 1H), 7.84 (s, 1H), 8.38 (dt, 1H), 8.69 (t, 1H).

LC-MS (method 4): $R_t$=0.48 min; m/z=418 (M+H)$^+$.

Example 21

N-(5-Chloro-2-fluorobenzyl)-2-[(3R)-3-methyl[1,4'-bipiperidin]-1'-yl]-1,3-thiazole-5-carboxamide

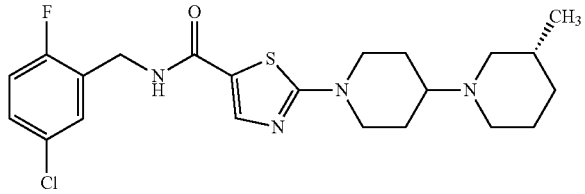 [SMILES: C[C@@H]1CCCN(C2CCN(c3ncc(C(=O)NCc4cc(Cl)ccc4F)s3)CC2)C1]

0.18 ml (1.05 mmol) of N,N-diisopropylethylamine was added to 100 mg (0.26 mmol) of 2-[(3R)-3-methyl[1,4'-bipiperidin]-1'-yl]-1,3-thiazole-5-carboxylic acid dihydrochloride and 46 mg (0.29 mmol) of 1-(5-chloro-2-fluorophenyl)methanamine in 10 ml of acetonitrile, and 0.17 ml (0.29 mmol) of a 50% strength solution of T3P (2,4,6-tripropyl-1,3,5,2,4,6-trioxatriphosphorinane 2,4,6-trioxide) in ethyl acetate was then metered into the reaction solution at room temperature. After the addition had ended, the reaction solution was stirred at room temperature overnight. The reaction mixture was then extracted with water and with dichloromethane. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.
Method 7:
Instrument: Waters Prep LC/MS System, column: XBridge C18 5 μm 100×30 mm Mobile phase A: water, mobile phase B: acetonitrile, mobile phase C: 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time.

This gave 45 mg of a mixture which was purified further by column chromatography on silica gel (Isolera Biotage SNAP-Ultra 10 g column; mobile phase: cyclohexane/ethyl acetate 8:2→gradient over 15 CV (CV=column volumes)→ cyclohexane/ethyl acetate 2:8). This gave 16 mg (0.04 mmol, 14% of theory) of the target compound as a beige solid.

$^1$H-NMR (600 MHz, DMSO-d$_6$, δ/ppm): 0.76-0.87 (m, 4H, including at 0.82 (d, 3H)), 1.35-1.67 (m, 6H), 1.72-1.82 (m, 3H), 2.05 (br. t, 1H), 2.45-2.57 (m, 1H, partially obscured by DMSO), 2.74 (br. t, 2H), 3.05 (td, 2H), 3.94 (br. d, 2H), 4.41 (d, 2H), 7.26 (t, 1H), 7.33-7.40 (m, 2H), 7.85 (s, 1H), 8.76 (t, 1H).

LC-MS (method 4): $R_t$=0.68 min; m/z=451/453 (M+H)$^+$.

Example 22

2-[(3R)-3-Methyl[1,4'-bipiperidin]-1'-yl]-N-[4-(trifluoromethyl)benzyl]-1,3-thiazole-5-carboxamide

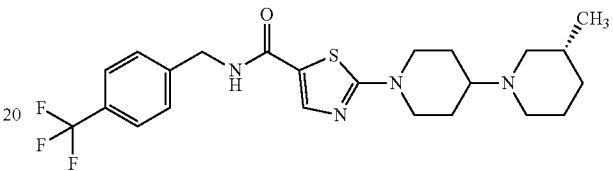

0.22 ml (1.23 mmol) of N,N-diisopropylethylamine was added to 200 mg (0.31 mmol, purity 59%) of 2-[(3R)-3-methyl[1,4'-bipiperidin]-1'-yl]-1,3-thiazole-5-carboxylic acid dihydrochloride and 59 mg (0.34 mmol) of 1-[4-(trifluoromethyl)phenyl]methanamine in 10 ml of acetonitrile, and 0.2 ml (0.34 mmol) of a 50% strength solution of T3P (2,4,6-tripropyl-1,3,5,2,4,6-trioxatriphosphorinane 2,4, 6-trioxide) in ethyl acetate was then metered into the reaction solution at room temperature. After the addition had ended, the reaction solution was stirred at room temperature overnight. The reaction mixture was then extracted with water and with dichloromethane. The organic phase was finally separated off and the organic solution obtained was then filtered through hydrophobic filters (pleated filter MN 616 WA 1/4, D=12.5 cm), dried and concentrated to dryness under reduced pressure. The residue obtained was purified using the following method.
Method 10:
Instrument: Waters Prep LC/MS System, column: XBridge C18 5 μm 100×30 mm Mobile phase A: water, mobile phase B: acetonitrile, mobile phase C 2% ammonia in water, mobile phase D: acetonitrile/water (80% by volume/20% by volume) total flow rate: 80 ml/min, room temperature, wavelength 200-400 nm, At-Column Injection (complete injection)

Gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time.

This gave 25 mg (0.05 mmol, 17% of theory) of the target compound as a white lyophylisate.

$^1$H-NMR (400 MHz, DMSO-d$_6$, δ/ppm): 0.74-0.89 (m, 4H, including at 0.82 (d, 3H)), 1.33-1.68 (m, 6H), 1.71-1.83 (m, 3H), 2.00-2.10 (m, 1H), 2.45-2.57 (m, 1H, partially obscured by DMSO), 2.70-2.79 (m, 2H), 3.06 (td, 2H), 3.94 (br. d, 2H), 4.47 (d, 2H), 7.50 (d, 2H), 7.70 (d, 2H), 7.84 (s, 1H), 8.83 (t, 1H).

LC-MS (method 1): $R_t$=1.27 min; m/z=467 (M+H)$^+$.

Analogously to Examples 18 to 22, the following compounds of Examples 23 to 37 were prepared from the starting materials stated in each case:

| Example | Name/Structure/Starting material | Analytical data |
|---|---|---|
| 23 | N-[(5-chloro-3-fluoropyridin-2-yl)methyl]-2-[(3R)-3-methyl[1,4'-bipiperidin]-1'-yl]-1,3-thiazole-5-carboxamide<br/>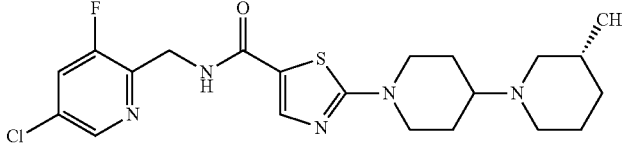<br/>from 2-[(3R)-3-methyl[1,4'-bipiperidin]-1'-yl]-1,3-thiazole-5-carboxylic acid dihydrochloride and 1-(5-chloro-3-fluoropyridin-2-yl)methanamine hydrochloride (1:1) | $^1$H-NMR (400 MHz, DMSO-$d_6$, δ/ppm): 0.74-0.88 (m, 4H, including at 0.82 (d, 3H)), 1.32-1.67 (m, 6H), 1.71-1.82 (m, 3H), 2.00-2.10 (m, 1H), 2.44-2.58 (m, 1H, partially obscured by DMSO), 2.69-2.79 (m, 2H), 3.04 (td, 2H), 3.93 (br. d, 2H), 4.53 (dd, 2H), 7.83 (s, 1H), 8.06 (dd, 1H), 8.48 (d, 1H), 8.73 (t, 1H).<br/>LC-MS (method 1):<br/>$R_t$ = 1.04 min; m/z = 452/454 (M + H)$^+$. |
| 24 | 2-[(3R)-3-methyl[1,4'-bipiperidin]-1'-yl]-N-[(3-methylpyridin-2-yl)methyl]-1,3-thiazole-5-carboxamide<br/>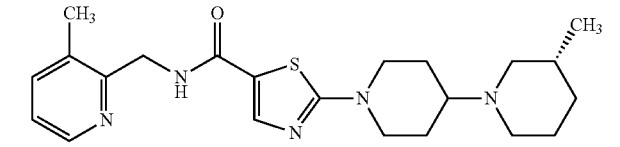 [SMILES: Cc1cccnc1CNC(=O)c1cnc(N2CCC(N3CCC[C@@H](C)C3)CC2)s1]<br/>from 2-[(3R)-3-methyl[1,[4'-bipiperidin]-1'-yl]-1,3-thiazole-5-carboxylic acid dihydrochloride and 1-(3-methylpyridin-2-yl)methanamine | $^1$H-NMR (400 MHz, DMSO-$d_6$, δ/ppm): 0.75-0.88 (m, 4H, including at 0.82 (d, 3H)), 1.33-1.68 (m, 6H), 1.70-1.83 (m, 3H), 2.00-2.11 (m, 1H), 2.31 (s, 3H), 2.43-2.58 (m, 1H, partially obscured by DMSO), 2.69-2.80 (m, 2H), 3.04 (td, 2H), 3.94 (br. d, 2H), 4.50 (d, 2H), 7.21 (dd, 1H), 7.57 (dd, 1H), 7.86 (s, 1H), 8.35 (dd, 1H), 8.54 (t, 1H).<br/>LC-MS (method 1):<br/>$R_t$ = 0.66 min; m/z = 414 (M + H)$^+$. |
| 25 | 2-[(3R)-3-methyl[1,4'-bipiperidin]-1'-yl]-N-[(4-methylpyridin-2-yl)methyl]-1,3-thiazole-5-carboxamide<br/>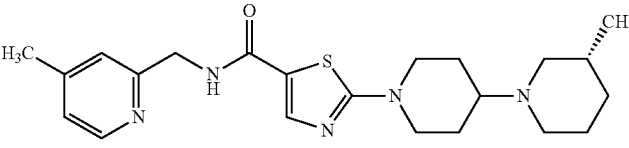<br/>from 2-[(3R)-3-methyl[1,[4'-bipiperidin]-1'-yl]-1,3-thiazole-5-carboxylic acid dihydrochloride and 1-(4-methylpyridin-2-yl)methanamine | $^1$H-NMR (600 MHz, DMSO-$d_6$, δ/ppm): 0.77-0.86 (m, 4H, including at 0.82 (d, 3H)), 1.35-1.67 (m, 6H), 1.71-1.81 (m, 3H), 2.05 (br. t, 1H), 2.29 (s, 3H), 2.46-2.53 (m, 1H, partially obscured by DMSO), 2.74 (br. t, 2H), 3.05 (td, 2H), 3.95 (br. d, 2H), 4.44 (d, 2H), 7.09 (d, 1H), 7.11 (s, 1H), 7.86 (s, 1H), 8.35 (d, 1H), 8.78 (t, 1H).<br/>LC-MS (method 1):<br/>$R_t$ = 0.63 min; m/z = 414 (M + H)$^+$. |
| 26 | N-[(3-chloropyridin-2-yl)methyl]-2-[(3R)-3-methyl[1,4'-bipiperidin]-1'-yl]-1,3-thiazole-5-carboxamide<br/>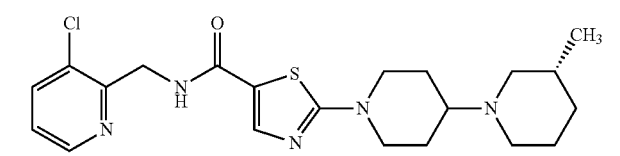 [SMILES: C[C@@H]1CCCN(C2CCN(c3ncc(C(=O)NCc4ncccc4Cl)s3)CC2)C1]<br/>from 2-[(3R)-3-methyl[1,[4'-bipiperidin]-1'-yl]-1,3-thiazole-5-carboxylic acid dihydrochloride and 1-(3-chloropyridin-2-yl)methanamine hydrochloride (1:1) | $^1$H-NMR (400 MHz, DMSO-$d_6$, δ/ppm): 0.75-0.88 (m, 4H, including at 0.82 (d, 3H)), 1.33-1.68 (m, 6H), 1.71-1.83 (m, 3H), 2.05 (br. t, 1H), 2.44-2.57 (m, 1H, partially obscured by DMSO), 2.69-2.80 (m, 2H), 3.05 (br. t, 2H), 3.94 (br. d, 2H), 4.60 (d, 2H), 7.36 (dd, 1H), 7.86 (s, 1H), 7.92 (dd, 1H), 8.50 (dd, 1H), 8.64 (t, 1H).<br/>LC-MS (method 1):<br/>$R_t$ = 0.93 min; m/z = 434/436 (M + H)$^+$. |
| 27 | N-[(3-fluoropyridin-2-yl)methyl]-N-methyl-2-[(3R)-3-methyl[1,4'-bipiperidin]-1'-yl]-1,3-thiazole-5-carboxamide<br/>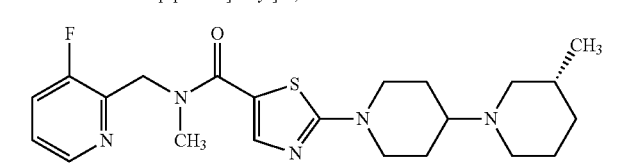<br/>from 2-[(3R)-3-methyl[1,[4'-bipiperidin]-1'-yl]-1,3-thiazole-5-carboxylic acid dihydrochloride and (3-fluoropyridin-2-yl)-N-methylmethanamine | $^1$H-NMR (400 MHz, DMSO-$d_6$, δ/ppm): 0.74-0.88 (m, 4H, including at 0.82 (d, 3H)), 1.32-1.67 (m, 6H), 1.70-1.83 (m, 3H), 2.05 (br. t, 1H), 2.43-2.58 (m, 1H, partially obscured by DMSO), 2.69-2.79 (m, 2H), 3.04 (td, 2H), 3.16 (br. s, 3H), 3.94 (br. d, 2H), 4.86 (s, 2H), 7.38-7.46 (m, 1H), 7.59 (s, 1H), 7.68-7.77 (m, 1H), 8.37-8.45 (m, 1H).<br/>LC-MS (method 1):<br/>$R_t$ = 0.91 min; m/z = 432 (M + H)$^+$. |

-continued

| Example | Name/Structure/Starting material | Analytical data |
|---|---|---|
| 28 | 2-[(3R)-3-methyl[1,[4'-bipiperidin]-1'-yl]-N-{[6-(trifluoromethyl)pyridin-2-yl]methyl}-1,3-thiazole-5-carboxamide<br><br>from 2-[(3R)-3-methyl[[1,[4'-bipiperidin]-1'-yl]-1,3-thiazole-5-carboxylic acid dihydrochloride and 1-[6-(trifluoromethyl)pyridin-2-yl]methanamine hydrochloride (1:1) | $^1$H-NMR (400 MHz, DMSO-$d_6$, δ/ppm): 0.75-0.88 (m, 4H, including at 0.82 (d, 3H)), 1.33-1.68 (m, 6H), 1.71-1.83 (m, 3H), 2.05 (br. t, 1H), 2.45-2.58 (m, 1H, partially obscured by DMSO), 2.69-2.79 (m, 2H), 3.06 (td, 2H), 3.95 (br. d, 2H), 4.54 (d, 2H), 7.61 (d, 1H), 7.79 (d, 1H), 7.87 (s, 1H), 8.07 (t, 1H), 8.95 (t, 1H).<br>LC-MS (method 1):<br>$R_t$ = 1.09 min; m/z = 468 (M + H)$^+$. |
| 29 | N-[(5-chloropyridin-2-yl)methyl]-2-[(3R)-3-methyl[1,4'-bipiperidin]-1'-yl]-1,3-thiazole-5-carboxamide<br>from 2-[(3R)-3-methyl[1,[4'-bipiperidin]-1'-yl]-1,3-thiazole-5-carboxylic acid dihydrochloride and 1-(5-chloropyridin-2-yl)methanamine | LC-MS (method 1):<br>$R_t$ = 0.91 min; m/z = 434/436 (M + H)$^+$. |
| 30 | N-[1-(2,5-difluorophenyl)ethyl]-2-[(3R)-3-methyl[1,4'-bipiperidin]-1-yl]-1,3-thiazole-5-carboxamide (diastereomer mixture)<br><br>from 2-[(3R)-3-methyl[1,4'-bipiperidin]-1'-yl]-1,3-thiazole-5-carboxylic acid dihydrochloride and 1-(2,5-difluorophenyl)ethanamine (racemate) | $^1$H-NMR (600 MHz, DMSO-$d_6$, δ/ppm): 0.76-0.86 (m, 4H, including at 0.82 (d, 3H)), 1.32-1.66 (m, 9H, including at 1.42 (d, 3H)), 1.71-1.81 (m, 3H), 2.05 (td, 1H), 2.46-2.56 (m, 1H, partially obscured by DMSO), 2.73 (br. t, 2H), 3.01-3.09 (m, 2H), 3.90-3.99 (m, 2H), 5.22-5.29 (m, 1H), 7.09-7.16 (m, 1H), 7.19-7.26 (m, 2H), 7.92 (s, 1H), 8.55 (d, 1H).<br>LC-MS (method 1):<br>$R_t$ = 1.22 min; m/z = 449 (M + H)$^+$. |
| 31 | N-[(3-chloro-5-fluoropyridin-2-yl)methyl]-2-[(3R)-3-methyl[1,4'-bipiperidin]-1'-yl]-1,3-thiazole-5-carboxamide<br>from 2-[(3R)-3-methyl[1,4'-bipiperidin]-1'-yl]-1,3-thiazole-5-carboxylic acid dihydrochloride and 1-(3-chloro-5-fluoropyridin-2-yl)methanamine hydrochloride (1:1) | $^1$H-NMR (400 MHz, DMSO-$d_6$, δ/ppm): 0.75-0.88 (m, 4H, including at 0.82 (d, 3H)), 1.33-1.68 (m, 6H), 1.71-1.83 (m, 3H), 2.06 (br. t, 1H), 2.44-2.57 (m, 1H, partially obscured by DMSO), 2.69-2.80 (m, 2H), 3.05 (br. t, 2H), 3.94 (br. d, 2H), 4.57 (d, 2H), 7.85 (s, 1H), 8.09 (dd, 1H), 8.57 (d, 1H), 8.66 (t, 1H).<br>LC-MS (method 1):<br>$R_t$ = 1.02 min; m/z = 452/454 (M + H)$^+$. |
| 32 | 2-[(3R)-3-methyl[1,[4'-bipiperidin]-1'-yl]-N-{[6-(trifluoromethyl)pyridin-2-yl]methyl}-1,3-thiazole-5-carboxamide<br>from 2-[(3R)-3-methyl[1,[4'-bipiperidin]-1'-yl]-1,3-thiazole-5-carboxylic acid dihydrochloride and 1-[6-(trifluoromethoxy)pyridin-2-yl]methanamine | $^1$H-NMR (400 MHz, DMSO-$d_6$, δ/ppm): 0.75-0.89 (m, 4H, including at 0.82 (d, 3H)), 1.33-1.68 (m, 6H), 1.71-1.83 (m, 3H), 2.05 (br. t, 1H), 2.43-2.57 (m, 1H, partially obscured by DMSO), 2.69-2.79 (m, 2H), 3.06 (br. t, 2H), 3.95 (br. d, 2H), 4.44 (d, 2H), 7.16 (d, 1H), 7.33 (d, 1H), 7.86 (s, 1H), 7.99 (t, 1H), 8.87 (t, 1H).<br>LC-MS (method 4):<br>$R_t$ = 0.65 min; m/z = 484 (M + H)$^+$. |

-continued

| Example | Name/Structure/Starting material | Analytical data |
|---|---|---|
| 33 | N-(4-chlorobenzyl)-2-[(3R)-3-methyl[1,4'-bipiperidin]-1'-yl]-1,3-thiazole-5-carboxamide<br>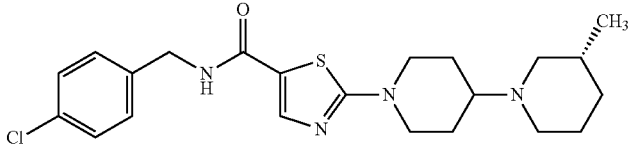 [SMILES: C[C@@H]1CCCN(C2CCN(c3ncc(C(=O)NCc4ccc(Cl)cc4)s3)CC2)C1]<br>from 2-[(3R)-3-methyl[1,4'-bipiperidin]-1'-yl]-1,3-thiazole-5-carboxylic acid dihydrochloride and 1-(4-chlorophenyl)methanamine | $^1$H-NMR (400 MHz, DMSO-$d_6$, δ/ppm): 0.75-0.88 (m, 4H, including at 0.82 (d, 3H), 1.33-1.68 (m, 6H), 1.71-1.83 (m, 3H), 2.00-2.10 (m, 1H), 2.44-2.57 (m, 1H, partially obscured by DMSO), 2.69-2.79 (m, 2H), 3.05 (br. td, 2H), 3.94 (br. d, 2H), 4.37 (d, 2H), 7.27-7.33 (m, 2H), 7.35-7.42 (m, 2H), 7.82 (s, 1H), 8.75 (t, 1H). LC-MS (method 1): $R_t$ = 1.18 min; m/z = 433/435 (M + H)$^+$. |
| 34 | N-(2-chloro-5-fluorobenzyl)-2-[(3R)-3-methyl[1,4'-bipiperidin]-1'-yl]-1,3-thiazole-5-carboxamide<br>from 2-[(3R)-3-methyl[1,4'-bipiperidin]-1'-yl]-1,3-thiazole-5-carboxylic acid dihydrochloride and 1-(2-chloro-5-fluorophenyl)methanamine | $^1$H-NMR (600 MHz, DMSO-$d_6$, δ/ppm): 0.76-0.87 (m, 4H, including at 0.82 (d, 3H)), 1.35-1.67 (m, 6H), 1.72-1.83 (m, 3H), 2.05 (td, 1H), 2.46-2.57 (m, 1H, partially obscured by DMSO), 2.74 (br. t, 2H), 3.06 (td, 2H), 3.96 (br. d, 2H), 4.44 (d, 2H), 7.13 (dd, 1H), 7.18 (td, 1H), 7.51 (dd, 1H), 7.88 (s, 1H), 8.77 (t, 1H). LC-MS (method 1): $R_t$ = 1.23 min; m/z = 451/453 (M + H)$^+$. |
| 35 | N-(4-methylbenzyl)-2-[(3R)-3-methyl[1,4'-bipiperidin]-1'-yl]-1,3-thiazole-5-carboxamide<br>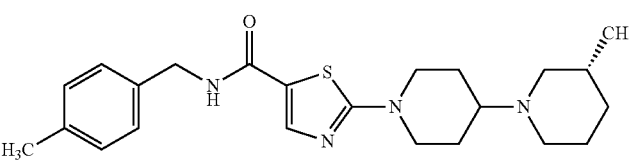<br>from 2-[(3R)-3-methyl[1,4'-bipiperidin]-1'-yl]-1,3-thiazole-5-carboxylic acid dihydrochloride and 1-(4-methylphenyl)methanamine | $^1$H-NMR (600 MHz, DMSO-$d_6$, δ/ppm): 0.76-0.87 (m, 4H, including at 0.82 (d, 3H)), 1.34-1.66 (m, 6H), 1.71-1.81 (m, 3H), 2.05 (br. t, 1H), 2.27 (s, 3H), 2.45-2.56 (m, 1H. partially obscured by DMSO), 2.73 (br. t, 2H), 3.04 (td, 2H), 3.94 (br. d, 2H), 4.34 (d, 2H), 7.15 (q, 4H), 7.81 (s, 1H), 8.68 (t, 1H). LC-MS (method 1): $R_t$ = 1.19 min; m/z = 413 (M + H)$^+$. |
| 36 | N-(3-methylbenzyl)-2-[(3R)-3-methyl[1,4'-bipiperidin]-1'-yl]-1,3-thiazole-5-carboxamide<br>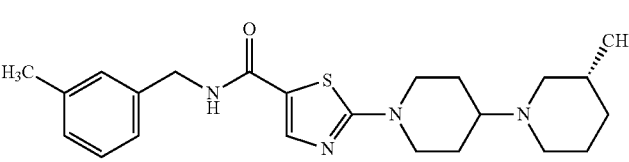<br>from 2-[(3R)-3-methyl[1,4'-bipiperidin]-1'-yl]-1,3-thiazole-5-carboxylic acid dihydrochloride and 1-(3-methylphenyl)methanamine | $^1$H-NMR (600 MHz, DMSO-$d_6$, δ/ppm): 0.76-0.87 (m, 4H, including at 0.82 (d, 3H), 1.35-1.67 (m, 6H), 1.71-1.81 (m, 3H), 2.05 (br. t, 1H), 3.02 (s, 3H), 2.45-2.56 (m, 1H, partially obscured by DMSO), 2.74 (br. t, 2H), 3.04 (td, 2H), 3.94 (br. d, 2H), 4.35 (d, 2H), 7.03-7.11 (m, 3H), 7.20 (t, 1H), 7.82 (s, 1H), 8.69 (t, 1H). LC-MS (method 1): $R_t$ = 1.19 min; m/z = 413 (M + H)$^+$. |
| 37 | N-(2-methylbenzyl)-2-[(3R)-3-methyl[1,4'-bipiperidin]-1'-yl]-1,3-thiazole-5-carboxamide<br>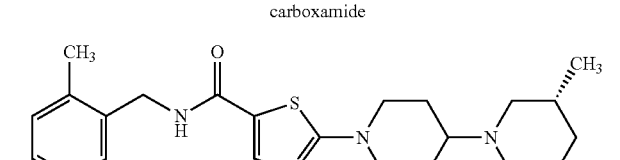<br>from 2-[(3R)-3-methyl[1,4'-bipiperidin]-1'-yl]-1,3-thiazole-5-carboxylic acid dihydrochloride and 1-(2-methylphenyl)methanamine | $^1$H-NMR (600 MHz, DMSO-$d_6$, δ/ppm): 0.77-0.86 (m, 4H, including at 0.82 (d, 3H), 1.35-1.66 (m, 6H), 1.72-1.81 (m, 3H), 2.05 (br. t, 1H), 3.05 (s, 3H), 2.46-2.55 (m, 1H, partially obscured by DMSO), 2.74 (br. t, 2H), 3.04 (td, 2H), 3.94 (br. d, 2H), 4.37 (d, 2H), 7.13-7.18 (m, 3H), 7.19-7.24 (m, 1H), 7.85 (s, 1H), 8.58 (t, 1H). LC-MS (method 1): $R_t$ = 1.16 min; m/z = 413 (M + H)$^+$. |

Example 38 and Example 39

2-[3-(Difluoromethyl)[1,4'-bipiperidin]-1'-yl]-N-[(3,5-difluoropyridin-2-yl)methyl]-1,3-thiazole-5-carboxamide (Enantiomers 1 and 2)

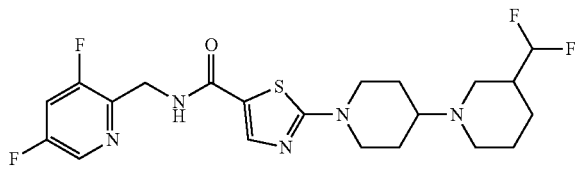 [SMILES: O=C(NCc1ncc(F)cc1F)c1cnc(N2CCC(N3CCCC(C(F)F)C3)CC2)s1]

203 mg (0.43 mmol) of the racemic 2-[3-(difluoromethyl)[1,4'-bipiperidin]-1'-yl]-N-[(3,5-difluoropyridin-2-yl)methyl]-1,3-thiazole-5-carboxamide (Example 4) were separated into the enantiomers by preparative HPLC on a chiral phase [column: Daicel Chiralpak AY-H, 5 µm, 250 mm×20 mm; mobile phase: 2-propanol+0.2% diethylamine/n-heptane 50:50; flow rate: 20 ml/min; UV detection: 220 nm; temperature: 40° C.]:

Example 38 (Enantiomer 1)

2-[(3S)-3-(Difluoromethyl)[1,4'-bipiperidin]-1'-yl]-N-[(3,5-difluoropyridin-2-yl)methyl]-1,3-thiazole-5-carboxamide

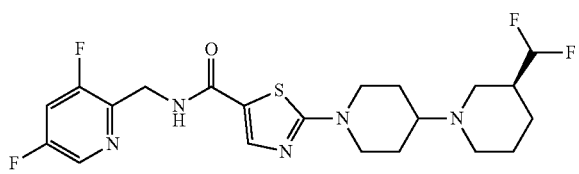 [SMILES: O=C(NCc1ncc(F)cc1F)c1cnc(N2CCC(N3CCC[C@H](C(F)F)C3)CC2)s1]

yield: 97 mg
$R_t$=4.93 min; chemical purity >99%; >99% ee
[column: Chiraltek AY-3, 3 µm, 100 mm×4.6 mm; mobile phase: isohexane/2-propanol+0.2% diethylamine 20:80; flow rate: 1 ml/min; temperature: 25° C.; UV detection: 220 nm].
LC-MS (method 5): $R_t$=1.52 min; m/z=472 (M+H)$^+$.

Example 39 (Enantiomer 2)

2-[(3R)-3-(Difluoromethyl)[1,4'-bipiperidin]-1'-yl]-N-[(3,5-difluoropyridin-2-yl)methyl]-1,3-thiazole-5-carboxamide

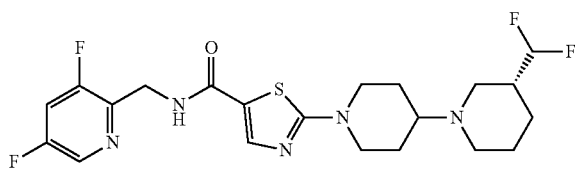 [SMILES: O=C(NCc1ncc(F)cc1F)c1cnc(N2CCC(N3CCC[C@@H](C(F)F)C3)CC2)s1]

yield: 101 mg
$R_t$=6.03 min; chemical purity >96%; >94% ee
[column: Chiraltek AY-3, 3 µm, 100 mm×4.6 mm; mobile phase: isohexane/2-propanol+0.2% diethylamine 20:80; flow rate: 1 ml/min; temperature: 25° C.; UV detection: 220 nm].
LC-MS (method 5): $R_t$=1.52 min; m/z=472 (M+H)$^+$.

$^1$H-NMR (600 MHz, DMSO-d$_6$, δ/ppm): 1.11-1.22 (m, 1H), 1.37-1.54 (m, 3H), 1.62-1.72 (m, 2H), 1.73-1.81 (m, 2H), 1.88-1.99 (m, 1H), 2.10-2.21 (m, 2H), 2.47-2.60 (m, 1H, partially obscured by DMSO), 2.72 (br. d, 1H), 2.79 (br. d, 1H), 3.05 (br. t, 2H), 3.94 (br. d, 2H), 4.53 (br. d, 2H), 5.82-6.06 (m, 1H), 7.84 (s, 1H), 7.93 (td, 1H), 8.47 (d, 1H), 8.75 (t, 1H).

Example 40 and Example 41

N-[(3,5-difluoropyridin-2-yl)methyl]-2-[3-(fluoromethyl)[1,4'-bipiperidin]-1'-yl]-1,3-thiazole-5-carboxamide (Enantiomers 1 and 2)

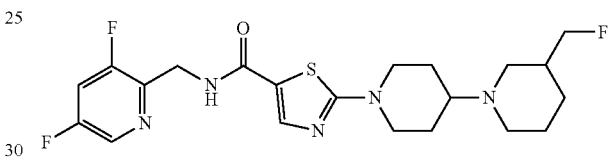

144 mg (0.32 mmol) of the racemic N-[(3,5-difluoropyridin-2-yl)methyl]-2-[3-(fluoromethyl)[1,4'-bipiperidin]-1'-yl]-1,3-thiazole-5-carboxamide (Example 6) were separated into the enantiomers by preparative HPLC on a chiral phase [column: Daicel Chiralpak IG, 5 µm, 250 mm×20 mm; mobile phase: ethanol; flow rate: 15 ml/min; UV detection: 220 nm; temperature: 70° C.]:

Example 40 (Enantiomer 1)

N-[(3,5-Difluoropyridin-2-yl)methyl]-2-[(3S)-3-(fluoromethyl)[1,4'-bipiperidin]-1'-yl]-1,3-thiazole-5-carboxamide

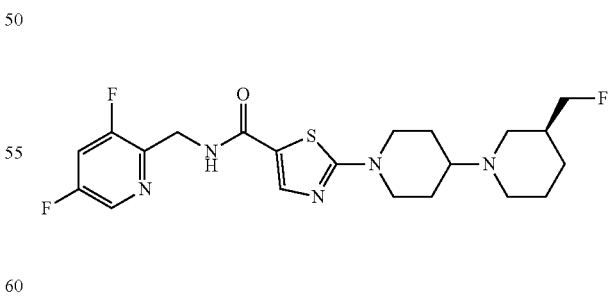

yield: 71 mg $R_t$=10.94 min; chemical purity 99%; 99% ee
[column: Daicel Chiralcel IG, 5 µm, 250 mm×4.6 mm; mobile phase: ethanol+0.2% diethylamine; flow rate: 1 ml/min; temperature: 40° C.; UV detection: 235 nm].
LC-MS (method 1): $R_t$=0.85 min; m/z=454 (M+H)$^+$.

Example 41 (Enantiomer 2)

N-[(3,5-Difluoropyridin-2-yl)methyl]-2-[(3R)-3-(fluoromethyl)[1,4'-bipiperidin]-1'-yl]-1,3-thiazole-5-carboxamide

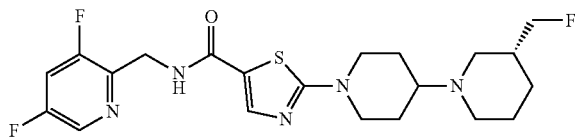 [SMILES: O=C(NCc1ncc(F)cc1F)c1cnc(N2CCC(N3CCCC(CF)C3)CC2)s1]

yield: 70 mg $R_t$=12.21 min; chemical purity 99%; 99% ee

[column: Daicel Chiralcel IG, 5 μm, 250 mm×4.6 mm; mobile phase: ethanol+0.2% diethylamine; flow rate: 1 ml/min; temperature: 40° C.; UV detection: 235 nm].

LC-MS (method 1): $R_t$=0.84 min; m/z=454 (M+H)$^+$.

$^1$H-NMR (400 MHz, DMSO-d$_6$, δ/ppm): 0.94-1.10 (m, 1H), 1.35-1.55 (m, 3H), 1.61 (br. d, 2H), 1.72-1.92 (m, 3H), 2.03 (t, 1H), 2.16 (br. t, 1H), 2.47-2.57 (m, 1H, partially obscured by DMSO), 2.65-2.76 (m, 1H), 2.80 (br. d, 1H), 3.05 (br. t, 2H), 3.94 (br. d, 2H), 4.19-4.29 (m, 1H), 4.31-4.41 (m, 1H), 4.53 (br. d, 2H), 7.83 (s, 1H), 7.87-7.96 (m, 1H), 8.47 (d, 1H), 8.71 (t, 1H).

Example 42 and Example 43

N-[(3,5-Difluoropyridin-2-yl)methyl]-2-[3-(trifluoromethyl)[1,4'-bipiperidin]-1'-yl]-1,3-thiazole-5-carboxamide (Enantiomers 1 and 2)

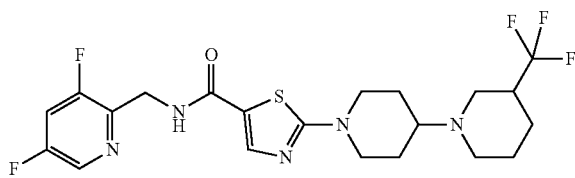 [SMILES: O=C(NCc1ncc(F)cc1F)c1cnc(N2CCC(N3CCCC(C(F)(F)F)C3)CC2)s1]

143 mg (0.29 mmol) of N-[(3,5-difluoropyridin-2-yl)methyl]-2-[3-(trifluoromethyl)[1,4'-bipiperidin]-1'-yl]-1,3-thiazole-5-carboxamide (Example 5) were separated into the enantiomers by preparative HPLC on a chiral phase [column: Daicel Chiralpak IG, 5 μm, 250 mm×20 mm; mobile phase: ethanol; flow rate: 15 ml/min; UV detection: 220 nm; temperature: 40° C.]:

Example 42 (Enantiomer 1)

N-[(3,5-Difluoropyridin-2-yl)methyl]-2-[(3S)-3-(trifluoromethyl)[1,4'-bipiperidin]-1'-yl]-1,3-thiazole-5-carboxamide

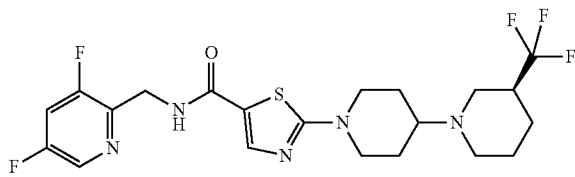 [SMILES: O=C(NCc1ncc(F)cc1F)c1cnc(N2CCC(N3CCC[C@H](C(F)(F)F)C3)CC2)s1]

yield: 67 mg $R_t$=11.22 min; chemical purity 99%; 99% ee

[column: Daicel Chiralcel IG, 5 μm, 250 mm×4.6 mm; mobile phase: ethanol+0.2% diethylamine; flow rate: 1 ml/min; temperature: 50° C.; UV detection: 235 nm].

LC-MS (method 1): $R_t$=0.97 min; m/z=490 (M+H)$^+$.

Example 43 (Enantiomer 2)

N-[(3,5-Difluoropyridin-2-yl)methyl]-2-[(3R)-3-(trifluoromethyl)[1,4'-bipiperidin]-1'-yl]-1,3-thiazole-5-carboxamide

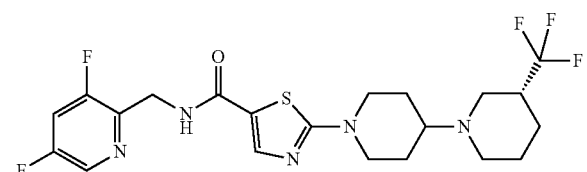

yield: 67 mg $R_t$=11.87 min; chemical purity 99%; >96% ee

[column: Daicel Chiralcel IG, 5 μm, 250 mm×4.6 mm; mobile phase: ethanol+0.2% diethylamine; flow rate: 1 ml/min; temperature: 50° C.; UV detection: 235 nm].

LC-MS (method 1): $R_t$=0.96 min; m/z=490 (M+H)$^+$.

$^1$H-NMR (500 MHz, DMSO-d$_6$, δ/ppm): 1.14-1.27 (m, 1H), 1.39-1.57 (m, 3H), 1.65-1.73 (m, 1H), 1.74-1.82 (m, 2H), 1.82-1.88 (m, 1H), 2.06-2.20 (m, 2H), 2.32-2.44 (m, 1H), 2.61 (br. t, 1H), 2.81 (br. d, 1H), 2.96 (br. d, 1H), 3.05 (td, 2H), 3.95 (br. d, 2H), 4.53 (br. d, 2H), 7.83 (s, 1H), 7.88-7.94 (m, 1H), 8.47 (d, 1H), 8.71 (t, 1H).

Example 44 and Example 45

2-{3-[(3,3-Difluorocyclobutyl)methoxy][1,4'-bipiperidin]-1'-yl}-N-[(3,5-difluoropyridin-2-yl)methyl]-1,3-thiazole-5-carboxamide (Enantiomers 1 and 2)

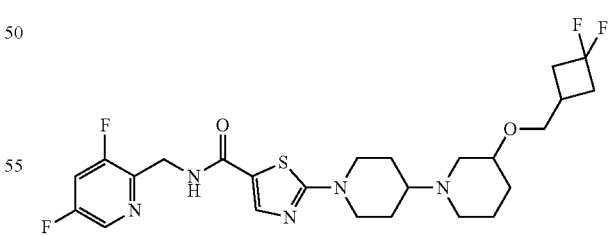

251 mg (0.46 mmol) of 2-{3-[(3,3-difluorocyclobutyl)methoxy][1,4'-bipiperidin]-1'-yl}-N-[(3,5-difluoropyridin-2-yl)methyl]-1,3-thiazole-5-carboxamide (Example 7) were separated into the enantiomers by preparative HPLC on a chiral phase [column: Daicel Chiralcel OD-H, 5 μm, 250 mm×20 mm; mobile phase: n-heptane/2-propanol+0.2% diethylamine 50:50; flow rate: 20 ml/min; UV detection: 220 nm; temperature: 30° C.]:

Example 44 (Enantiomer 1)

2-{(3R)-3-[(3,3-Difluorocyclobutyl)methoxy][1,4'-bipiperidin]-1'-yl}-N-[(3,5-difluoropyridin-2-yl)methyl]-1,3-thiazole-5-carboxamide

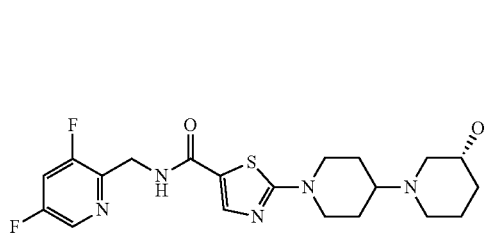

yield: 93 mg $R_t$=1.50 min; chemical purity >99%; 99% ee

[column: Phenomenex Cellulose-1, 3 μm, 50 mm×4.6 mm; mobile phase: n-heptane/2-propanol+0.2% diethylamine); flow rate: 1 ml/min; temperature: 25° C.; UV detection: 220 nm].

LC-MS (method 4): $R_t$=0.63 min; m/z=542 (M+H)$^+$.

Example 45 (Enantiomer 2)

2-{(3S)-3-[(3,3-Difluorocyclobutyl)methoxy][1,4'-bipiperidin]-1'-yl}-N-[(3,5-difluoropyridin-2-yl)methyl]-1,3-thiazole-5-carboxamide

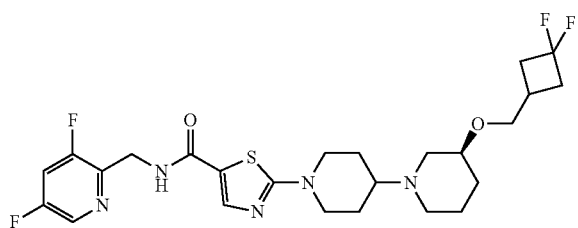 [SMILES: O=C(NCc1ncc(F)cc1F)c1cnc(N2CCC(N3CCC[C@H](OCC4CC(F)(F)C4)C3)CC2)s1]

yield: 86 mg $R_t$=2.21 min; chemical purity >99%; 99% ee

[column: Phenomenex Cellulose-1, 3 μm, 50 mm×4.6 mm; mobile phase: n-heptane/2-propanol+0.2% diethylamine); flow rate: 1 ml/min; temperature: 25° C.; UV detection: 220 nm].

LC-MS (method 4): $R_t$=0.62 min; m/z=542 (M+H)$^+$.

$^1$H-NMR (400 MHz, DMSO-$d_6$, δ/ppm): 1.02-1.12 (m, 1H), 1.30-1.42 (m, 1H), 1.42-1.56 (m, 2H), 1.58-1.68 (m, 1H), 1.72-1.83 (m, 2H), 1.85-1.94 (m, 1H), 1.99 (br. t, 1H), 2.10 (br. t, 1H), 2.21-2.38 (m, 3H), 2.48-2.62 (m, 3H, partially obscured by DMSO), 2.62-2.70 (m, 1H), 2.95 (br. d, 1H), 3.04 (br. t, 2H), 3.22-3.34 (m, 1H, partially obscured by H$_2$O), 3.40-3.51 (m, 2H), 3.95 (br. d, 2H), 4.53 (br. d, 2H), 7.83 (s, 1H), 7.87-7.95 (m, 1H), 8.47 (d, 1H), 8.71 (t, 1H).

Example 46 and Example 47

N-[1-(2,5-Difluorophenyl)ethyl]-2-[(3R)-3-methyl[1,4'-bipiperidin]-1'-yl]-1,3-thiazole carboxamide (Diastereomers 1 and 2)

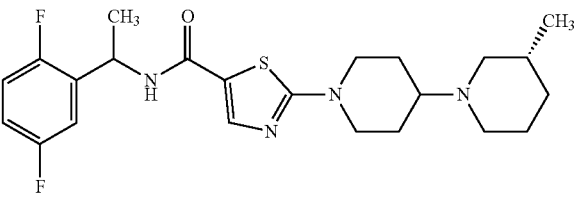 [SMILES: CC(NC(=O)c1cnc(N2CCC(N3CCC[C@@H](C)C3)CC2)s1)c1cc(F)ccc1F]

51 mg (0.11 mmol) of the diastereomer mixture N-[1-(2,5-difluorophenyl)ethyl]-2-[(3R)-3-methyl[1,4'-bipiperidin]-1'-yl]-1,3-thiazole-5-carboxamide (Example 30) were separated into the diastereomers by preparative HPLC on a chiral phase [column: Daicel Chiralcel OX-H 5 μm, 250 mm×20 mm; mobile phase: n-heptane/ethanol 50:50; flow rate: 20 ml/min; UV detection: 220 nm; temperature: 40° C.]:

Example 46 (Diastereomer 1)

yield: 20 mg $R_t$=1.32 min; chemical purity >99%; 99% ee

[column: Daicel Chiralpak OX-3, 3 μm, 50 mm×4.6 mm; mobile phase: n-heptane/ethanol+0.2% diethylamine; flow rate: 1 ml/min; temperature: 25° C.; UV detection: 220 nm].

LC-MS (method 1): $R_t$=1.22 min; m/z=449 (M+H)$^+$.

$^1$H-NMR (600 MHz, DMSO-$d_6$, δ/ppm): 0.76-0.87 (m, 4H, including at 0.82 (d, 3H)), 1.34-1.66 (m, 9H, including at 1.42 (d, 3H)), 1.70-1.84 (m, 3H), 2.00-2.12 (m, 1H), 2.44-2.56 (m, 1H, partially obscured by DMSO), 2.68-2.80 (m, 2H), 3.00-3.09 (m, 2H), 3.95 (br. t, 2H), 5.21-5.29 (m, 1H), 7.09-7.16 (m, 1H), 7.19-7.25 (m, 2H), 7.92 (s, 1H), 8.56 (d, 1H).

Example 47 (Diastereomer 2)

yield: 19 mg $R_t$=1.78 min; chemical purity >99%; 99% ee

[column: Daicel Chiralpak OX-3, 3 μm, 50 mm×4.6 mm; mobile phase: n-heptane/ethanol+0.2% diethylamine; flow rate: 1 ml/min; temperature: 25° C.; UV detection: 220 nm].

LC-MS (method 1): $R_t$=1.19 min; m/z=449 (M+H)$^+$.

$^1$H-NMR (600 MHz, DMSO-$d_6$, δ/ppm): 0.76-0.89 (m, 4H, including at 0.82 (d, 3H)), 1.34-1.67 (m, 9H, including at 1.42 (d, 3H)), 1.72-1.84 (m, 3H), 2.00-2.12 (m, 1H), 2.44-2.60 (m, 1H, partially obscured by DMSO), 2.69-2.81 (m, 2H), 3.05 (br. t, 2H), 3.89-4.00 (m, 2H), 5.21-5.29 (m, 1H), 7.09-7.16 (m, 1H), 7.18-7.26 (m, 2H), 7.92 (s, 1H), 8.56 (d, 1H).

Example 48 rac-N-[(3,5-Difluoropyridin-2-yl)methyl]-2-[3-(methoxymethyl)[1,4'-bipiperidin]-1'-yl]-1,3-thiazole-5-carboxamide

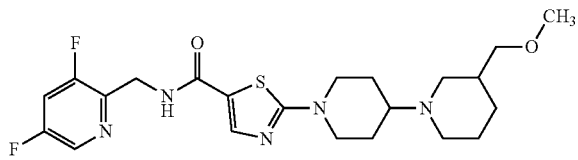

2-Bromo-N-[(3,5-difluoropyridin-2-yl)methyl]-1,3-thiazole-5-carboxamide (124 mg, 370 µmol) and rac-3-(methoxymethyl)-1,4'-bipiperidine dihydrochloride (123 mg, purity 75%, 285 µmol) were combined and stirred at 120° C. in 2 ml of sodium carbonate solution (2.0 ml, 2.0 M, 4.0 mmol) for 1 h. The reaction mixture was then concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 60.0 mg (purity 100%, 35% of theory) of the target compound.

LC-MS (method 4): $R_t$=0.51 min; MS (ESIpos): m/z=466 [M+H]$^+$.

$^1$H-NMR (600 MHz, DMSO-d6) δ [ppm]: 0.903 (0.47), 0.918 (0.53), 1.389 (0.42), 1.409 (0.44), 1.432 (0.44), 1.445 (0.53), 1.452 (0.88), 1.460 (0.62), 1.465 (0.64), 1.472 (0.94), 1.480 (0.56), 1.578 (1.12), 1.596 (1.00), 1.716 (0.49), 1.755 (1.11), 1.774 (0.96), 1.878 (0.66), 1.895 (1.06), 1.912 (0.56), 2.091 (0.43), 2.106 (0.78), 2.109 (0.78), 2.124 (0.42), 2.483 (0.43), 2.520 (0.42), 2.706 (0.61), 2.724 (0.57), 2.795 (0.63), 2.809 (0.61), 3.018 (0.74), 3.023 (0.88), 3.040 (1.54), 3.043 (1.52), 3.060 (0.87), 3.064 (0.76), 3.129 (0.51), 3.144 (1.48), 3.157 (1.78), 3.159 (1.83), 3.169 (1.56), 3.175 (0.63), 3.184 (0.52), 3.200 (16.00), 3.920 (1.12), 3.941 (1.06), 4.521 (2.22), 4.530 (2.22), 7.828 (5.37), 7.893 (0.59), 7.897 (0.63), 7.910 (0.90), 7.913 (0.94), 7.925 (0.60), 7.929 (0.62), 8.465 (2.32), 8.468 (2.28), 8.701 (0.73), 8.710 (1.47), 8.720 (0.71).

Example 49

N-[(3,5-Difluoropyridin-2-yl)methyl]-3-[(3R)-3-methyl[1,4'-bipiperidin]-1'-yl]-1,2,4-oxadiazole carboxamide

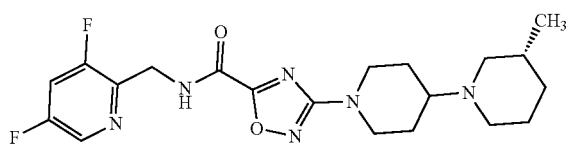 [SMILES: C[C@@H]1CCCN(C2CCN(c3noc(C(=O)NCc4ncc(F)cc4F)n3)CC2)C1]

N,N-Diisopropylethylamine (44 µl, 250 mmol) and propylphosphonic anhydride (66 µl, 50% in ethyl acetate, 110 µmol) were added to a solution of 3-[(3R)-3-methyl[1,4'-bipiperidin]-1'-yl]-1,2,4-oxadiazole-5-carboxylic acid (25.0 mg, 84.9 µmol) and 1-(3,5-difluoropyridin-2-yl)methanamine dihydrochloride (24.0 mg, 110 µmol) in 1 ml of acetonitrile, and the mixture was stirred at room temperature. After 1.5 h, the reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 7.00 mg (purity 100%, 20% of theory) of the target compound.

LC-MS (method 1): $R_t$=0.96 min; MS (ESIpos): m/z=421 [M+H]$^+$.

$^1$H-NMR (600 MHz, DMSO-d6) δ [ppm]: 0.780 (0.59), 0.786 (0.66), 0.813 (14.94), 0.824 (16.00), 0.841 (0.69), 0.847 (0.57), 1.370 (0.56), 1.377 (0.45), 1.391 (1.47), 1.411 (1.58), 1.431 (1.38), 1.437 (1.22), 1.457 (2.49), 1.472 (2.70), 1.493 (1.64), 1.498 (1.66), 1.510 (1.34), 1.516 (1.25), 1.522 (1.29), 1.527 (1.13), 1.567 (1.91), 1.583 (1.19), 1.588 (1.52), 1.618 (1.61), 1.639 (1.55), 1.744 (2.47), 1.760 (5.97), 1.778 (4.64), 2.040 (1.21), 2.055 (2.23), 2.074 (1.19), 2.449 (1.19), 2.467 (2.20), 2.487 (1.30), 2.732 (2.07), 2.746 (3.74), 2.763 (1.77), 2.931 (2.53), 2.949 (4.76), 2.969 (2.54), 3.905 (3.81), 3.927 (3.64), 4.586 (6.49), 4.596 (6.41), 7.930 (1.47), 7.934 (1.53), 7.949 (2.60), 7.962 (1.51), 7.966 (1.50), 8.476 (5.87), 8.479 (5.69), 9.631 (1.76), 9.641 (3.44), 9.651 (1.75).

Example 50 diamix-N-[(3,5-Difluoropyridin-2-yl)methyl]-2-[(3R)-3'-fluoro-3-methyl[1,4'-bipiperidin]-1'-yl]-1,3-thiazole-5-carboxamide

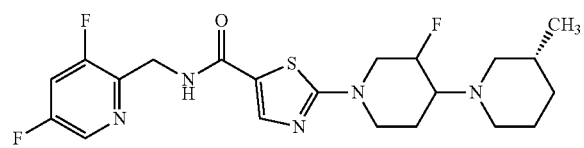

2-Bromo-N-[(3,5-difluoropyridin-2-yl)methyl]-1,3-thiazole-5-carboxamide (200 mg, 599 µmol) and diamix-(3R)-3'-fluoro-3-methyl-1,4'-bipiperidine dihydrochloride (142 mg, 519 µmol) were combined and stirred at 120° C. in 1.2 ml of sodium carbonate solution (1.2 ml, 2.0 M, 2.4 mmol) for 30 min. The reaction mixture was then concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 192 mg (purity 100%, 70% of theory) of the target compound.

LC-MS (method 4): $R_t$=0.54 min; MS (ESIpos): m/z=454 [M+H]$^+$.

$^1$H-NMR (600 MHz, DMSO-d6) δ [ppm]: 0.807 (8.04), 0.818 (8.54), 0.823 (9.19), 0.833 (9.26), 0.845 (1.26), 0.851 (1.27), 0.865 (0.57), 0.872 (0.48), 1.375 (0.72), 1.396 (0.88), 1.425 (0.72), 1.513 (0.76), 1.524 (0.78), 1.550 (1.22), 1.572 (1.24), 1.578 (1.30), 1.600 (1.01), 1.624 (1.99), 1.639 (1.94), 1.647 (1.92), 1.795 (1.24), 1.817 (0.99), 1.923 (0.96), 1.932 (0.79), 1.940 (1.73), 1.948 (1.32), 1.958 (1.00), 1.964 (0.66), 2.226 (1.04), 2.245 (1.98), 2.264 (1.01), 2.424 (0.59), 2.653 (0.51), 2.730 (2.22), 2.744 (2.48), 2.801 (1.20), 2.813 (1.28), 3.129 (1.00), 3.134 (1.13), 3.154 (1.85), 3.169 (1.17), 3.214 (0.84), 3.226 (1.61), 3.235 (1.14), 3.247 (1.52), 3.261 (0.83), 3.286 (0.43), 3.705 (1.26), 3.726 (1.18), 4.117 (0.76), 4.123 (0.88), 4.136 (1.42), 4.144 (1.43), 4.156 (0.80), 4.162 (0.74), 4.527 (5.54), 4.536 (5.52), 4.691 (0.60), 4.698 (0.88), 4.705 (1.12), 4.713 (0.79), 4.719 (0.57), 4.773 (0.59), 4.779 (0.81), 4.787 (1.13), 4.794 (0.85), 4.801 (0.57), 7.844 (16.00), 7.899 (1.65), 7.903 (1.77), 7.916 (2.25), 7.918 (2.38), 7.931 (1.68), 7.935 (1.72), 8.468 (6.33), 8.472 (6.30), 8.754 (1.79), 8.764 (3.76), 8.773 (1.86).

Example 51 ent-N-[(3,5-Difluoropyridin-2-yl)methyl]-2-[(3R)-3'-fluoro-3-methyl[1,4'-bipiperidin]-1'-yl]-1,3-thiazole-5-carboxamide (Enantiomer 1)

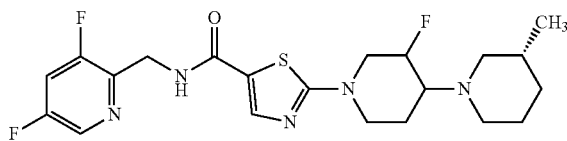 [SMILES: C[C@@H]1CCCN(C2CCN(c3ncc(C(=O)NCc4ncc(F)cc4F)s3)CC2F)C1]

190 mg of diamix-N-[(3,5-difluoropyridin-2-yl)methyl]-2-[(3R)-3'-fluoro-3-methyl[1,4'-bipiperidin]-1'-yl]-1,3-thiazole-5-carboxamide were separated into the stereoisomers by chiral HPLC (preparative HPLC: column Daicel® Chiralpak IA, 5 μm, 250×20 mm; mobile phase: 100% ethanol+0.2% diethylamine; flow rate 20 ml/min; temperature 60° C., detection: 220 nm). The stereoisomer having a retention time of 7.873 min (HPLC: column Daicel® Chiralpak IE 5 μm, flow rate 1 ml/min; mobile phase: 100% ethanol+0.2% diethylamine; temperature 60° C.; detection: 220 nm) was collected. Removal of the solvents gave 88 mg (99% ee) of the title compound.

LC-MS (method 1): $R_t$=0.93 min; MS (ESIpos): m/z=454 [M+H]$^+$.

$^1$H.NMR (500 MHz, DMSO-d6) δ [ppm]: δ 8.72 (t, 1H), 8.47 (d, 1H), 7.94-7.89 (m, 1H), 7.82 (s, 1H), 5.10 (d, 1H), 4.53 (d, 2H), 4.18 (m, 1H), 4.00 (m, 1H), 3.32 (dd, 1H), 3.18-3.11 (m, 1H), 2.82 (m, 2H), 2.70-2.57 (m, 1H), 2.20-2.14 (m, 1H), 1.94-1.83 (m, 2H), 1.70-1.51 (m, 4H), 1.43-1.33 (m, 1H), 0.88-0.78 (m, 1H), 0.82 (d, 3H).

Example 52 ent-N-[(3,5-Difluoropyridin-2-yl)methyl]-2-[(3R)-3'-fluoro-3-methyl[1,4'-bipiperidin]-1'-yl]-1,3-thiazole-5-carboxamide (Enantiomer 2)

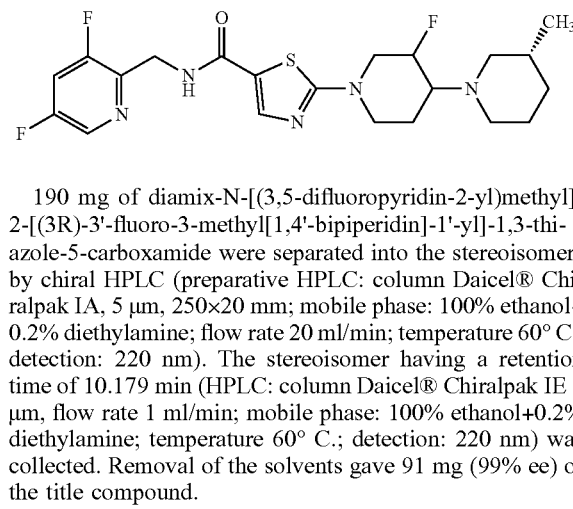

190 mg of diamix-N-[(3,5-difluoropyridin-2-yl)methyl]-2-[(3R)-3'-fluoro-3-methyl[1,4'-bipiperidin]-1'-yl]-1,3-thiazole-5-carboxamide were separated into the stereoisomers by chiral HPLC (preparative HPLC: column Daicel® Chiralpak IA, 5 μm, 250×20 mm; mobile phase: 100% ethanol+0.2% diethylamine; flow rate 20 ml/min; temperature 60° C., detection: 220 nm). The stereoisomer having a retention time of 10.179 min (HPLC: column Daicel® Chiralpak IE 5 μm, flow rate 1 ml/min; mobile phase: 100% ethanol+0.2% diethylamine; temperature 60° C.; detection: 220 nm) was collected. Removal of the solvents gave 91 mg (99% ee) of the title compound.

LC-MS (method 1): $R_t$=0.93 min; MS (ESIpos): m/z=454 [M+H]$^+$.

$^1$H.NMR (500 MHz, DMSO-d6) δ [ppm]: δ 8.72 (t, 1H), 8.47 (d, 1H), 7.94-7.89 (m, 1H), 7.82 (s, 1H), 5.10 (d, 1H), 4.53 (d, 2H), 4.18 (m, 1H), 4.00 (m, 1H), 3.32 (dd, 1H), 3.19-3.12 (m, 1H), 2.82 (d br, 2H), 2.70-2.57 (m, 1H), 2.21-2.15 (m, 1H), 1.94-1.84 (m, 2H), 1.70-1.56 (m, 3H), 1.53-1.38 (m, 2H), 0.88-0.78 (m, 1H), 0.81 (d, 3H).

Example 53 rac-N-[(3,5-Difluoropyridin-2-yl)methyl]-2-[4-(4-methylazepan-1-yl)piperidin-1-yl]-1,3-thiazole-5-carboxamide

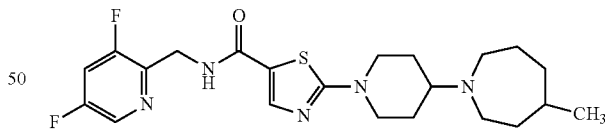

N,N-Diisopropylethylamine (49 μl, 280 μmol) and acetic acid (9.7 μl, 170 μmol) were added in succession to a solution of N-[(3,5-difluoropyridin-2-yl)methyl]-2-(4-oxopiperidin-1-yl)-1,3-thiazole-5-carboxamide (50.0 mg, 142 μmol) and rac-4-methylazepane (32.1 mg, 284 μmol) in 2.5 ml of dichloromethane, and the mixture was stirred at room temperature overnight. Subsequently, sodium triacetoxyborohydride (45.1 mg, 213 μmol) was added and stirring of the mixture at room temperature was continued. After 2 h, sat. NaHCO$_3$ solution was added and the reaction mixture was extracted with dichloromethane. The organic phase was concentrated on a rotary evaporator and the residue was dissolved in DMSO and purified by preparative HPLC (instrument: Waters Prep LC/MS System, column:

XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 43.0 mg (100% purity, 67% of theory) of the title compound.

LC-MS (method 1): $R_t$=0.98 min; MS (ESIpos): m/z=450 [M+H]$^+$.

$^1$H-NMR (600 MHz, DMSO-d6) δ [ppm]: 0.874 (16.00), 0.886 (15.94), 1.166 (1.35), 1.173 (2.14), 1.180 (1.44), 1.189 (2.16), 1.195 (1.69), 1.206 (1.49), 1.223 (2.09), 1.240 (2.28), 1.257 (1.07), 1.262 (0.94), 1.417 (1.40), 1.431 (3.73), 1.438 (3.97), 1.451 (4.78), 1.457 (4.63), 1.471 (3.48), 1.478 (2.98), 1.491 (1.13), 1.499 (0.91), 1.566 (1.97), 1.572 (1.71), 1.590 (2.05), 1.609 (1.83), 1.632 (4.40), 1.642 (4.13), 1.649 (3.78), 1.727 (2.59), 1.747 (4.36), 1.766 (2.28), 2.519 (3.82), 2.525 (2.88), 2.567 (1.76), 2.574 (1.84), 2.588 (3.16), 2.594 (2.42), 2.603 (2.38), 2.610 (2.22), 2.636 (3.23), 2.645 (6.11), 2.653 (6.12), 2.664 (4.76), 2.675 (3.65), 2.684 (1.53), 3.020 (3.04), 3.038 (5.45), 3.059 (3.16), 3.327 (0.99), 3.921 (4.02), 3.941 (3.84), 4.523 (7.77), 4.532 (7.71), 7.819 (13.98), 7.877 (1.85), 7.881 (1.92), 7.895 (3.21), 7.897 (3.22), 7.909 (1.86), 7.913 (1.83), 8.458 (6.41), 8.462 (6.13), 8.662 (2.36), 8.671 (4.40), 8.680 (2.29).

Example 54 rac-N-[(3,5-Difluoropyridin-2-yl)methyl]-2-[4-(3-methylazepan-1-yl)piperidin-1-yl]-1,3-thiazole-5-carboxamide

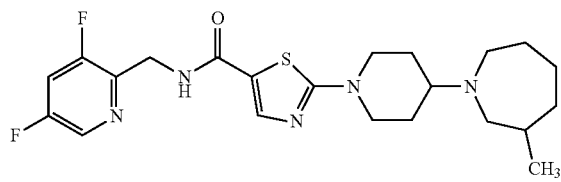 [SMILES: CC1CCCCN(C2CCN(c3ncc(C(=O)NCc4ncc(F)cc4F)s3)CC2)C1]

N,N-Diisopropylethylamine (49 μl, 280 μmol) and acetic acid (9.7 μl, 170 μmol) were added in succession to a solution of N-[(3,5-difluoropyridin-2-yl)methyl]-2-(4-oxopiperidin-1-yl)-1,3-thiazole-5-carboxamide (50.0 mg, 142 μmol) and rac-3-methylazepane hydrochloride (42.5 mg, 284 μmol) in 2.5 ml of dichloromethane, and the mixture was stirred at room temperature overnight. Subsequently, sodium triacetoxyborohydride (45.1 mg, 213 μmol) was added and stirring of the mixture at room temperature was continued. After 2 h, sat. NaHCO$_3$ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 40.0 mg (purity 100%, 63% of theory) of the target compound.

LC-MS (method 1): $R_t$=0.97 min; MS (ESIpos): m/z=450 [M+H]$^+$ $^1$H-NMR (600 MHz, DMSO-d6) δ [ppm]: 0.813 (15.55), 0.823 (16.00), 1.127 (0.63), 1.144 (1.47), 1.151 (1.29), 1.168 (1.44), 1.409 (0.90), 1.422 (3.44), 1.428 (3.08), 1.440 (5.99), 1.449 (4.90), 1.461 (3.41), 1.468 (2.80), 1.481 (1.05), 1.561 (1.44), 1.573 (1.70), 1.589 (0.97), 1.610 (3.22), 1.629 (4.80), 1.637 (3.85), 1.648 (2.15), 1.738 (3.86), 1.757 (3.39), 2.188 (2.20), 2.202 (2.24), 2.210 (2.45), 2.224 (2.31), 2.569 (0.93), 2.578 (1.13), 2.591 (2.08), 2.600 (2.09), 2.609 (1.71), 2.630 (1.60), 2.639 (4.89), 2.644 (4.73), 2.660 (4.71), 2.664 (4.78), 2.683 (1.26), 3.018 (2.77), 3.035 (5.01), 3.039 (4.91), 3.056 (2.76), 3.256 (0.45), 3.933 (3.56), 3.953 (3.40), 4.524 (7.13), 4.533 (7.07), 7.819 (13.92), 7.880 (1.63), 7.883 (1.71), 7.896 (2.87), 7.899 (2.96), 7.911 (1.68), 7.915 (1.70), 8.460 (6.36), 8.463 (6.29), 8.662 (2.12), 8.672 (4.27), 8.681 (2.16).

Example 55 diamix-N-[1-(3,5-Difluoropyridin-2-yl)ethyl]-2-[(3R)-3-methyl[1,4'-bipiperidin]-1'-yl]-1,3-thiazole-5-carboxamide

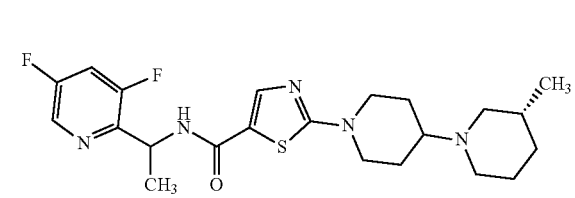 [SMILES: CC(NC(=O)c1cnc(N2CCC(N3CCC[C@@H](C)C3)CC2)s1)c1ncc(F)cc1F]

N,N-Diisopropylethylamine (182 μl, 105 μmol) and propylphosphonic anhydride (86 μl, 50% in ethyl acetate, 290 μmol) were added to a solution of 2-[(3R)-3-methyl[1,4'-bipiperidin]-1'-yl]-1,3-thiazole-5-carboxylic acid dihydrochloride (100 mg, 262 μmol) and rac-1-(3,5-difluoropyridin-2-yl)ethanamine (45.5 mg, 288 μmol) in 5 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 12.0 mg (purity 100%, 10% of theory) of the target compound.

LC-MS (method 1): $R_t$=1.02 min; MS (ESIpos): m/z=450 [M+H]$^+$.

$^1$H-NMR (600 MHz, DMSO-d6) δ [ppm]: 0.788 (0.72), 0.811 (14.96), 0.822 (16.00), 0.843 (0.68), 1.389 (1.55), 1.409 (1.64), 1.440 (14.70), 1.452 (14.49), 1.480 (2.90), 1.502 (2.05), 1.564 (1.99), 1.586 (1.51), 1.615 (1.65), 1.636 (1.56), 1.735 (1.85), 1.753 (4.97), 1.779 (3.32), 2.032 (1.18), 2.049 (2.19), 2.069 (1.17), 2.423 (0.65), 2.466 (1.28), 2.653 (0.49), 2.716 (2.04), 2.731 (3.74), 2.748 (1.88), 3.015 (2.36), 3.036 (4.36), 3.057 (2.38), 3.224 (0.42), 3.249 (0.65), 3.316 (0.89), 3.913 (2.65), 5.317 (0.57), 5.329 (2.00), 5.341 (3.01), 5.353 (1.96), 7.861 (1.44), 7.876 (2.73), 7.893 (1.49), 7.912 (11.30), 8.468 (5.59), 8.531 (3.80), 8.543 (3.75).

Example 56

N-[(5-Chloro-1,3-thiazol-2-yl)methyl]-2-[(3R)-3-methyl[1,4'-bipiperidin]-1'-yl]-1,3-thiazole-5-carboxamide

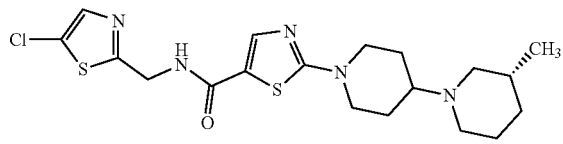 [SMILES: C[C@@H]1CCCN(C2CCN(c3ncc(C(=O)NCc4ncc(Cl)s4)s3)CC2)C1]

N,N-Diisopropylethylamine (230 µl, 1.3 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid dihydrochloride (100 mg, 262 µmol) and 1-(5-chloro-1,3-thiazol-2-yl)methanamine hydrochloride (53.2 mg, 288 µmol) in 5 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 14.0 mg (purity 100%, 12% of theory) of the target compound.

LC-MS (method 1): $R_t$=1.00 min; MS (ESIpos): m/z=440 [M+H]$^+$.

$^1$H-NMR (400 MHz, DMSO-d6) δ [ppm]: −0.149 (0.78), 0.146 (0.87), 0.811 (14.60), 0.827 (16.00), 1.475 (2.13), 1.498 (2.88), 1.605 (1.71), 1.729 (1.52), 1.756 (3.69), 1.802 (2.53), 2.051 (1.90), 2.366 (1.52), 2.710 (2.65), 3.041 (2.14), 3.067 (3.51), 3.098 (1.95), 3.937 (2.72), 3.966 (2.56), 4.573 (8.03), 4.588 (7.85), 7.731 (15.89), 7.837 (15.31), 9.094 (1.71), 9.108 (3.31), 9.122 (1.68).

Example 57

N-[(5-Fluoro-2-thienyl)methyl]-2-[(3R)-3-methyl[1,4'-bipiperidin]-1'-yl]-1,3-thiazole-5-carboxamide

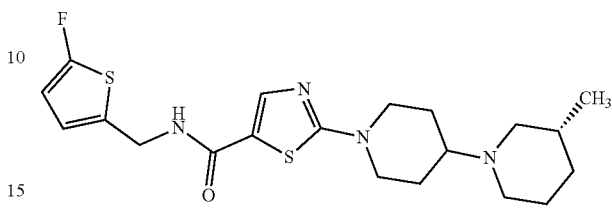

N,N-Diisopropylethylamine (180 µl, 1.0 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid dihydrochloride (100 mg, 262 µmol) and 1-(5-fluoro-2-thienyl)methanamine (37.7 mg, 288 µmol) in 5 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 12.0 mg (purity 100%, 11% of theory) of the target compound.

LC-MS (method 1): $R_t$=1.09 min; MS (ESIpos): m/z=423 [M+H]$^+$.

$^1$H-NMR (600 MHz, DMSO-d6) δ [ppm]: 0.783 (0.52), 0.790 (0.59), 0.813 (15.03), 0.824 (16.00), 0.843 (0.57), 0.850 (0.47), 1.370 (0.50), 1.391 (1.25), 1.411 (1.35), 1.431 (0.57), 1.454 (0.72), 1.474 (1.98), 1.494 (2.47), 1.511 (1.80), 1.529 (0.96), 1.540 (0.58), 1.565 (1.59), 1.571 (1.23), 1.582 (0.96), 1.587 (1.28), 1.616 (1.32), 1.637 (1.24), 1.737 (1.79), 1.754 (3.23), 1.771 (4.08), 1.788 (2.51), 2.036 (1.05), 2.050 (1.91), 2.054 (1.88), 2.069 (1.04), 2.471 (1.13), 2.477 (0.78), 2.722 (1.66), 2.734 (3.05), 2.752 (1.45), 3.031 (1.84), 3.035 (2.16), 3.052 (3.73), 3.055 (3.70), 3.072 (2.12), 3.077 (1.85), 3.257 (0.59), 3.278 (0.99), 3.927 (2.78), 3.948 (2.65), 4.394 (4.22), 4.398 (4.54), 4.404 (4.54), 4.408 (4.29), 6.512 (3.08), 6.516 (3.37), 6.518 (3.69), 6.522 (3.52), 6.660 (2.25), 6.666 (4.14), 6.672 (2.16), 7.780 (13.01), 8.786 (1.58), 8.796 (3.27), 8.806 (1.66).

Example 58

2-[(3R)-3-Methyl[1,4'-bipiperidin]-1'-yl]-N-(pyridin-4-ylmethyl)-1,3-thiazole-5-carboxamide

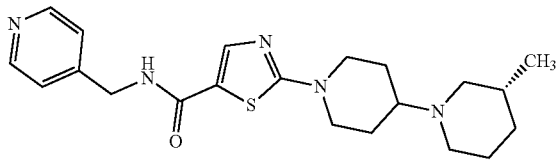 [SMILES: C[C@@H]1CCCN(C2CCN(c3ncc(C(=O)NCc4ccncc4)s3)CC2)C1]

N,N-Diisopropylethylamine (180 µl, 1.0 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid dihydrochloride (100 mg, 262 µmol) and 1-(pyridin-4-yl)methanamine (31.1 mg, 288 µmol) in 5 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 7.00 mg (purity 100%, 7% of theory) of the target compound.

LC-MS (method 1): $R_t$=0.48 min; MS (ESIneg): m/z=398 [M−H]⁻.

¹H-NMR (400 MHz, DMSO-d6) δ [ppm]: 0.776 (0.54), 0.796 (1.55), 0.812 (14.81), 0.828 (16.00), 0.855 (0.65), 0.865 (0.55), 0.950 (1.20), 0.966 (1.16), 1.356 (0.44), 1.387 (1.16), 1.417 (1.35), 1.446 (1.24), 1.474 (2.25), 1.499 (2.83), 1.525 (1.95), 1.534 (1.73), 1.563 (1.86), 1.604 (1.82), 1.645 (1.30), 1.731 (1.87), 1.758 (4.55), 1.783 (2.68), 1.796 (2.56), 2.030 (1.05), 2.052 (1.88), 2.058 (1.85), 2.080 (1.06), 2.366 (0.57), 2.473 (1.30), 2.725 (2.30), 2.741 (2.70), 3.031 (2.07), 3.057 (3.71), 3.088 (2.13), 3.932 (2.97), 3.965 (2.79), 4.401 (6.43), 4.416 (6.43), 7.269 (4.34), 7.280 (4.58), 7.849 (13.88), 8.505 (1.83), 8.800 (1.58), 8.815 (3.27), 8.830 (1.59).

Example 59 rac-N-[(3,5-Difluoropyridin-2-yl)methyl]-2-{3-[(2,2,2-trifluoroethoxy)methyl][1,4'-bipiperidin]-1'-yl}-1,3-thiazole-5-carboxamide

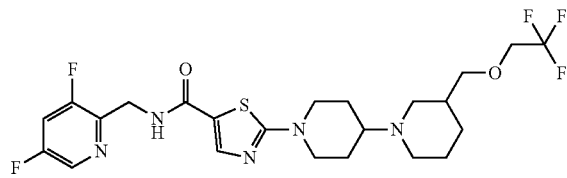 [SMILES: O=C(NCc1ncc(F)cc1F)c1cnc(N2CCC(N3CCCC(COCC(F)(F)F)C3)CC2)s1]

2-Bromo-N-[(3,5-difluoropyridin-2-yl)methyl]-1,3-thiazole-5-carboxamide (118 mg, 353 µmol) and rac-3-[(2,2,2-trifluoroethoxy)methyl]-1,4'-bipiperidine dihydrochloride (164 mg, purity 75%, 348 µmol) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over Na₂SO₄, the drying agent was filtered off and the filtrate was concentrated on a rotary evaporator. The residue was dissolved in DMSO and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 56.0 mg (purity 100%, 30% of theory) of the target compound.

LC-MS (method 5): $R_t$=1.64 min; MS (ESIpos): m/z=534 [M+H]⁺.

¹H-NMR (600 MHz, DMSO-d6) δ [ppm]: 0.937 (0.65), 0.955 (1.56), 0.970 (1.59), 0.988 (0.67), 1.381 (0.58), 1.402 (1.31), 1.420 (1.45), 1.431 (1.19), 1.439 (1.22), 1.452 (2.08), 1.458 (1.80), 1.465 (1.92), 1.471 (3.02), 1.478 (1.98), 1.485 (1.91), 1.492 (2.15), 1.505 (0.81), 1.512 (0.59), 1.589 (3.51), 1.605 (3.09), 1.767 (4.45), 1.952 (1.98), 1.969 (3.12), 1.986 (1.74), 2.133 (1.36), 2.148 (2.51), 2.166 (1.33), 2.513 (2.55), 2.689 (1.93), 2.707 (1.83), 2.776 (2.08), 2.791 (2.00), 3.029 (2.57), 3.049 (4.90), 3.070 (2.56), 3.425 (0.45), 3.443 (7.66), 3.454 (8.96), 3.925 (3.82), 3.947 (3.63), 3.976 (3.33), 3.992 (9.56), 4.008 (9.29), 4.023 (3.00), 4.525 (7.17), 4.534 (7.14), 7.824 (16.00), 7.877 (1.74), 7.881 (1.86), 7.897 (2.97), 7.909 (1.76), 7.913 (1.81), 8.458 (6.85), 8.462 (6.81), 8.666 (2.27), 8.676 (4.58), 8.685 (2.26).

Example 60 rac-N-[(3,5-Difluoropyridin-2-yl)methyl]-2-[3-({[1-(fluoromethyl)cyclopropyl]methoxy}methyl)[1,4'-bipiperidin]-1'-yl]-1,3-thiazole-5-carboxamide

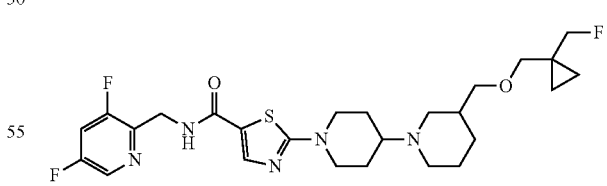

2-Bromo-N-[(3,5-difluoropyridin-2-yl)methyl]-1,3-thiazole-5-carboxamide (75.5 mg, 226 µmol) and rac-3-({[1-(fluoromethyl)cyclopropyl]methoxy}methyl)-1,4'-bipiperidine dihydrochloride (133 mg) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over Na₂SO₄, the drying agent was filtered off and the filtrate was concentrated on a rotary evaporator.

The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 10.5 mg (purity 100%, 9% of theory) of the target compound.

LC-MS (method 5): $R_t$=1.65 min; MS (ESIpos): m/z=538 [M+H]$^+$.

$^1$H-NMR (600 MHz, DMSO-d6) δ [ppm]: 0.500 (0.62), 0.507 (0.85), 0.526 (0.86), 0.531 (1.03), 1.601 (0.40), 3.051 (0.52), 3.242 (1.08), 3.253 (1.11), 3.279 (2.71), 3.289 (16.00), 3.923 (0.41), 3.943 (0.40), 4.219 (0.96), 4.301 (0.97), 4.524 (0.77), 4.533 (0.76), 7.824 (1.56), 8.459 (0.67), 8.463 (0.68), 8.675 (0.48).

Example 61 rac-2-[3-({[1-(Difluoromethyl)cyclopropyl]methoxy}methyl)[1,4'-bipiperidin]-1'-yl]-N-[(3,5-difluoropyridin-2-yl)methyl]-1,3-thiazole-5-carboxamide

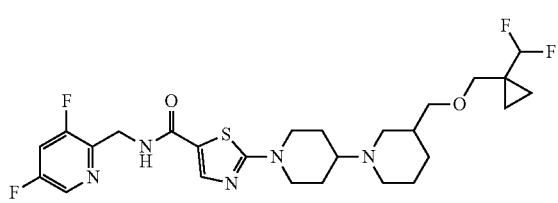 [SMILES: O=C(NCc1ncc(F)cc1F)c1cnc(N2CCC(N3CCCC(COCC4(C(F)F)CC4)C3)CC2)s1]

2-Bromo-N-[(3,5-difluoropyridin-2-yl)methyl]-1,3-thiazole-5-carboxamide (100 mg, 300 μmol) and rac-3-({[1-(difluoromethyl)cyclopropyl]methoxy}methyl)-1,4'-bipiperidine dihydrochloride (112 mg) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 49.8 mg (purity 100%, 30% of theory) of the target compound.

LC-MS (method 5): $R_t$=1.71 min; MS (ESIpos): m/z=556 [M+H]$^+$.

$^1$H-NMR (600 MHz, DMSO-d6) δ [ppm]: 0.608 (6.75), 0.611 (6.72), 0.725 (3.50), 0.733 (9.17), 0.735 (8.79), 0.743 (2.54), 0.904 (0.57), 0.921 (1.21), 0.936 (1.35), 0.955 (0.59), 1.372 (0.53), 1.391 (1.17), 1.411 (1.22), 1.437 (0.65), 1.444 (0.72), 1.456 (1.67), 1.466 (1.85), 1.476 (2.47), 1.485 (1.95), 1.496 (1.74), 1.515 (0.52), 1.587 (2.51), 1.592 (2.61), 1.599 (2.32), 1.722 (1.44), 1.739 (1.01), 1.759 (2.61), 1.781 (2.25), 1.909 (1.70), 1.926 (2.76), 1.943 (1.48), 2.109 (1.17), 2.125 (2.16), 2.142 (1.16), 2.486 (1.43), 2.522 (1.19), 2.699 (1.73), 2.718 (1.60), 2.791 (1.81), 2.806 (1.75), 3.029 (2.22), 3.050 (4.07), 3.071 (2.19), 3.237 (7.84), 3.248 (8.49), 3.384 (0.66), 3.403 (16.00), 3.422 (0.65), 3.922 (3.21), 3.943 (3.05), 4.524 (6.21), 4.533 (6.24), 5.805 (2.61), 5.901 (5.22), 5.996 (2.47), 7.824 (12.56), 7.878 (1.45), 7.882 (1.55), 7.897 (2.60), 7.910 (1.53), 7.914 (1.57), 8.458 (5.72), 8.462 (5.73), 8.666 (1.94), 8.675 (3.99), 8.684 (2.01).

Example 62 rac-N-[(3,5-Difluoropyridin-2-yl)methyl]-2-[3-({[1-(trifluoromethyl)cyclopropyl]methoxy}methyl)[1,4'-bipiperidin]-1'-yl]-1,3-thiazole-5-carboxamide

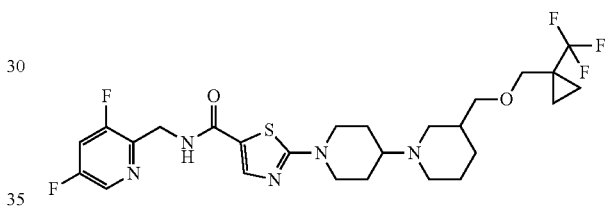

2-Bromo-N-[(3,5-difluoropyridin-2-yl)methyl]-1,3-thiazole-5-carboxamide (110 mg, 329 μmol) and rac-3-({[1-(trifluoromethyl)cyclopropyl]methoxy}methyl)-1,4'-bipiperidine dihydrochloride (129 mg) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 56.0 mg (purity 100%, 30% of theory) of the target compound.

LC-MS (method 5): $R_t$=1.78 min; MS (ESIpos): m/z=574 [M+H]$^+$.

$^1$H-NMR (600 MHz, DMSO-d6) δ [ppm]: 0.808 (7.29), 0.908 (0.91), 0.926 (1.41), 0.934 (3.81), 0.942 (9.64), 0.953 (2.74), 1.393 (1.17), 1.411 (1.23), 1.432 (0.90), 1.440 (0.99), 1.452 (1.48), 1.460 (2.20), 1.470 (2.07), 1.480 (2.36), 1.500

(0.99), 1.584 (2.93), 1.600 (2.53), 1.721 (1.36), 1.757 (2.85), 1.779 (2.43), 1.907 (1.65), 1.925 (2.68), 1.941 (1.46), 2.110 (1.18), 2.125 (2.13), 2.144 (1.12), 2.482 (1.29), 2.519 (1.31), 2.699 (1.69), 2.717 (1.59), 2.788 (1.78), 2.804 (1.71), 3.031 (2.12), 3.052 (3.86), 3.073 (2.08), 3.233 (0.60), 3.252 (5.22), 3.262 (7.02), 3.456 (0.42), 3.475 (16.00), 3.495 (0.43), 3.920 (3.15), 3.942 (3.00), 4.524 (6.08), 4.533 (6.04), 7.824 (11.55), 7.879 (1.35), 7.883 (1.50), 7.897 (2.52), 7.911 (1.45), 7.914 (1.45), 8.459 (5.46), 8.462 (5.45), 8.666 (1.84), 8.675 (3.81), 8.685 (1.89).

Example 63

N-[(3,5-Difluoropyridin-2-yl)methyl]-2-(3,3-dimethyl[1,4'-bipiperidin]-1'-yl)-1,3-thiazole carboxamide

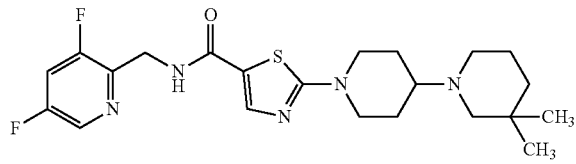

2-Bromo-N-[(3,5-difluoropyridin-2-yl)methyl]-1,3-thiazole-5-carboxamide (50.0 mg, 150 μmol) and 3,3-dimethyl-1,4'-bipiperidine dihydrochloride (52.3 mg) were initially charged in 1 ml of water. Sodium carbonate (63.4 mg, 599 μmol) was added and the mixture was stirred at 120° C. for 1 h. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 37.0 mg (purity 100%, 55% of theory) of the target compound.

LC-MS (method 1): R$_t$=0.95 min; MS (ESIpos): m/z=450 [M+H]$^+$.

$^1$H-NMR (600 MHz, DMSO-d6) δ [ppm]: 0.882 (16.00), 1.150 (0.79), 1.160 (1.14), 1.170 (0.89), 1.468 (1.40), 1.479 (1.32), 1.488 (1.33), 1.729 (0.86), 1.747 (0.73), 2.097 (2.01), 2.392 (0.76), 2.473 (0.61), 3.034 (0.54), 3.038 (0.63), 3.056 (1.10), 3.076 (0.63), 3.080 (0.54), 3.902 (0.87), 3.923 (0.82), 4.520 (1.58), 4.529 (1.56), 7.826 (3.86), 7.894 (0.42), 7.898 (0.44), 7.911 (0.63), 7.913 (0.67), 7.926 (0.43), 7.930 (0.43), 8.464 (1.64), 8.468 (1.59), 8.699 (0.51), 8.709 (1.03), 8.719 (0.50).

Example 64

2-[4-(5-Azaspiro[2.5]octan-5-yl)piperidin-1-yl]-N-[(3,5-difluoropyridin-2-yl)methyl]-1,3-thiazole-5-carboxamide

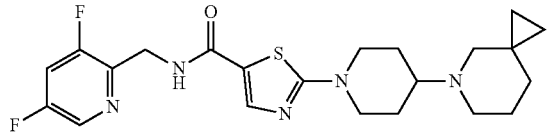 [SMILES: O=C(NCc1ncc(F)cc1F)c1cnc(N2CCC(N3CCCC4(CC4)C3)CC2)s1]

2-Bromo-N-[(3,5-difluoropyridin-2-yl)methyl]-1,3-thiazole-5-carboxamide (200 mg, 599 μmol) and 5-(piperidin-4-yl)-5-azaspiro[2.5]octane dihydrochloride (180 mg) were initially charged in 2 ml of water. Sodium carbonate (254 mg, 2.39 mmol) was added and the mixture was stirred at 120° C. for 1 h. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 108 mg (purity 100%, 40% of theory) of the target compound.

LC-MS (method 1): R$_t$=0.90 min; MS (ESIpos): m/z=448 [M+H]$^+$.

$^1$H.NMR (500 MHz, DMSO-d6) δ [ppm]: δ 8.70 (t, 1H), 8.46 (d, 1H), 7.94-7.89 (m, 1H), 7.82 (s, 1H), 4.52 (d, 2H), 3.90 (d br, 2H), 3.08-3.02 (m, 2H), 2.47-2.40 (m, 3H), 2.19 (s, 2H) 1.77 (d br, 2H), 1.57 (m, 2H), 1.50-1.40 (m, 2H), 1.24 (t, 2H), 0.28-0.21 (m, 4H).

Example 65 rac-2-[4-(1,1-Difluoro-5-azaspiro[2.5]octan-5-yl)piperidin-1-yl]-N-[(3,5-difluoropyridin-2-yl)methyl]-1,3-thiazole-5-carboxamide

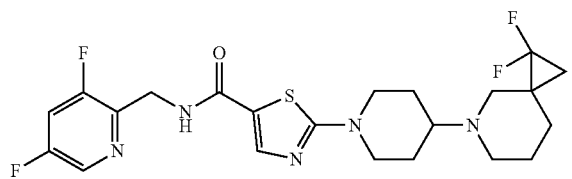 [SMILES: O=C(NCc1ncc(F)cc1F)c1cnc(N2CCC(N3CCCC4(C3)CC4(F)F)CC2)s1]

2-Bromo-N-[(3,5-difluoropyridin-2-yl)methyl]-1,3-thiazole-5-carboxamide (100 mg, 299 μmol) and rac-1,1-difluoro-5-(piperidin-4-yl)-5-azaspiro[2.5]octane dihydrochloride (104 mg) were initially charged in 1 ml of water. Sodium carbonate (127 mg, 1.20 mmol) was added and the mixture was stirred at 120° C. for 1 h. The reaction mixture was then diluted with water and extracted with dichloromethane. The organic phase was dried over $Na_2SO_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 62.0 mg (purity 100%, 43% of theory) of the target compound.

LC-MS (method 5): $R_t$=1.56 min; MS (ESIpos): m/z=484 $[M+H]^+$.

$^1$H.NMR (500 MHz, DMSO-d6) δ [ppm]: δ 8.71 (t, 1H), 8.46 (d, 1H), 7.94-7.89 (m, 1H), 7.83 (s, 1H), 4.52 (d, 2H), 3.92 (d br, 2H), 3.10-3.02 (m, 2H), 2.67-2.57 (m, 3H), 2.44-2.37 (m, 2H), 1.78 (t br, 2H), 1.60 (m, 1H), 1.53-1.42 (m, 5H), 1.26-1.14 (m, 2H).

Example 66 rac-2-[3-(Cyclobutylmethoxy)[1,4'-bipiperidin]-1'-yl]-N-[(3,5-difluoropyridin-2-yl)methyl]-1,3-thiazole-5-carboxamide

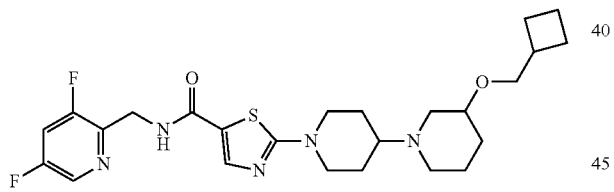

N,N-Diisopropylethylamine (49 μl, 280 μmol) and acetic acid (12 μl, 210 μmol) were added in succession to a solution of N-[(3,5-difluoropyridin-2-yl)methyl]-2-(4-oxopiperidin-1-yl)-1,3-thiazole-5-carboxamide (50.0 mg, 142 μmol) and rac-3-(cyclobutylmethoxy)piperidine hydrochloride (58.4 mg, 284 μmol) in 5 ml of dichloromethane, and the mixture was stirred at room temperature overnight. Subsequently, sodium triacetoxyborohydride (36.1 mg, 170 μmol) was added and stirring of the mixture at room temperature was continued. After 1.5 h, more sodium triacetoxyborohydride (36.1 mg, 170 μmol) was added and stirring of the mixture at room temperature was continued. After 2 h, sat. NaHCO₃ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 5.00 mg (purity 100%, 7% of theory) of the target compound.

LC-MS (method 1): $R_t$=1.22 min; MS (ESIpos): m/z=506 $[M+H]^+$.

$^1$H-NMR (600 MHz, DMSO-d6) δ [ppm]: 1.009 (0.53), 1.016 (0.59), 1.029 (1.45), 1.036 (1.37), 1.053 (1.53), 1.066 (0.71), 1.074 (0.56), 1.316 (0.60), 1.337 (1.44), 1.357 (1.50), 1.376 (0.65), 1.453 (0.95), 1.472 (2.73), 1.492 (2.83), 1.511 (1.08), 1.610 (1.84), 1.632 (1.99), 1.643 (3.00), 1.657 (3.90), 1.672 (3.26), 1.685 (1.32), 1.759 (3.93), 1.781 (4.11), 1.796 (2.12), 1.808 (3.21), 1.822 (4.29), 1.836 (2.48), 1.840 (1.45), 1.849 (0.87), 1.854 (0.98), 1.867 (0.44), 1.890 (1.64), 1.904 (1.62), 1.919 (1.99), 1.931 (3.81), 1.945 (6.23), 1.953 (3.44), 1.961 (4.23), 1.974 (1.09), 2.059 (1.35), 2.073 (2.48), 2.092 (1.33), 2.403 (1.00), 2.415 (2.19), 2.427 (2.80), 2.440 (2.11), 2.452 (0.94), 2.564 (1.15), 2.652 (2.37), 2.669 (1.88), 2.942 (1.96), 2.954 (1.82), 3.018 (2.55), 3.038 (4.84), 3.058 (2.54), 3.205 (1.36), 3.214 (1.73), 3.221 (2.34), 3.229 (1.64), 3.237 (1.32), 3.244 (0.74), 3.293 (0.74), 3.354 (1.90), 3.365 (2.08), 3.370 (5.42), 3.382 (7.32), 3.394 (5.38), 3.399 (2.01), 3.410 (1.64), 3.929 (3.33), 3.949 (3.21), 4.520 (6.95), 4.530 (6.93), 7.828 (16.00), 7.894 (1.82), 7.898 (1.94), 7.913 (2.92), 7.926 (1.83), 7.930 (1.88), 8.465 (7.15), 8.468 (7.02), 8.701 (2.24), 8.711 (4.57), 8.721 (2.24).

Example 67 rac-2-[3-(Cyclopropylmethoxy)[1,4'-bipiperidin]-1'-yl]-N-[(3,5-difluoropyridin-2-yl)methyl]-1,3-thiazole-5-carboxamide

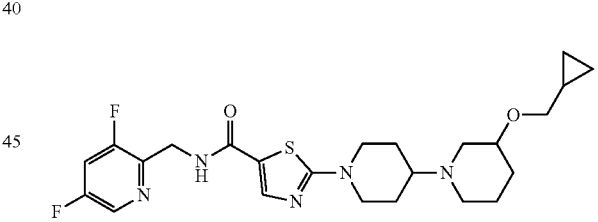

2-Bromo-N-[(3,5-difluoropyridin-2-yl)methyl]-1,3-thiazole-5-carboxamide (60.8 mg, 182 μmol) and rac-3-(cyclopropylmethoxy)-1,4'-bipiperidine dihydrochloride (50.0 mg) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over $Na_2SO_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 20.0 mg (purity 100%, 22% of theory) of the target compound.

LC-MS (method 1): $R_t$=1.06 min; MS (ESIpos): m/z=492 [M+H]$^+$.

$^1$H-NMR (600 MHz, DMSO-d6) δ [ppm]: 0.114 (2.20), 0.122 (7.19), 0.129 (7.41), 0.137 (2.33), 0.410 (2.11), 0.416 (6.34), 0.419 (6.12), 0.430 (6.52), 0.433 (6.08), 0.439 (1.85), 0.923 (1.53), 0.935 (2.28), 0.947 (1.44), 1.024 (0.64), 1.038 (1.55), 1.060 (1.59), 1.075 (0.78), 1.316 (0.66), 1.336 (1.50), 1.357 (1.60), 1.376 (0.70), 1.451 (1.00), 1.471 (2.74), 1.482 (2.39), 1.491 (2.85), 1.499 (1.88), 1.511 (1.16), 1.610 (1.97), 1.633 (1.67), 1.758 (3.91), 1.777 (3.38), 1.886 (1.71), 1.900 (1.62), 1.926 (2.05), 1.942 (3.48), 1.959 (2.11), 2.062 (1.42), 2.077 (2.57), 2.095 (1.40), 2.423 (0.62), 2.520 (1.90), 2.558 (1.22), 2.652 (2.62), 2.669 (2.02), 2.943 (2.00), 2.956 (1.92), 3.018 (2.70), 3.037 (5.11), 3.057 (2.70), 3.240 (13.81), 3.251 (14.04), 3.264 (2.67), 3.271 (1.87), 3.280 (1.60), 3.288 (1.56), 3.344 (0.84), 3.927 (3.48), 3.946 (3.30), 4.520 (7.38), 4.529 (7.39), 7.827 (16.00), 7.895 (1.83), 7.899 (1.91), 7.915 (3.15), 7.927 (1.89), 7.931 (1.94), 8.465 (7.46), 8.469 (7.11), 8.702 (2.42), 8.711 (4.84), 8.721 (2.39).

Example 68 rac-2-{3-[(Cyclobutyloxy)methyl][1,4'-bipiperidin]-1'-yl}-N-[(3,5-difluoropyridin-2-yl)methyl]-1,3-thiazole-5-carboxamide

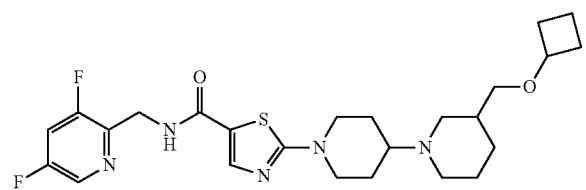 [SMILES: O=C(NCc1ncc(F)cc1F)c1cnc(N2CCC(N3CCCC(COC4CCC4)C3)CC2)s1]

2-Bromo-N-[(3,5-difluoropyridin-2-yl)methyl]-1,3-thiazole-5-carboxamide (100 mg, 299 μmol) and rac-3-[(cyclobutyloxy)methyl]-1,4'-bipiperidine dihydrochloride (144 mg) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength: 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 38.0 mg (purity 100%, 25% of theory) of the target compound.

LC-MS (method 1): $R_t$=1.11 min; MS (ESIpos): m/z=506 [M+H]$^+$.

$^1$H-NMR (600 MHz, DMSO-d6) δ [ppm]: 0.880 (0.72), 0.897 (1.70), 0.913 (1.85), 0.932 (0.78), 1.361 (0.72), 1.381 (1.75), 1.387 (1.75), 1.404 (2.77), 1.418 (3.45), 1.435 (3.99), 1.443 (2.72), 1.450 (3.84), 1.463 (3.80), 1.483 (2.61), 1.574 (4.23), 1.588 (6.01), 1.604 (4.37), 1.622 (1.30), 1.659 (1.93), 1.753 (6.08), 1.761 (6.58), 1.768 (6.61), 1.774 (6.32), 1.804 (0.59), 1.883 (2.18), 1.900 (3.68), 1.917 (1.93), 2.099 (5.66), 2.113 (7.26), 2.131 (2.89), 2.522 (1.55), 2.691 (2.43), 2.709 (2.25), 2.788 (2.57), 2.802 (2.45), 3.022 (3.24), 3.041 (6.13), 3.061 (3.30), 3.084 (4.70), 3.098 (4.88), 3.101 (5.01), 3.111 (4.67), 3.117 (2.12), 3.127 (1.53), 3.294 (0.66), 3.357 (0.67), 3.793 (0.85), 3.805 (3.00), 3.818 (4.35), 3.829 (2.93), 3.842 (0.82), 3.924 (4.69), 3.945 (4.39), 4.520 (8.81), 4.529 (8.73), 7.827 (16.00), 7.896 (1.92), 7.911 (3.69), 7.926 (1.86), 8.464 (7.34), 8.467 (7.27), 8.700 (2.70), 8.709 (5.37), 8.719 (2.66).

Example 69 rac-2-{3-[(Cyclopropylmethoxy)methyl][1,4'-bipiperidin]-1'-yl}-N-[(3,5-difluoropyridin-2-yl)methyl]-1,3-thiazole-5-carboxamide

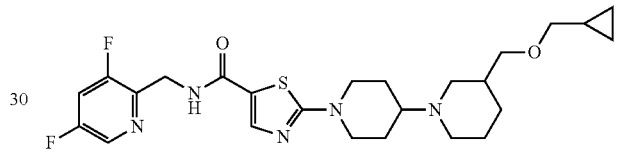

2-Bromo-N-[(3,5-difluoropyridin-2-yl)methyl]-1,3-thiazole-5-carboxamide (50.9 mg, 152 μmol) and rac-3-[(cyclopropylmethoxy)methyl]-1,4'-bipiperidine dihydrochloride (44.0 mg) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 15.0 mg (purity 100%, 19% of theory) of the target compound.

LC-MS (method 1): $R_t$=1.12 min; MS (ESIpos): m/z=506 [M+H]$^+$.

$^1$H-NMR (600 MHz, DMSO-d6) δ [ppm]: 0.118 (2.25), 0.126 (9.10), 0.134 (9.17), 0.142 (2.22), 0.419 (2.38), 0.426 (7.33), 0.427 (7.44), 0.439 (7.57), 0.441 (7.33), 0.448 (1.98), 0.889 (0.73), 0.904 (1.72), 0.922 (2.00), 0.947 (2.51), 0.958 (2.65), 0.969 (1.73), 0.978 (0.81), 1.369 (0.75), 1.388 (1.75), 1.409 (1.76), 1.428 (1.26), 1.435 (1.20), 1.447 (2.46), 1.467 (3.67), 1.487 (2.56), 1.507 (0.71), 1.573 (2.43), 1.579 (2.59), 1.593 (4.27), 1.609 (2.19), 1.705 (1.94), 1.766 (3.63), 1.894

(2.27), 1.911 (3.77), 1.928 (1.94), 2.099 (1.66), 2.114 (3.06), 2.132 (1.60), 2.526 (1.44), 2.701 (2.49), 2.719 (2.26), 2.802 (2.62), 2.817 (2.51), 3.026 (3.23), 3.045 (6.22), 3.064 (3.23), 3.147 (0.41), 3.165 (13.68), 3.176 (13.45), 3.191 (1.65), 3.206 (5.08), 3.219 (9.08), 3.228 (5.08), 3.234 (1.95), 3.244 (1.30), 3.296 (0.60), 3.923 (4.82), 3.944 (4.45), 4.521 (8.96), 4.530 (8.75), 7.827 (16.00), 7.893 (2.03), 7.896 (2.11), 7.911 (3.75), 7.924 (2.05), 7.928 (2.02), 8.464 (8.06), 8.467 (7.70), 8.700 (2.76), 8.710 (5.37), 8.719 (2.62).

Example 70 rac-N-[(3,5-Difluoropyridin-2-yl)methyl]-2-[3-ethoxy[1,4'-bipiperidin]-1'-yl]-1,3-thiazole-5-carboxamide

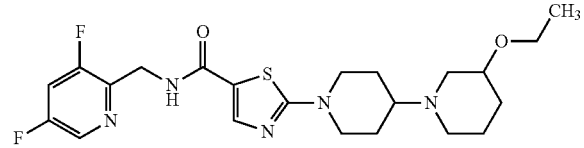

Acetic acid (12 µl, 210 µmol) was added to a solution of N-[(3,5-difluoropyridin-2-yl)methyl]-2-(4-oxopiperidin-1-yl)-1,3-thiazole-5-carboxamide (50.0 mg, 142 µmol) and rac-3-ethoxypiperidine (36.7 mg, 284 µmol) in 5 ml of dichloromethane, and the mixture was stirred at room temperature overnight. Subsequently, sodium triacetoxyborohydride (36.1 mg, 170 µmol) was added and stirring of the mixture at room temperature was continued. After 4 h, sat. NaHCO$_3$ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 15.0 mg (purity 100%, 23% of theory) of the target compound.

LC-MS (method 1): R$_t$=0.94 min; MS (ESIpos): m/z=466 [M+H]$^+$.

$^1$H-NMR (600 MHz, DMSO-d6) δ [ppm]: 1.021 (0.44), 1.035 (0.92), 1.042 (0.86), 1.057 (8.38), 1.068 (16.00), 1.080 (8.12), 1.320 (0.40), 1.342 (0.87), 1.360 (0.89), 1.472 (1.63), 1.492 (1.70), 1.511 (0.65), 1.611 (1.11), 1.617 (0.92), 1.627 (0.80), 1.634 (1.00), 1.759 (2.28), 1.778 (1.99), 1.887 (0.97), 1.901 (0.93), 1.935 (1.27), 1.951 (2.00), 1.967 (1.30), 2.062 (0.81), 2.076 (1.56), 2.080 (1.49), 2.095 (0.84), 2.523 (1.00), 2.561 (0.76), 2.652 (1.54), 2.670 (1.13), 2.938 (1.14), 2.949 (1.07), 3.019 (1.52), 3.038 (2.87), 3.058 (1.56), 3.221 (0.46), 3.228 (0.88), 3.235 (1.05), 3.244 (1.46), 3.251 (1.03), 3.259 (0.83), 3.266 (0.45), 3.346 (0.70), 3.351 (0.76), 3.423 (0.98), 3.427 (1.06), 3.434 (1.21), 3.438 (4.04), 3.450 (6.06), 3.461 (4.04), 3.465 (1.20), 3.473 (1.09), 3.477 (0.96), 3.927 (1.96), 3.948 (1.87), 4.521 (4.14), 4.530 (4.13), 7.828 (11.05), 7.895 (1.16), 7.899 (1.24), 7.912 (1.70), 7.914 (1.80), 7.927 (1.19), 7.931 (1.24), 8.465 (4.56), 8.469 (4.52), 8.702 (1.37), 8.712 (2.80), 8.721 (1.38).

Example 71

N-[(3,5-Difluoropyridin-2-yl)methyl]-2-{4-[(3R)-3-methylpiperidin-1-yl]azepan-1-yl}-1,3-thiazole-5-carboxamide

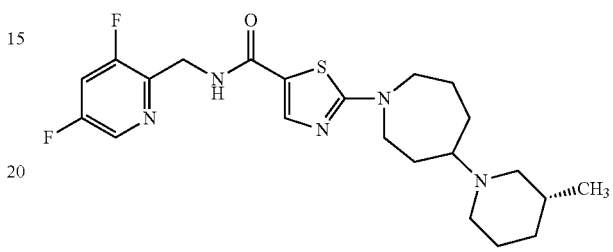

2-Bromo-N-[(3,5-difluoropyridin-2-yl)methyl]-1,3-thiazole-5-carboxamide (70.0 mg, 209 µmol) and 4-[(3R)-3-methylpiperidin-1-yl]azepane dihydrochloride (48.8 mg) were initially charged in 1 ml of water. Sodium carbonate (88.8 mg, 838 µmol) was added and the mixture was stirred at 120° C. for 1 h. The reaction mixture was then diluted with water and extracted with dichloromethane. The organic phase was dried over Na$_2$SO$_4$, the drying agent was filtered off and the filtrate was concentrated on a rotary evaporator. The residue was dissolved in DMSO and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 38.0 mg (purity 100%, 40% of theory) of the target compound.

LC-MS (method 5): R$_t$=1.80 min; MS (ESIpos): m/z=450 [M+H]$^+$.

$^1$H-NMR (600 MHz, DMSO-d6) δ [ppm]: 0.763 (0.66), 0.790 (11.01), 0.794 (11.81), 0.800 (12.77), 0.805 (11.44), 1.354 (1.54), 1.368 (3.05), 1.373 (2.83), 1.387 (2.70), 1.409 (1.20), 1.488 (1.52), 1.534 (2.35), 1.556 (2.32), 1.593 (2.70), 1.614 (2.01), 1.688 (1.57), 1.705 (1.69), 1.722 (0.79), 1.740 (1.27), 1.757 (4.10), 1.773 (4.04), 1.790 (2.51), 1.894 (3.01), 2.065 (1.69), 2.383 (1.59), 2.399 (2.60), 2.417 (1.27), 2.599 (4.31), 2.615 (3.21), 3.354 (1.52), 3.378 (2.77), 3.397 (2.73), 3.655 (1.75), 4.519 (7.77), 4.528 (7.74), 7.825 (16.00), 7.893 (1.86), 7.897 (1.91), 7.909 (3.18), 7.924 (1.95), 7.928 (1.92), 8.463 (7.52), 8.467 (7.26), 8.646 (2.37), 8.656 (4.74), 8.665 (2.33).

Example 72

2-[(3R)-3-methyl[1,4'-bipiperidin]-1'-yl]-N-[(6-methylpyridin-3-yl)methyl]-1,3-thiazole-5-carboxamide

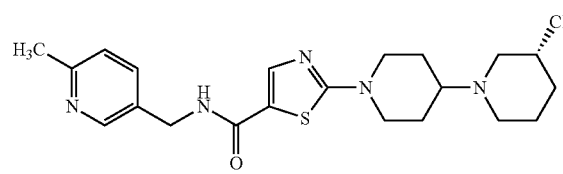

N,N-Diisopropylethylamine (180 µl, 1.0 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid dihydrochloride (100 mg, 262 µmol) and 1-(6-methylpyridin-3-yl)methanamine (35.1 mg, 288 µmol) in 5 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 19.0 mg (purity 100%, 18% of theory) of the target compound.

LC-MS (method 1): $R_t$=0.55 min; MS (ESIneg): m/z=412 [M−H]⁻.

¹H-NMR (600 MHz, DMSO-d6) δ [ppm]: 0.799 (0.74), 0.811 (7.56), 0.822 (8.04), 1.388 (0.65), 1.408 (0.66), 1.466 (1.03), 1.490 (1.23), 1.508 (0.93), 1.519 (0.60), 1.525 (0.54), 1.564 (0.83), 1.580 (0.51), 1.586 (0.67), 1.615 (0.70), 1.636 (0.67), 1.732 (0.88), 1.750 (1.63), 1.767 (2.09), 1.783 (1.34), 2.032 (0.52), 2.046 (0.96), 2.050 (0.94), 2.065 (0.52), 2.431 (16.00), 2.470 (0.64), 2.720 (0.87), 2.734 (1.57), 2.751 (0.74), 3.026 (1.11), 3.044 (1.97), 3.064 (1.13), 3.924 (1.42), 3.945 (1.35), 4.349 (3.74), 4.359 (3.72), 7.196 (2.33), 7.210 (2.52), 7.556 (1.53), 7.560 (1.54), 7.570 (1.45), 7.573 (1.43), 7.795 (6.86), 8.366 (2.40), 8.370 (2.40), 8.711 (0.92), 8.721 (1.84), 8.731 (0.92).

Example 73

N-Benzyl-2-[(3R)-3-methyl[1,4'-bipiperidin]-1'-yl]-1,3-thiazole-5-carboxamide

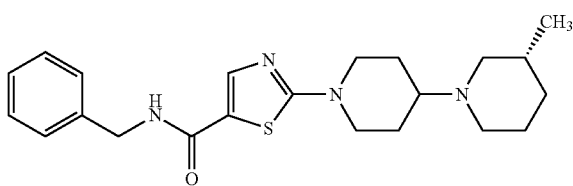 [SMILES: C[C@@H]1CCCN(C2CCN(c3ncc(C(=O)NCc4ccccc4)s3)CC2)C1]

N,N-Diisopropylethylamine (100 µl, 580 µmol) and propylphosphonic anhydride (47 µl, 50% in ethyl acetate, 160 µmol) were added to a solution of 2-[(3R)-3-methyl[1,4'-bipiperidin]-1'-yl]-1,3-thiazole-5-carboxylic acid hydrochloride (50.0 mg, 145 µmol) and 1-phenylmethanamine (17 µl, 160 µmol) in 5 ml of acetonitrile, and the mixture was stirred at room temperature. After 30 min, the reaction mixture was concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 25.0 mg (purity 100%, 43% of theory) of the target compound.

LC-MS (method 1): $R_t$=1.04 min; MS (ESIpos): m/z=399 [M+H]⁺.

¹H-NMR (600 MHz, DMSO-d6) δ [ppm]: 0.785 (0.53), 0.791 (0.62), 0.815 (14.94), 0.826 (16.00), 0.844 (0.63), 0.851 (0.53), 1.372 (0.52), 1.393 (1.35), 1.407 (0.92), 1.413 (1.45), 1.433 (0.62), 1.458 (0.78), 1.477 (2.21), 1.496 (2.75), 1.513 (2.00), 1.531 (1.04), 1.542 (0.63), 1.567 (1.74), 1.572 (1.34), 1.583 (1.05), 1.589 (1.39), 1.617 (1.47), 1.638 (1.39), 1.739 (1.91), 1.757 (3.65), 1.773 (4.17), 1.788 (2.83), 2.038 (1.12), 2.053 (2.08), 2.056 (2.04), 2.071 (1.14), 2.471 (1.17), 2.477 (0.82), 2.724 (1.87), 2.736 (3.43), 2.754 (1.63), 3.030 (2.28), 3.048 (4.18), 3.068 (2.31), 3.929 (3.15), 3.951 (2.98), 4.387 (7.95), 4.397 (7.93), 7.225 (1.22), 7.237 (3.31), 7.248 (2.13), 7.277 (4.54), 7.289 (8.70), 7.310 (6.60), 7.322 (7.31), 7.336 (2.52), 7.822 (11.60), 8.684 (1.68), 8.694 (3.35), 8.704 (1.70).

Example 74 diamix-N-[(3,5-Difluoropyridin-2-yl)methyl]-2-[3-({[3-fluorobutyl]oxy}methyl)[1,4'-bipiperidin]-1'-yl]-1,3-thiazole-5-carboxamide

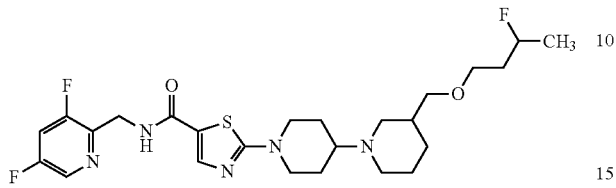

2-Bromo-N-[(3,5-difluoropyridin-2-yl)methyl]-1,3-thiazole-5-carboxamide (100 mg, 299 μmol) and diamix-3-[(3-fluorobutoxy)methyl]-1,4'-bipiperidine dihydrochloride (92.4 mg) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over $Na_2SO_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 45.0 mg (purity 100%, 29% of theory) of the target compound.

LC-MS (method 1): $R_t$=1.10 min; MS (ESIpos): m/z=526 [M+H]$^+$.

$^1$H-NMR (600 MHz, DMSO-d6) δ [ppm]: 0.894 (0.51), 0.910 (1.21), 0.927 (1.31), 0.946 (0.55), 1.231 (1.01), 1.249 (9.88), 1.259 (9.97), 1.289 (9.92), 1.300 (9.69), 1.367 (0.53), 1.387 (1.24), 1.407 (1.28), 1.426 (0.92), 1.434 (0.92), 1.445 (1.68), 1.455 (1.93), 1.465 (2.52), 1.476 (2.04), 1.485 (1.80), 1.493 (0.81), 1.504 (0.53), 1.574 (1.89), 1.589 (2.71), 1.595 (2.68), 1.698 (1.15), 1.710 (1.65), 1.721 (1.89), 1.729 (1.76), 1.734 (1.74), 1.742 (2.56), 1.752 (3.56), 1.758 (3.71), 1.768 (3.79), 1.771 (3.66), 1.777 (3.74), 1.780 (3.74), 1.787 (2.97), 1.799 (1.97), 1.808 (0.76), 1.900 (1.21), 1.915 (2.14), 1.931 (1.08), 2.101 (1.15), 2.115 (2.11), 2.133 (1.13), 2.485 (1.36), 2.522 (1.14), 2.698 (1.78), 2.716 (1.64), 2.788 (1.77), 2.804 (1.72), 3.023 (2.35), 3.043 (4.47), 3.064 (2.31), 3.181 (0.85), 3.197 (1.94), 3.209 (5.46), 3.221 (4.27), 3.231 (1.98), 3.237 (1.28), 3.247 (0.88), 3.368 (0.58), 3.378 (1.01), 3.384 (1.18), 3.387 (0.79), 3.394 (1.92), 3.401 (3.11), 3.411 (4.27), 3.421 (2.19), 3.428 (1.41), 3.431 (1.34), 3.441 (1.12), 3.444 (0.79), 3.457 (0.56), 3.921 (3.36), 3.943 (3.18), 4.521 (6.49), 4.530 (6.43), 4.687 (0.71), 4.698 (0.98), 4.708 (0.96), 4.718 (0.66), 4.769 (0.74), 4.780 (1.12), 4.790 (1.10), 4.800 (0.71), 7.828 (16.00), 7.892 (1.77), 7.896 (1.83), 7.909 (2.66), 7.911 (2.78), 7.924 (1.78), 7.928 (1.78), 8.463 (7.00), 8.467 (6.72), 8.701 (2.17), 8.710 (4.39), 8.720 (2.11).

Example 75 rac-2-(3-{[(3,3-Difluorocyclobutyl)methoxy]methyl}[1,4'-bipiperidin]-1'-yl)-N-[(3,5-difluoropyridin-2-yl)methyl]-1,3-thiazole-5-carboxamide

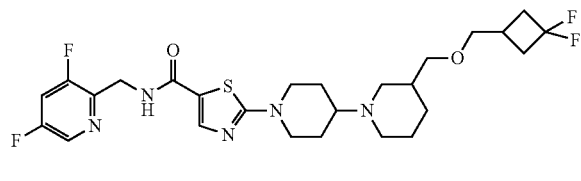 [SMILES: O=C(NCc1ncc(F)cc1F)c1cnc(N2CCC(N3CCCC(COCC4CC(F)(F)C4)C3)CC2)s1]

2-Bromo-N-[(3,5-difluoropyridin-2-yl)methyl]-1,3-thiazole-5-carboxamide (100 mg, 299 μmol) and rac-3-{[(3,3-difluorocyclobutyl)methoxy]methyl}-1,4'-bipiperidine dihydrochloride (286 mg) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over $Na_2SO_4$, the drying agent was filtered off and the filtrate was concentrated on a rotary evaporator. The residue was dissolved in DMSO and purified by preparative HPLC (instrument: Waters Prep LC/MS System, column: XBridge C18 5 μm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 42.0 mg (purity 100%, 25% of theory) of the target compound.

LC-MS (method 1): $R_t$=1.20 min; MS (ESIpos): m/z=556 [M+H]$^+$.

$^1$H-NMR (600 MHz, DMSO-d6) δ [ppm]: 0.911 (0.78), 0.928 (1.72), 0.945 (1.85), 0.963 (0.81), 1.374 (0.78), 1.394 (1.76), 1.414 (1.76), 1.434 (1.28), 1.441 (1.17), 1.454 (2.40), 1.466 (2.42), 1.473 (3.58), 1.486 (2.51), 1.493 (2.58), 1.596 (3.83), 1.731 (2.04), 1.759 (4.07), 1.917 (2.39), 1.935 (3.91), 1.952 (2.04), 2.110 (1.73), 2.126 (3.13), 2.144 (1.58), 2.261 (0.89), 2.274 (1.32), 2.295 (3.70), 2.317 (5.95), 2.336 (3.61), 2.485 (2.03), 2.521 (1.62), 2.564 (2.23), 2.574 (2.41), 2.578 (2.59), 2.587 (3.86), 2.601 (2.66), 2.611 (2.16), 2.701 (2.47), 2.719 (2.29), 2.789 (2.63), 2.804 (2.46), 3.029 (3.08), 3.050 (5.72), 3.070 (3.05), 3.231 (0.68), 3.247 (9.82), 3.258 (11.25), 3.358 (0.88), 3.381 (7.63), 3.389 (5.10), 3.405 (0.86), 3.921 (4.65), 3.943 (4.34), 4.524 (8.79), 4.534 (8.71), 7.823 (16.00), 7.878 (1.95), 7.882 (2.02), 7.897 (3.64), 7.910 (1.95), 7.914 (2.00), 8.458 (7.56), 8.462 (7.46), 8.665 (2.65), 8.674 (5.27), 8.684 (2.62).

Example 76

N-[(3-Fluoropyridin-4-yl)methyl]-2-[(3R)-3-methyl[1,4'-bipiperidin]-1'-yl]-1,3-thiazole-5-carboxamide

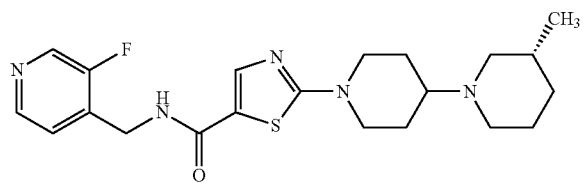 [SMILES: C[C@@H]1CCCN(C2CCN(c3ncc(C(=O)NCc4ccncc4F)s3)CC2)C1]

N,N-Diisopropylethylamine (180 µl, 1.0 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid hydrochloride (100 mg, 262 µmol) and 1-(3-fluoropyridin-yl)methanamine (36.3 mg, 288 µmol) in 5 ml of acetonitrile, and the mixture was stirred at room temperature overnight. The reaction mixture was then concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 21.0 mg (purity 100%, 19% of theory) of the target compound.

LC-MS (method 1): $R_t$=0.82 min; MS (ESIneg): m/z=416 [M–H]⁻.

$^1$H-NMR (600 MHz, DMSO-d6) δ [ppm]: 0.788 (0.58), 0.814 (15.04), 0.825 (16.00), 0.842 (0.70), 1.371 (0.56), 1.392 (1.36), 1.412 (1.46), 1.432 (0.62), 1.473 (2.29), 1.493 (2.88), 1.511 (2.09), 1.568 (1.79), 1.589 (1.42), 1.618 (1.54), 1.640 (1.49), 1.738 (1.72), 1.756 (3.14), 1.773 (4.60), 1.792 (2.86), 2.037 (1.07), 2.056 (2.00), 2.071 (1.12), 2.425 (0.56), 2.520 (1.70), 2.653 (0.50), 2.726 (1.87), 2.738 (3.35), 2.757 (1.60), 3.042 (2.38), 3.059 (4.22), 3.080 (2.39), 3.287 (0.93), 3.937 (3.04), 3.959 (2.92), 4.466 (7.56), 4.476 (7.60), 7.336 (2.33), 7.345 (3.35), 7.355 (2.45), 7.859 (12.63), 8.383 (4.52), 8.391 (4.59), 8.511 (6.60), 8.513 (6.51), 8.819 (1.88), 8.829 (3.81), 8.839 (1.85).

Example 77 rac-N-[(3,5-Difluoropyridin-2-yl)methyl]-2-[3-(2,2,2-trifluoroethoxy)[1,4'-bipiperidin]-1'-yl]-1,3-thiazole-5-carboxamide

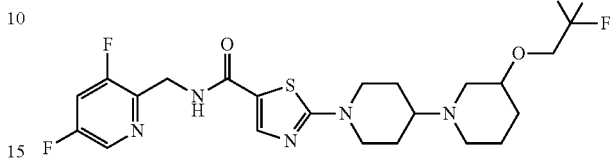

Acetic acid (12 µl, 210 µmol) was added to a solution of N-[(3,5-difluoropyridin-2-yl)methyl]-2-(4-oxopiperidin-1-yl)-1,3-thiazole-5-carboxamide (50.0 mg, 142 µmol) and rac-3-(2,2,2-trifluoroethoxy)piperidine (52.0 mg, 284 µmol) in 5 ml of dichloromethane, and the mixture was stirred at room temperature overnight. Subsequently, sodium triacetoxyborohydride (36.1 mg, 170 µmol) was added and stirring of the mixture at room temperature was continued. After 1.5 h, more sodium triacetoxyborohydride (36.1 mg, 170 µmol) was added and stirring of the mixture at room temperature was continued. After 2 h, sat. NaHCO₃ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 7.00 mg (purity 100%, 9% of theory) of the target compound.

LC-MS (method 1): $R_t$=1.06 min; MS (ESIpos): m/z=520 [M+H]⁺.

$^1$H-NMR (600 MHz, DMSO-d6) δ [ppm]: 1.124 (1.34), 1.147 (1.39), 1.160 (0.64), 1.343 (1.36), 1.365 (1.39), 1.475 (1.80), 1.496 (2.67), 1.516 (1.84), 1.637 (1.77), 1.658 (1.46), 1.758 (3.69), 1.777 (3.15), 1.916 (1.56), 2.015 (1.74), 2.032 (2.94), 2.048 (1.77), 2.106 (1.29), 2.120 (2.39), 2.138 (1.28), 2.423 (0.93), 2.565 (2.35), 2.584 (0.93), 2.640 (1.95), 2.652 (2.04), 2.658 (1.76), 2.969 (1.90), 2.981 (1.80), 3.025 (2.41), 3.045 (4.81), 3.065 (2.50), 3.282 (1.41), 3.289 (0.62), 3.345 (1.02), 3.350 (0.92), 3.447 (1.28), 3.455 (1.66), 3.462 (2.19), 3.470 (1.56), 3.478 (1.17), 3.934 (3.16), 3.953 (3.03), 4.042 (1.46), 4.049 (1.60), 4.058 (4.17), 4.065 (4.12), 4.073 (4.05), 4.081 (3.91), 4.096 (1.27), 4.520 (6.74), 4.529 (6.68), 7.828 (16.00), 7.895 (1.76), 7.900 (1.83), 7.915 (2.87), 7.927 (1.78), 7.931 (1.82), 8.465 (6.78), 8.469 (6.85), 8.703 (2.10), 8.712 (4.35), 8.722 (2.21).

Example 78

N-[(4,6-Dimethylpyridin-3-yl)methyl]-2-[(3R)-3-methyl[1,4'-bipiperidin]-1'-yl]-1,3-thiazole-5-carboxamide

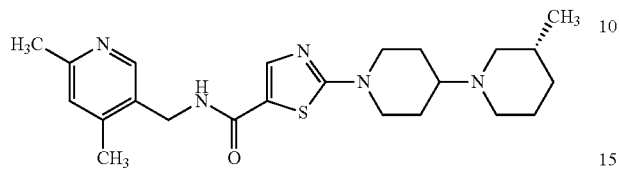

N,N-Diisopropylethylamine (180 µl, 1.0 mmol) and propylphosphonic anhydride (86 µl, 50% in ethyl acetate, 290 µmol) were added to a solution of 2-[(3R)-3-methyl[1,4'-bipiperidin]-1'-yl]-1,3-thiazole-5-carboxylic acid hydrochloride (100 mg, 262 µmol) and 1-(4,6-dimethylpyridin-yl)methanamine (39.2 mg, 288 µmol) in 5 ml of acetonitrile, and the mixture was stirred at room temperature overnight. The reaction mixture was then concentrated on a rotary evaporator and the residue was dissolved in DMSO, filtered and purified by preparative HPLC (instrument: Waters Prep LC/MS System, column: XBridge C18 5 µm 100×30 mm; mobile phase A: water, mobile phase B: acetonitrile, mobile phase C: 2% ammonia in water, mobile phase D: acetonitrile/water (80% by volume/20% by volume); total flow rate: 80 ml/min; room temperature; wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 8.00 mg (purity 100%, 7% of theory) of the target compound.

LC-MS (method 1): $R_t$=0.53 min; MS (ESIneg): m/z=426 [M−H]⁻.

¹H-NMR (400 MHz, DMSO-d6) δ [ppm]: −0.149 (0.57), 0.146 (0.57), 0.808 (8.12), 0.825 (8.74), 1.382 (0.62), 1.413 (0.76), 1.422 (0.69), 1.465 (1.17), 1.486 (1.46), 1.494 (1.54), 1.513 (0.97), 1.559 (0.97), 1.601 (0.93), 1.640 (0.67), 1.724 (1.01), 1.751 (2.71), 1.776 (1.44), 1.786 (1.36), 2.023 (0.58), 2.045 (0.99), 2.073 (0.56), 2.263 (16.00), 2.327 (0.71), 2.366 (1.24), 2.386 (15.84), 2.459 (0.67), 2.669 (0.76), 2.674 (0.57), 2.710 (2.03), 2.736 (1.41), 3.013 (1.10), 3.039 (1.91), 3.070 (1.13), 3.294 (2.40), 3.916 (1.56), 3.949 (1.50), 4.352 (3.75), 4.366 (3.82), 7.051 (3.86), 7.802 (8.23), 8.243 (4.42), 8.518 (0.89), 8.532 (1.87), 8.546 (0.89).

Example 79

N-[(4-Chloro-1-methyl-1H-pyrazol-5-yl)methyl]-2-[(3R)-3-methyl[1,4'-bipiperidin]-1'-yl]-1,3-thiazole-5-carboxamide

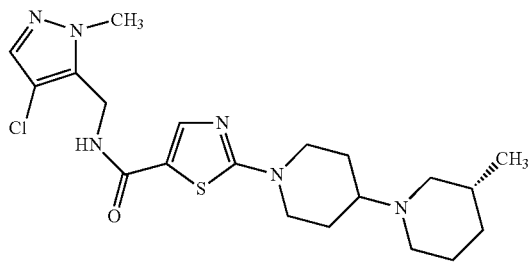 [SMILES: C[C@@H]1CCCN(C2CCN(c3ncc(C(=O)NCc4c(Cl)cnn4C)s3)CC2)C1]

30.9 mg (0.10 mmol) of 2-[(3R)-3-methyl[1,4'-bipiperidin]-F-yl]-1,3-thiazole-5-carboxylic acid, 53.2 mg (0.14 mmol) of HATU and 50 µl of 4-methylmorpholine were dissolved in 0.7 ml of DMF and stirred at RT for 30 min. The solution was then added to 29.2 mg (0.20 mmol) of 1-(4-chloro-1-methyl-1H-pyrazol-5-yl)methanamine, which had been initially charged into a well of a 96-well multititre plate, and the multititre plate was sealed and shaken at RT overnight. 0.2 ml of water were then added, the mixture was filtered and the filtrate was separated into its components by preparative LC-MS using one of the following methods:

Prep. LC-MS Methods:

MS instrument: Waters, HPLC instrument: Waters (column Waters X-Bridge C18, 19 mm×50 mm, 5 µm, mobile phase A: water+0.375% ammonia, mobile phase B: acetonitrile (ULC)+0.375% ammonia with gradient; flow rate: 40 ml/min; UV detection: DAD; 210-400 nm).

or alternatively:

MS instrument: Waters, HPLC instrument: Waters (column Phenomenex Luna 5µ C18(2) 100A, AXIA Tech. 50×21.2 mm, mobile phase A: water+0.0375% formic acid, mobile phase B: acetonitrile (ULC)+0.0375% formic acid with gradient; flow rate: 40 ml/min; UV detection: DAD; 210-400 nm).

In this way, 27.7 mg (63% of theory, 96% purity) of the title compound were obtained.

LC-MS (method 6, ESIpos): $R_t$=0.69 min; m/z=437 (M+H)⁺.

¹H-NMR (500 MHz, DMSO-d6, δ/ppm): 0.90 (d, 3H), 1.03-1.15 (m, 1H), 1.60-1.90 (m, 6H), 2.05-2.14 (m, 2H), 2.56-2.65 (m, 1H), 2.80-2.91 (m, 1H), 3.12 (br. t, 2H), 3.33 (br. d, 1H), 3.36-3.51 (m, 1H, partially obscured by H₂O), 3.82 (s, 3H), 4.08 (br. d, 2H), 4.45 (d, 2H), 7.49 (s, 1H), 7.85 (s, 1H), 8.68 (t, 1H), 8.96-9.04 (m, 1H).

In a parallel-synthetic manner analogously to Example 79, the following compounds of Examples 80 to 98 were prepared from 2-[(3R)-3-methyl[1,4'-bipiperidin]-1'-yl]-1,3-thiazole-5-carboxylic acid and the appropriate amine or its salt:

| Example | IUPAC name/structure (yield; purity) | LC-MS (Method 6) |
|---|---|---|
| 80 | N-(3-methoxybenzyl)-2-[(3R)-3-methyl[1,4'-bipiperidin]-1'-yl]-1,3-thiazole-5-carboxamide<br>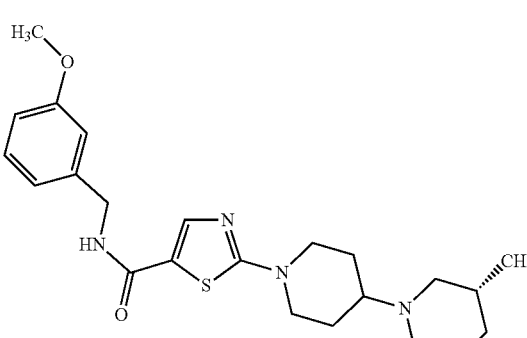<br>(66% of theory; purity 94%) | $R_t$ = 0.73 min; m/z = 429 (M + H)$^+$ |
| 81 | N-(2,5-difluorobenzyl)-2-[(3R)-3-methyl[1,4'-bipiperidin]-1'-yl]-1,3-thiazole-5-carboxamide<br>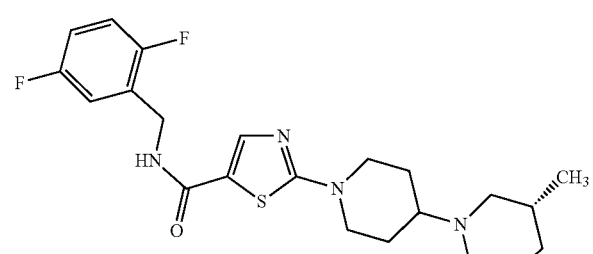<br>(16% of theory; purity 100%) | $R_t$ = 0.75 min; m/z = 435 (M + H)$^+$ |
| 82 | N-(3-hydroxybenzyl)-2-[(3R)-3-methyl[1,4'-bipiperidin]-1'-yl]-1,3-thiazole-5-carboxamide<br>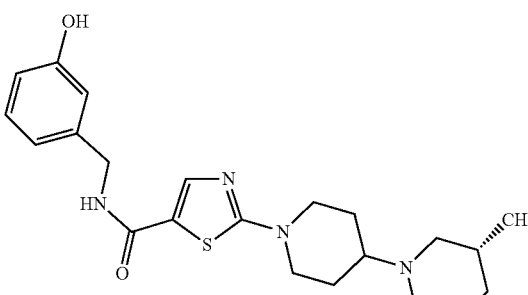<br>(67% of theory; purity 90%) | $R_t$ = 0.66 min; m/z = 415 (M + H)$^+$ |

-continued

| Example | IUPAC name/structure (yield; purity) | LC-MS (Method 6) |
|---------|--------------------------------------|------------------|
| 83 | rel-2-[(3R)-3-methyl[1,4'-bipiperidin]-1'-yl]-N-[(2R)-2-phenylpropyl]-1,3-thiazole-5-carboxamide (2 diastereomers)<br>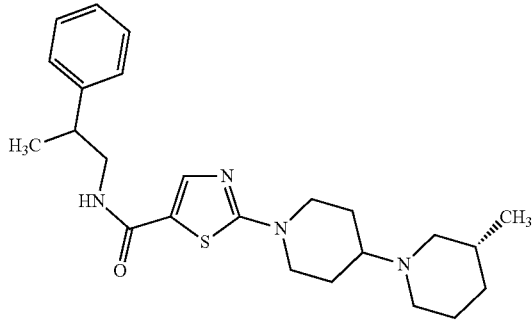<br>(50% of theory; purity 98%) | $R_t$ = 0.76 min; m/z = 427 (M + H)$^+$ |
| 84 | N-(4-fluorobenzyl)-2-[(3R)-3-methyl[1,4'-bipiperidin]-1'-yl]-1,3-thiazole-5-carboxamide<br>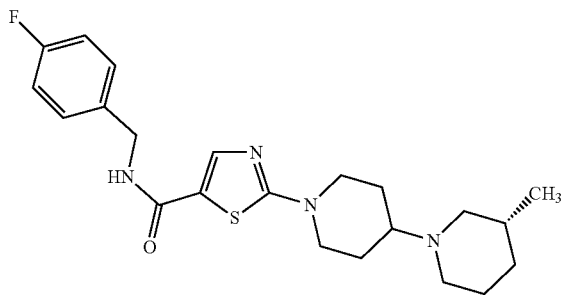<br>(81% of theory; purity 99%) | $R_t$ = 0.73 min; m/z = 417 (M + H)$^+$ |
| 85 | 2-[(3R)-3-Methyl[1,4'-bipiperidin]-1'-yl]-N-(pyridin-3-ylmethyl)-1,3-thiazole-5-carboxamide<br>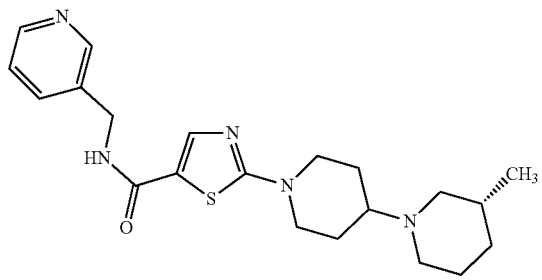<br>(32% of theory; purity 90%) | $R_t$ = 0.63 min; m/z = 400 (M + H)$^+$ |

-continued

| Example | IUPAC name/structure (yield; purity) | LC-MS (Method 6) |
|---|---|---|
| 86 | N-(3-fluorobenzyl)-2-[(3R)-3-methyl[1,4'-bipiperidin]-1'-yl]-1,3-thiazole-5-carboxamide<br>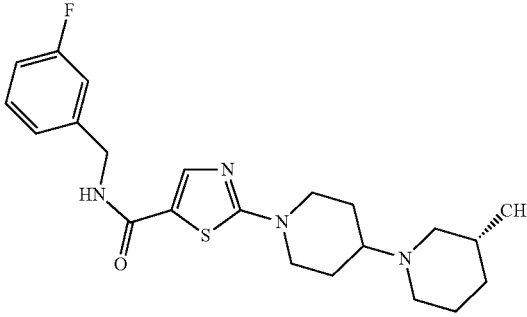<br>(96% of theory; purity 91%) | $R_t$ = 0.72 min; m/z = 417 $(M + H)^+$ |
| 87 | N-(2-fluorobenzyl)-2-[(3R)-3-methyl[1,4'-bipiperidin]-1'-yl]-1,3-thiazole-5-carboxamide<br>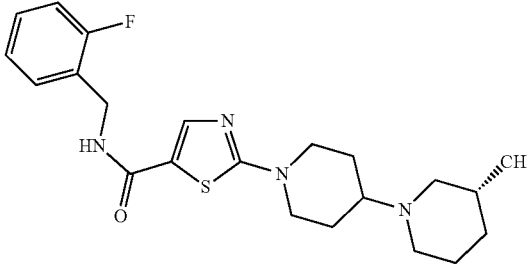<br>(72% of theory; purity 93%) | $R_t$ = 0.73 min; m/z = 417 $(M + H)^+$ |
| 88 | N-(2-chloro-4-fluorophenyl)-2-[(3R)-3-methyl[1,4'-bipiperidin]-1'-yl]-1,3-thiazole-5-carboxamide<br>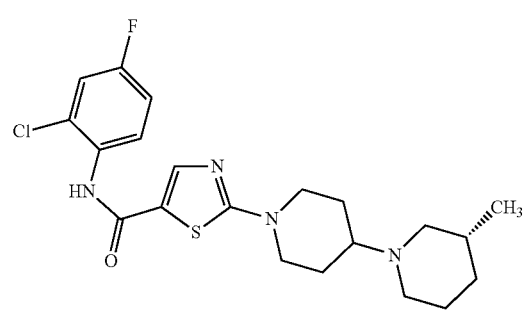<br>(10% of theory; purity 100%) | $R_t$ = 0.76 min; m/z = 437 $(M + H)^+$ |

| Example | IUPAC name/structure (yield; purity) | LC-MS (Method 6) |
| --- | --- | --- |
| 89 | N-(3-cyano-4-fluorophenyl)-2-[(3R)-3-methyl[1,4'-bipiperidin]-1'-yl]-1,3-thiazole-5-carboxamide<br>(14% of theory; purity 94%) | $R_t$ = 0.77 min; m/z = 428 (M + H)$^+$ |
| 90 | N-methyl-2-[(3R)-3-methyl[1,4'-bipiperidin]-1'-yl]-N-(pyridin-3-ylmethyl)-1,3-thiazole-5-carboxamide<br>(41% of theory; purity 96%) | $R_t$ = 0.60 min; m/z = 414 (M + H)$^+$ |
| 91 | N-methyl-2-[(3R)-3-methyl[1,4'-bipiperidin]-1'-yl]-N-(pyridin-4-ylmethyl)-1,3-thiazole-5-carboxamide<br>(47% of theory; purity 96%) | $R_t$ = 0.57 min; m/z = 414 (M + H)$^+$ |
| 92 | N-benzyl-N-methyl-2-[(3R)-3-methyl[1,4'-bipiperidin]-1'-yl]-1,3-thiazole-5-carboxamide<br>(11% of theory; purity 100%) | $R_t$ = 0.75 min; m/z = 413 (M + H)$^+$ |

-continued

| Example | IUPAC name/structure (yield; purity) | LC-MS (Method 6) |
|---|---|---|
| 93 | N-(2-cyclopropylphenyl)-2-[(3R)-3-methyl[1,4'-bipiperidin]-1'-yl]-1,3-thiazole-5-carboxamide<br><br>(6% of theory; purity 100%) | $R_t$ = 0.87 min; m/z = 425 (M + H)$^+$ |
| 94 | N-(3-chlorobenzyl)-2-[(3R)-3-methyl[1,4'-bipiperidin]-1'-yl]-1,3-thiazole-5-carboxamide<br><br>(35% of theory; purity 98%) | $R_t$ = 0.85 min; m/z = 433 (M + H)$^+$ |
| 95 | rel-2-[(3R)-3-methyl[1,4'-bipiperidin]-1'-yl]-N-[(1R)-1-(4-methylphenyl)ethyl]-1,3-thiazole-5-carboxamide (2 diastereomers)<br><br>(12% of theory; purity 99%) | $R_t$ = 0.87 min; m/z = 427 (M + H)$^+$ |
| 96 | N-(5-chloro-2-hydroxyphenyl)-2-[(3R)-3-methyl[1,4'-bipiperidin]-1'-yl]-1,3-thiazole-5-carboxamide<br><br>(12% of theory; purity 96%) | $R_t$ = 0.85 min; m/z = 435 (M + H)$^+$ |

| Example | IUPAC name/structure (yield; purity) | LC-MS (Method 6) |
|---|---|---|
| 97 | N-(5-fluoro-2-methoxyphenyl)-2-[(3R)-3-methyl[1,4'-bipiperidin]-1'-yl]-1,3-thiazole-5-carboxamide<br>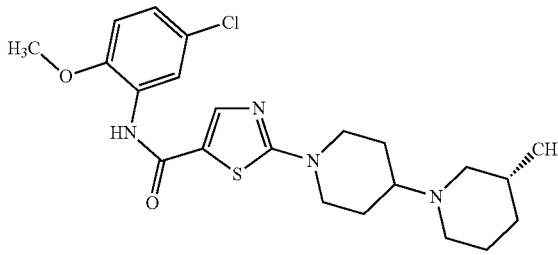<br>(22% of theory; purity 97%) | $R_t$ = 0.87 min; m/z = 433 (M + H)$^+$ |
| 98 | N-(2-ethylpyridin-4-yl)-2-[(3R)-3-methyl[1,4'-bipiperidin]-1'-yl]-1,3-thiazole-5-carboxamide<br>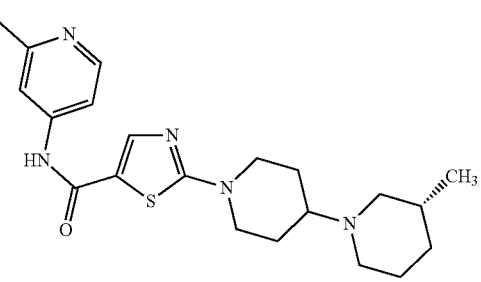<br>(4% of theory; purity 91%) | $R_t$ = 0.65 min; m/z = 414 (M + H)$^+$ |

Example 99 ent-N-[(3,5-Difluoropyridin-2-yl)methyl]-2-[3-(methoxymethyl)[1,4'-bipiperidin]-1'-yl]-1,3-thiazole-5-carboxamide (Enantiomer 1)

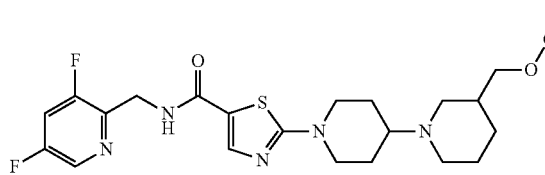

45 mg of rac-N-[(3,5-difluoropyridin-2-yl)methyl]-2-[3-(methoxymethyl)[1,4'-bipiperidin]-1'-yl]-1,3-thiazole-5-carboxamide were separated into the enantiomers by chiral HPLC (preparative HPLC: column Daicel® Chiralpak IG, 5 µm, 250×20 mm; mobile phase: 100% ethanol+0.2% diethylamine; flow rate 15 ml/min; temperature 55° C., detection: 220 nm). The enantiomer having a retention time of 10.838 min (HPLC: column Daicel® Chiralpak IE 5 µm, flow rate 1 ml/min; mobile phase: 100% ethanol+0.2% diethylamine; temperature 60° C.; detection: 220 nm) was collected. Removal of the solvents gave 23 mg (99% ee) of the title compound.

LC-MS (method 1): $R_t$=0.89 min; MS (ESIpos): m/z=466 [M+H]$^+$.

$^1$H-NMR (600 MHz, DMSO-d6) δ [ppm]: 0.911 (0.66), 0.927 (0.72), 1.392 (0.58), 1.410 (0.63), 1.436 (0.52), 1.457 (1.21), 1.477 (1.28), 1.497 (0.51), 1.582 (1.53), 1.598 (1.39), 1.719 (0.66), 1.758 (1.52), 1.778 (1.33), 1.887 (0.89), 1.904 (1.48), 1.921 (0.77), 2.097 (0.59), 2.114 (1.12), 2.132 (0.59), 2.707 (0.80), 2.726 (0.79), 2.796 (0.89), 2.809 (0.83), 3.026 (1.13), 3.044 (2.13), 3.065 (1.14), 3.136 (0.55), 3.151 (1.82), 3.164 (3.39), 3.173 (1.89), 3.189 (0.57), 3.203 (16.00), 3.919 (1.63), 3.941 (1.53), 4.522 (2.97), 4.531 (2.96), 7.822 (5.28), 7.879 (0.69), 7.897 (1.23), 7.910 (0.69), 8.459 (2.58), 8.462 (2.46), 8.663 (0.90), 8.673 (1.76), 8.682 (0.91).

Example 100 ent-N-[(3,5-Difluoropyridin-2-yl)methyl]-2-[3-(methoxymethyl)[1,4'-bipiperidin]-1'-yl]-1,3-thiazole-5-carboxamide (Enantiomer 2)

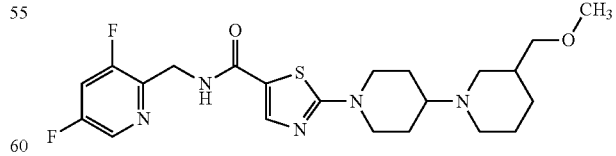

45 mg of rac-N-[(3,5-difluoropyridin-2-yl)methyl]-2-[3-(methoxymethyl)[1,4'-bipiperidin]-1'-yl]-1,3-thiazole-5-carboxamide were separated into the enantiomers by chiral HPLC (preparative HPLC: column Daicel® Chiralpak IG, 5 µm, 250×20 mm; mobile phase: 100% ethanol+0.2% diethylamine; flow rate 15 ml/min; temperature 55° C., detection:

220 nm). The enantiomer having a retention time of 11.879 min (HPLC: column Daicel® Chiralpak IE 5 μm, flow rate 1 ml/min; mobile phase: 100% ethanol+0.2% diethylamine; temperature 60° C.; detection: 220 nm) was collected. Removal of the solvents gave 19 mg (99% ee) of the title compound.

LC-MS (method 1): $R_t$=0.87 min; MS (ESIpos): m/z=466 [M+H]$^+$.

$^1$H-NMR (600 MHz, DMSO-d6) δ [ppm]: 0.912 (0.54), 0.927 (0.59), 1.393 (0.47), 1.411 (0.49), 1.437 (0.45), 1.458 (0.99), 1.469 (0.70), 1.478 (1.03), 1.497 (0.43), 1.582 (1.26), 1.599 (1.14), 1.720 (0.53), 1.759 (1.25), 1.778 (1.08), 1.887 (0.77), 1.904 (1.24), 1.921 (0.65), 2.098 (0.48), 2.113 (0.90), 2.132 (0.48), 2.521 (0.54), 2.708 (0.69), 2.725 (0.65), 2.795 (0.72), 2.809 (0.70), 3.027 (0.95), 3.044 (1.74), 3.065 (0.96), 3.136 (0.52), 3.151 (1.62), 3.164 (3.04), 3.173 (1.73), 3.179 (0.62), 3.189 (0.51), 3.203 (16.00), 3.920 (1.30), 3.942 (1.23), 4.523 (2.44), 4.532 (2.44), 7.822 (5.22), 7.878 (0.60), 7.882 (0.63), 7.897 (1.01), 7.910 (0.61), 7.914 (0.60), 8.459 (2.33), 8.462 (2.25), 8.664 (0.75), 8.673 (1.50), 8.683 (0.73).

Example 101 ent-2-{3-[(Cyclobutyloxy)methyl][1,4'-bipiperidin]-1'-yl}-N-[(3,5-difluoropyridin-2-yl)methyl]-1,3-thiazole-5-carboxamide (Enantiomer 1)

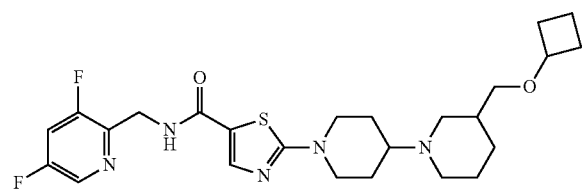 [SMILES: O=C(NCc1ncc(F)cc1F)c1cnc(N2CCC(N3CCCC(COC4CCC4)C3)CC2)s1]

28 mg of rac-2-{3-[(cyclobutyloxy)methyl][1,4'-bipiperidin]-1'-yl}-N-[(3,5-difluoropyridin-2-yl)methyl]-1,3-thiazole-5-carboxamide were separated into the enantiomers by chiral HPLC (preparative HPLC: column Daicel® Chiralpak IG, 5 μm, 250×20 mm; mobile phase: 100% ethanol+ 0.2% diethylamine; flow rate 15 ml/min; temperature 35° C.; detection: 220 nm). The enantiomer having a retention time of 13.192 min (HPLC: column Daicel® Chiralpak IG 5 μm, flow rate 1 ml/min; mobile phase: 100% ethanol+0.2% diethylamine; temperature 40° C.; detection: 220 nm) was collected. Removal of the solvents gave 11 mg (99% ee) of the title compound.

LC-MS (method 4): $R_t$=0.61 min; MS (ESIpos): m/z=506 [M+H]$^+$.

$^1$H-NMR (600 MHz, DMSO-d6) δ [ppm]: 0.890 (0.70), 0.905 (1.48), 0.923 (1.66), 0.941 (0.75), 1.236 (0.70), 1.365 (0.68), 1.384 (1.52), 1.391 (1.55), 1.405 (2.41), 1.409 (2.43), 1.422 (3.30), 1.426 (2.37), 1.436 (2.51), 1.439 (3.65), 1.453 (3.11), 1.457 (3.28), 1.469 (3.44), 1.477 (2.22), 1.488 (2.22), 1.576 (3.79), 1.592 (5.01), 1.608 (3.25), 1.626 (1.13), 1.661 (1.66), 1.736 (0.87), 1.757 (5.34), 1.765 (5.46), 1.772 (5.55), 1.779 (5.30), 1.809 (0.51), 1.892 (2.15), 1.909 (3.40), 1.926 (1.85), 2.088 (1.66), 2.092 (2.09), 2.105 (5.13), 2.120 (5.86), 2.132 (1.97), 2.136 (2.23), 2.421 (0.40), 2.523 (1.40), 2.693 (2.11), 2.711 (1.92), 2.788 (2.15), 2.803 (2.11), 3.027 (2.76), 3.045 (5.15), 3.065 (2.86), 3.077 (1.68), 3.093 (4.48), 3.106 (7.14), 3.117 (4.69), 3.123 (1.81), 3.132 (1.31), 3.260 (0.75), 3.797 (0.82), 3.810 (2.77), 3.822 (3.96), 3.834 (2.63), 3.846 (0.73), 3.924 (4.03), 3.945 (3.80), 4.523 (7.43), 4.532 (7.38), 7.822 (16.00), 7.878 (1.81), 7.882 (1.92), 7.897 (3.16), 7.910 (1.88), 7.913 (1.87), 8.458 (7.01), 8.462 (6.89), 8.664 (2.34), 8.673 (4.66), 8.683 (2.34).

Example 102 ent-2-{3-[(Cyclobutyloxy)methyl][1,4'-bipiperidin]-1'-yl}-N-[(3,5-difluoropyridin-2-yl)methyl]-1,3-thiazole-5-carboxamide (Enantiomer 2)

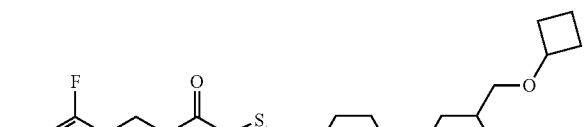

28 mg of rac-2-{3-[(cyclobutyloxy)methyl][1,4'-bipiperidin]-1'-yl}-N-[(3,5-difluoropyridin yl)methyl]-1,3-thiazole-5-carboxamide were separated into the enantiomers by chiral HPLC (preparative HPLC: column Daicel® Chiralpak IG, 5 μm, 250×20 mm; mobile phase: 100% ethanol+0.2% diethylamine; flow rate 15 ml/min; temperature 35° C., detection: 220 nm). The enantiomer having a retention time of 15.649 min (HPLC: column Daicel® Chiralpak IG 5 μm, flow rate 1 ml/min; mobile phase: 100% ethanol+0.2% diethylamine; temperature 40° C.; detection: 220 nm) was collected. Removal of the solvents gave 15 mg (99% ee) of the title compound.

LC-MS (method 4): $R_t$=0.61 min; MS (ESIpos): m/z=506 [M+H]$^+$.

$^1$H-NMR (600 MHz, DMSO-d6) δ [ppm]: 0.892 (0.70), 0.911 (1.47), 0.925 (1.61), 0.944 (0.75), 1.181 (0.58), 1.236 (0.75), 1.393 (1.83), 1.406 (2.67), 1.410 (2.79), 1.423 (3.49), 1.427 (2.71), 1.437 (2.88), 1.441 (3.93), 1.454 (3.44), 1.458 (3.62), 1.471 (3.83), 1.479 (2.52), 1.490 (2.38), 1.578 (4.21), 1.593 (5.37), 1.609 (3.64), 1.627 (1.42), 1.664 (1.80), 1.737 (1.27), 1.758 (5.60), 1.766 (5.97), 1.773 (5.87), 1.781 (5.68), 1.810 (0.82), 1.898 (1.60), 1.915 (2.56), 1.931 (1.34), 2.089 (2.00), 2.093 (2.40), 2.107 (5.04), 2.111 (4.26), 2.117 (4.59), 2.122 (4.87), 2.136 (2.03), 2.423 (0.43), 2.572 (0.60), 2.697 (1.87), 2.716 (1.71), 2.793 (2.04), 2.808 (1.91), 3.028 (2.85), 3.046 (5.10), 3.066 (3.05), 3.078 (2.04), 3.094 (4.70), 3.108 (6.61), 3.118 (4.75), 3.124 (2.06), 3.134 (1.53), 3.798 (0.78), 3.811 (2.64), 3.822 (3.74), 3.835 (2.51), 3.847 (0.68), 3.926 (3.99), 3.947 (3.69), 4.524 (7.26), 4.533 (7.00), 7.824 (16.00), 7.878 (2.01), 7.882 (2.03), 7.895 (2.96), 7.898 (2.98), 7.910 (1.94), 7.914 (1.86), 8.459 (7.08), 8.463 (6.55), 8.665 (2.41), 8.675 (4.52), 8.684 (2.21).

Example 103 rac-N-[(3,5-Difluoropyridin-2-yl)methyl]-2-(3-isopropyl[1,4'-bipiperidin]-1'-yl)-1,3-thiazole-5-carboxamide

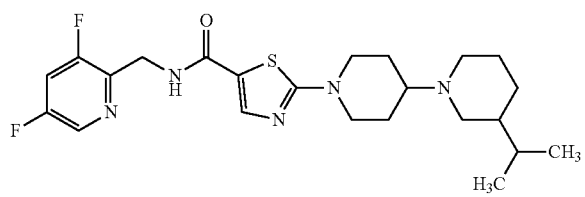 [SMILES: CC(C)C1CCCN(C2CCN(c3ncc(C(=O)NCc4ncc(F)cc4F)s3)CC2)C1]

N,N-Diisopropylethylamine (49 µl, 280 µmol) and acetic acid (9.7 µl, 170 µmol) were added in succession to a solution of N-[(3,5-difluoropyridin-2-yl)methyl]-2-(4-oxopiperidin-1-yl)-1,3-thiazole-5-carboxamide (50.0 mg, 142 µmol) and rac-3-isopropylpiperidine (36.1 mg, 284 µmol) in 3 ml of dichloromethane, and the mixture was stirred at room temperature 6 h. Subsequently, sodium triacetoxyborohydride (45.1 mg, 213 µmol) was added and stirring of the mixture at room temperature was continued. After 15 h, sat. $NaHCO_3$ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 23.0 mg (100% purity, 35% of theory) of the title compound.

LC-MS (method 5): $R_t$=1.85 min; MS (ESIpos): m/z=464 $[M+H]^+$.

$^1$H-NMR (600 MHz, DMSO-d6) δ [ppm]: 0.837 (14.82), 0.843 (15.99), 0.848 (16.00), 0.854 (15.31), 0.877 (1.10), 0.883 (1.12), 0.897 (1.16), 0.903 (1.14), 0.917 (0.49), 0.923 (0.43), 1.160 (0.54), 1.171 (0.93), 1.177 (1.09), 1.183 (0.97), 1.188 (1.09), 1.195 (0.85), 1.206 (0.49), 1.334 (0.44), 1.354 (1.17), 1.375 (1.58), 1.387 (1.58), 1.398 (2.24), 1.409 (1.94), 1.420 (1.12), 1.441 (0.42), 1.448 (0.49), 1.461 (1.12), 1.467 (1.32), 1.486 (1.96), 1.506 (1.42), 1.525 (0.55), 1.533 (0.43), 1.600 (1.43), 1.606 (1.16), 1.616 (0.92), 1.622 (1.22), 1.627 (0.94), 1.647 (1.19), 1.668 (1.14), 1.765 (1.59), 1.778 (2.27), 1.792 (1.35), 1.866 (1.66), 1.883 (3.02), 1.901 (1.55), 2.024 (1.02), 2.038 (1.80), 2.042 (1.78), 2.057 (1.01), 2.524 (1.03), 2.733 (1.42), 2.751 (1.37), 2.770 (1.47), 2.786 (1.40), 3.020 (1.59), 3.026 (1.23), 3.041 (2.88), 3.057 (1.18), 3.063 (1.59), 3.931 (2.24), 3.948 (2.14), 4.523 (4.92), 4.532 (4.94), 7.821 (13.40), 7.879 (1.40), 7.883 (1.52), 7.895 (2.03), 7.898 (2.11), 7.910 (1.43), 7.914 (1.50), 8.459 (5.28), 8.462 (5.28), 8.662 (1.61), 8.672 (3.25), 8.681 (1.63).

Example 104 ent-N-[(3,5-Difluoropyridin-2-yl)methyl]-2-[4-(4-methylazepan-1-yl)piperidin-1-yl]-1,3-thiazole-5-carboxamide (Enantiomer 1)

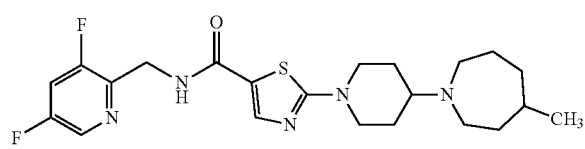 [SMILES: CC1CCCN(C2CCN(c3ncc(C(=O)NCc4ncc(F)cc4F)s3)CC2)CC1]

33 mg of rac-N-[(3,5-difluoropyridin-2-yl)methyl]-2-[4-(4-methylazepan-1-yl)piperidin-1-yl]-1,3-thiazole-5-carboxamide were separated into the enantiomers by chiral HPLC (preparative HPLC: column Daicel® Chiralpak AY-H, 5 µm, 250×20 mm; mobile phase: 70% n-heptane, mobile phase B: 30% ethanol+0.2% diethylamine in B; flow rate 15 ml/min; temperature 60° C., detection: 220 nm). The enantiomer having a retention time of 10.241 min (HPLC: column Daicel® Chiralpak AY-H 5 µm, flow rate 1 ml/min; mobile phase A: 70% n-heptane, mobile phase B: 30% ethanol+0.2% diethylamine in B; temperature 60° C.; detection: 220 nm) was collected. Removal of the solvents gave 15 mg (99% ee) of the title compound.

LC-MS (method 1): $R_t$=0.98 min; MS (ESIpos): m/z=450 $[M+H]^+$.

$^1$H-NMR (600 MHz, DMSO-d6) δ [ppm]: 0.876 (16.00), 0.887 (15.94), 1.181 (1.40), 1.200 (1.81), 1.223 (2.27), 1.240 (2.37), 1.257 (1.01), 1.446 (2.85), 1.460 (3.55), 1.479 (2.38), 1.572 (1.57), 1.595 (1.81), 1.613 (1.45), 1.619 (1.81), 1.642 (3.31), 1.648 (3.08), 1.655 (2.78), 1.756 (2.90), 2.422 (0.41), 2.611 (1.54), 2.668 (2.96), 3.023 (2.75), 3.040 (5.00), 3.061 (2.82), 3.926 (3.42), 3.946 (3.24), 4.523 (7.45), 4.532 (7.44), 7.820 (14.18), 7.879 (1.77), 7.882 (1.83), 7.895 (3.04), 7.910 (1.83), 7.914 (1.85), 8.458 (6.84), 8.462 (6.66), 8.663 (2.10), 8.672 (4.24), 8.682 (2.21).

Example 105 ent-N-[(3,5-Difluoropyridin-2-yl)methyl]-2-[4-(4-methylazepan-1-yl)piperidin-1-yl]-1,3-thiazole-5-carboxamide (Enantiomer 2)

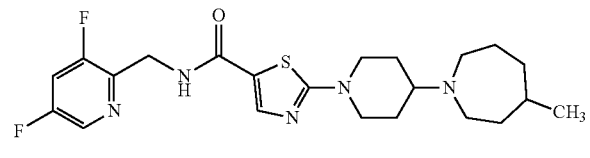 [SMILES: CC1CCCN(C2CCN(c3ncc(C(=O)NCc4ncc(F)cc4F)s3)CC2)CC1]

33 mg of rac-N-[(3,5-difluoropyridin-2-yl)methyl]-2-[4-(4-methylazepan-1-yl)piperidin-1-yl]-1,3-thiazole-5-carboxamide were separated into the enantiomers by chiral HPLC (preparative HPLC: column Daicel® Chiralpak AY-H, 5 µm, 250×20 mm; mobile phase: 70% n-heptane, mobile phase B: 30% ethanol+0.2% diethylamine in B; flow rate 15 ml/min; temperature 60° C., detection: 220 nm). The enantiomer having a retention time of 10.783 min (HPLC: column Daicel® Chiralpak AY-H 5 µm, flow rate 1 ml/min; mobile phase A: 70% n-heptane, mobile phase B: 30% ethanol+0.2% diethylamine in B; temperature 60° C.; detection: 220 nm) was collected. Removal of the solvents gave 16 mg (99% ee) of the title compound.

LC-MS (method 1): $R_t$=0.98 min; MS (ESIpos): m/z=450 $[M+H]^+$.

$^1$H-NMR (600 MHz, DMSO-d6) δ [ppm]: 0.876 (15.76), 0.887 (16.00), 1.181 (1.39), 1.201 (1.73), 1.223 (2.16), 1.240 (2.40), 1.257 (1.05), 1.444 (2.79), 1.458 (3.56), 1.477 (2.43), 1.572 (1.52), 1.596 (1.76), 1.641 (3.34), 1.647 (3.12), 1.655 (2.79), 1.754 (3.00), 2.610 (1.55), 2.664 (3.12), 3.023 (2.70), 3.040 (4.97), 3.060 (2.82), 3.258 (0.86), 3.324 (0.78), 3.924 (3.44), 3.944 (3.25), 4.522 (7.39), 4.531 (7.46), 7.819 (14.10), 7.879 (1.72), 7.882 (1.79), 7.895 (3.01), 7.910 (1.67), 7.914 (1.76), 8.458 (6.66), 8.462 (6.47), 8.663 (2.16), 8.672 (4.25), 8.682 (2.15).

Example 106 ent-N-[(3,5-Difluoropyridin-2-yl)methyl]-2-{3-[(2,2,2-trifluoroethoxy)methyl][1,4'-bipiperidin]-1'-yl}-1,3-thiazole-5-carboxamide (Enantiomer 1)

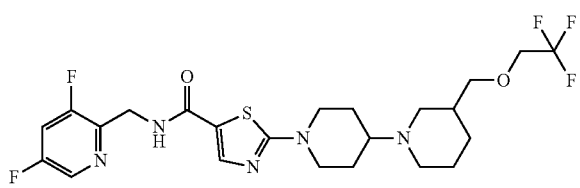 [SMILES: O=C(NCc1ncc(F)cc1F)c1cnc(N2CCC(N3CCCC(COCC(F)(F)F)C3)CC2)s1]

53 mg of rac-N-[(3,5-difluoropyridin-2-yl)methyl]-2-{3-[(2,2,2-trifluoroethoxy)methyl][1,4'-bipiperidin]-1'-yl}-1,3-thiazole-5-carboxamide were separated into the enantiomers by chiral HPLC (preparative HPLC: column Daicel® Chiralpak AY-H, 5 µm, 250×20 mm; mobile phase A: 55% n-heptane, mobile phase B: 45% ethanol+0.2% diethylamine in B; flow rate 15 ml/min; temperature 60° C., detection: 220 nm). The enantiomer having a retention time of 5.622 min (HPLC: column Daicel® Chiralpak AY-H 5 µm, flow rate 1 ml/min; mobile phase A: 50% n-heptane, mobile phase B: 50% ethanol+0.2% diethylamine in B; temperature 70° C.; detection: 220 nm) was collected. Removal of the solvents gave 27 mg (99% ee) of the title compound.

LC-MS (method 1): $R_t$=1.09 min; MS (ESIpos): m/z=534 [M+H]$^+$.

$^1$H-NMR (600 MHz, DMSO-d6) δ [ppm]: 0.957 (1.60), 0.972 (1.65), 0.991 (0.73), 1.405 (1.42), 1.422 (1.56), 1.433 (1.26), 1.453 (2.17), 1.474 (3.10), 1.493 (2.23), 1.591 (3.88), 1.609 (3.56), 1.771 (4.73), 1.974 (1.76), 2.155 (1.88), 2.697 (1.60), 2.780 (1.80), 2.796 (1.72), 3.030 (2.88), 3.051 (5.58), 3.071 (2.93), 3.322 (0.44), 3.426 (0.55), 3.443 (8.06), 3.454 (9.47), 3.926 (4.21), 3.948 (4.04), 3.977 (3.49), 3.993 (10.05), 4.008 (9.84), 4.024 (3.21), 4.524 (8.20), 4.533 (8.19), 7.823 (16.00), 7.879 (1.88), 7.882 (2.06), 7.898 (3.42), 7.910 (1.91), 7.914 (2.03), 8.458 (7.35), 8.462 (7.51), 8.667 (2.44), 8.676 (4.94), 8.685 (2.45).

Example 107 ent-N-[(3,5-Difluoropyridin-2-yl)methyl]-2-{3-[(2,2,2-trifluoroethoxy)methyl][1,4'-bipiperidin]-1'-yl}-1,3-thiazole-5-carboxamide (Enantiomer 2)

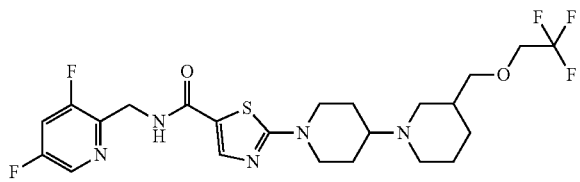 [SMILES: O=C(NCc1ncc(F)cc1F)c1cnc(N2CCC(N3CCCC(COCC(F)(F)F)C3)CC2)s1]

53 mg of rac-N-[(3,5-difluoropyridin-2-yl)methyl]-2-{3-[(2,2,2-trifluoroethoxy)methyl][1,4'-bipiperidin]-1'-yl}-1,3-thiazole-5-carboxamide were separated into the enantiomers by chiral HPLC (preparative HPLC: column Daicel® Chiralpak AY-H, 5 µm, 250×20 mm; mobile phase A: 55% n-heptane, mobile phase B: 45% ethanol+0.2% diethylamine in B; flow rate 15 ml/min; temperature 60° C., detection: 220 nm). The enantiomer having a retention time of 6.301 min (HPLC: column Daicel® Chiralpak AY-H 5 µm, flow rate 1 ml/min; mobile phase A: 50% n-heptane, mobile phase B: 50% ethanol+0.2% diethylamine in B; temperature 70° C.; detection: 220 nm) was collected. Removal of the solvents gave 25 mg (99% ee) of the title compound.

LC-MS (method 1): $R_t$=1.08 min; MS (ESIpos): m/z=534 [M+H]$^+$.

$^1$H-NMR (600 MHz, DMSO-d6) δ [ppm]: 0.956 (1.27), 0.972 (1.33), 1.403 (1.14), 1.422 (1.29), 1.433 (1.11), 1.453 (1.79), 1.473 (2.52), 1.493 (1.88), 1.592 (3.06), 1.608 (2.89), 1.770 (3.84), 1.973 (1.45), 2.154 (1.54), 2.693 (1.28), 2.780 (1.42), 2.794 (1.42), 3.030 (2.30), 3.050 (4.43), 3.071 (2.43), 3.426 (0.52), 3.443 (6.29), 3.454 (7.83), 3.926 (3.34), 3.947 (3.28), 3.977 (3.35), 3.992 (9.35), 4.008 (9.05), 4.024 (3.07), 4.524 (6.38), 4.532 (6.45), 7.823 (16.00), 7.878 (1.79), 7.882 (1.93), 7.895 (2.60), 7.897 (2.76), 7.910 (1.89), 7.914 (1.90), 8.458 (6.68), 8.462 (6.64), 8.666 (2.02), 8.676 (4.13), 8.685 (2.11).

Example 108 diamix-2-{3-[(2,2-Difluorocyclopropyl)methoxy][1,4'-bipiperidin]-1'-yl}-N-[(3,5-difluoropyridin-2-yl)methyl]-1,3-thiazole-5-carboxamide

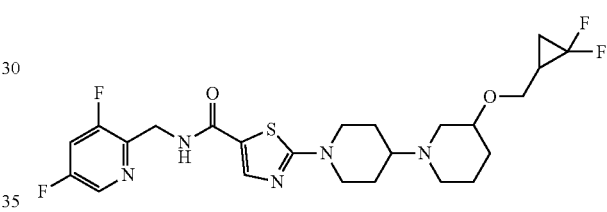

N,N-Diisopropylethylamine (200 µl, 1.1 mmol) was added to a solution of diamix-3-[(2,2-difluorocyclopropyl)methoxy]piperidine sulfate hydrochloride (185 mg, 568 µmol) in 5 ml of dichloromethane, and the mixture was stirred for 5 min, after which N-[(3,5-difluoropyridin-yl)methyl-2-(4-oxopiperidin-1-yl)-1,3-thiazole-5-carboxamide (100 mg, 284 µmol) and acetic acid (19 µl, 340 µmol) were added to the mixture. The mixture was then stirred at room temperature. After 3 h, sodium triacetoxyborohydride (90.2 mg, 426 µmol) was added to the mixture and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 10.0 mg (purity 100%, 7% of theory) of the target compound.

LC-MS (method 1): $R_t$=1.05 min; MS (ESIpos): m/z=528 [M+H]$^+$.

$^1$H-NMR (600 MHz, DMSO-d6) δ [ppm]: 1.074 (1.61), 1.091 (1.50), 1.237 (1.72), 1.251 (1.61), 1.348 (1.50), 1.367 (1.61), 1.488 (2.47), 1.548 (1.93), 1.556 (1.40), 1.568 (1.83), 1.623 (1.83), 1.764 (3.97), 1.783 (3.54), 1.907 (2.58), 1.963 (1.61), 1.982 (2.79), 1.997 (1.61), 2.098 (1.83), 2.383 (0.97), 2.422 (1.29), 2.566 (1.40), 2.611 (0.86), 2.651 (2.79), 2.942 (2.04), 2.956 (1.93), 3.023 (2.79), 3.043 (5.26), 3.063 (2.79), 3.254 (1.40), 3.260 (0.64), 3.315 (3.76), 3.322 (3.97), 3.375 (1.07), 3.391 (2.58), 3.406 (2.79), 3.423 (1.40), 3.570 (2.04), 3.581 (1.93), 3.928 (3.65), 3.950 (3.44), 4.524 (7.73), 4.532 (7.84), 7.822 (16.00), 7.879 (1.93), 7.883 (2.15), 7.897 (3.22), 7.910 (2.04), 7.914 (2.04), 8.459 (7.30), 8.462 (7.41), 8.666 (2.36), 8.675 (4.83), 8.685 (2.36).

Example 109 rac-2-[3-(Cyclobutyloxy)[1,4'-bipiperidin]-1'-yl]-N-[(3,5-difluoropyridin-2-yl)methyl]-1,3-thiazole-5-carboxamide

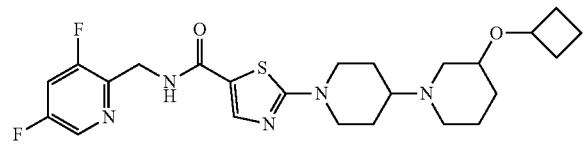 [SMILES: O=C(NCc1ncc(F)cc1F)c1cnc(N2CCC(N3CCCC(OC4CCC4)C3)CC2)s1]

N,N-Diisopropylethylamine (200 µl, 1.1 mmol) and acetic acid (19 µl, 340 µmol) were added in succession to a solution of N-[(3,5-difluoropyridin-2-yl)methyl]-2-(4-oxopiperidin-1-yl)-1,3-thiazole-5-carboxamide (100 mg, 284 µmol) and rac-3-(cyclobutyloxy)piperidine sulfate hydrochloride (164 mg, 568 µmol) in 5 ml of dichloromethane, and the mixture was stirred at room temperature for 5 h. Subsequently, sodium triacetoxyborohydride (90.2 mg, 426 µmol) was added and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 10.0 mg (purity 100%, 7% of theory) of the target compound.

LC-MS (method 1): $R_t$=1.04 min; MS (ESIpos): m/z=492 [M+H]$^+$.

$^1$H-NMR (600 MHz, DMSO-d6) δ [ppm]: 1.034 (0.72), 1.046 (1.63), 1.069 (1.63), 1.083 (0.81), 1.091 (0.68), 1.311 (0.68), 1.333 (1.54), 1.352 (1.72), 1.372 (1.08), 1.385 (1.04), 1.390 (1.58), 1.403 (2.76), 1.407 (1.72), 1.416 (1.72), 1.420 (3.07), 1.433 (1.99), 1.438 (2.26), 1.445 (1.31), 1.458 (2.98), 1.464 (3.12), 1.478 (3.30), 1.485 (3.12), 1.498 (1.45), 1.505 (1.27), 1.550 (0.90), 1.567 (2.53), 1.585 (2.71), 1.600 (2.85), 1.623 (1.76), 1.757 (4.84), 1.777 (6.37), 1.790 (4.07), 1.810 (3.30), 1.823 (2.53), 1.838 (1.76), 1.937 (2.21), 1.953 (3.66), 1.969 (2.26), 2.046 (1.49), 2.064 (2.71), 2.079 (1.54), 2.112 (3.44), 2.120 (3.39), 2.383 (0.45), 2.422 (0.59), 2.465 (0.50), 2.611 (0.54), 2.641 (2.26), 2.651 (1.94), 2.659 (2.12), 2.864 (2.08), 2.882 (1.94), 3.019 (2.89), 3.037 (5.24), 3.057 (2.94), 3.234 (1.63), 3.243 (2.12), 3.250 (2.85), 3.257 (3.12), 3.924 (3.98), 3.946 (3.84), 3.968 (0.90), 3.980 (2.71), 3.993 (3.80), 4.005 (2.62), 4.017 (0.77), 4.523 (7.73), 4.532 (7.73), 7.823 (16.00), 7.879 (1.90), 7.882 (2.08), 7.897 (3.30), 7.910 (1.99), 7.914 (2.03), 8.459 (7.28), 8.462 (7.37), 8.666 (2.44), 8.676 (4.79), 8.685 (2.44).

Example 110 rac-2-{3-[(3,3-Difluorocyclobutyl)oxy][1,4'-bipiperidin]-1'-yl}-N-[(3,5-difluoropyridin yl)methyl]-1,3-thiazole-5-carboxamide

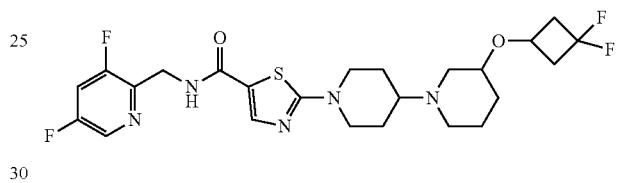

N,N-Diisopropylethylamine (200 µl, 1.1 mmol) and acetic acid (19 µl, 340 µmol) were added in succession to a solution of N-[(3,5-difluoropyridin-2-yl)methyl]-2-(4-oxopiperidin-1-yl)-1,3-thiazole-5-carboxamide (100 mg, 284 µmol) and rac-3-[(3,3-difluorocyclobutyl)oxy]piperidine sulfate hydrochloride (185 mg, 568 µmol) in 5 ml of dichloromethane, and the mixture was stirred at room temperature for 5 h. Subsequently, sodium triacetoxyborohydride (90.2 mg, 426 µmol) was added and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 30.0 mg (purity 100%, 20% of theory) of the target compound.

LC-MS (method 1): $R_t$=1.06 min; MS (ESIpos): m/z=528 [M+H]$^+$.

$^1$H-NMR (600 MHz, DMSO-d6) δ [ppm]: 1.083 (0.83), 1.097 (2.04), 1.119 (2.12), 1.134 (0.94), 1.324 (0.86), 1.344 (1.99), 1.364 (2.10), 1.384 (0.88), 1.478 (3.86), 1.498 (4.08), 1.518 (1.52), 1.621 (2.46), 1.643 (2.15), 1.757 (5.57), 1.777 (4.80), 1.853 (2.32), 1.867 (2.21), 2.003 (2.54), 2.019 (4.36), 2.035 (2.65), 2.084 (1.85), 2.100 (3.42), 2.117 (1.88), 2.422 (2.26), 2.431 (2.76), 2.441 (2.59), 2.446 (2.68), 2.451 (2.73), 2.459 (2.87), 2.468 (2.12), 2.524 (2.07), 2.561 (1.68), 2.636 (2.87), 2.654 (2.79), 2.874 (4.00), 2.884 (5.49), 2.901 (3.70), 3.019 (3.59), 3.040 (6.90), 3.061 (3.56), 3.257 (0.66), 3.265 (0.69), 3.308 (2.37), 3.317 (2.76), 3.325 (3.06), 3.331 (2.48), 3.340 (1.74), 3.929 (5.08), 3.951 (4.86), 4.101 (2.37), 4.524 (9.90), 4.533 (9.74), 7.824 (16.00), 7.882 (2.21), 7.897 (4.14), 7.914 (2.18), 8.459 (7.92), 8.462 (8.17), 8.667 (2.84), 8.677 (5.71), 8.686 (2.92).

Example 111 diamix-N-[(3,5-Difluoropyridin-2-yl)methyl]-2-[(3R)-3'-fluoro-3-methyl[1,4'-bipiperidin]-1'-yl]-1,3-thiazole-4-carboxamide

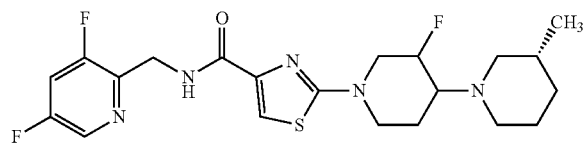

2-Bromo-N-[(3,5-difluoropyridin-2-yl)methyl]-1,3-thiazole-5-carboxamide (100 mg, 299 μmol) and diamix-(3R)-3'-fluoro-3-methyl-1,4'-bipiperidine dihydrochloride (70.9 mg, 259 μmol) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 μm 100×30 mm, mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 78.0 mg (purity 100%, 57% of theory) of the target compound.

LC-MS (method 1): $R_t$=0.95 min; MS (ESIpos): m/z=454 [M+H]$^+$.

$^1$H-NMR (600 MHz, DMSO-d6) δ [ppm]: 0.816 (10.43), 0.823 (12.35), 0.826 (12.52), 0.834 (10.93), 0.849 (1.65), 0.869 (0.67), 1.386 (0.84), 1.406 (1.13), 1.428 (1.10), 1.448 (0.90), 1.469 (0.43), 1.497 (0.61), 1.503 (0.75), 1.514 (0.75), 1.552 (0.84), 1.572 (2.20), 1.588 (1.25), 1.594 (1.45), 1.629 (1.77), 1.649 (1.68), 1.689 (1.68), 1.706 (1.97), 1.887 (1.48), 1.896 (1.86), 1.904 (2.87), 1.917 (2.26), 1.923 (2.52), 1.938 (1.57), 1.946 (1.48), 1.958 (0.55), 1.965 (0.43), 2.175 (1.28), 2.193 (2.38), 2.210 (1.19), 2.591 (1.04), 2.596 (1.01), 2.611 (1.25), 2.650 (1.25), 2.672 (1.01), 2.838 (3.19), 2.846 (3.16), 3.105 (1.42), 3.122 (2.61), 3.126 (2.52), 3.143 (1.42), 3.213 (2.09), 3.236 (2.17), 3.262 (0.78), 3.279 (3.51), 3.302 (2.87), 4.028 (1.68), 4.049 (1.59), 4.189 (1.10), 4.210 (2.03), 4.229 (1.01), 4.578 (7.30), 4.588 (7.30), 5.065 (2.26), 5.149 (2.29), 7.373 (16.00), 7.883 (1.88), 7.887 (2.00), 7.902 (2.96), 7.915 (1.88), 7.919 (1.94), 8.452 (7.65), 8.456 (8.70), 8.467 (4.12), 8.477 (2.09).

Example 112 diamix-N-[(3,5-Difluoropyridin-2-yl)methyl]-2-[(3R)-3'-fluoro-3-methyl[1,4'-bipiperidin]-1'-yl]-1,3-oxazole-4-carboxamide

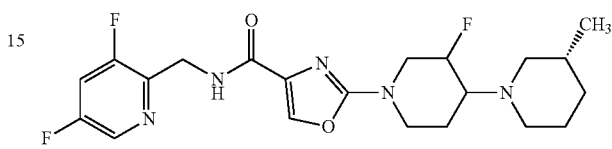

2-Chloro-N-[(3,5-difluoropyridin-2-yl)methyl]-1,3-oxazole-4-carboxamide (100 mg, 314 μmol) and diamix-(3R)-3'-fluoro-3-methyl-1,4'-bipiperidine dihydrochloride (86.5 mg, 317 μmol) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 μm 100×30 mm, mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 81.0 mg (purity 100%, 51% of theory) of the target compound.

LC-MS (method 1): $R_t$=0.88 min; MS (ESIpos): m/z=438 [M+H]$^+$.

$^1$H-NMR (600 MHz, DMSO-d6) δ [ppm]: 0.809 (11.35), 0.817 (14.02), 0.820 (14.57), 0.827 (12.10), 0.841 (2.08), 0.862 (0.75), 1.379 (1.01), 1.398 (1.40), 1.419 (1.40), 1.440 (1.11), 1.460 (0.55), 1.505 (0.91), 1.564 (2.73), 1.586 (1.85), 1.623 (2.24), 1.644 (4.13), 1.665 (2.50), 1.864 (1.53), 1.880 (3.45), 1.889 (3.32), 1.900 (2.57), 1.906 (2.57), 2.068 (5.46), 2.160 (1.56), 2.178 (3.09), 2.197 (1.63), 2.578 (1.40), 2.615 (1.46), 2.636 (1.33), 2.824 (4.33), 3.057 (1.72), 3.075 (3.28), 3.096 (1.76), 3.181 (2.67), 3.205 (2.83), 3.246 (2.83), 3.259 (1.01), 3.271 (3.77), 3.317 (0.52), 4.085 (2.37), 4.106 (2.28), 4.130 (1.63), 4.150 (2.67), 4.173 (1.46), 4.561 (9.04), 4.570 (9.01), 5.028 (2.86), 5.111 (2.89), 7.883 (2.02), 7.887 (2.05), 7.901 (3.64), 7.915 (2.05), 7.919 (2.02), 8.004 (16.00), 8.207 (2.47), 8.217 (4.81), 8.226 (2.37), 8.459 (7.93), 8.463 (7.61).

Example 113 diamix-N-(5-Chloro-2-fluorobenzyl)-2-[(3R)-3'-fluoro-3-methyl[1,4'-bipiperidin]-1'-yl]-1,3-thiazole-5-carboxamide

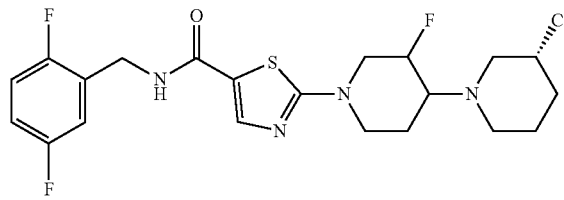

2-Bromo-N-(5-chloro-2-fluorobenzyl)-1,3-thiazole-5-carboxamide (100 mg, 286 µmol) and diamix-(3R)-3'-fluoro-3-methyl-1,4'-bipiperidine dihydrochloride (67.7 mg, 248 µmol) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 µm 100×30 mm, mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 25.0 mg (purity 97%, 18% of theory) of the target compound.

LC-MS (method 1): $R_t$=1.17 min; MS (ESIpos): m/z=469 [M+H]$^+$.

$^1$H-NMR (600 MHz, DMSO-d6) δ [ppm]: 0.809 (11.21), 0.818 (13.98), 0.820 (14.09), 0.828 (11.39), 0.843 (2.02), 0.863 (0.72), 1.122 (0.47), 1.381 (0.94), 1.401 (1.30), 1.423 (1.26), 1.443 (1.08), 1.464 (0.58), 1.496 (0.90), 1.565 (2.85), 1.587 (1.84), 1.623 (2.16), 1.645 (2.09), 1.681 (1.98), 1.699 (2.38), 1.884 (3.14), 1.892 (3.71), 1.909 (2.56), 1.927 (0.58), 2.162 (1.41), 2.180 (2.70), 2.199 (1.41), 2.384 (0.43), 2.422 (0.47), 2.607 (1.37), 2.622 (1.15), 2.665 (1.15), 2.682 (1.15), 2.823 (4.07), 3.143 (1.62), 3.160 (3.03), 3.181 (1.69), 3.241 (2.59), 3.265 (3.96), 3.307 (3.14), 3.332 (2.49), 3.411 (0.86), 4.001 (2.09), 4.024 (1.98), 4.174 (1.37), 4.195 (2.34), 4.217 (1.23), 4.405 (10.20), 4.414 (10.13), 5.058 (2.77), 5.140 (2.74), 7.231 (3.17), 7.247 (6.09), 7.262 (3.96), 7.352 (4.36), 7.362 (6.56), 7.375 (2.56), 7.382 (2.45), 7.822 (16.00), 8.713 (2.52), 8.722 (5.01), 8.732 (2.56).

Example 114

2-[(3R)-3-(Cyclopropylmethoxy)[1,4'-bipiperidin]-1'-yl]-N-[(3,5-difluoropyridin-2-yl)methyl]-1,3-thiazole-5-carboxamide

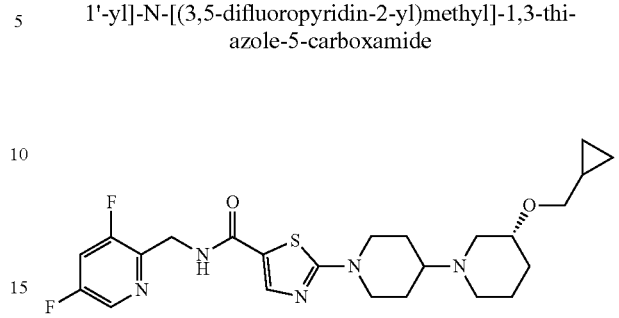

2-Bromo-N-[(3,5-difluoropyridin-2-yl)methyl]-1,3-thiazole-5-carboxamide (80.2 mg, 240 µmol) and (3R)-3-(cyclopropylmethoxy)-1,4'-bipiperidine dihydrochloride (66.0 mg, 212 µmol) were combined and stirred at 120° C. in 2 ml of sodium carbonate solution (2 ml, 2.0 M, 4 mmol) for 1 hour. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 µm 100×30 mm, mobile phase A: water, mobile phase B: acetonitrile, mobile phase C: 2% ammonia in water, mobile phase D: acetonitrile/water (80% by volume/20% by volume) total flow rate: 80 ml/min; room temperature, wavelength 200-400 nm, complete injection; gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 46.0 mg (purity 100%, 39% of theory) of the target compound.

LC-MS (method 1): $R_t$=1.01 min; MS (ESIpos): m/z=492 [M+H]$^+$.

$^1$H-NMR (600 MHz, DMSO-d6) δ [ppm]: 0.116 (2.25), 0.124 (7.52), 0.131 (7.71), 0.140 (2.25), 0.411 (2.21), 0.417 (6.60), 0.420 (6.38), 0.431 (6.78), 0.433 (6.27), 0.440 (1.84), 0.915 (0.77), 0.926 (1.59), 0.937 (2.32), 0.948 (1.55), 1.023 (0.59), 1.030 (0.66), 1.044 (1.59), 1.067 (1.66), 1.080 (0.77), 1.088 (0.66), 1.320 (0.70), 1.339 (1.59), 1.359 (1.62), 1.380 (0.70), 1.455 (1.11), 1.474 (2.95), 1.486 (2.40), 1.494 (3.13), 1.514 (1.25), 1.613 (2.06), 1.636 (1.73), 1.762 (4.17), 1.781 (3.65), 1.885 (1.81), 1.900 (1.73), 1.933 (2.21), 1.949 (3.69), 1.965 (2.25), 2.067 (1.51), 2.081 (2.73), 2.099 (1.47), 2.422 (0.44), 2.521 (1.73), 2.557 (1.33), 2.652 (2.54), 2.671 (2.14), 2.943 (2.18), 2.955 (2.03), 3.021 (2.80), 3.040 (5.46), 3.060 (2.88), 3.243 (14.49), 3.255 (14.56), 3.268 (3.61), 3.320 (0.81), 3.927 (3.80), 3.946 (3.61), 4.523 (7.74), 4.532 (7.71), 7.822 (16.00), 7.878 (1.92), 7.882 (1.99), 7.895 (3.17), 7.910 (1.95), 7.914 (1.92), 8.459 (7.37), 8.462 (7.12), 8.665 (2.43), 8.675 (4.83), 8.684 (2.40).

Example 115 ent-2-{3-[(Cyclopropylmethoxy)methyl][1,4'-bipiperidin]-1'-yl}-N-[(3,5-difluoropyridin-2-yl)methyl]-1,3-thiazole-5-carboxamide (Enantiomer 1)

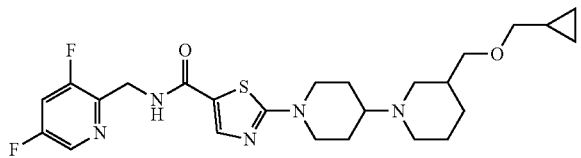 [SMILES: O=C(NCc1ncc(F)cc1F)c1cnc(N2CCC(N3CCCC(COCC4CC4)C3)CC2)s1]

67 mg of rac-2-{3-[(cyclopropylmethoxy)methyl][1,4'-bipiperidin]-1'-yl}-N-[(3,5-difluoropyridin-2-yl)methyl]-1,3-thiazole-5-carboxamide were separated into the enantiomers by chiral HPLC (preparative HPLC: column Daicel® Chiralpak AY-H, 5 μm, 250×20 mm; mobile phase A: 60% n-heptane, mobile phase B: 40% ethanol+0.2% diethylamine in B; flow rate 15 ml/min; temperature 55° C., detection: 220 nm). The enantiomer having a retention time of 8.062 min (HPLC: column Daicel® Chiralpak AY-H 5 μm, flow rate 1 ml/min; mobile phase A: 50% n-heptane, mobile phase B: 50% ethanol+0.2% diethylamine in B; temperature 55° C.; detection: 220 nm) was collected. Removal of the solvents gave 30 mg (99% ee) of the title compound.

LC-MS (method 1): $R_t$=1.07 min; MS (ESIpos): m/z=506 [M+H]$^+$.

$^1$H-NMR (600 MHz, DMSO-d6) δ [ppm]: −0.146 (2.10), −0.024 (1.44), −0.017 (5.45), −0.009 (5.51), 0.275 (1.55), 0.282 (4.53), 0.285 (4.49), 0.288 (2.09), 0.295 (4.69), 0.298 (4.42), 0.305 (1.34), 0.755 (0.46), 0.773 (1.01), 0.791 (1.41), 0.794 (1.44), 0.804 (1.40), 0.807 (1.47), 0.815 (1.92), 0.823 (1.00), 0.826 (1.08), 0.835 (0.50), 1.230 (0.43), 1.249 (1.00), 1.269 (1.02), 1.290 (0.76), 1.298 (0.72), 1.310 (1.42), 1.322 (1.47), 1.330 (2.10), 1.338 (1.53), 1.350 (1.51), 1.369 (0.44), 1.433 (1.41), 1.439 (1.58), 1.451 (2.33), 1.467 (1.38), 1.566 (1.12), 1.617 (2.07), 1.623 (2.07), 1.764 (0.92), 1.781 (1.55), 1.798 (0.81), 1.965 (0.79), 1.983 (1.44), 2.000 (0.76), 2.352 (9.20), 2.355 (11.79), 2.357 (8.79), 2.369 (1.29), 2.394 (16.00), 2.580 (1.15), 2.662 (1.37), 2.678 (1.31), 2.885 (1.91), 2.904 (3.60), 2.923 (1.91), 3.026 (9.38), 3.037 (9.30), 3.053 (1.05), 3.069 (3.29), 3.080 (5.47), 3.089 (3.47), 3.095 (1.22), 3.105 (0.91), 3.143 (10.67), 3.780 (2.83), 3.801 (2.66), 4.379 (5.25), 4.388 (5.22), 7.679 (11.00), 7.732 (1.28), 7.735 (1.33), 7.748 (2.15), 7.750 (2.18), 7.763 (1.30), 7.767 (1.30), 8.313 (4.95), 8.316 (4.80), 8.520 (1.64), 8.529 (3.26), 8.538 (1.62).

Example 116 ent-2-{3-[(Cyclopropylmethoxy)methyl][1,4'-bipiperidin]-1'-yl}-N-[(3,5-difluoropyridin yl)methyl]-1,3-thiazole-5-carboxamide (Enantiomer 2)

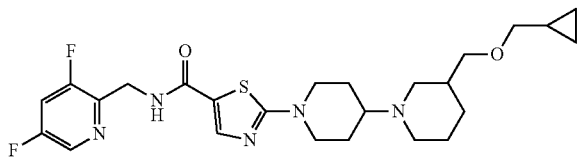 [SMILES: O=C(NCc1ncc(F)cc1F)c1cnc(N2CCC(N3CCCC(COCC4CC4)C3)CC2)s1]

67 mg of rac-2-{3-[(cyclopropylmethoxy)methyl][1,4'-bipiperidin]-1'-yl}-N-[(3,5-difluoropyridin-2-yl)methyl]-1,3-thiazole-5-carboxamide were separated into the enantiomers by chiral HPLC (preparative HPLC: column Daicel® Chiralpak AY-H, 5 μm, 250×20 mm; mobile phase A: 60% n-heptane, mobile phase B: 40% ethanol+0.2% diethylamine in B; flow rate 15 ml/min; temperature 55° C., detection: 220 nm). The enantiomer having a retention time of 8.740 min (HPLC: column Daicel® Chiralpak AY-H 5 μm, flow rate 1 ml/min; mobile phase A: 50% n-heptane, mobile phase B: 50% ethanol+0.2% diethylamine in B; temperature 55° C.; detection: 220 nm) was collected. Removal of the solvents gave 28 mg (99% ee) of the title compound.

LC-MS (method 1): $R_t$=1.07 min; MS (ESIpos): m/z=506 [M+H]$^+$.

$^1$H-NMR (600 MHz, DMSO-d6) δ [ppm]: −0.146 (2.11), −0.024 (0.87), −0.017 (3.12), −0.015 (3.03), −0.009 (3.17), −0.007 (3.10), 0.275 (0.95), 0.282 (2.68), 0.285 (2.76), 0.288 (1.22), 0.292 (1.19), 0.295 (2.78), 0.298 (2.72), 0.305 (0.83), 0.774 (0.55), 0.791 (0.83), 0.793 (0.81), 0.804 (0.78), 0.807 (0.82), 0.815 (1.19), 0.823 (0.58), 0.826 (0.62), 1.250 (0.55), 1.270 (0.56), 1.291 (0.42), 1.298 (0.41), 1.310 (0.79), 1.322 (0.82), 1.330 (1.17), 1.338 (0.85), 1.350 (0.84), 1.452 (1.28), 1.467 (0.79), 1.567 (0.60), 1.623 (1.14), 1.766 (0.43), 1.783 (0.69), 1.984 (0.68), 2.351 (8.08), 2.354 (10.97), 2.357 (8.10), 2.369 (0.63), 2.393 (16.00), 2.581 (0.58), 2.662 (0.72), 2.679 (0.68), 2.886 (1.09), 2.904 (2.03), 2.924 (1.09), 3.026 (5.94), 3.037 (5.84), 3.054 (0.64), 3.069 (1.97), 3.081 (3.29), 3.089 (2.05), 3.095 (0.72), 3.105 (0.53), 3.141 (15.73), 3.779 (1.60), 3.801 (1.51), 4.378 (3.00), 4.387 (2.96), 7.678 (7.07), 7.732 (0.80), 7.736 (0.84), 7.749 (1.21), 7.751 (1.24), 7.764 (0.81), 7.768 (0.81), 8.312 (3.04), 8.316 (2.99), 8.519 (0.96), 8.529 (1.94), 8.538 (0.95).

Example 117 diamix-N-[1-(2,5-Difluorophenyl)ethyl]-2-[(3R)-3'-fluoro-3-methyl[1,4'-bipiperidin]-1'-yl]-1,3-thiazole-5-carboxamide

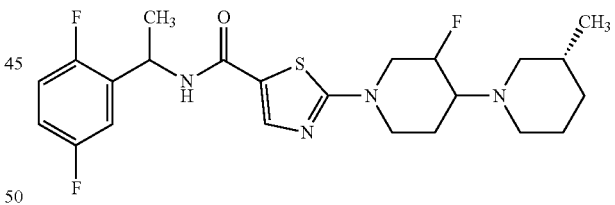

rac-2-Bromo-N-[1-(2,5-difluorophenyl)ethyl]-1,3-thiazole-5-carboxamide (145 mg, 418 μmol) and diamix-(3R)-3'-fluoro-3-methyl-1,4'-bipiperidine dihydrochloride (98.9 mg, 362 μmol) were combined and stirred at 120° C. in 2 ml of sodium carbonate solution (2 ml, 2.0 M, 4 mmol) for 1 h. The reaction mixture was then diluted with water and extracted with dichloromethane. The organic phase was dried over Na$_2$SO$_4$ and filtered and the filtrate was concentrated on a rotary evaporator. The residue was dissolved in DMSO and purified by preparative HPLC (instrument: Waters Prep LC/MS System, column: XBridge C18 5 μm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile:

mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 117 mg (purity 100%, 60% of theory) of the target compound.

LC-MS (method 1): $R_t$=1.18 min; MS (ESIpos): m/z=467 [M+H]$^+$.

$^1$H-NMR (600 MHz, DMSO-d6) δ [ppm]: 0.808 (6.23), 0.816 (13.24), 0.826 (12.53), 0.841 (1.66), 0.861 (0.65), 1.378 (1.12), 1.398 (1.48), 1.417 (16.00), 1.429 (15.57), 1.544 (1.06), 1.563 (2.56), 1.580 (1.42), 1.585 (1.64), 1.622 (1.79), 1.643 (1.71), 1.675 (1.64), 1.693 (1.97), 1.863 (1.00), 1.872 (2.46), 1.888 (3.25), 1.905 (2.33), 2.157 (1.20), 2.176 (2.36), 2.194 (1.22), 2.617 (1.14), 2.655 (1.04), 2.676 (1.00), 2.805 (1.54), 2.820 (3.23), 3.131 (1.10), 3.153 (2.11), 3.175 (1.10), 3.232 (1.60), 3.257 (2.09), 3.322 (1.73), 3.998 (1.42), 4.018 (1.34), 4.194 (1.34), 5.053 (2.25), 5.135 (2.27), 5.228 (0.55), 5.240 (2.19), 5.251 (3.23), 5.263 (2.17), 5.276 (0.51), 7.099 (1.22), 7.113 (2.42), 7.120 (1.81), 7.127 (1.62), 7.133 (0.85), 7.195 (1.64), 7.203 (2.01), 7.211 (4.14), 7.218 (4.04), 7.226 (2.84), 7.233 (2.40), 7.902 (11.61), 7.914 (0.51), 8.535 (3.76), 8.547 (3.57).

Example 118

4-(2-Chlorophenyl)-N-[(3,5-difluoropyridin-2-yl)methyl]-2-[(3R)-3-methyl[1,4'-bipiperidin]-1'-yl]-1,3-thiazole-5-carboxamide

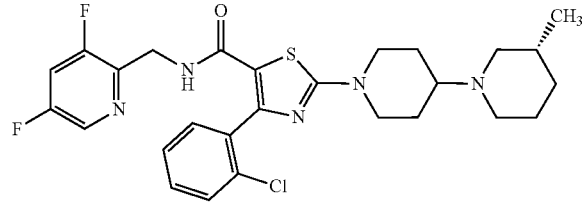 [SMILES: C[C@@H]1CCCN(C2CCN(c3nc(-c4ccccc4Cl)c(C(=O)NCc4ncc(F)cc4F)s3)CC2)C1]

N,N-Diisopropylethylamine (250 μl, 1.4 mmol) and propylphosphonic anhydride (280 μl, 50% in ethyl acetate, 460 μmol) were added to a solution of 4-(2-chlorophenyl)-2-[(3R)-3-methyl[1,4'-bipiperidin]-1'-yl]-1,3-thiazole-5-carboxylic acid (150 mg, 357 μmol) and 1-(3,5-difluoropyridin-2-yl)methanamine dihydrochloride (101 mg, 464 μmol) in 4.8 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 μm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature, wavelength 200-400 nm, complete injection; gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 19.0 mg (purity 100%, 10% of theory) of the target compound.

LC-MS (method 5): $R_t$=2.13 min; MS (ESIpos): m/z=546 [M+H]$^+$.

$^1$H-NMR (600 MHz, DMSO-d6) δ [ppm]: 0.796 (0.63), 0.819 (15.20), 0.830 (16.00), 0.850 (0.61), 0.857 (0.57), 1.377 (0.51), 1.397 (1.27), 1.418 (1.39), 1.438 (0.57), 1.485 (0.85), 1.492 (1.06), 1.505 (2.64), 1.512 (3.04), 1.525 (3.40), 1.531 (3.30), 1.544 (1.54), 1.573 (1.65), 1.595 (1.35), 1.621 (1.37), 1.642 (1.31), 1.746 (1.78), 1.763 (3.06), 1.782 (3.83), 1.806 (2.62), 2.040 (1.06), 2.055 (1.90), 2.073 (1.06), 2.423 (0.40), 2.474 (1.12), 2.740 (1.75), 2.753 (3.19), 2.770 (1.50), 3.061 (2.13), 3.078 (3.80), 3.098 (2.16), 3.258 (0.53), 3.314 (0.63), 3.319 (0.53), 3.917 (2.75), 3.939 (2.62), 4.384 (5.88), 4.392 (5.81), 7.141 (1.88), 7.149 (3.80), 7.157 (1.86), 7.393 (1.10), 7.404 (3.34), 7.417 (3.30), 7.427 (4.23), 7.430 (5.09), 7.440 (2.18), 7.443 (1.73), 7.480 (1.46), 7.484 (1.25), 7.494 (3.15), 7.497 (2.71), 7.506 (2.41), 7.508 (2.30), 7.522 (5.28), 7.535 (2.37), 7.857 (1.42), 7.861 (1.52), 7.873 (2.37), 7.877 (2.47), 7.889 (1.48), 7.893 (1.52), 8.248 (5.85), 8.252 (5.81).

Example 119

4-Bromo-N-[(3,5-difluoropyridin-2-yl)methyl]-2-[(3R)-3-methyl[1,4'-bipiperidin]-1'-yl]-1,3-thiazole-5-carboxamide

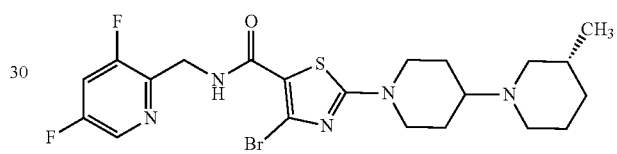

N,N-Diisopropylethylamine (180 μL 1.0 mmol) and propylphosphonic anhydride (200 μL 50% in ethyl acetate, 330 μmol) were added to a solution of 4-bromo-2-[(3R)-3-methyl[1,4'-bipiperidin]-1'-yl]-1,3-thiazole-5-carboxylic acid (100 mg, 258 μmol) and 1-(3,5-difluoropyridin-2-yl)methanamine dihydrochloride (72.7 mg, 335 μmol) in 4.0 ml of acetonitrile, and the mixture was stirred at room temperature overnight. The reaction mixture was concentrated on a rotary evaporator and the residue was dissolved in DMSO, filtered and purified by preparative HPLC (instrument: Waters Prep LC/MS System, column: XBridge C18 5 μm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature, wavelength 200-400 nm, complete injection; gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 24.0 mg (purity 100%, 18% of theory) of the target compound.

LC-MS (method 5): $R_t$=2.00 min; MS (ESIneg): m/z=513 [M−H]$^-$.

$^1$H-NMR (600 MHz, DMSO-d6) δ [ppm]: 0.785 (0.48), 0.791 (0.54), 0.805 (1.48), 0.815 (15.08), 0.826 (16.00), 0.845 (0.61), 0.851 (0.50), 1.371 (0.48), 1.391 (1.23), 1.411 (1.30), 1.425 (0.40), 1.432 (0.56), 1.458 (0.71), 1.479 (1.90), 1.495 (2.41), 1.500 (2.41), 1.512 (1.82), 1.518 (1.65), 1.529 (0.94), 1.541 (0.59), 1.567 (1.57), 1.573 (1.21), 1.583 (0.96), 1.589 (1.26), 1.617 (1.28), 1.638 (1.25), 1.737 (1.80), 1.754

(3.05), 1.772 (3.93), 1.795 (2.40), 2.035 (1.03), 2.050 (1.90), 2.054 (1.86), 2.069 (1.69), 2.482 (1.21), 2.519 (1.17), 2.722 (1.72), 2.734 (2.95), 2.751 (1.42), 3.063 (1.74), 3.068 (2.05), 3.085 (3.51), 3.088 (3.41), 3.105 (2.05), 3.110 (1.76), 3.318 (0.48), 3.876 (2.18), 3.898 (2.07), 4.591 (5.46), 4.600 (5.48), 7.911 (1.44), 7.915 (1.53), 7.928 (2.03), 7.930 (2.15), 7.943 (1.48), 7.947 (1.55), 8.178 (1.69), 8.187 (3.45), 8.196 (1.71), 8.478 (5.56), 8.482 (5.54).

Example 120

4-Chloro-N-[(3,5-difluoropyridin-2-yl)methyl]-2-[(3R)-3-methyl[1,4'-bipiperidin]-1'-yl]-1,3-thiazole-5-carboxamide

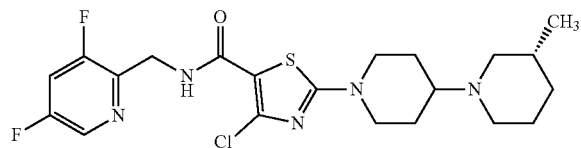 [SMILES: C[C@@H]1CCCN(C2CCN(c3nc(Cl)c(C(=O)NCc4ncc(F)cc4F)s3)CC2)C1]

2-Bromo-4-chloro-N-[(3,5-difluoropyridin-2-yl)methyl]-1,3-thiazole-5-carboxamide (100 mg, 271 µmol) and (3R)-3-methyl-1,4'-bipiperidine dihydrochloride (69.2 mg, 271 µmol) were combined and stirred at 120° C. in sodium carbonate solution (540 µl, 2.0 M, 1.1 mmol) for 1 h. The solid obtained was then filtered off with suction, washed with MTBE and dried under high vacuum. This gave 111 mg (purity 100%, 87% of theory) of the target compound.

LC-MS (method 5): $R_t$=1.96 min; MS (ESIpos): m/z=470 [M+H]$^+$.

$^1$H-NMR (400 MHz, DMSO-d6) δ [ppm]: –0.149 (0.48), 0.146 (0.50), 0.773 (0.60), 0.810 (14.86), 0.826 (16.00), 0.852 (0.70), 0.862 (0.57), 1.352 (0.47), 1.383 (1.15), 1.413 (1.36), 1.443 (1.27), 1.472 (2.29), 1.495 (2.91), 1.504 (2.92), 1.522 (2.00), 1.531 (1.75), 1.560 (1.89), 1.602 (1.85), 1.641 (1.32), 1.725 (1.91), 1.751 (3.63), 1.775 (3.60), 1.797 (2.47), 2.023 (1.08), 2.046 (1.94), 2.052 (1.91), 2.074 (1.10), 2.328 (0.60), 2.367 (0.85), 2.670 (0.64), 2.674 (0.49), 2.710 (2.59), 2.719 (2.45), 2.736 (2.63), 3.055 (2.04), 3.080 (3.62), 3.111 (2.12), 3.868 (2.52), 3.900 (2.37), 4.580 (5.48), 4.593 (5.48), 7.910 (1.38), 7.916 (1.50), 7.935 (2.01), 7.938 (2.12), 7.941 (1.91), 7.957 (1.46), 7.963 (1.55), 8.146 (1.68), 8.159 (3.47), 8.173 (1.63), 8.483 (4.79), 8.489 (4.63).

Example 121 rac-N-[(3,5-Difluoropyridin-2-yl)methyl]-2-(3-propyl[1,4'-bipiperidin]-1'-yl)-1,3-thiazole-5-carboxamide

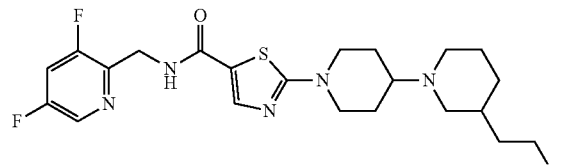

N,N-Diisopropylethylamine (49 µl, 280 µmol) and acetic acid (9.7 µl, 170 µmol) were added in succession to a solution of N-[(3,5-difluoropyridin-2-yl)methyl]-2-(4-oxopiperidin-1-yl)-1,3-thiazole-5-carboxamide (50 mg, 142 µmol) and rac-3-propylpiperidine (36.1 mg, 284 µmol) in 3 ml of dichloromethane, and the mixture was stirred at room temperature for 6 h. Subsequently, sodium triacetoxyborohydride (45.1 mg, 213 µmol) was added and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume), total flow rate: 80 ml/min; room temperature; wavelength 200-400 nm, complete injection. Gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and concentrated and the residue was dried under high vacuum. This gave 9.00 mg (purity 100%, 14% of theory) of the target compound.

LC-MS (method 5): $R_t$=1.89 min; MS (ESIpos): m/z=464 [M+H]$^+$.

$^1$H-NMR (600 MHz, DMSO-d6) δ [ppm]: 0.782 (0.42), 0.796 (0.99), 0.802 (1.00), 0.815 (1.07), 0.822 (1.05), 0.834 (7.50), 0.847 (16.00), 0.859 (8.04), 1.080 (0.68), 1.091 (0.99), 1.094 (0.85), 1.103 (1.64), 1.116 (1.70), 1.128 (1.13), 1.137 (1.31), 1.152 (1.62), 1.163 (1.21), 1.174 (0.77), 1.185 (0.44), 1.249 (0.74), 1.261 (2.17), 1.274 (3.33), 1.286 (2.73), 1.298 (1.24), 1.354 (0.40), 1.374 (1.15), 1.380 (0.89), 1.393 (1.72), 1.409 (1.32), 1.414 (1.31), 1.420 (1.00), 1.426 (0.70), 1.440 (0.48), 1.448 (0.57), 1.461 (1.18), 1.470 (1.54), 1.480 (1.76), 1.490 (1.64), 1.499 (1.26), 1.509 (0.64), 1.570 (1.35), 1.575 (1.08), 1.586 (0.84), 1.591 (1.10), 1.654 (1.11), 1.659 (1.08), 1.667 (0.72), 1.675 (1.11), 1.762 (2.32), 1.778 (3.07), 1.795 (2.67), 1.813 (1.30), 2.057 (0.93), 2.072 (1.64), 2.075 (1.62), 2.090 (0.89), 2.473 (0.92), 2.479 (0.63), 2.727 (1.42), 2.743 (2.48), 2.753 (1.62), 3.021 (1.72), 3.041 (3.32), 3.062 (1.72), 3.923 (2.55), 3.944 (2.45), 4.524 (4.71), 4.533 (4.70), 7.822 (12.11), 7.878 (1.31), 7.882 (1.39), 7.894 (1.90), 7.897 (1.97), 7.909 (1.32), 7.913 (1.36), 8.458 (5.03), 8.462 (4.90), 8.663 (1.52), 8.673 (3.08), 8.683 (1.51).

Example 122

4-Cyclopropyl-N-[(3,5-difluoropyridin-2-yl)methyl]-2-[(3R)-3-methyl[1,4'-bipiperidin]-1'-yl]-1,3-thiazole-5-carboxamide

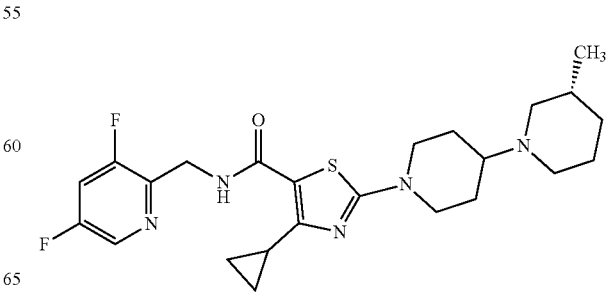

2-Bromo-4-cyclopropyl-N-[(3,5-difluoropyridin-2-yl)methyl]-1,3-thiazole-5-carboxamide (100 mg, 267 µmol) and (3R)-3-methyl-1,4'-bipiperidine dihydrochloride (68.2 mg, 267 µmol) were combined and stirred at 120° C. in sodium carbonate solution (530 µl, 2.0 M, 1.1 mmol) for 1 h. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume), total flow rate: 80 ml/min; room temperature; wavelength 200-400 nm, complete injection. Gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 80.0 mg (purity 98%, 62% of theory) of the target compound.

LC-MS (method 5): $R_t$=2.11 min; MS (ESIpos): m/z=476 $[M+H]^+$.

$^1$H-NMR (600 MHz, DMSO-d6) δ [ppm]: 0.787 (0.64), 0.801 (1.39), 0.812 (15.16), 0.823 (16.00), 0.834 (1.40), 0.841 (3.13), 0.846 (4.94), 0.850 (3.91), 0.855 (2.63), 0.860 (5.16), 0.868 (3.30), 0.872 (4.59), 0.876 (4.88), 0.880 (5.43), 0.884 (3.26), 0.892 (0.83), 1.366 (0.47), 1.387 (1.21), 1.407 (1.28), 1.431 (1.04), 1.444 (2.03), 1.451 (2.08), 1.464 (2.21), 1.471 (2.10), 1.485 (1.20), 1.491 (1.33), 1.502 (0.89), 1.508 (1.05), 1.519 (1.03), 1.526 (0.92), 1.564 (1.52), 1.580 (0.92), 1.585 (1.23), 1.615 (1.25), 1.636 (1.21), 1.733 (1.89), 1.750 (5.64), 1.768 (3.44), 2.029 (1.03), 2.044 (1.84), 2.048 (1.84), 2.063 (1.02), 2.423 (0.47), 2.442 (1.04), 2.461 (1.92), 2.479 (1.09), 2.652 (0.41), 2.715 (1.59), 2.728 (2.95), 2.746 (1.40), 2.772 (0.74), 2.781 (1.42), 2.786 (1.50), 2.794 (2.41), 2.802 (1.38), 2.807 (1.33), 2.816 (0.65), 2.974 (1.92), 2.991 (3.49), 3.012 (1.96), 3.264 (0.81), 3.321 (0.75), 3.826 (2.55), 3.847 (2.41), 4.507 (5.32), 4.516 (5.29), 7.868 (1.47), 7.872 (1.67), 7.885 (2.09), 7.887 (2.23), 7.888 (2.12), 7.900 (1.60), 7.903 (1.61), 7.955 (1.67), 7.964 (3.49), 7.973 (1.71), 8.452 (5.76), 8.455 (5.74).

Example 123 ent-N-[(3,5-Difluoropyridin-2-yl)methyl]-2-(3-ethoxy[1,4'-bipiperidin]-1'-yl)-1,3-thiazole-5-carboxamide (Enantiomer 1)

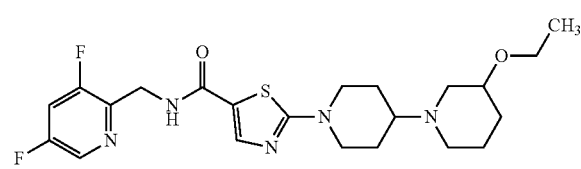 [SMILES: CCOC1CCCN(C2CCN(c3ncc(C(=O)NCc4ncc(F)cc4F)s3)CC2)C1]

97 mg of rac-N-[(3,5-difluoropyridin-2-yl)methyl]-2-(3-ethoxy[1,4'-bipiperidin]-1'-yl)-1,3-thiazole-5-carboxamide were separated into the enantiomers by chiral HPLC (preparative HPLC: column Daicel® Chiralpak ID, 5 µm, 250× 20 mm; mobile phase A: 40% n-heptane, mobile phase B: 60% ethanol+0.2% diethylamine in B; flow rate 20 ml/min; temperature 50° C., detection: 220 nm). The enantiomer having a retention time of 2.336 min (HPLC: column Daicel® Chiralpak ID-3 3 µm, flow rate 1 ml/min; mobile phase A: 50% n-heptane, mobile phase B: 50% ethanol+ 0.2% diethylamine in B; detection: 220 nm) was collected. Removal of the solvents gave 38 mg (99% ee) of the title compound.

LC-MS (method 2): $R_t$=0.52 min; MS (ESIpos): m/z=466 $[M+H]^+$.

$^1$H-NMR (600 MHz, DMSO-d6) δ [ppm]: 1.060 (8.60), 1.071 (16.00), 1.083 (8.26), 1.235 (0.59), 1.346 (1.07), 1.365 (1.08), 1.478 (2.05), 1.497 (2.16), 1.615 (1.29), 1.638 (1.12), 1.765 (2.83), 1.784 (2.51), 1.886 (1.30), 1.901 (1.26), 1.943 (0.94), 1.959 (1.62), 1.975 (0.96), 2.066 (0.82), 2.084 (1.44), 2.100 (0.79), 2.422 (0.44), 2.651 (1.43), 2.936 (1.37), 2.952 (1.34), 3.024 (2.23), 3.043 (4.12), 3.061 (2.16), 3.248 (1.59), 3.263 (1.29), 3.312 (0.54), 3.431 (1.22), 3.442 (3.89), 3.453 (5.34), 3.464 (4.14), 3.476 (1.31), 3.479 (1.09), 3.929 (2.79), 3.948 (2.67), 4.524 (6.31), 4.533 (6.25), 7.824 (13.37), 7.879 (1.72), 7.882 (1.81), 7.898 (2.60), 7.910 (1.70), 7.914 (1.78), 8.459 (6.60), 8.462 (6.49), 8.666 (1.78), 8.676 (3.41), 8.685 (1.73).

Example 124 ent-N-[(3,5-Difluoropyridin-2-yl)methyl]-2-(3-ethoxy[1,4'-bipiperidin]-1'-yl)-1,3-thiazole-5-carboxamide (Enantiomer 2)

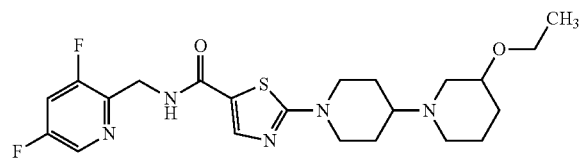 [SMILES: CCOC1CCCN(C2CCN(c3ncc(C(=O)NCc4ncc(F)cc4F)s3)CC2)C1]

97 mg of rac-N-[(3,5-difluoropyridin-2-yl)methyl]-2-(3-ethoxy[1,4'-bipiperidin]-1'-yl)-1,3-thiazole-5-carboxamide were separated into the enantiomers by chiral HPLC (preparative HPLC: column Daicel® Chiralpak ID, 5 µm, 250× 20 mm; mobile phase A: 40% n-heptane, mobile phase B: 60% ethanol+0.2% diethylamine in B; flow rate 20 ml/min; temperature 50° C., detection: 220 nm). The enantiomer having a retention time of 4.263 min (HPLC: column Daicel® Chiralpak ID-3 3 µm, flow rate 1 ml/min; mobile phase A: 50% n-heptane, mobile phase B: 50% ethanol+ 0.2% diethylamine in B; detection: 220 nm) was collected. Removal of the solvents gave 37 mg (99% ee) of the title compound.

LC-MS (method 2): $R_t$=0.52 min; MS (ESIpos): m/z=466 $[M+H]^+$.

$^1$H-NMR (600 MHz, DMSO-d6) δ [ppm]: 0.858 (0.50), 1.060 (8.69), 1.072 (16.00), 1.083 (8.44), 1.236 (1.50), 1.355 (1.34), 1.366 (1.33), 1.479 (2.47), 1.498 (2.65), 1.616 (1.60), 1.767 (3.37), 1.785 (3.03), 1.888 (1.68), 1.904 (1.66), 1.960 (1.76), 2.084 (1.62), 2.611 (0.50), 2.652 (1.56), 2.939 (1.58), 3.024 (2.76), 3.044 (5.20), 3.064 (2.72), 3.251 (2.20), 3.431 (1.40), 3.443 (4.13), 3.454 (5.81), 3.465 (4.31), 3.477 (1.43), 3.930 (3.48), 3.951 (3.36), 4.524 (8.10), 4.533 (8.05), 7.824 (12.08), 7.879 (1.78), 7.882 (1.96), 7.897 (3.40), 7.910 (1.75), 7.914 (1.92), 8.459 (7.08), 8.462 (7.27), 8.667 (2.01), 8.676 (3.85), 8.685 (1.99).

Example 125 ent-2-[3-(Cyclobutylmethoxy)[1,4'-bipiperidin]-1'-yl]-N-[(3,5-difluoropyridin-2-yl)methyl]-1,3-thiazole-5-carboxamide (Enantiomer 1)

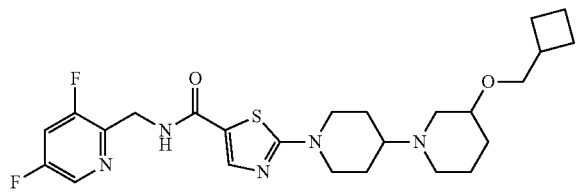 [SMILES: O=C(NCc1ncc(F)cc1F)c1cnc(N2CCC(N3CCCC(OCC4CCC4)C3)CC2)s1]

60 mg of rac-2-[3-(cyclobutylmethoxy)[1,4'-bipiperidin]-1'-yl]-N-[(3,5-difluoropyridin-2-yl)methyl]-1,3-thiazole-5-carboxamide were separated into the enantiomers by chiral HPLC (preparative HPLC: column Daicel® Chiralpak IF, 5 µm, 250×20 mm; mobile phase A: 100% ethanol+0.2% diethylamine; flow rate 18 ml/min; temperature 70° C., detection: 220 nm). The enantiomer having a retention time of 9.999 min (HPLC: column Daicel® Chiralpak IF 5 µm, flow rate 1 ml/min; mobile phase A: 100% ethanol+0.2% diethylamine; temperature 70° C.; detection: 220 nm) was collected. Removal of the solvents gave 28 mg (99% ee) of the title compound.

LC-MS (method 1): $R_t$=1.17 min; MS (ESIpos): m/z=506 [M+H]$^+$.

$^1$H-NMR (600 MHz, DMSO-d6) δ [ppm]: 1.040 (2.07), 1.059 (2.23), 1.146 (0.91), 1.158 (1.69), 1.171 (1.07), 1.234 (0.93), 1.341 (2.06), 1.360 (2.22), 1.478 (3.96), 1.497 (4.40), 1.615 (2.66), 1.645 (5.09), 1.661 (6.44), 1.675 (5.50), 1.690 (2.56), 1.765 (5.75), 1.784 (6.56), 1.809 (6.11), 1.824 (6.18), 1.837 (3.88), 1.856 (1.91), 1.888 (2.92), 1.904 (2.89), 1.922 (3.01), 1.936 (6.49), 1.950 (8.09), 2.081 (3.01), 2.405 (1.46), 2.418 (3.03), 2.430 (3.84), 2.442 (3.00), 2.455 (1.53), 2.654 (3.03), 2.941 (2.94), 2.954 (2.67), 3.022 (4.06), 3.041 (7.67), 3.061 (4.38), 3.225 (3.06), 3.357 (3.40), 3.373 (7.35), 3.384 (12.29), 3.396 (7.41), 3.411 (2.89), 3.929 (5.35), 3.950 (5.23), 4.523 (11.02), 4.532 (11.02), 7.823 (16.00), 7.878 (2.73), 7.895 (4.72), 7.910 (2.65), 8.458 (9.67), 8.664 (3.17), 8.674 (5.69), 8.683 (3.01).

Example 126 ent-2-[3-(Cyclobutylmethoxy)[1,4'-bipiperidin]-1'-yl]-N-[(3,5-difluoropyridin-2-yl)methyl]-1,3-thiazole-5-carboxamide (Enantiomer 2)

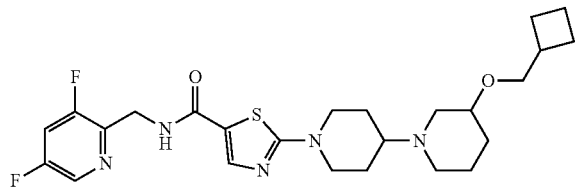 [SMILES: O=C(NCc1ncc(F)cc1F)c1cnc(N2CCC(N3CCCC(OCC4CCC4)C3)CC2)s1]

60 mg of rac-2-[3-(cyclobutylmethoxy)[1,4'-bipiperidin]-1'-yl]-N-[(3,5-difluoropyridin-2-yl)methyl]-1,3-thiazole-5-carboxamide were separated into the enantiomers by chiral HPLC (preparative HPLC: column Daicel® Chiralpak IF, 5 µm, 250×20 mm; mobile phase A: 100% ethanol+0.2% diethylamine; flow rate 18 ml/min; temperature 70° C., detection: 220 nm). The enantiomer having a retention time of 13.165 min (HPLC: column Daicel® Chiralpak IF 5 µm, flow rate 1 ml/min; mobile phase A: 100% ethanol+0.2% diethylamine; temperature 70° C.; detection: 220 nm) was collected. Removal of the solvents gave 28 mg (99% ee) of the title compound.

LC-MS (method 1): $R_t$=1.17 min; MS (ESIpos): m/z=506 [M+H]$^+$.

$^1$H-NMR (600 MHz, DMSO-d6) δ [ppm]: 1.023 (0.51), 1.037 (1.19), 1.060 (1.31), 1.078 (0.73), 1.143 (1.12), 1.155 (2.25), 1.167 (1.19), 1.235 (0.77), 1.321 (0.52), 1.341 (1.20), 1.361 (1.25), 1.381 (0.56), 1.477 (2.28), 1.497 (2.44), 1.516 (0.97), 1.614 (1.60), 1.635 (1.78), 1.647 (2.81), 1.662 (3.59), 1.677 (2.98), 1.690 (1.31), 1.766 (3.39), 1.775 (2.10), 1.785 (3.78), 1.793 (2.73), 1.800 (2.08), 1.810 (3.38), 1.815 (1.70), 1.824 (4.53), 1.829 (1.22), 1.838 (2.43), 1.842 (1.48), 1.852 (0.85), 1.857 (0.97), 1.870 (0.53), 1.889 (1.42), 1.903 (1.41), 1.923 (1.61), 1.927 (1.22), 1.932 (1.92), 1.936 (3.89), 1.945 (3.31), 1.953 (4.52), 1.956 (4.37), 1.964 (2.83), 1.970 (2.58), 1.978 (1.21), 2.065 (1.01), 2.082 (1.80), 2.099 (0.98), 2.406 (0.92), 2.418 (1.98), 2.431 (2.54), 2.443 (1.88), 2.456 (0.85), 2.564 (0.87), 2.655 (1.60), 2.672 (1.48), 2.908 (0.92), 2.921 (0.98), 2.942 (1.72), 2.955 (1.58), 3.023 (2.34), 3.042 (4.41), 3.061 (2.35), 3.210 (1.08), 3.218 (1.46), 3.225 (1.90), 3.233 (1.43), 3.242 (1.19), 3.317 (0.46), 3.357 (1.62), 3.369 (1.91), 3.373 (5.39), 3.385 (10.05), 3.396 (5.32), 3.401 (1.89), 3.412 (1.57), 3.930 (3.09), 3.950 (2.94), 4.524 (6.50), 4.533 (6.41), 7.813 (0.48), 7.824 (16.00), 7.878 (1.87), 7.882 (1.93), 7.894 (2.71), 7.897 (2.72), 7.910 (1.85), 7.913 (1.87), 8.458 (7.25), 8.462 (6.95), 8.665 (2.10), 8.675 (4.20), 8.684 (2.03).

Example 127 rac-Formic acid N-[(3,5-difluoropyridin-2-yl)methyl]-2-[3-(2-fluoroethyl)[1,4'-bipiperidin]-1'-yl]-1,3-thiazole-5-carboxamide

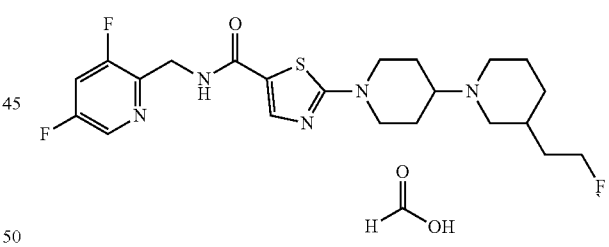

N,N-Diisopropylethylamine (49 µL 280 µmol) and acetic acid (9.7 µL 170 µmol) were added in succession to a solution of N-[(3,5-difluoropyridin-2-yl)methyl]-2-(4-oxopiperidin-1-yl)-1,3-thiazole-5-carboxamide (50 mg, 142 µmol) and rac-3-(2-fluoroethyl)piperidine (37.2 mg, 284 µmol) in 3 ml of dichloromethane, and the mixture was stirred at room temperature for 6 h. Subsequently, sodium triacetoxyborohydride (45.1 mg, 213 µmol) was added and the mixture was stirred at room temperature overnight. Sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: Phenomenex Kinetex C18 5 µm 100×30 mm. Mobile phase A: water, mobile phase B: acetonitrile, mobile phase C: 2% strength formic acid in water, mobile phase D: acetonitrile/water (80% by volume/20% by volume) total flow rate: 80 ml/min; room temperature; wavelength 200-400 nm, complete injection. Gradient profile: mobile phase A 0 to 2 min 63 ml, mobile phase B 0 to 2 min 7 ml, mobile phase A 2 to 10 min from 63 ml to 39 ml and mobile phase B from 7 ml to 31 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 8.3 mg (purity 90%, 62% of theory) of the target compound.

$^1$H-NMR (600 MHz, DMSO-d6) δ [ppm]: 0.891 (0.41), 0.908 (0.96), 0.929 (1.03), 0.943 (0.48), 1.380 (0.46), 1.401 (1.07), 1.421 (1.24), 1.440 (0.58), 1.471 (1.05), 1.485 (2.38), 1.491 (3.31), 1.504 (2.79), 1.511 (2.62), 1.524 (1.89), 1.532 (1.25), 1.542 (0.86), 1.552 (1.29), 1.562 (1.40), 1.586 (2.60), 1.592 (3.22), 1.598 (2.82), 1.609 (2.29), 1.613 (2.28), 1.620 (2.03), 1.630 (0.77), 1.681 (1.29), 1.702 (1.25), 1.774 (3.02), 1.794 (2.62), 1.901 (1.30), 1.917 (2.00), 1.934 (1.18), 2.135 (1.06), 2.150 (1.91), 2.154 (1.87), 2.168 (1.12), 2.520 (0.99), 2.564 (1.18), 2.652 (0.44), 2.735 (1.56), 2.754 (1.54), 2.781 (1.79), 2.799 (1.71), 3.028 (2.21), 3.048 (4.09), 3.068 (2.26), 3.102 (0.54), 3.480 (1.58), 3.563 (1.40), 3.934 (3.17), 3.955 (3.05), 4.430 (1.61), 4.438 (3.14), 4.448 (1.87), 4.509 (1.96), 4.519 (4.42), 4.525 (6.57), 4.533 (5.92), 7.824 (16.00), 7.865 (0.74), 7.879 (1.67), 7.883 (1.74), 7.895 (2.30), 7.898 (2.39), 7.910 (1.74), 7.914 (1.69), 8.171 (3.02), 8.459 (6.28), 8.463 (6.04), 8.668 (1.79), 8.678 (3.62), 8.687 (1.72).

Example 128

2-([1,4'-Bipiperidin]-1'-yl)-N-[(3,5-difluoropyridin-2-yl)methyl]-1,3-thiazole-5-carboxamide

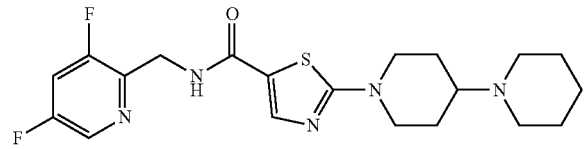 [SMILES: O=C(NCc1ncc(F)cc1F)c1cnc(N2CCC(N3CCCCC3)CC2)s1]

Acetic acid (9.7 µl, 170 µmol) was added to a solution of N-[(3,5-difluoropyridin-2-yl)methyl]-2-(4-oxopiperidin-1-yl)-1,3-thiazole-5-carboxamide (100.0 mg, 284 µmol) and piperidine (56 µl, 570 µmol) in 2 ml of dichloromethane, and the mixture was stirred at room temperature for 4 h. Subsequently, sodium triacetoxyborohydride (90.2 mg, 426 µmol) was added and the mixture was stirred at room temperature overnight. Subsequently, sat. NaHCO$_3$ solution was added and the reaction mixture was extracted with dichloromethane. The organic phase was concentrated on a rotary evaporator and the residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume). Total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 22.0 mg (100% purity, 18% of theory) of the title compound.

LC-MS (method 1): R$_t$=0.80 min; MS (ESIpos): m/z=422 [M+H]$^+$.

$^1$H-NMR (600 MHz, DMSO-d6) δ [ppm]: 1.366 (3.44), 1.375 (2.92), 1.444 (1.06), 1.453 (3.16), 1.463 (7.91), 1.471 (9.96), 1.482 (6.13), 1.490 (4.09), 1.504 (1.17), 1.512 (1.00), 1.769 (3.09), 1.790 (2.71), 2.430 (5.90), 2.439 (8.35), 2.447 (6.39), 2.466 (1.66), 2.471 (2.35), 2.517 (0.56), 2.651 (0.41), 3.021 (2.01), 3.025 (2.37), 3.042 (4.07), 3.045 (4.08), 3.062 (2.33), 3.067 (2.09), 3.259 (0.66), 3.920 (3.18), 3.942 (3.09), 4.523 (5.69), 4.532 (5.70), 7.821 (16.00), 7.879 (1.63), 7.882 (1.78), 7.895 (2.33), 7.897 (2.41), 7.910 (1.70), 7.914 (1.76), 8.458 (6.16), 8.462 (6.16), 8.664 (1.76), 8.673 (3.62), 8.683 (1.83).

Example 129

N-[1-(3,5-Difluoropyridin-2-yl)cyclopropyl]-2-[(3R)-3-methyl[1,4'-bipiperidin]-1'-yl]-1,3-thiazole-5-carboxamide

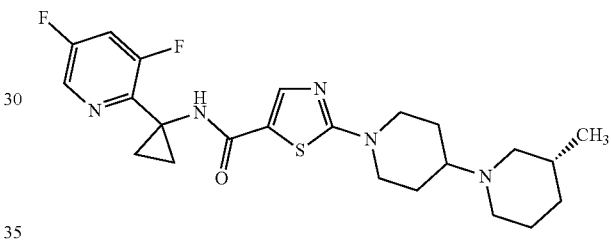

1-(3-Dimethylaminopropyl)-3-ethylcarbodiimide hydrochloride (32.6 mg, 170 µmol), 1-hydroxy-1H-benzotriazole hydrate (26.0 mg, 170 µmol) and N,N-diisopropylethylamine (110 µl, 650 µmol) were added to a solution of 2-[(3R)-3-methyl[1,4'-bipiperidin]-1'-yl]-1,3-thiazole-5-carboxylic acid dihydrochloride (50.0 mg, 131 µmol) in 2 ml of DMF and the mixture was stirred for 5 min, after which 1-(3,5-difluoropyridin-2-yl)cyclopropanamine hydrochloride (1:1) (29.7 mg, 144 µmol) was added. The mixture was then stirred at room temperature overnight. The reaction mixture was purified by preparative HPLC [instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 47 ml, mobile phase B 0 to 2 min 23 ml, mobile phase A 2 to 10 min from 47 ml to 23 ml and mobile phase B from 23 ml to 47 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 37.0 mg (100% purity, 61% of theory) of the title compound.

LC-MS (method 2): R$_t$=0.56 min; MS (ESIpos): m/z=462 [M+H]$^+$.

$^1$H-NMR (600 MHz, DMSO-d6) δ [ppm]: 0.782 (0.51), 0.788 (0.60), 0.812 (15.17), 0.823 (16.00), 0.842 (0.59), 0.848 (0.53), 0.955 (0.47), 1.174 (2.26), 1.182 (6.55), 1.187 (6.16), 1.194 (2.43), 1.369 (0.51), 1.389 (1.31), 1.409 (1.42), 1.429 (0.62), 1.449 (0.85), 1.464 (2.23), 1.477 (4.28), 1.484 (9.56), 1.488 (8.40), 1.496 (3.72), 1.521 (1.41), 1.527 (1.17), 1.565 (1.73), 1.581 (1.06), 1.586 (1.39), 1.615 (1.46), 1.636 (1.39), 1.737 (1.83), 1.755 (5.18), 1.772 (2.86), 1.779 (2.96), 2.036 (1.15), 2.051 (2.05), 2.070 (1.12), 2.470 (1.22), 2.720 (1.75), 2.732 (3.29), 2.748 (1.72), 2.956 (0.44), 3.020 (2.17), 3.037 (3.83), 3.058 (2.15), 3.915 (2.81), 3.936 (2.67), 6.779 (0.67), 6.785 (0.65), 7.120 (0.64), 7.125 (0.60), 7.740 (1.36), 7.744 (1.44), 7.755 (1.57), 7.759 (2.67), 7.763 (1.55), 7.774 (1.38), 7.778 (1.38), 7.835 (11.84), 8.360 (5.23), 8.364 (4.87), 8.928 (5.546).

Example 130

N-[(3,5-Difluoropyridin-2-yl)methyl]-4-ethyl-2-[(3R)-3-methyl[1,4'-bipiperidin]-1'-yl]-1,3-thiazole-5-carboxamide

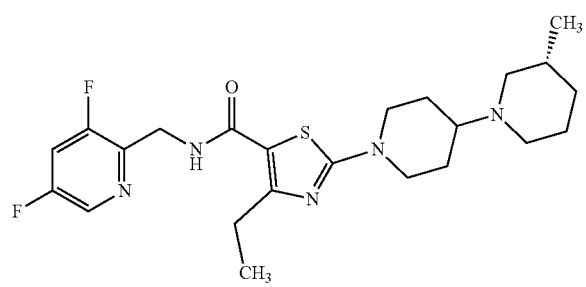 [SMILES: CCc1nc(N2CCC(N3CCC[C@@H](C)C3)CC2)sc1C(=O)NCc1ncc(F)cc1F]

2-Bromo-N-[(3,5-difluoropyridin-2-yl)methyl]-4-ethyl-1,3-thiazole-5-carboxamide (150 mg, 414 µmol) and (3R)-3-methyl-1,4'-bipiperidine dihydrochloride (106 mg, 414 µmol) were combined and stirred at 120° C. in sodium carbonate solution (830 µl, 2.0 M, 1.7 mmol) for 1 h. The reaction mixture was then purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 39 ml, mobile phase B 0 to 2 min 31 ml, mobile phase A 2 to 10 min from 39 ml to 15 ml and mobile phase B from 31 ml to 55 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 74.0 mg (purity 100%, 39% of theory) of the target compound.

LC-MS (method 2): $R_t$=0.60 min; MS (ESIpos): m/z=464 [M+H]$^+$.

$^1$H-NMR (500 MHz, DMSO-d6) δ [ppm]: 0.799 (1.09), 0.813 (11.56), 0.827 (12.24), 0.847 (0.47), 1.091 (7.29), 1.106 (16.00), 1.121 (7.29), 1.388 (0.88), 1.395 (0.58), 1.412 (0.97), 1.438 (0.80), 1.447 (0.69), 1.464 (1.55), 1.472 (1.65), 1.488 (2.07), 1.495 (2.07), 1.510 (1.47), 1.521 (1.26), 1.530 (0.74), 1.544 (0.47), 1.565 (1.25), 1.571 (0.94), 1.584 (0.71), 1.591 (0.92), 1.598 (0.74), 1.615 (0.99), 1.641 (0.96), 1.733 (1.37), 1.754 (2.49), 1.774 (2.92), 1.793 (1.87), 2.029 (0.79), 2.047 (1.42), 2.052 (1.39), 2.069 (0.80), 2.453 (0.77), 2.459 (0.54), 2.469 (0.96), 2.475 (1.59), 2.482 (1.28), 2.523 (0.42), 2.727 (1.39), 2.740 (2.26), 2.760 (1.12), 2.789 (1.99), 2.804 (6.09), 2.819 (5.92), 2.834 (1.81), 2.998 (1.35), 3.003 (1.59), 3.024 (2.79), 3.028 (2.70), 3.048 (1.59), 3.891 (2.15), 3.917 (2.01), 4.488 (4.13), 4.499 (4.03), 7.879 (1.35), 7.883 (1.42), 7.897 (1.69), 7.899 (1.75), 7.901 (1.82), 7.903 (1.63), 7.917 (1.34), 7.921 (1.38), 7.989 (1.38), 8.000 (2.84), 8.011 (1.31), 8.452 (4.92), 8.456 (4.69).

Example 131 ent-2-[4-(1,1-Difluoro-5-azaspiro[2.5]octan-5-yl)piperidin-1-yl]-N-[(3,5-difluoropyridin yl)methyl]-1,3-thiazole-5-carboxamide (Enantiomer 1)

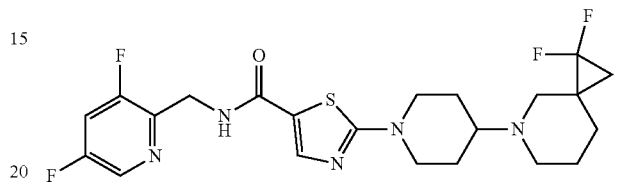

60 mg of rac-2-[4-(1,1-difluoro-5-azaspiro[2.5]octan-5-yl)piperidin-1-yl]-N-[(3,5-difluoropyridin-2-yl)methyl]-1,3-thiazole-5-carboxamide were separated into the enantiomers by chiral HPLC (preparative HPLC: column Daicel® Chiralpak ID, 5 µm, 250×20 mm; mobile phase A: 30% n-heptane, mobile phase B: 70% ethanol+0.2% diethylamine in B; flow rate 20 ml/min; temperature 40° C., detection: 220 nm). The enantiomer having a retention time of 1.927 min (HPLC: column Daicel® Chiralpak ID-3 3 µm, flow rate 1 ml/min; mobile phase A: 50% n-heptane, mobile phase B: 50% ethanol+0.2% diethylamine in B; detection: 220 nm) was collected. Removal of the solvents gave 23 mg (98% ee) of the title compound.

LC-MS (method 5): $R_t$=1.56 min; MS (ESIpos): m/z=484 [M+H]$^+$.

$^1$H-NMR (600 MHz, DMSO-d6) δ [ppm]: 1.146 (0.84), 1.158 (2.52), 1.170 (2.50), 1.186 (1.37), 1.198 (1.48), 1.215 (2.36), 1.226 (2.39), 1.436 (0.92), 1.456 (3.88), 1.476 (8.04), 1.494 (7.15), 1.603 (2.19), 1.755 (2.31), 1.776 (4.13), 1.799 (1.99), 2.377 (2.43), 2.396 (3.21), 2.422 (2.44), 2.514 (4.21), 2.568 (1.52), 2.620 (1.95), 3.046 (3.16), 3.063 (5.74), 3.083 (3.23), 3.907 (3.91), 3.926 (3.72), 4.523 (8.18), 4.532 (8.18), 7.822 (16.00), 7.878 (1.98), 7.882 (2.00), 7.897 (3.37), 7.910 (2.00), 7.913 (1.97), 8.458 (7.68), 8.461 (7.29), 8.666 (2.49), 8.676 (4.92), 8.685 (2.41).

Example 132 ent-2-[4-(1,1-Difluoro-5-azaspiro[2.5]octan-5-yl)piperidin-1-yl]-N-[(3,5-difluoropyridin yl)methyl]-1,3-thiazole-5-carboxamide (Enantiomer 2)

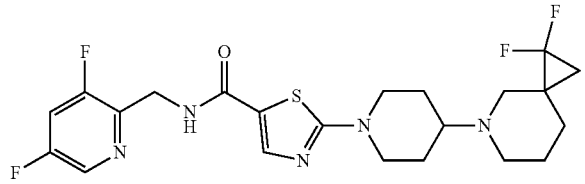 [SMILES: O=C(NCc1ncc(F)cc1F)c1cnc(N2CCC(N3CCCC4(C3)CC4(F)F)CC2)s1]

60 mg of rac-2-[4-(1,1-difluoro-5-azaspiro[2.5]octan-5-yl)piperidin-1-yl]-N-[(3,5-difluoropyridin-2-yl)methyl]-1,3-thiazole-5-carboxamide were separated into the enantiomers by chiral HPLC (preparative HPLC: column Daicel® Chiralpak ID, 5 μm, 250×20 mm; mobile phase A: 30% n-heptane, mobile phase B: 70% ethanol+0.2% diethylamine in B; flow rate 20 ml/min; temperature 40° C., detection: 220 nm). The enantiomer having a retention time of 3.317 min (HPLC: column Daicel® Chiralpak ID-3 3 μm, flow rate 1 ml/min; mobile phase A: 50% n-heptane, mobile phase B: 50% ethanol+0.2% diethylamine in B; detection: 220 nm) was collected. Removal of the solvents gave 23 mg (99% ee) of the title compound.

LC-MS (Method 5): $R_t$=1.56 min; MS (ESIpos): m/z=484 [M+H]$^+$.

$^1$H-NMR (600 MHz, DMSO-d6) δ [ppm]: 1.146 (0.75), 1.158 (1.98), 1.171 (1.91), 1.186 (1.08), 1.198 (1.15), 1.215 (1.81), 1.227 (1.85), 1.239 (0.96), 1.436 (0.80), 1.456 (2.96), 1.477 (5.97), 1.495 (5.35), 1.522 (1.38), 1.603 (1.63), 1.613 (1.24), 1.756 (1.75), 1.780 (3.00), 1.800 (1.48), 2.377 (1.82), 2.396 (2.41), 2.422 (1.92), 2.514 (3.06), 2.568 (1.08), 2.620 (1.43), 2.651 (0.41), 3.042 (2.15), 3.046 (2.46), 3.063 (4.28), 3.083 (2.49), 3.088 (2.11), 3.906 (2.87), 3.926 (2.70), 4.523 (6.11), 4.532 (6.07), 7.822 (16.00), 7.878 (1.73), 7.882 (1.81), 7.895 (2.55), 7.897 (2.67), 7.910 (1.78), 7.914 (1.86), 8.458 (6.46), 8.461 (6.36), 8.667 (1.89), 8.676 (3.89), 8.686 (1.94).

Example 133 rac-N-[(3,5-Difluoropyridin-2-yl)methyl]-2-(3-phenyl[1,4'-bipiperidin]-1'-yl)-1,3-thiazole-5-carboxamide

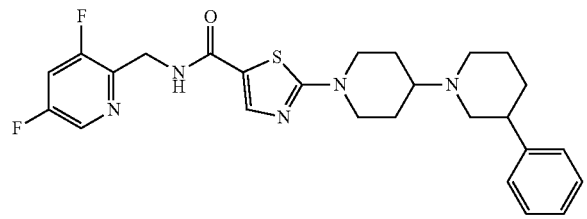 [SMILES: O=C(NCc1ncc(F)cc1F)c1cnc(N2CCC(N3CCCC(c4ccccc4)C3)CC2)s1]

N,N-Diisopropylethylamine (69 μl, 400 μmol) and acetic acid (14 μl, 240 μmol) were added in succession to a solution of N-[(3,5-difluoropyridin-2-yl)methyl]-2-(4-oxopiperidin-1-yl)-1,3-thiazole-5-carboxamide (70.0 mg, 199 μmol) and rac-3-phenylpiperidine (64.1 mg, 397 μmol) in 4.2 ml of dichloromethane, and the mixture was stirred at room temperature overnight. Subsequently, sodium triacetoxyborohydride (63.2 mg, 298 μmol) was added and the mixture was stirred at room temperature for 5 h. Subsequently, sat. NaHCO$_3$ solution was added and the reaction mixture was extracted with dichloromethane. The organic phase was washed with water and dried over Na$_2$SO$_4$. The drying agent was filtered off and the filtrate was concentrated. The residue was dissolved in DMSO and purified by preparative HPLC (instrument: Waters Prep LC/MS System, column: XBridge C18 5 μm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 70 ml, mobile phase B 0 to 2 min 0 ml, mobile phase A 2 to 10 min from 70 ml to 0 ml and mobile phase B from 0 ml to 70 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 17.0 mg (purity 100%, 17% of theory) of the target compound.

LC-MS (method 5): $R_t$=1.74 min; MS (ESIpos): m/z=498 [M+H]$^+$.

$^1$H-NMR (400 MHz, DMSO-d6) δ [ppm]: −0.149 (0.91), 0.146 (0.77), 1.378 (0.42), 1.400 (1.08), 1.408 (1.16), 1.430 (1.35), 1.439 (1.38), 1.461 (1.11), 1.496 (1.85), 1.510 (2.16), 1.528 (2.44), 1.560 (1.50), 1.704 (1.58), 1.736 (1.16), 1.796 (3.14), 1.819 (2.95), 2.073 (2.48), 2.157 (1.25), 2.185 (1.75), 2.201 (1.77), 2.228 (3.01), 2.255 (1.62), 2.328 (1.28), 2.367 (1.69), 2.524 (3.95), 2.574 (2.01), 2.601 (0.88), 2.666 (1.83), 2.670 (1.83), 2.693 (1.57), 2.711 (2.19), 2.856 (2.82), 2.883 (2.55), 3.015 (1.85), 3.045 (3.45), 3.075 (1.89), 3.921 (2.88), 3.954 (2.64), 4.514 (4.86), 4.527 (4.95), 7.166 (1.21), 7.172 (0.84), 7.182 (3.04), 7.193 (1.08), 7.199 (1.96), 7.204 (1.62), 7.241 (2.91), 7.257 (12.12), 7.263 (16.00), 7.280 (6.40), 7.299 (1.70), 7.820 (15.56), 7.881 (1.54), 7.887 (1.58), 7.906 (2.02), 7.910 (2.10), 7.929 (1.58), 7.935 (1.60), 8.173 (0.95), 8.460 (4.70), 8.465 (4.61), 8.685 (1.67), 8.699 (3.57), 8.713 (1.70).

Example 134 diamix-2-[4-(1,1-Difluoro-5-azaspiro[2.5]octan-5-yl)-3-fluoropiperidin-1-yl]-N-[(3,5-difluoropyridin-2-yl)methyl]-1,3-thiazole-5-carboxamide

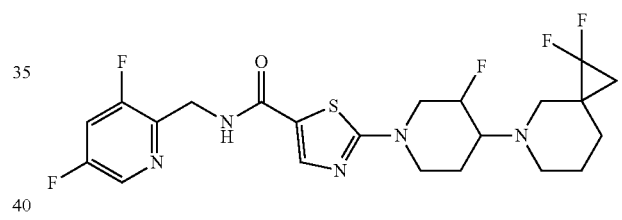

2-Bromo-N-[(3,5-difluoropyridin-2-yl)methyl]-1,3-thiazole-5-carboxamide (100 mg, 299 μmol) and diamix-1,1-difluoro-5-(3-fluoropiperidin-4-yl)-5-azaspiro[2.5]octane dihydrochloride (96.1 mg, 299 μmol) were combined and stirred at 120° C. in 2 ml of sodium carbonate solution (2 ml, 2.0 M, 4 mmol) for 30 hours. The reaction mixture was then diluted with water and extracted with dichloromethane. The organic phase was dried over Na$_2$SO$_4$ and filtered and the filtrate was concentrated on a rotary evaporator. The residue was dissolved in DMSO and purified by preparative HPLC (instrument: Waters Prep LC/MS System, column: XBridge C18 5 μm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 46.0 mg (purity 100%, 31% of theory) of the target compound.

LC-MS (method 5): $R_t$=1.52 min; MS (ESIpos): m/z=502 [M+H]$^+$.

¹H-NMR (400 MHz, DMSO-d6) δ [ppm]: −0.149 (0.40), 1.174 (2.35), 1.195 (4.08), 1.216 (2.33), 1.232 (0.76), 1.462 (1.17), 1.481 (2.78), 1.501 (4.70), 1.523 (1.86), 1.608 (1.52), 1.623 (1.37), 1.668 (1.19), 1.703 (1.07), 1.846 (0.95), 1.858 (1.09), 1.879 (1.18), 1.890 (1.21), 1.911 (0.72), 1.923 (0.63), 2.328 (0.44), 2.367 (0.65), 2.524 (3.86), 2.604 (2.69), 2.633 (1.49), 2.670 (1.14), 2.699 (2.14), 2.710 (2.28), 2.769 (0.60), 2.788 (0.77), 3.126 (1.00), 3.158 (1.99), 3.190 (1.15), 3.214 (1.44), 3.250 (1.52), 3.987 (1.42), 4.019 (1.34), 4.153 (0.87), 4.187 (1.56), 4.217 (0.79), 4.521 (5.39), 4.534 (5.43), 5.026 (1.17), 5.056 (0.66), 5.149 (1.18), 5.177 (0.67), 7.812 (16.00), 7.885 (1.58), 7.891 (1.73), 7.908 (2.00), 7.910 (2.18), 7.913 (2.27), 7.916 (2.13), 7.933 (1.66), 7.938 (1.74), 8.464 (5.05), 8.470 (5.00), 8.709 (1.84), 8.724 (3.89), 8.738 (1.87).

Example 135 diamix-2-[4-(5-Azaspiro[2.5]octan-5-yl)-3-fluoropiperidin-1-yl]-N-[(3,5-difluoropyridin-2-yl)methyl]-1,3-thiazole-5-carboxamide

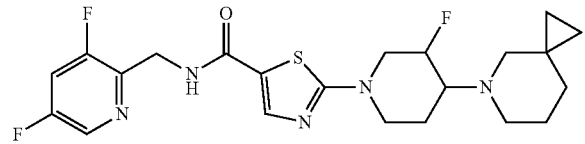

2-Bromo-N-[(3,5-difluoropyridin-2-yl)methyl]-1,3-thiazole-5-carboxamide (100 mg, 299 µmol) and diamix-5-(3-fluoropiperidin-4-yl)-5-azaspiro[2.5]octane dihydrochloride (85.4 mg, 299 µmol) were combined and stirred at 120° C. in 2 ml of sodium carbonate solution (2 ml, 2.0 M, 4 mmol) for 30 hours. The reaction mixture was then diluted with water and extracted with dichloromethane. The organic phase was dried over $Na_2SO_4$ and filtered and the filtrate was concentrated on a rotary evaporator. The residue was dissolved in DMSO and purified by preparative HPLC (instrument: Waters Prep LC/MS System, column: XBridge C18 5 µm 100×30 mm. Mobile phase A: water, mobile phase B: acetonitrile, mobile phase C: 2% ammonia in water, mobile phase D: acetonitrile/water (80% by volume/20% by volume) total flow rate: 80 ml/min; room temperature; wavelength 200-400 nm, complete injection. Gradient profile: mobile phase A 0 to 2 min 55 ml, mobile phase B 0 to 2 min 15 ml, mobile phase A 2 to 10 min from 55 ml to 31 ml and mobile phase B from 15 ml to 39 ml, 10 to 12 min 0 ml of mobile phase A and 70 ml of mobile phase B. Mobile phase C and mobile phase D constant flow rate of 5 ml/min each over the entire running time). The product-containing fractions were combined and lyophilized. This gave 18.0 mg (purity 100%, 13% of theory) of the target compound.

LC-MS (method 5): $R_t$=1.52 min; MS (ESIpos): m/z=466 [M+H]⁺.

¹H-NMR (400 MHz, DMSO-d6) δ [ppm]: 0.236 (9.32), 0.259 (7.85), 0.278 (1.43), 0.294 (0.46), 1.209 (0.58), 1.227 (1.61), 1.242 (3.77), 1.257 (3.72), 1.271 (1.81), 1.290 (0.55), 1.561 (2.71), 1.571 (3.44), 1.585 (2.57), 1.669 (1.21), 1.694 (1.73), 1.787 (0.48), 1.797 (0.60), 1.818 (1.34), 1.828 (1.46), 1.849 (1.31), 1.860 (1.24), 1.880 (0.46), 2.073 (1.21), 2.269 (1.36), 2.297 (5.25), 2.313 (4.36), 2.328 (0.76), 2.339 (1.10), 2.367 (0.61), 2.577 (4.23), 2.589 (5.56), 2.602 (3.30), 2.635 (0.93), 2.644 (0.90), 2.666 (1.15), 2.710 (0.57), 3.110 (1.17), 3.136 (2.08), 3.142 (2.03), 3.167 (1.24), 3.199 (1.78), 3.235 (2.02), 3.968 (1.52), 4.001 (1.41), 4.142 (0.95), 4.172 (1.62), 4.206 (0.88), 4.520 (5.56), 4.533 (5.59), 5.026 (1.83), 5.148 (1.86), 7.810 (16.00), 7.884 (1.64), 7.890 (1.76), 7.909 (2.28), 7.913 (2.39), 7.915 (2.23), 7.932 (1.72), 7.938 (1.80), 8.164 (0.74), 8.463 (5.37), 8.469 (5.31), 8.706 (1.86), 8.720 (3.88), 8.734 (1.86).

Analogously to Examples 15 to 17, the following compounds of Examples 136 to 149 were prepared from the starting materials stated in each case:

| Example | Name/Structure/Starting materials | Analytical data |
|---|---|---|
| 136 | N-[(3,5-difluoropyridin-2-yl)methyl]-2-[4-(2-oxa-6-azaspiro[3.5]nonan-6-yl)piperidin-1-yl]-1,3-thiazole-5-carboxamide<br><br>from N-[(3,5-difluoropyridin-2-yl)methyl]-2-(4-oxopiperidin-1-yl)-1,3-thiazole-5-carboxamide and 2-oxa-6-azaspiro[3.5]nonane oxalic acid (2:1) | ¹H-NMR (600 MHz, DMSO-d₆, δ/ppm): 1.37-1.44 (m, 2H), 1.46-1.56 (m, 2H), 1.57-1.65 (m, 2H), 1.78 (br. d, 2H), 2.37 (br. s, 2H), 2.52-2.63 (m, 3H, partially obscured by DMSO), 3.07 (td, 2H), 3.94 (br. d, 2H), 4.19 (s, 4H), 4.53 (d, 2H), 7.83 (s, 1H), 7.90 (td, 1H), 8.46 (d, 1H), 8.68 (t, 1H). LC-MS (method 1): $R_t$ = 0.76 min; m/z = 464 (M + H)⁺. |

-continued

| Example | Name/Structure/Starting materials | Analytical data |
|---|---|---|
| 137 | 2-(3-cyclopropyl[1,4'-bipiperidin]-1'-yl)-N-[(3,5-difluoropyridin-2-yl)methyl]-1,3-thiazole-5-carboxamide (racemic)<br>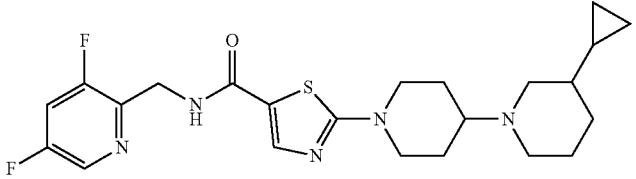 [SMILES: O=C(NCc1ncc(F)cc1F)c1cnc(N2CCC(N3CCCC(C4CC4)C3)CC2)s1]<br>from N-[(3,5-difluoropyridin-2-yl)methyl]-2-(4-oxopiperidin-1-yl)-1,3-thiazole-5-carboxamide and 3-cyclopropylpiperidine hydrochloride (1:1) (racemic) | $^1$H-NMR (600 MHz, DMSO-d$_6$, δ/ppm): 0.01-0.08 (m, 2H), 0.29-0.37 (m, 2H), 0.47-0.54 (m, 1H), 0.63-0.72 (m, 1H), 0.99 (qd, 1H), 1.28-1.38 (m, 1H), 1.42-1.54 (m, 2H), 1.56-1.63 (m, 1H), 1.66-1.72 (m, 1H), 1.74-1.81 (m, 2H), 1.99 (t, 1H), 2.05-2.12 (m, 1H), 2.47-2.55 (m, 1H, partially obscured by DMSO), 2.71 (br. d, 1H), 2.80 (br. d, 1H), 3.04 (td, 2H), 3.93 (br. d, 2H), 4.52 (d, 2H), 7.82 (s, 1H), 7.89 (td, 1H), 8.46 (d, 1H), 8.67 (t, 1H).<br>LC-MS (method 1):<br>R$_t$ = 1.02 min; m/z = 462 (M + H)$^+$. |
| 138 | 2-(3-cyclobutyl[1,4'-bipiperidin]-1'-yl)-N-[(3,5-difluoropyridin-2-yl)methyl]-1,3-thiazole-5-carboxamide (racemic)<br>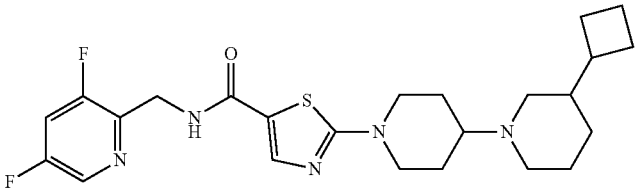 [SMILES: O=C(NCc1ncc(F)cc1F)c1cnc(N2CCC(N3CCCC(C4CCC4)C3)CC2)s1]<br>from N-[(3,5-difluoropyridin-2-yl)methyl]-2-(4-oxopiperidin-1-yl)-1,3-thiazole-5-carboxamide and 3-cyclobutylpiperidine (racemic)<br>The product obtained was purified using Method 10 (preparative HPLC). | $^1$H-NMR (600 MHz, DMSO-d$_6$, δ/ppm): 0.67-0.75 (m, 1H), 1.30-1.40 (m, 2H), 1.41-1.52 (m, 2H), 1.54-1.83 (m, 9H), 1.88-1.95 (m, 2H), 1.97-2.10 (m, 2H), 2.44-2.52 (m, 1H, partially obscured by DMSO), 2.67 (br. d, 1H), 2.71 (br. d, 1H), 2.99-3.08 (m, 2H), 3.93 (br. d, 2H), 4.53 (d, 2H), 7.82 (s, 1H), 7.89 (td, 1H), 8.46 (d, 1H), 8.67 (t, 1H).<br>LC-MS (method 1):<br>R$_t$ = 1.13 min; m/z = 476 (M + H)$^+$. |
| 139 | 2-[4-(7-chloro-3,4-dihydroisoquinolin-2(1H)-yl)piperidin-1-yl]-N-[(3,5-difluoropyridin-2-yl)methyl]-1,3-thiazole-5-carboxamide<br>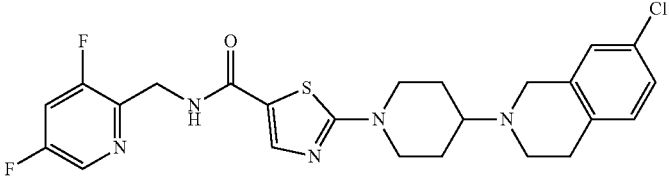 [SMILES: O=C(NCc1ncc(F)cc1F)c1cnc(N2CCC(N3CCc4ccc(Cl)cc4C3)CC2)s1]<br>from N-[(3,5-difluoropyridin-2-yl)methyl]-2-(4-oxopiperidin-1-yl)-1,3-thiazole-5-carboxamide and 7-chloro-1,2,3,4-tetrahydroisoquinoline | $^1$H-NMR (400 MHz, DMSO-d$_6$, δ/ppm): 1.51-1.66 (m, 2H), 1.89 (br. d, 2H), 2.65-2.80 (m, 5H), 3.12 (br. t, 2H), 3.70 (s, 2H), 3.96 (br. d, 2H), 4.53 (br. d, 2H), 7.07-7.18 (m, 3H), 7.84 (s, 1H), 7.88-7.95 (m, 1H), 8.47 (d, 1H), 8.72 (t, 1H).<br>LC-MS (method 1):<br>R = 1.10 min; m/z = 504/506 (M + H)$^+$. |
| 140 | N-[(3,5-difluoropyridin-2-yl)methyl]-2-[4-(8-methoxy-3,4-dihydroisoquinolin-2(1H)-yl)piperidin-1-yl]-1,3-thiazole-5-carboxamide<br>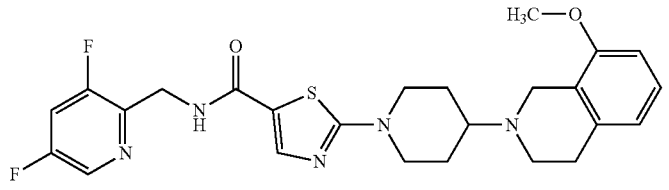 [SMILES: COc1cccc2c1CN(C1CCN(c3ncc(C(=O)NCc4ncc(F)cc4F)s3)CC1)CC2]<br>from N-[(3,5-difluoropyridin-2-yl)methyl]-2-(4-oxopiperidin-1-yl)-1,3-thiazole-5-carboxamide and 8-methoxy-1,2,3,4-tetrahydroisoquinoline | $^1$H-NMR (400 MHz, DMSO-d$_6$, δ/ppm): 1.51-1.66 (m, 2H), 1.90 (br. d, 2H), 2.65-2.79 (m, 5H), 3.12 (br. t, 2H), 3.58 (s, 2H), 3.75 (s, 3H), 3.97 (br. d, 2H), 4.53 (br. d, 2H), 6.68 (d, 1H), 6.74 (d, 1H), 7.08 (t, 1H), 7.85 (s, 1H), 7.91 (ddd, 1H), 8.48 (d, 1H), 8.72 (t, 1H).<br>LC-MS (method 1):<br>R$_t$ = 1.01 min; m/z = 500 (M + H)$^+$. |

| Example | Name/Structure/Starting materials | Analytical data |
|---|---|---|
| 141 | 2-[4-(8-chloro-3,4-dihydroisoquinolin-2(1H)-yl)piperidin-1-yl]-N-[(3,5-difluoropyridin-2-yl)methyl]-1,3-thiazole-5-carboxamide<br />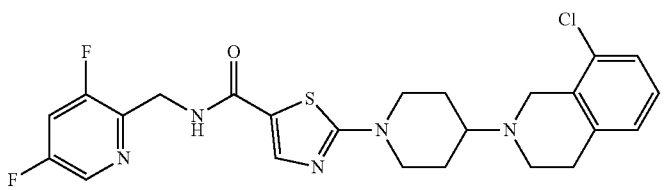 [SMILES: O=C(NCc1ncc(F)cc1F)c1cnc(N2CCC(N3CCc4cccc(Cl)c4C3)CC2)s1]<br />from N-[(3,5-difluoropyridin-2-yl)methyl]-2-(4-oxopiperidin-1-yl)-1,3-thiazole-5-carboxamide and 8-chloro-1,2,3,4-tetrahydroisoquinoline | $^1$H-NMR (400 MHz, DMSO-$d_6$, δ/ppm): 1.53-1.67 (m, 2H), 1.92 (br. d, 2H), 2.70-2.85 (m, 5H), 3.13 (br. t, 2H), 3.70 (s, 2H), 3.99 (br. d, 2H), 4.53 (br. d, 2H), 7.10 (d, 1H), 7.16 (t, 1H), 7.24 (d, 1H), 7.85 (s, 1H), 7.91 (ddd, 1H), 8.47 (d, 1H), 8.72 (t, 1H).<br />LC-MS (method 1):<br />$R_t$ = 1.07 min; m/z = 504/506 (M + H)$^+$. |
| 142 | 2-[4-(5-chloro-3,4-dihydroisoquinolin-2(1H)-yl)piperidin-1-yl]-N-[(3,5-difluoropyridin-2-yl)methyl]-1,3-thiazole-5-carboxamide<br />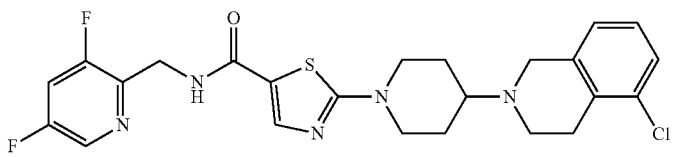<br />from N-[(3,5-difluoropyridin-2-yl)methyl]-2-(4-oxopiperidin-1-yl)-1,3-thiazole-5-carboxamide and 5-chloro-1,2,3,4-tetrahydroisoquinoline | $^1$H-NMR (400 MHz, DMSO-$d_6$, δ/ppm): 1.52-1.66 (m, 2H), 1.90 (br. d, 2H), 2.67-2.77 (m, 3H), 2.78-2.85 (m, 2H), 3.12 (br. t, 2H), 3.72 (s, 2H), 3.97 (br. d, 2H), 4.53 (br. d, 2H), 7.06 (d, 1H), 7.15 (t, 1H), 7.25 (d, 1H), 7.85 (s, 1H), 7.91 (ddd, 1H), 8.47 (d, 1H), 8.72 (t, 1H).<br />LC-MS (method 1):<br />$R_t$ = 1.07 min; m/z = 504/506 (M + H)$^+$. |
| 143 | N-[(3,5-difluoropyridin-2-yl)methyl]-2-[4-(7-methyl-3,4-dihydroisoquinolin-2(1H)-yl)piperidin-1-yl]-1,3-thiazole-5-carboxamide<br />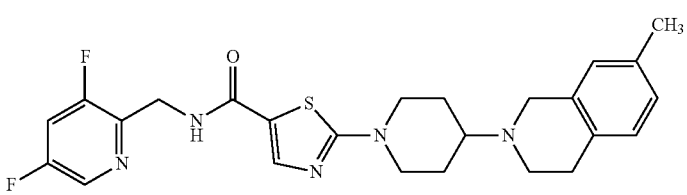 [SMILES: Cc1ccc2c(c1)CN(C1CCN(c3ncc(C(=O)NCc4ncc(F)cc4F)s3)CC1)CC2]<br />from N-[(3,5-difluoropyridin-2-yl)methyl]-2-(4-oxopiperidin-1-yl)-1,3-thiazole-5-carboxamide and 7-methyl-1,2,3,4-tetrahydroisoquinoline | $^1$H-NMR (400 MHz, DMSO-$d_6$, δ/ppm): 1.52-1.66 (m, 2H), 1.90 (br. d, 2H), 2.22 (s, 3H), 2.61-2.78 (m, 5H), 3.12 (br. t, 2H), 3.65 (s, 2H), 3.96 (br. d, 2H), 4.53 (br. d, 2H), 6.85 (s, 1H), 6.90 (d, 1H), 6.95 (d, 1H), 7.85 (s, 1H), 7.91 (ddd, 1H), 8.47 (d, 1H), 8.72 (t, 1H).<br />LC-MS (method 1):<br />$R_t$ = 1.06 min; m/z = 484 (M + H)$^+$. |
| 144 | N-[(3,5-difluoropyridin-2-yl)methyl]-2-[4-(8-fluoro-3,4-dihydroisoquinolin-2(1H)-yl)piperidin-1-yl]-1,3-thiazole-5-carboxamide<br />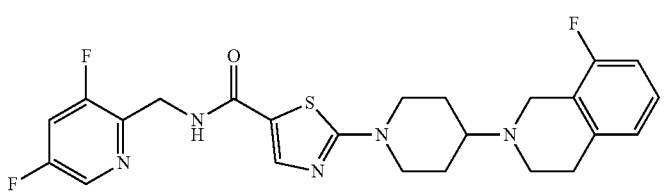<br />from N-[(3,5-difluoropyridin-2-yl)methyl]-2-(4-oxopiperidin-1-yl)-1,3-thiazole-5-carboxamide and 8-fluoro-1,2,3,4-tetrahydroisoquinoline hydrochloride (1:1) | $^1$H-NMR (400 MHz, DMSO-$d_6$, δ/ppm): 1.53-1.67 (m, 2H), 1.91 (br. d, 2H), 2.72-2.84 (m, 5H), 3.12 (br. t, 2H), 3.70 (s, 2H), 3.98 (br. d, 2H), 4.53 (br. d, 2H), 6.91-6.98 (m, 2H), 7.11-7.19 (m, 1H), 7.85 (s, 1H), 7.91 (ddd, 1H), 8.47 (d, 1H), 8.72 (t, 1H).<br />LC-MS (method 1):<br />$R_t$ = 1.00 min; m/z = 488 (M + H)$^+$. |

| Example | Name/Structure/Starting materials | Analytical data |
|---|---|---|
| 145 | N-[(3,5-difluoropyridin-2-yl)methyl]-2-[4-(6-methoxy-3,4-dihydroisoquinolin-2(1H)-yl)piperidin-1-yl]-1,3-thiazole-5-carboxamide<br>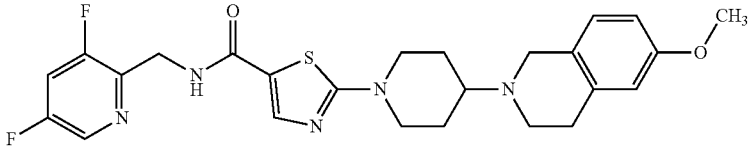 [SMILES: COc1ccc2c(c1)CCN(C1CCN(c3ncc(C(=O)NCc4ncc(F)cc4F)s3)CC1)C2]<br>from N-[(3,5-difluoropyridin-2-yl)methyl]-2-(4-oxopiperidin-1-yl)-1,3-thiazole-5-carboxamide and 6-methoxy-1,2,3,4-tetrahydroisoquinoline | $^1$H-NMR (600 MHz, DMSO-d$_6$, δ/ppm): 1.53-1.64 (m, 2H), 1.89 (br. d, 2H), 2.65-2.71 (m, 1H), 2.71-2.78 (m, 4H), 3.12 (br. t, 2H), 3.63 (s, 2H), 3.69 (s, 3H), 3.95 (br. d, 2H), 4.53 (br. d, 2H), 6.64 (d, 1H), 6.67 (dd, 1H), 6.95 (d, 1H), 7.84 (s, 1H), 7.90 (ddd, 1H), 8.46 (d, 1H), 8.69 (t, 1H).<br>LC-MS (method 1):<br>R$_t$ = 1.00 min; m/z = 500 (M + H)$^+$. |
| 146 | N-[(3,5-difluoropyridin-2-yl)methyl]-2-[4-(6-methyl-3,4-dihydroisoquinolin-2(1H)-yl)piperidin-1-yl]-1,3-thiazole-5-carboxamide<br>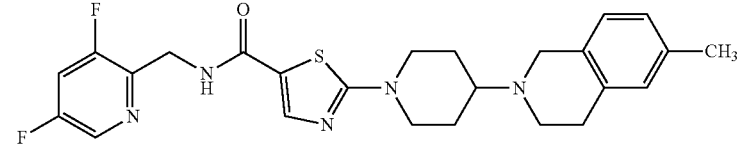 [SMILES: Cc1ccc2c(c1)CCN(C1CCN(c3ncc(C(=O)NCc4ncc(F)cc4F)s3)CC1)C2]<br>from N-[(3,5-difluoropyridin-2-yl)methyl]-2-(4-oxopiperidin-1-yl)-1,3-thiazole-5-carboxamide and 6-methyl-1,2,3,4-tetrahydroisoquinoline hydrochloride (1:1) | $^1$H-NMR (400 MHz, DMSO-d$_6$, δ/ppm): 1.51-1.66 (m, 2H), 1.90 (br. d, 2H), 2.22 (s, 3H), 2.64-2.78 (m, 5H), 3.11 (br. t, 2H), 3.65 (s, 2H), 3.96 (br. d, 2H), 4.53 (br. d, 2H), 6.85-6.95 (m, 3H), 7.84 (s, 1H), 7.91 (ddd, 1H), 8.47 (d, 1H), 8.72 (t, 1H).<br>LC-MS (method 1):<br>R$_t$ = 1.06 min; m/z = 484 (M + H)$^+$. |
| 147 | N-[(3,5-difluoropyridin-2-yl)methyl]-2-[4-(5-fluoro-3,4-dihydroisoquinolin-2(1H)-yl)piperidin-1-yl]-1,3-thiazole-5-carboxamide<br>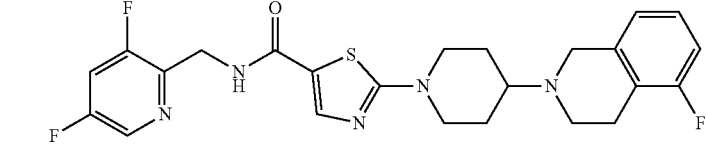 [SMILES: O=C(NCc1ncc(F)cc1F)c1cnc(N2CCC(N3CCc4c(F)cccc4C3)CC2)s1]<br>from N-[(3,5-difluoropyridin-2-yl)methyl]-2-(4-oxopiperidin-1-yl)-1,3-thiazole-5-carboxamide and 5-fluoro-1,2,3,4-tetrahydroisoquinoline | $^1$H-NMR (600 MHz, DMSO-d$_6$, δ/ppm): 1.55-1.65 (m, 2H), 1.90 (br. d, 2H), 2.68-2.76 (m, 3H), 2.76-2.82 (m, 2H), 3.12 (br. t, 2H), 3.72 (s, 2H), 3.97 (br. d, 2H), 4.53 (d, 2H), 6.89-6.97 (m, 2H), 7.11-7.16 (m, 1H), 7.84 (s, 1H), 7.90 (td, 1H), 8.46 (d, 1H), 8.69 (t, 1H).<br>LC-MS (method 1):<br>R$_t$ = 1.00 min; m/z = 488 (M + H)$^+$. |
| 148 | N-[(3,5-difluoropyridin-2-yl)methyl]-2-[3-(2-methoxyethyl)[1,4'-bipiperidin]-1'-yl]-1,3-thiazole-5-carboxamide (racemic)<br>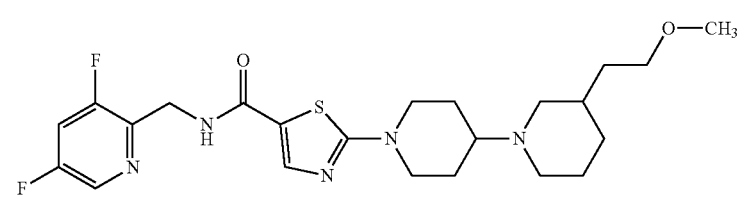 [SMILES: COCCC1CCCN(C2CCN(c3ncc(C(=O)NCc4ncc(F)cc4F)s3)CC2)C1]<br>from N-[(3,5-difluoropyridin-2-yl)methyl]-2-(4-oxopiperidin-1-yl)-1,3-thiazole-5-carboxamide and 3-(2-methoxyethyl)piperidine hydrochloride (1:1) (racemic)<br>The product obtained was purified using Method 9 (preparative HPLC). | $^1$H-NMR (400 MHz, DMSO-d$_6$, δ/ppm): 0.77-0.92 (m, 1H), 1.25-1.89 (m, 13H), 2.03-2.15 (m, 1H), 2.38-2.58 (m, 1H, partially obscured by DMSO), 2.64-2.78 (m, 2H), 3.04 (br. t, 2H), 3.20 (s, 3H), 3.94 (br. d, 2H), 4.53 (br. d, 2H), 7.83 (s, 1H), 7.87-7.95 (m, 1H), 8.47 (d, 1H), 8.71 (t, 1H).<br>LC-MS (method 1):<br>R$_t$ = 0.90 min; m/z = 480 (M + H)$^+$. |

-continued

| Example | Name/Structure/Starting materials | Analytical data |
|---|---|---|
| 149 | 2-(3-tert-butyl[1,4'-bipiperidin]-1'-yl)-N-[(3,5-difluoropyridin-2-yl)methyl]-1,3-thiazole-5-carboxamide (racemic)<br>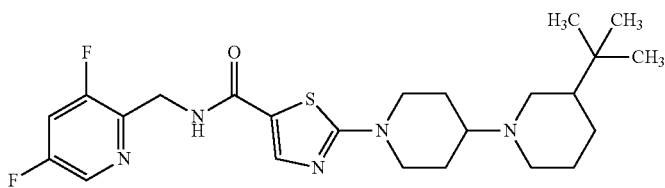 [SMILES: CC(C)(C)C1CCCN(C2CCN(c3ncc(C(=O)NCc4ncc(F)cc4F)s3)CC2)C1]<br>from N-[(3,5-difluoropyridin-2-yl)methyl]-2-(4-oxopiperidin-1-yl)-1,3-thiazole-5-carboxamide and 3-tert-butylpiperidine hydrochloride (1:1) (racemic)<br>The product obtained was purified using Method 10 (preparative HPLC). | $^1$H-NMR (600 MHz, DMSO-$d_6$, δ/ppm): 0.78-0.96 (m, 10H, including at 0.84 (s, 9H)), 1.18 (br. t, 1H), 1.30-1.40 (m, 1H), 1.43-1.56 (m, 2H), 1.64 (br. d, 1H), 1.70 (br. d, 1H), 1.75-1.82 (m, 2H), 1.86 (t, 1H), 1.98 (br. t, 1H), 2.48-2.55 (m, 1H, partially obscured by DMSO), 2.78 (br. d, 1H), 2.87 (br. d, 1H), 3.00-3.09 (m, 2H), 4.53 (br. d, 2H), 7.82 (s, 1H), 7.88 (td, 1H), 8.46 (d, 1H), 8.67 (t, 1H).<br>LC-MS (method 1):<br>$R_t$ = 1.14 min; m/z = 478 (M + H)$^+$. |

Analogously to Examples 18 to 22, the following compounds of Examples 150 to 152 were prepared from the starting materials stated in each case:

| Example | Name/Structure/Starting material | Analytical data |
|---|---|---|
| 150 | N-[(3,5-difluoropyridin-2-yl)methyl]-N-methyl-2-[(3R)-3-methyl[1,4'-bipiperidin]-1'-yl]-1,3-thiazole-5-carboxamide<br>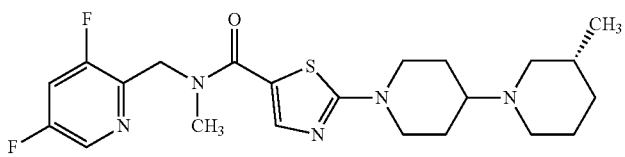<br>from 2-[(3R)-3-methyl[1,4'-bipiperidin]-1'-yl]-1,3-thiazole-5-carboxylic acid dihydrochloride and 1-(3,5-difluoropyridin-2-yl)-N-methylmethanamine hydrochloride (1:1) | $^1$H-NMR (600 MHz, DMSO-$d_6$, δ/ppm): 0.76-0.87 (m, 4H, including at 0.82 (d, 3H)), 1.35-1.67 (m, 6H), 1.71-1.82 (m, 3H), 2.05 (br. t, 1H), 2.45-2.56 (m, 1H, partially obscured by DMSO), 2.74 (br. t, 2H), 3.05 (t, 2H), 3.16 (br. s, 3H), 3.94 (br. d, 2H), 4.83 (br. s, 2H), 7.59 (s, 1H), 7.93 (t, 1H), 8.48 (d, 1H).<br>LC-MS (method 1):<br>$R_t$ = 0.99 min; m/z = 450 (M + H)$^+$. |
| 151 | N-(2-chlorobenzyl)-2-[(3R)-3-methyl[1,4'-bipiperidin]-1'-yl]-1,3-thiazole-5-carboxamide<br>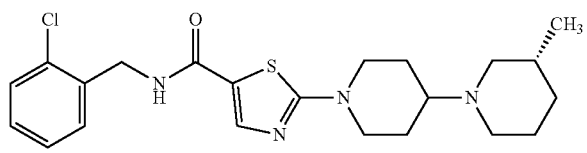 [SMILES: C[C@@H]1CCCN(C2CCN(c3ncc(C(=O)NCc4ccccc4Cl)s3)CC2)C1]<br>from 2-[(3R)-3-methyl[1,4'-bipiperidin]-1'-yl]-1,3-thiazole-5-carboxylic acid dihydrochloride and 1-(2-chlorophenyl)methanamine | $^1$H-NMR (600 MHz, DMSO-$d_6$, δ/ppm): 0.77-0.87 (m, 4H, including at 0.82 (d, 3H)), 1.34-1.67 (m, 6H), 1.72-1.82 (m, 3H), 2.01-2.10 (m, 1H), 2.45-2.56 (m, 1H, partially obscured by DMSO), 2.74 (br. t, 2H), 3.06 (td, 2H), 3.95 (br. d, 2H), 4.46 (d, 2H), 7.26-7.37 (m, 3H), 7.41-7.49 (m, 1H), 7.87 (s, 1H), 7.87 (t, 1H).<br>LC-MS (method 1):<br>$R_t$ = 1.17 min; m/z = 433/435 (M + H)$^+$. |

| Example | Name/Structure/Starting material | Analytical data |
|---|---|---|
| 152 | N-[(3,5-difluoropyridin-2-yl)methyl]-5-[(3R)-3-methyl[1,4'-bipiperidin]-1'-yl]-1,3,4-thiadiazole-2-carboxamide<br><br>from 5-[(3R)-3-methyl[1,4'-bipiperidin]-1'-yl]-1,3,4-thiadiazole-2-carboxylic acid and 1-(3,5-difluoropyridin-2-yl)methanamine dihydrochloride | $^1$H-NMR (600 MHz, DMSO-$d_6$, δ/ppm): 0.78-0.87 (m, 4H, including at 0.82 (d, 3H)), 1.36-1.45 (m, 1H), 1.48-1.67 (m, 5H), 1.73-1.84 (m, 3H), 2.02-2.10 (m, 1H), 2.45-2.57 (m, 1H, partially obscured by DMSO), 2.70-2.78 (m, 2H), 3.20 (td, 2H), 3.94 (br. d, 2H), 4.59 (d, 2H), 7.91 (td, 1H), 8.46 (d, 1H), 9.11 (t, 1H). LC-MS (method 1): $R_t$ = 0.94 min; m/z = 437 (M + H)$^+$. |

Example 153 rac-2-[4-(5-Azaspiro[2.5]octan-5-yl)azepan-1-yl]-N-[(3,5-difluoropyridin-2-yl)methyl]-1,3-thiazole-5-carboxamide

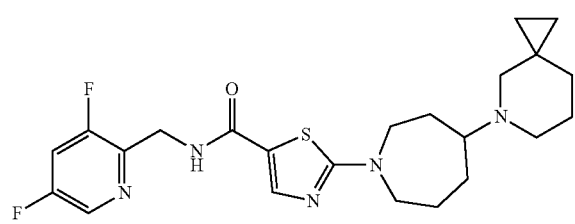 [SMILES: O=C(NCc1ncc(F)cc1F)c1cnc(N2CCCC(N3CCCC4(CC4)C3)CC2)s1]

2-Bromo-N-[(3,5-difluoropyridin-2-yl)methyl]-1,3-thiazole-5-carboxamide (190 mg, 568 μmol) and rac-5-(azepan-4-yl)-5-azaspiro[2.5]octane hydrochloride (139 mg, 568 μmol) was stirred at 120° C. in 5 ml of sodium carbonate solution (5.0 ml, 2.0 M, 10 mmol). After 30 min, the reaction mixture was diluted with water and extracted with dichloromethane. The organic phase was dried over $Na_2SO_4$, the desiccant was filtered off and the filtrate was concentrated on a rotary evaporator. The residue was dissolved in DMSO and purified by means of preparative HPLC (instrument: Waters Prep LC/MS System, column: XBridge C18 5 μm 100×30 mm. Eluent A: water, eluent B: acetonitrile, eluent C: 2% ammonia in water, eluent D: acetonitrile/water (80% by vol./20% by vol.) total flow rate: 80 ml/min, room temperature, wavelength 200-400 nm, complete injection, gradient profile: eluent A 0 to 2 min 47 ml, eluent B 0 to 2 min 23 ml, eluent A 2 to 10 min from 47 ml to 23 ml and eluent B from 23 ml to 47 ml, 10 to 12 min 0 ml eluent A and 70 ml eluent B. Eluent C and eluent D constant flow rate of 5 ml/min in each case over the entire run time). The product-containing fractions were combined and lyophilized. 65.0 mg (100% purity, 25% of theory) of the target compound was obtained.

LC-MS (method 1): $R_t$=0.93 min; MS (ESIpos): m/z=462 [M+H]$^+$.

$^1$H-NMR (600 MHz, DMSO-d6) δ [ppm]: −0.198 (5.60), −0.018 (0.69), 0.010 (2.52), 0.016 (1.67), 0.027 (1.99), 0.043 (6.17), 0.048 (4.92), 0.054 (2.80), 0.067 (0.96), 1.018 (3.68), 1.147 (0.51), 1.152 (0.58), 1.169 (1.67), 1.187 (1.84), 1.205 (0.77), 1.209 (0.68), 1.340 (3.14), 1.348 (4.28), 1.356 (3.45), 1.366 (1.72), 1.379 (1.32), 1.390 (1.15), 1.397 (1.21), 1.413 (0.50), 1.455 (0.48), 1.462 (0.56), 1.471 (0.99), 1.478 (1.45), 1.486 (1.01), 1.495 (1.57), 1.501 (1.15), 1.511 (0.68), 1.518 (0.59), 1.554 (1.38), 1.576 (1.21), 1.662 (1.28), 1.672 (1.28), 1.691 (2.34), 1.714 (1.18), 1.945 (10.99), 2.175 (1.22), 2.192 (2.33), 2.209 (1.29), 2.241 (4.34), 2.301 (9.23), 2.303 (11.81), 2.306 (8.61), 2.342 (16.00), 3.113 (4.59), 3.166 (1.35), 3.172 (1.41), 3.189 (2.63), 3.195 (2.20), 3.206 (2.26), 3.212 (2.58), 3.229 (1.15), 4.325 (6.54), 4.334 (6.54), 7.620 (13.19), 7.677 (1.57), 7.681 (1.61), 7.694 (2.63), 7.696 (2.64), 7.709 (1.63), 7.713 (1.61), 8.258 (6.08), 8.262 (5.84), 8.410 (2.03), 8.420 (3.98), 8.429 (2.01).

Example 154 ent-2-[4-(5-Azaspiro[2.5]octan-5-yl)-3-fluoropiperidin-1-yl]-N-[(3,5-difluoropyridin-2-yl)methyl]-1,3-thiazole-5-carboxamide (Enantiomer 1)

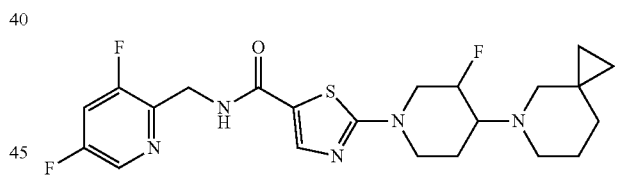

30 mg of diamix-2-[4-(5-azaspiro[2.5]octan-5-yl)-3-fluoropiperidin-1-yl]-N-[(3,5-difluoropyridin-2-yl)methyl]-1,3-thiazole-5-carboxamide were separated into the stereoisomers by means of chiral HPLC (preparative HPLC: Daicel® Chiralpak AY-H column, 5 μm, 250×20 mm; eluent A: 50% n-heptane, eluent B: 50% ethanol+0.2% diethylamine; flow rate 17 ml/min; temperature 60° C., detection: 300 nm). The stereoisomer having a retention time of 7.369 min (HPLC: Daicel® Chiralpak AY-H column, 5 μm 250×4.6 mm, flow rate 1 ml/min; eluent A: 50% n-heptane, eluent B: 50% ethanol; temperature 40° C.; detection: 300 nm) was collected. After the solvents had been removed, 13.8 mg (95% purity, 44% of theory) of the title compound was obtained.

LC-MS (method 1): $R_t$=0.89 min; MS (ESIpos): m/z=466 [M*1]$^+$.

$^1$H-NMR (400 MHz, DMSO-d6) δ [ppm]: 0.236 (10.79), 0.258 (8.99), 1.090 (0.54), 1.108 (1.06), 1.125 (0.51), 1.209 (0.73), 1.227 (2.07), 1.241 (4.56), 1.256 (4.39), 1.270 (2.23), 1.288 (0.77), 1.560 (3.15), 1.572 (4.03), 1.585 (3.05), 1.668 (1.38), 1.693 (2.00), 1.787 (0.54), 1.797 (0.68), 1.818 (1.54), 1.828 (1.68), 1.849 (1.49), 1.860 (1.48), 1.880 (0.52), 1.892 (0.43), 2.154 (0.91), 2.267 (1.33), 2.296 (5.50), 2.311 (4.85), 2.338 (1.24), 2.366 (1.57), 2.575 (5.38), 2.588 (6.31), 2.601 (3.87), 2.641 (1.14), 2.665 (1.32), 2.670 (1.33), 2.710 (1.63), 3.110 (1.26), 3.135 (2.36), 3.141 (2.29), 3.167 (1.39), 3.199 (1.92), 3.234 (1.99), 3.332 (3.95), 3.968 (1.80), 4.000 (1.68), 4.142 (1.13), 4.171 (1.92), 4.206 (1.06), 4.520 (6.58), 4.533 (6.75), 5.025 (2.13), 5.148 (2.16), 7.811 (16.00), 7.885 (1.66), 7.891 (1.75), 7.909 (2.58), 7.915 (2.63), 7.933 (1.75), 7.939 (1.80), 8.464 (5.71), 8.469 (5.60), 8.705 (2.14), 8.719 (4.42), 8.734 (2.16).

Example 155 ent-2-[4-(5-Azaspiro[2.5]octan-5-yl)-3-fluoropiperidin-1-yl]-N-[(3,5-difluoropyridin-2-yl)methyl]-1,3-thiazole-5-carboxamide (Enantiomer 2)

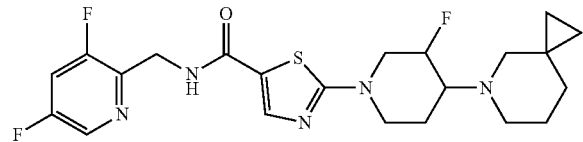 [SMILES: O=C(NCc1ncc(F)cc1F)c1cnc(N2CCC(N3CCCC4(CC4)C3)C(F)C2)s1]

30 mg of diamix-2-[4-(5-azaspiro[2.5]octan-5-yl)-3-fluoropiperidin-1-yl]-N-[(3,5-difluoropyridin-2-yl)methyl]-1,3-thiazole-5-carboxamide was separated into the stereoisomers by means of chiral HPLC (preparative HPLC: Daicel® Chiralpak AY-H column, 5 μm, 250×20 mm; eluent A: 50% n-heptane, eluent B: 50% ethanol+0.2% diethylamine; flow rate 17 ml/min; temperature 60° C., detection: 300 nm). The stereoisomer having a retention time of 10.529 min (HPLC: Daicel® Chiralpak AY-H column, 5 μm, flow rate 1 ml/min; eluent A: 50% n-heptane, eluent B: 50% ethanol; temperature 40° C.; detection: 300 nm) was collected. After the solvents had been removed, 14 mg (94% purity, 99% ee) of the title compound was obtained.

LC-MS (method 1): $R_t$=0.91 min; MS (ESIpos): m/z=466 [M+H]$^+$.

$^1$H-NMR (400 MHz, DMSO-d6) δ [ppm]: 0.236 (11.06), 0.258 (9.20), 1.090 (0.62), 1.107 (1.28), 1.125 (0.64), 1.209 (0.81), 1.241 (4.81), 1.256 (4.57), 1.270 (2.32), 1.288 (0.85), 1.560 (3.23), 1.570 (4.14), 1.584 (3.10), 1.667 (1.44), 1.693 (2.05), 1.786 (0.58), 1.797 (0.71), 1.817 (1.60), 1.828 (1.73), 1.848 (1.56), 1.859 (1.52), 1.879 (0.55), 1.891 (0.45), 2.153 (1.06), 2.267 (1.39), 2.296 (5.60), 2.311 (4.94), 2.337 (1.29), 2.366 (0.85), 2.575 (5.05), 2.587 (6.35), 2.600 (3.87), 2.640 (1.11), 2.670 (1.33), 2.710 (0.84), 3.109 (1.29), 3.134 (2.45), 3.141 (2.38), 3.166 (1.37), 3.198 (1.98), 3.234 (2.01), 3.332 (4.25), 3.967 (1.85), 4.000 (1.74), 4.141 (1.18), 4.171 (1.95), 4.206 (1.08), 4.519 (6.81), 4.533 (6.87), 5.025 (2.18), 5.147 (2.20), 7.810 (16.00), 7.885 (1.65), 7.891 (1.70), 7.909 (2.59), 7.914 (2.63), 7.933 (1.70), 7.938 (1.74), 8.463 (5.57), 8.469 (5.44), 8.705 (2.16), 8.719 (4.49), 8.733 (2.19).

Example 156 diamix-2-[4-(1,1-Difluoro-5-azaspiro[2.5]octan-5-yl) azepan-1-yl]-N-[(3,5-difluoropyridin-2-yl)-methyl]-1,3-thiazole-5-carboxamide

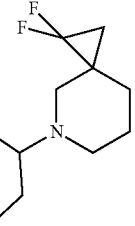

2-Bromo-N-[(3,5-difluoropyridin-2-yl)methyl]-1,3-thiazole-5-carboxamide (204 mg, 612 μmol) and diamix-5-(azepan-4-yl)-1,1-difluoro-5-azaspiro[2.5]octane dihydrochloride (194 mg, 612 μmol) were stirred at 120° C. in 5 ml of sodium carbonate solution (5.0 ml, 2.0 M, 10 mmol). After 30 min, the reaction mixture was diluted with water and extracted with dichloromethane. The organic phase was dried over Na$_2$SO$_4$, the desiccant was filtered off and the filtrate was concentrated on a rotary evaporator. The residue was dissolved in DMSO and purified by means of preparative HPLC (instrument: Waters Prep LC/MS System, column: XBridge C18 5 μm 100×30 mm. Eluent A: water, eluent B: acetonitrile, eluent C: 2% ammonia in water, eluent D: acetonitrile/water (80% by vol./20% by vol.) total flow rate: 80 ml/min, room temperature, wavelength 200-400 nm, complete injection, gradient profile: eluent A 0 to 2 min 47 ml, eluent B 0 to 2 min 23 ml, eluent A 2 to 10 min from 47 ml to 23 ml and eluent B from 23 ml to 47 ml, 10 to 12 min 0 ml eluent A and 70 ml eluent B. Eluent C and eluent D constant flow rate of 5 ml/min in each case over the entire run time). The product-containing fractions were combined and lyophilized. 189 mg (100% purity, 62% of theory) of the title compound was obtained.

LC-MS (method 1): $R_t$=0.94 min; MS (ESIpos): m/z=498 [M+H]$^+$ $^1$H-NMR (600 MHz, DMSO-d6) δ [ppm]: 1.133 (2.06), 1.142 (1.83), 1.164 (0.97), 1.178 (0.90), 1.186 (1.69), 1.197 (1.47), 1.206 (1.48), 1.215 (0.88), 1.227 (0.45), 1.351 (1.08), 1.369 (1.22), 1.374 (0.96), 1.381 (0.58), 1.387 (0.62), 1.395 (0.96), 1.399 (1.20), 1.417 (1.58), 1.422 (1.32), 1.436 (1.96), 1.458 (3.65), 1.476 (4.32), 1.490 (2.59), 1.503 (1.49), 1.579 (2.76), 1.587 (2.68), 1.593 (2.48), 1.597 (2.45), 1.602 (2.32), 1.620 (1.16), 1.644 (0.54), 1.660 (0.68), 1.666 (1.01), 1.683 (1.31), 1.689 (1.08), 1.699 (1.04), 1.705 (1.28), 1.722 (1.03), 1.729 (0.74), 1.739 (0.47), 1.786 (1.62), 1.808 (0.81), 1.885 (1.92), 1.902 (2.88), 1.908 (2.66), 2.338 (1.81), 2.357 (2.71), 2.384 (1.25), 2.397 (1.98), 2.402 (1.93), 2.420 (3.53), 2.435 (3.12), 2.453 (2.78), 2.466 (2.20), 2.482 (1.24), 3.315 (0.82), 3.374 (1.71), 3.379 (1.45), 3.391 (2.82), 3.396 (3.31), 3.413 (2.79), 3.432 (0.78), 3.634 (1.33), 3.668 (1.30), 4.523 (8.18), 4.531 (8.26), 7.820 (16.00), 7.876 (2.24), 7.880 (2.38), 7.892 (3.31), 7.895 (3.49), 7.907 (2.32), 7.911 (2.36), 8.455 (7.27), 8.459 (7.23), 8.612 (2.58), 8.621 (5.17), 8.631 (2.61).

Example 157 ent-N-[(3,5-Difluoropyridin-2-yl)methyl]-2-[(3R)-3'-fluoro-3-methyl[1,4'-bipiperidin]-1'-yl]-1,3-thiazole-4-carboxamide (Diastereomer 1)

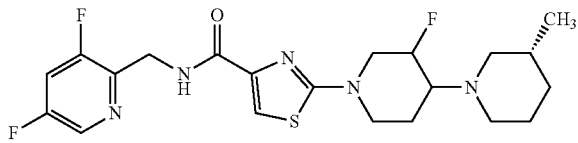

65 mg of diamix-N-[(3,5-Difluoropyridin-2-yl)methyl]-2-[(3R)-3'-fluoro-3-methyl[1,4'-bipiperidin]-F-yl]-1,3-thiazole-4-carboxamide was separated into the stereoisomers by means of chiral HPLC (preparative HPLC: Daicel® Chiralcel OZ-H column, 5 μm, 250×20 mm; eluent A: 50% n-heptane, eluent B: 50% ethanol+0.2% diethylamine; flow rate 18 ml/min; temperature 50° C., detection: 210 nm). The stereoisomer having a retention time of 4.883 min (HPLC: Chiraltec OZ-3 column, 3 μm, flow rate 1 ml/min; eluent A: 50% i-hexane, eluent B: 50% ethanol+0.2% diethylamine; detection: 220 nm) was collected. After the solvents had been removed, 21 mg (100% purity, 99% ee) of the title compound was obtained.

LC-MS (method 1): $R_t$=0.94 min; MS (ESIpos): m/z=454 [M+H]$^+$.

$^1$H-NMR (600 MHz, DMSO-d6) δ [ppm]: 0.823 (14.86), 0.835 (16.00), 0.849 (1.42), 0.869 (0.63), 1.236 (0.85), 1.387 (1.14), 1.407 (1.22), 1.573 (2.13), 1.596 (1.28), 1.630 (1.35), 1.650 (1.31), 1.689 (1.24), 1.707 (1.39), 1.889 (1.27), 1.906 (2.38), 1.916 (1.76), 1.923 (2.52), 1.937 (1.47), 1.945 (1.32), 1.957 (0.51), 2.068 (0.62), 2.175 (0.82), 2.194 (1.52), 2.212 (0.85), 2.383 (0.49), 2.422 (0.58), 2.596 (0.68), 2.611 (1.03), 2.651 (1.20), 2.672 (0.67), 2.827 (1.46), 2.845 (2.46), 2.865 (1.33), 3.106 (1.10), 3.123 (2.00), 3.127 (1.96), 3.144 (1.09), 3.213 (1.63), 3.237 (1.65), 3.256 (0.81), 3.300 (5.24), 3.319 (0.75), 4.026 (1.36), 4.047 (1.35), 4.190 (0.88), 4.213 (1.55), 4.233 (0.86), 4.577 (5.51), 4.587 (5.59), 5.068 (1.55), 5.149 (1.56), 7.373 (13.52), 7.883 (1.47), 7.887 (1.57), 7.900 (2.20), 7.902 (2.27), 7.915 (1.59), 7.919 (1.70), 8.452 (6.07), 8.456 (7.08), 8.467 (3.22), 8.476 (1.57).

Example 158 ent-N-[(3,5-Difluoropyridin-2-yl)methyl]-2-[(3R)-3'-fluoro-3-methyl[1,4'-bipiperidin]-1'-yl]-1,3-thiazole-4-carboxamide (Diastereomer 2)

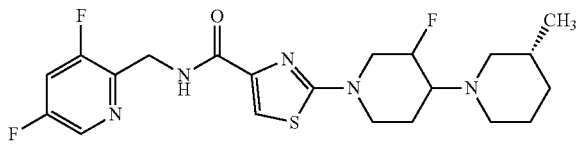

65 mg of diamix-N-[(3,5-difluoropyridin-2-yl)methyl]-2-[(3R)-3'-fluoro-3-methyl[1,4'-bipiperidin]-F-yl]-1,3-thiazole-4-carboxamide was separated into the stereoisomers by means of chiral HPLC (preparative HPLC: Daicel® Chiralcel OZ-H column, 5 μm, 250×20 mm; eluent A: 50% n-heptane, eluent B: 50% ethanol+0.2% diethylamine; flow rate 18 ml/min; temperature 50° C., detection: 210 nm). The stereoisomer having a retention time of 6.565 min (HPLC: Chiraltec OZ-3 column, 3 μm, flow rate 1 ml/min; eluent A: 50% i-hexane, eluent B: 50% ethanol+0.2% diethylamine; detection: 220 nm) was collected. After the solvents had been removed, 22 mg (100% purity, 99% ee) of the title compound was obtained.

LC-MS (method 1): $R_t$=0.95 min; MS (ESIpos): m/z=454 [M+H]$^+$.

$^1$H-NMR (600 MHz, DMSO-d6) δ [ppm]: 0.816 (14.95), 0.827 (16.00), 0.844 (1.56), 0.850 (1.48), 0.865 (0.73), 1.235 (0.95), 1.259 (0.49), 1.429 (1.23), 1.449 (1.33), 1.469 (0.69), 1.505 (1.15), 1.577 (1.72), 1.598 (1.31), 1.629 (1.49), 1.651 (1.43), 1.690 (1.29), 1.708 (1.52), 1.883 (0.96), 1.897 (2.04), 1.918 (2.19), 1.925 (1.68), 1.939 (1.52), 1.947 (1.43), 1.960 (0.55), 2.068 (1.18), 2.177 (0.94), 2.194 (1.68), 2.212 (0.97), 2.422 (0.40), 2.595 (0.72), 2.614 (0.91), 2.651 (1.01), 2.675 (0.67), 2.837 (2.71), 2.855 (2.60), 3.105 (1.16), 3.122 (2.09), 3.126 (2.06), 3.143 (1.18), 3.214 (1.69), 3.237 (1.76), 3.255 (0.67), 3.302 (3.65), 4.031 (1.52), 4.052 (1.43), 4.186 (0.95), 4.209 (1.64), 4.229 (0.90), 4.578 (5.83), 4.587 (5.87), 5.066 (1.70), 5.149 (1.74), 7.373 (12.51), 7.883 (1.46), 7.887 (1.60), 7.902 (2.37), 7.915 (1.61), 7.919 (1.65), 8.452 (6.19), 8.456 (7.23), 8.466 (3.38), 8.476 (1.74).

Example 159 ent-N-[(3,5-Difluoropyridin-2-yl)methyl]-2-[(3R)-3'-fluoro-3-methyl[1,4'-bipiperidin]-1'-yl]-1,3-oxazole-4-carboxamide (Diastereomer 1)

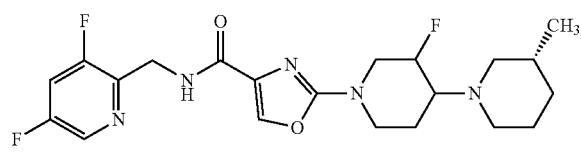 [SMILES: C[C@@H]1CCCN(C2CCN(c3nc(C(=O)NCc4ncc(F)cc4F)co3)CC2F)C1]

69 mg of diamix-N-[(3,5-difluoropyridin-2-yl)methyl]-2-[(3R)-3'-fluoro-3-methyl[1,4'-bipiperidin]-F-yl]-1,3-oxazole-4-carboxamide was separated into the stereoisomers by means of chiral HPLC (preparative HPLC: Daicel® Chiralcel OZ-H column, 5 μm, 250×20 mm; eluent A: 50% n-heptane, eluent B: 50% ethanol+0.2% diethylamine; flow rate 17 ml/min; temperature 50° C., detection: 210 nm). The stereoisomer having a retention time of 4.187 min (HPLC: Chiraltec OZ-3 column, 3 μm, flow rate 1 ml/min; eluent A: 50% i-hexane, eluent B: 50% ethanol+0.2% diethylamine; detection: 220 nm) was collected. After the solvents had been removed, 24 mg (100% purity, 99% ee) of the title compound was obtained.

LC-MS (method 1): $R_t$=0.88 min; MS (ESIpos): m/z=438 [M+H]$^+$.

$^1$H-NMR (600 MHz, DMSO-d6) δ [ppm]: 0.817 (14.98), 0.828 (16.00), 0.842 (1.57), 0.848 (1.55), 0.862 (0.71), 1.183 (1.16), 1.236 (0.78), 1.259 (0.42), 1.360 (0.49), 1.380 (1.19), 1.400 (1.28), 1.420 (0.55), 1.545 (1.16), 1.566 (2.24), 1.582 (1.25), 1.587 (1.43), 1.623 (1.47), 1.650 (2.35), 1.670 (1.45), 1.853 (0.52), 1.861 (0.65), 1.874 (2.32), 1.882 (1.97), 1.895 (2.84), 1.903 (1.88), 1.924 (0.60), 2.163 (0.76), 2.182 (1.38), 2.200 (0.80), 2.560 (0.76), 2.581 (0.60), 2.624 (0.62), 2.643 (0.58), 2.813 (1.42), 2.832 (2.40), 2.853 (1.29), 3.057 (1.11), 3.074 (2.04), 3.078 (2.01), 3.096 (1.15), 3.182 (1.64), 3.206 (1.68), 3.247 (1.77), 3.272 (2.52), 4.084 (1.52), 4.102 (1.38), 4.106 (1.50), 4.132 (1.01), 4.150 (1.66), 4.154 (1.57), 4.174 (0.92), 4.560 (5.67), 4.570 (5.70), 5.030 (1.59), 5.112 (1.58), 7.883 (1.46), 7.887 (1.54), 7.900 (2.18), 7.903 (2.27), 7.915 (1.53), 7.919 (1.60), 8.005 (12.95), 8.206 (1.59), 8.216 (3.17), 8.226 (1.64), 8.459 (5.78), 8.463 (5.70).

Example 160 ent-N-[(3,5-Difluoropyridin-2-yl)methyl]-2-[(3R)-3'-fluoro-3-methyl[1,4'-bipiperidin]-1'-yl]-1,3-oxazole-4-carboxamide (Diastereomer 2)

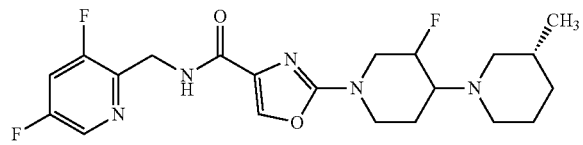

69 mg of diamix-N-[(3,5-difluoropyridin-2-yl)methyl]-2-[(3R)-3'-fluoro-3-methyl[1,4'-bipiperidin]-F-yl]-1,3-oxazole-4-carboxamide was separated into the stereoisomers by means of chiral HPLC (preparative HPLC: Daicel® Chiralcel OZ-H column, 5 μm, 250×20 mm; eluent A: 50% n-heptane, eluent B: 50% ethanol+0.2% diethylamine; flow rate 17 ml/min; temperature 50° C., detection: 210 nm). The stereoisomer having a retention time of 5.588 min (HPLC: Chiraltec OZ-3 column, 3 μm, flow rate 1 ml/min; eluent A: 50% i-hexane, eluent B: 50% ethanol+0.2% diethylamine; detection: 220 nm) was collected. After the solvents had been removed, 25 mg (100% purity, 99% ee) of the title compound was obtained.

LC-MS (method 1): $R_t$=0.88 min; MS (ESIpos): m/z=438 [M+H]$^+$.

$^1$H-NMR (600 MHz, DMSO-d6) δ [ppm]: 0.809 (14.88), 0.821 (16.00), 0.837 (1.47), 0.843 (1.50), 0.859 (1.88), 0.870 (0.67), 1.181 (1.27), 1.237 (1.02), 1.401 (0.50), 1.421 (1.11), 1.441 (1.23), 1.462 (0.67), 1.495 (1.05), 1.569 (1.52), 1.591 (1.21), 1.624 (1.48), 1.645 (2.41), 1.665 (1.40), 1.865 (1.31), 1.879 (2.59), 1.886 (2.46), 1.900 (2.08), 1.907 (1.57), 1.921 (0.62), 1.928 (0.53), 2.068 (1.85), 2.166 (0.82), 2.182 (1.46), 2.200 (0.85), 2.560 (0.89), 2.580 (0.67), 2.617 (0.67), 2.640 (0.60), 2.651 (0.55), 2.824 (2.58), 2.841 (2.48), 3.058 (1.09), 3.075 (1.99), 3.079 (1.97), 3.097 (1.09), 3.167 (0.69), 3.175 (0.78), 3.182 (1.67), 3.206 (1.64), 3.248 (1.85), 3.257 (0.98), 3.260 (0.94), 3.272 (2.79), 3.320 (0.82), 4.085 (1.49), 4.107 (1.48), 4.131 (0.98), 4.150 (1.59), 4.173 (0.90), 4.560 (5.51), 4.570 (5.53), 5.031 (1.47), 5.112 (1.47), 7.884 (1.53), 7.888 (1.65), 7.900 (2.13), 7.903 (2.27), 7.915 (1.60), 7.920 (1.63), 8.005 (13.82), 8.206 (1.60), 8.216 (3.12), 8.226 (1.56), 8.459 (5.88), 8.463 (5.86).

Example 161 ent-N-[(3,5-Difluoropyridin-2-yl)methyl]-2-[(3R)-2',3-dimethyl[1,4'-bipiperidin]-1'-yl]-1,3-thiazole-5-carboxamide (Diastereomer 1)

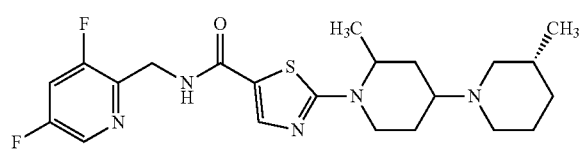

2-Bromo-N-[(3,5-difluoropyridin-2-yl)methyl]-1,3-thiazole-5-carboxamide (190 mg, 568 μmol) and diamix-(3R)-2',3-dimethyl-1,4'-bipiperidine dihydrochloride (80.6 mg, 299 μmol) was stirred at 120° C. in 2 ml of sodium carbonate solution (2.0 ml, 2.0 M, 4 mmol). After 1 h, the reaction mixture was diluted with water and extracted with dichloromethane. The organic phase was dried over Na$_2$SO$_4$, the desiccant was filtered off and the filtrate was concentrated on a rotary evaporator. The residue was dissolved in DMSO and purified by means of preparative HPLC (instrument: Waters Prep LC/MS System, column: XBridge C18 5 μm 100×30 mm. Eluent A: water, eluent B: acetonitrile, eluent C: 2% ammonia in water, eluent D: acetonitrile/water (80% by vol./20% by vol.) total flow rate: 80 ml/min, room temperature, wavelength 200-400 nm, complete injection, gradient profile: eluent A 0 to 2 min 47 ml, eluent B 0 to 2 min 23 ml, eluent A 2 to 10 min from 47 ml to 23 ml and eluent B from 23 ml to 47 ml, 10 to 12 min 0 ml eluent A and 70 ml eluent B. Eluent C and eluent D constant flow rate of 5 ml/min in each case over the entire run time). The product-containing fractions were combined and lyophilized. 8.00 mg (82% purity, 5% of theory) of the target compound was obtained.

LC-MS (method 5): $R_t$=1.72 min; MS (ESIpos): m/z=450 [M+H]$^+$ $^1$H-NMR (400 MHz, DMSO-d6) δ [ppm]: 0.146 (0.43), 0.771 (0.56), 0.809 (13.00), 0.826 (15.28), 0.844 (2.58), 0.851 (2.10), 1.166 (14.79), 1.183 (15.12), 1.235 (0.44), 1.296 (1.97), 1.301 (1.60), 1.312 (2.07), 1.317 (1.56), 1.373 (1.37), 1.383 (1.84), 1.393 (2.21), 1.404 (2.07), 1.413 (2.10), 1.423 (2.05), 1.434 (1.41), 1.454 (0.86), 1.512 (1.28), 1.560 (2.23), 1.592 (2.05), 1.618 (2.40), 1.637 (2.72), 1.652 (3.46), 1.665 (4.32), 1.676 (3.70), 1.728 (1.19), 1.754 (2.06), 1.764 (1.63), 1.790 (3.56), 1.817 (2.90), 2.012 (0.60), 2.041 (1.19), 2.074 (1.20), 2.102 (0.58), 2.328 (0.62), 2.366 (0.89), 2.670 (0.69), 2.710 (3.13), 2.725 (3.59), 2.732 (3.58), 3.123 (1.06), 3.149 (1.93), 3.155 (1.93), 3.182 (1.13), 3.820 (1.15), 3.852 (1.08), 4.364 (1.34), 4.517 (6.60), 4.530 (6.70), 7.811 (3.31), 7.822 (16.00), 7.885 (1.94), 7.891 (2.06), 7.910 (2.71), 7.913 (2.88), 7.932 (1.99), 7.938 (2.02), 8.462 (6.46), 8.468 (6.34), 8.644 (0.43), 8.659 (0.91), 8.673 (2.24), 8.687 (3.93), 8.701 (1.91).

Analogously to Examples 15 to 17, the following compounds of Examples 162 to 163 were prepared from the reactants specified in each case:

| Example | Name/Structure/Reactants | Analytical data |
|---|---|---|
| 162 | N-[(3,5-Difluoropyridin-2-yl)methyl]-2-[(3R)-3'-ethyl-3-methyl[1,4'-bipiperidin]-1'-yl]-1,3-thiazole-5-carboxamide (cis diastereomer 1)<br><br>from N-[(3,5-difluoropyridin-2-yl)methyl]-2-(3-ethyl-4-oxopiperidin-1-yl)-1,3-thiazole-5-carboxamide (Example 91A (Enantiomer 1)), and (3R)-3-methylpiperidine hydrochloride | $^1$H-NMR (600 MHz, DMSO-$d_6$, δ/ppm): 0.79-0.88 (m, 4H, including at 0.84 (d, 3H)), 0.88-0.94 (m, 3H), 1.02-1.12 (m, 1H), 1.33-1.56 (m, 5H), 1.57-1.67 (m, 2H), 1.74-1.81 (m, 1H), 1.81-1.91 (m, 2H), 2.12-2.20 (m, 1H), 2.82-2.90 (m, 1H), 2.91-3.05 (m, 3H), 3.92-4.04 (m, 2H), 4.52 (br. d, 2H), 7.79 (s, 1H), 7.87-7.93 (m, 1H), 8.46 (d, 1H), 8.66 (t, 1H).<br>LC-MS (method 4):<br>$R_t$ = 0.56 min; m/z = 464 (M + H)$^+$.<br>$[α]_D^{20}$ = −20.21° (c = 0.310, methanol). |
| 163 | N-[(3,5-Difluoropyridin-2-yl)methyl]-2-[(3R)-3'-ethyl-3-methyl[1,4'-bipiperidin]-1'-yl]-1,3-thiazole-5-carboxamide (cis diastereomer 2)<br><br>from N-[(3,5-difluoropyridin-2-yl)methyl]-2-(3-ethyl-4-oxopiperidin-1-yl)-1,3-thiazole-5-carboxamide (Example 92A (Enantiomer 2)), and (3R)-3-methylpiperidine hydrochloride | $^1$H-NMR (600 MHz, DMSO-$d_6$, δ/ppm): 0.80-0.88 (m, 4H, including at 0.84 (d, 3H)), 0.88-0.94 (m, 3H), 1.02-1.12 (m, 1H), 1.33-1.57 (m, 5H), 1.57-1.67 (m, 2H), 1.74-1.80 (m, 1H), 1.81-1.90 (m, 2H), 2.12-2.19 (m, 1H), 2.82-3.05 (m, 4H), 3.93-4.03 (m, 2H), 4.52 (br. d, 2H), 7.79 (s, 1H), 7.87-7.93 (m, 1H), 8.46 (d, 1H), 8.66 (t, 1H).<br>LC-MS (method 4):<br>$R_t$ = 0.56 min; m/z = 464 (M + H)$^+$.<br>$[α]_D^{20}$ = −17.69° (c = 0.360, methanol). |

Analogously to Examples 1 to 3, the following compounds of Examples 164 to 165 were prepared from the reactants specified in each case:

| Example | Name/Structure/Reactants | Analytical data |
|---|---|---|
| 164 | N-[(3,5-Difluoropyridin-2-yl)methyl]-2-[(3R)-3,3'-dimethyl[1,4'-bipiperidin]-1'-yl]-1,3-thiazole-5-carboxamide (cis-Diastereomer 1)<br><br>from 2-bromo-N-[(3,5-difluoropyridin-2-yl)methyl]-1,3-thiazole-5-carboxamide and (3R)-3,3'-dimethyl-1,4'-bipiperidine dihydrobromide (cis-Diastereomer 1, Example 96A) | $^1$H-NMR (600 MHz, DMSO-$d_6$, δ/ppm): 0.79-0.88 (m, 7H), 1.37-1.55 (m, 4H), 1.57-1.67 (m, 2H), 1.75-1.85 (m, 2H), 2.13-2.18 (m, 1H), 2.21-2.28 (m, 1H), 2.86-3.00 (m, 3H), 3.14 (dd, 1H), 3.80 (br. d, 1H), 3.99 (br. d, 1H), 4.53 (d, 2H), 7.79 (s, 1H), 7.89 (td, 1H), 8.46 (d, 1H), 8.65 (t, 1H).<br>LC-MS (method 1):<br>$R_t$ = 0.88 min; m/z = 450 (M + H)$^+$.<br>$[α]_D^{20}$ = −12.17° (c = 0.345, methanol). |
| 165 | N-[(3,5-Difluoropyridin-2-yl)methyl]-2-[(3R)-3,3'-dimethyl[1,4'-bipiperidin]-1'-yl]-1,3-thiazole-5-carboxamide (cis-Diastereomer 2)<br><br>from 2-bromo-N-[(3,5-difluoropyridin-2-yl)methyl]-1,3-thiazole-5-carboxamide and (3R)-3,3'-dimethyl-1,4'-bipiperidine dihydrobromide (cis-Diastereomer 2, Example 97A) | $^1$H-NMR (600 MHz, DMSO-$d_6$, δ/ppm): 0.79-0.90 (m, 7H), 1.35-1.49 (m, 2H), 1.50-1.57 (m, 2H), 1.57-1.66 (m, 2H), 1.73-1.80 (m, 1H), 1.81-1.87 (m, 1H), 2.12-2.18 (m, 1H), 2.20-2.26 (m, 1H), 2.84-2.91 (m, 2H), 2.93-3.00 (m, 1H), 3.15 (dd, 1H), 3.78 (br. d, 1H), 4.00 (br. d, 1H), 4.52 (d, 2H), 7.79 (s, 1H), 7.87-7.92 (m, 1H), 8.46 (d, 1H), 8.65 (t, 1H).<br>LC-MS (method 1):<br>$R_t$ = 0.88 min; m/z = 450 (M + H)$^+$.<br>$[α]_D^{20}$ = −25.14° (c = 0.350, methanol). |

B. ASSESSMENT OF PHARMACOLOGICAL EFFICACY

The pharmacological activity of the compounds of the invention can be demonstrated by in vitro and in vivo studies as known to the person skilled in the art. The application examples which follow describe the biological action of the compounds of the invention, without restricting the invention to these examples. Binding studies (B-1.) and activity studies (B-2.) were carried out for in vitro characterization of receptor/substance interaction and determination of biological activity, respectively.

B-1 In Vitro Radioligand Binding Studies for Determination of the Dissociation Constants $K_i$ at the Human Adrenoreceptor ADRA2C (Eurojins Panlabs Discovery Services, Taiwan, Ltd)

A competition assay based on [$^3$H] rauwolscine as radioliganden was used to determine the binding affinity of the test substances at the human ADRA2C receptor.

To configure the competition assay, the equilibrium dissociation constant $K_d$ of the radioligand [$^3$H] rauwolscine was determined in a saturation experiment. To this end, homogenates of CHO-K1 cells recombinantly expressing the human ADRA2C receptor were incubated with increasing concentrations of the radiotracers for 1 h at 4° C. in binding buffer (50 mM Tris-HCl, 1 mM EDTA, pH 7.4). Unspecific binding was determined by addition of an excess of the not radioactively labelled ligand prazosin (10 µM). The radioactivity was determined in a scintiation counter.

The competition experiments were carried out in the presence of 0.5 nM [$^3$H] rauwolscine and increasing concentrations of the test substances to be characterized under the conditions described above. The substance concentration which displaces 50% of the radiolabelled ligand is referred to as IC$_{50}$ value.

From the IC$_{50}$ value measured in the competition experiment and the $K_d$ value from the saturation experiment, the equilibrium constant Ki of the inhibitor, which describes the affinity of the test substances to the receptor, was calculated using the Cheng Prusoff equation [Cheng Y, Prusoff W H. Relationship between the inhibition constant (Ki) and the concentration of inhibitor which causes 50 percent inhibition (ISO) of an enzymatic reaction. Biochem Pharmacol. 22 (23): 3099-108. doi:10.1016/0006-2952(73)90196-2. PMID 4202581 PMID: 4202581].

$$Ki = \frac{IC50}{\left(1 + \frac{L}{Kd}\right)} \quad \text{Formula 1}$$

Cheng Prusoff equation. $K_i$=equilibrium constant of the inhibitor, IC$_{50}$=concentration which displaces 50% of the ligand, $K_d$=equilibrium constant of the ligand, L=concentration of the ligand Table 1 below shows the binding affinity to the human ADRA2C receptor (Ki [nM]) and the half-maximal inhibition of the human ADRA2C receptor (IC50 [nM]) of representative embodiments of the invention:

TABLE 1

| Example No. | hARα$_{2C}$ IC$_{50}$ [nM] | hARα$_{2C}$ K$_i$ [nM] |
|---|---|---|
| 1 | 54 | 24 |
| 41 | 130 | 56 |
| 64 | 6.2 | 2.8 |
| 124 | 5.1 | 2.3 |

The data in Table 1 show that the test substances listed both bind to the human ADRA2C receptor and block the biological activity of the human ADRA2C receptor. Accordingly, the results in Table 1 confirm the mechanism of action of the compounds according to the invention as ADRA2C inhibitors.

B-2. In Vitro Activity Assay to Determine the Inhibition of Recombinant ADRA2C

The human ADRA2C receptor belongs to the G protein (guanine-dependent protein)-coupled receptors, the main function of which is the transduction of signals into the interior of the cell.

The investigations of the inhibition of the recombinant human ADRA2C receptors were carried out with stably transfected CHO-K1 cells coexpressing the G$_{\alpha q}$ protein and the calcium-sensitive photoprotein aequorin. In this recombinant system, binding of the agonists noradrenaline to the ADRA2C receptor leads, after activation of a signal cascade, to calcium release from intracellular stores, which is detected by the intracellular calcium sensor aequorin as a bioluminescent signal. The method is described in detail in the reference below. [Wunder F., Kalthof B., Muller T., Hueser J. Functional Cell-Based Assays in Microliter Volumes for Ultra-High Throughput Screening. Combinatorial Chemistry & High Throughput Screening, Volume 11, Number 7, 2008, pp. 495-504(10). doi.org/10.2174/138620708785204054]

The activity of the test substances was determined via their ability to inhibit the agonist-induced increase of the bioluminescence signal. The concentration which can block half of this signal increase is referred to as IC$_{50}$. The IC$_{50}$ value is calculated using the 4 parameter logistic function (Hill function):

$$Y(x) = \text{Bottom} + \frac{\text{Top} - \text{Bottom}}{1 + 10^{(logIC50+x) - HillSlope}} \quad \text{Formula 2:Hill function}$$

Top=upper threshold, Bottom=lower threshold, Slope=slope, IC$_{50}$=turning point Table 2 below lists the IC$_{50}$ values from this assay determined for individual working examples of the invention (some as mean values from multiple independent individual determinations):

TABLE 2

| Example No. | ARα$_{2C}$ IC$_{50}$ [nM] |
|---|---|
| 1 | 121 |
| 2 | 5.2 |
| 3 | 2.9 |
| 4 | 169 |
| 5 | 335 |
| 6 | 335 |
| 7 | 49.6 |
| 8 | 591 |
| 9 | 170 |
| 10 | 21.4 |
| 11 | 140 |

TABLE 2-continued

| Example No. | ARα$_{2C}$ IC$_{50}$ [nM] |
|---|---|
| 12 | 107 |
| 13 | 209 |
| 14 | 211 |
| 15 | 1850 |
| 16 | 2000 |
| 17 | 26.5 |
| 18 | 6800 |
| 19 | 690 |
| 20 | 110 |
| 21 | 7.2 |
| 22 | 640 |
| 23 | 17 |
| 24 | 1060 |
| 25 | 2400 |
| 26 | 280 |
| 27 | 310 |
| 28 | 890 |
| 29 | 96 |
| 31 | 89 |
| 32 | 640 |
| 33 | 15 |
| 34 | 640 |
| 35 | 1000 |
| 36 | 190 |
| 37 | 200 |
| 38 | 2340 |
| 39 | 135 |
| 41 | 243 |
| 43 | 261 |
| 44 | 41.2 |
| 46 | 8.3 |
| 47 | 25 |
| 48 | 17 |
| 49 | 56 |
| 50 | 73.5 |
| 51 | 150 |
| 52 | 6.7 |
| 53 | 110 |
| 54 | 230 |
| 55 | 150 |
| 56 | 240 |
| 57 | 830 |
| 58 | 870 |
| 59 | 11 |
| 60 | 74 |
| 61 | 87 |
| 62 | 130 |
| 63 | 570 |
| 64 | 1.4 |
| 65 | 4.5 |
| 66 | 1.5 |
| 67 | 2.2 |
| 68 | 4.3 |
| 69 | 5.5 |
| 70 | 22 |
| 71 | 100 |
| 72 | 180 |
| 73 | 219 |
| 74 | 285 |
| 75 | 345 |
| 76 | 400 |
| 77 | 640 |
| 78 | 755 |
| 79 | 50.3 |
| 80 | 90.5 |
| 81 | 22.2 |
| 82 | 102 |
| 83 | 98.1 |
| 84 | 65 |
| 85 | 600 |
| 86 | 28 |
| 87 | 25.5 |
| 88 | 489 |
| 89 | 230 |
| 90 | 971 |
| 91 | 284 |
| 92 | 85 |
| 93 | 630 |
| 94 | 150 |
| 95 | 800 |
| 96 | 1000 |
| 97 | 1300 |
| 98 | 1600 |
| 99 | 590 |
| 100 | 2.9 |
| 101 | 2.3 |
| 102 | 0.085 |
| 103 | 0.83 |
| 104 | 10 |
| 105 | 4.3 |
| 106 | 0.5 |
| 107 | 37 |
| 108 | 0.37 |
| 109 | 0.85 |
| 110 | 1.5 |
| 111 | 0.49 |
| 112 | 1.2 |
| 113 | 0.61 |
| 114 | 1.3 |
| 115 | 0.61 |
| 116 | 11 |
| 117 | 0.65 |
| 118 | 7.7 |
| 119 | 30 |
| 120 | 41 |
| 121 | 0.65 |
| 122 | 13 |
| 123 | 260 |
| 124 | 2.9 |
| 125 | 0.49 |
| 126 | 2.3 |
| 127 | 8.4 |
| 128 | 550 |
| 129 | 10 |
| 130 | 0.54 |
| 131 | 1.9 |
| 132 | 0.71 |
| 133 | 0.95 |
| 134 | 0.74 |
| 135 | 0.26 |
| 136 | 320 |
| 137 | 19 |
| 138 | 6.5 |
| 139 | 0.65 |
| 140 | 0.32 |
| 141 | 8.7 |
| 142 | 6.7 |
| 143 | 0.42 |
| 144 | 1.8 |
| 145 | 1.0 |
| 146 | 1.72 |
| 148 | 1.3 |
| 149 | 35 |
| 150 | 200 |
| 151 | 170 |
| 152 | 660 |
| 153 | 23 |
| 154 | 31 |
| 155 | 2.5 |
| 156 | 36 |
| 157 | 2.7 |
| 158 | 98 |
| 159 | 25 |
| 160 | 435 |
| 161 | 233 |
| 162 | 810 |
| 163 | 480 |
| 164 | 24 |
| 165 | 410 |

The data in Table 2 show that the test substances listed block the biological activity of the human ADRA2C receptor. Accordingly, the results in Table 1 confirm the mechanism of action of the compounds according to the invention as ADRA2C inhibitors.

B-3 Animal Model of Obstructive Sleep Apnoea in the Pig

Using negative pressure, it is possible to induce collapse and thus obstruction of the upper respiratory tract in anesthetized, spontaneously breathing pigs [Wirth et al., Sleep 36, 699-708 (2013)].

German Landrace pigs are used for the model. The pigs are anesthetized and tracheotomized. One cannula each is inserted into the rostral and the caudal part of the trachea. Using a T connector, the rostral cannula is connected on the one hand to a device generating negative pressures and on the other hand to the caudal cannula. Using a T connector, the caudal cannula is connected to the rostral cannula and to a tube which allows spontaneous breathing circumventing the upper respiratory tract. By appropriate closing and opening of the tubes it is thus possible for the pig to change from normal nasal breathing to breathing via the caudal cannula during the time when the upper respiratory tract is isolated and connected to the device for generating negative pressures. The muscle activity of the musculus genioglossus is recorded by electromyogram (EMG).

At certain points in time, the collapsibility of the upper respiratory tract is tested by having the pig breathe via the caudal cannula and applying negative pressures of −50, −100 and −150 cm water head (cmH$_2$O) to the upper respiratory tract. This causes the upper respiratory tract to collapse, which manifests itself in an interruption of the airflow and a pressure drop in the tube system. This test is conducted prior to the administration of the test substance and at certain intervals after the administration of the test substance. An appropriately effective test substance can prevent this collapse of the respiratory tract in the inspiratory phase.

Administration of the test substance can be intranasal, intravenous, subcutaneous, intraperitoneal, intraduodenal or intragastral.

C. WORKING EXAMPLES OF PHARMACEUTICAL COMPOSITIONS

The compounds of the invention can be converted to pharmaceutical preparations as follows:

Tablet:
Composition:

100 mg of the compound of the invention, 50 mg of lactose (monohydrate), 50 mg of corn starch (native), 10 mg of polyvinylpyrrolidone (PVP 25) (BASF, Ludwigshafen, Germany) and 2 mg of magnesium stearate.

Tablet weight 212 mg. Diameter 8 mm, radius of curvature 12 mm.

Production:

The mixture of compound of the invention, lactose and starch is granulated with a 5% solution (w/w) of the PVP in water. The granules are dried and then mixed with the magnesium stearate for 5 minutes. This mixture is compressed using a conventional tableting press (see above for format of the tablet). The guide value used for the pressing is a pressing force of 15 kN.

Suspension for Oral Administration:
Composition:

1000 mg of the compound of the invention, 1000 mg of ethanol (96%), 400 mg of Rhodigel® (xanthan gum from FMC, Pennsylvania, USA) and 99 g of water.

10 ml of oral suspension correspond to a single dose of 100 mg of the compound of the invention.

Production:

The Rhodigel is suspended in ethanol; the compound of the invention is added to the suspension. The water is added while stirring. The mixture is stirred for about 6 h until the swelling of the Rhodigel is complete.

Solution for Oral Administration:
Composition:

500 mg of the compound of the invention, 2.5 g of polysorbate and 97 g of polyethylene glycol 400.

20 g of oral solution correspond to a single dose of 100 mg of the compound of the invention.

Production:

The compound of the invention is suspended in the mixture of polyethylene glycol and polysorbate with stirring. The stirring operation is continued until dissolution of the compound of the invention is complete.

i.v. Solution:

The compound of the invention is dissolved in a concentration below the saturation solubility in a physiologically acceptable solvent (e.g. isotonic saline solution, glucose solution 5% and/or PEG 400 solution 30%). The solution is subjected to sterile filtration and dispensed into sterile and pyrogen-free injection vessels.

Solution for Nasal Administration:

The compound of the invention is dissolved in a concentration below the saturation solubility in a physiologically acceptable solvent (e.g. purified water, phosphate buffer, citrate buffer). The solution may contain further additives for isotonization, for preservation, for adjusting the pH, for improvement in the solubility and/or for stabilization.

The invention claimed is:

1. A compound of formula (I)

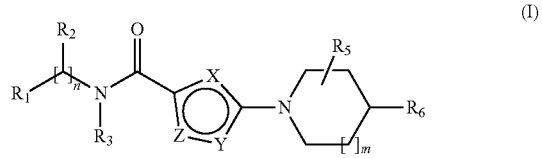

in which

X represents S, N or O;

Y represents N, S or O, where, if X represents S, then Y represents N;

where, if X represents O, then Y represents N;

Z represents CR$_4$, O or NR$_4$, where, if X represents N and Y represents N, then Z represents O;

where, if X represents S, then Z represents CR$_4$ or NR$_4$

R$_1$ represents 5- or 6-membered heteroaryl, phenyl, where 5- to 6-membered heteroaryl may be substituted by 1 to 2 substituents independently of one another selected from the group of (C$_1$-C$_4$)-alkyl, (C$_1$-C$_4$)-alkoxy, halogen;

where (C$_1$-C$_4$)-alkyl may be up to trisubstituted by halogen, where (C$_1$-C$_4$)-alkoxy may be up to trisubstituted by halogen, where phenyl may be substituted by 1 to 2 substituents independently of one another selected from the group of (C$_1$-C$_4$)-alkyl, (C$_3$-C$_5$)-cycloalkyl, (C$_1$-C$_4$)-alkoxy, cyano, hydroxy, halogen;

where (C$_1$-C$_4$)-alkyl may be up to trisubstituted by halogen,

R$_2$ represents hydrogen, (C$_1$-C$_4$)-alkyl;
where (C$_1$-C$_4$)-alkyl may be up to trisubstituted by halogen,
or
together with the carbon atom to which R$_2$ is attached forms a (C$_3$-C$_4$)-cycloalkyl ring,
R$_3$ represents hydrogen, (C$_1$-C$_4$)-alkyl,
where (C$_1$-C$_4$)-alkyl may be up to trisubstituted by halogen,
R$_4$ in CR$_4$ represents hydrogen, (C$_1$-C$_4$)-alkyl, (C$_3$-C$_4$)-cycloalkyl, phenyl, halogen;
where (C$_1$-C$_4$)-alkyl may be up to trisubstituted by halogen and phenyl may be substituted by halogen,
in NR$_4$ represents hydrogen, (C$_1$-C$_4$)-alkyl, (C$_3$-C$_4$)-cycloalkyl, phenyl;
where (C$_1$-C$_4$)-alkyl may be up to trisubstituted by halogen and phenyl may be substituted by halogen,
R$_5$ represents hydrogen, (C$_1$-C$_4$)-alkyl, (C$_1$-C$_4$)-alkoxy, halogen,
R$_6$ represents a group of formula a), b), c), d), e), f) or g)

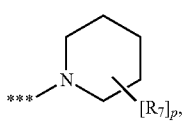
a)

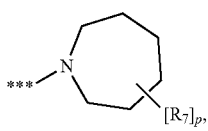
b)

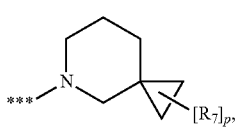
c)

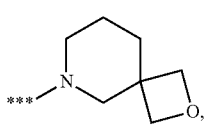
d)

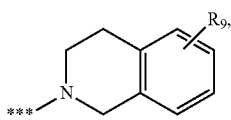
e)

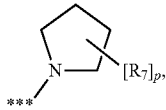
f)

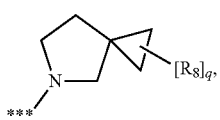
g)

where *** marks the attachment to the adjacent piperidine ring,
where R$_7$ represents hydrogen, (C$_1$-C$_4$)-alkyl, (C$_3$-C$_4$)-cycloalkyl, (C$_1$-C$_4$)-alkoxy, (C$_3$-C$_4$)-cycloalkoxy, phenyl,
where (C$_1$-C$_4$)-alkyl may be substituted by (C$_3$-C$_4$)-cycloalkyl, (C$_1$-C$_4$)-alkoxy, (C$_3$-C$_4$)-cycloalkoxy and up to trisubstituted by halogen,
where (C$_1$-C$_4$)-alkoxy may be substituted by (C$_3$-C$_4$)-cycloalkyl and up to trisubstituted by halogen,
where (C$_3$-C$_4$)-cycloalkyl may be substituted by monofluoromethyl, difluoromethyl or trifluoromethyl and up to disubstituted by halogen,
where (C$_1$-C$_4$)-alkoxy may be substituted by (C$_3$-C$_4$)-cycloalkyl and up to trisubstituted by halogen,
where (C$_3$-C$_4$)-cycloalkyl may be mono- or disubstituted by halogen,
where (C$_3$-C$_4$)-cycloalkoxy may be up to disubstituted by halogen,
where R$_8$ represents hydrogen or fluorine,
where R$_9$ represents hydrogen, (C$_1$-C$_4$)-alkyl, (C$_1$-C$_4$)-alkoxy, halogen;
where (C$_1$-C$_4$)-alkyl may be substituted by (C$_1$-C$_4$)-alkoxy,
n represents 0 or 1,
m represents 0, 1 or 2,
p represents 0, 1 or 2 and
q represents 0, 1 or 2,
or a salt, a solvate, or a solvate of a salt thereof.

2. The compound of claim 1, wherein
X represents S or N;
Y represents N, S or O,
where, if X represents S, then Y represents N;
Z represents CR$_4$, N or O,
where, if X represents N and Y represents N, then Z represents O;
where, if X represents S, then Z represents N or CR$_4$
R$_1$ represents pyridinyl, pyrazolyl, thiazolyl, thienyl, phenyl,
where pyridinyl may be substituted by 1 to 2 substituents independently of one another selected from the group of (C$_1$-C$_2$)-alkyl, fluorine, chlorine, trifluoromethyl, trifluoromethoxy,
where pyrazolyl may be substituted by 1 to 2 substituents independently of one another selected from the group of (C$_1$-C$_2$)-alkyl, fluorine, chlorine, trifluoromethyl,
where thiazolyl may be substituted by 1 to 2 substituents independently of one another selected from the group of fluorine, chlorine,
where thienyl may be substituted by 1 to 2 substituents independently of one another selected from the group of fluorine, chlorine,
where phenyl may be substituted by 1 to 2 substituents independently of one another selected from the group of (C$_1$-C$_2$)-alkyl, (C$_3$-C$_4$)-cycloalkyl, methoxy, cyano, hydroxy, fluorine, chlorine, trifluoromethyl;
R$_2$ represents hydrogen, (C$_1$-C$_2$)-alkyl,
or
together with the carbon atom to which R$_2$ is attached forms a cyclopropyl ring,
R$_3$ represents hydrogen, (C$_1$-C$_2$)-alkyl;
R$_4$ represents hydrogen, (C$_1$-C$_2$)-alkyl, (C$_3$-C$_4$)-cycloalkyl, trifluoromethyl, bromine, chlorine, phenyl;
where phenyl may be substituted by halogen,
R$_5$ represents hydrogen, (C$_1$-C$_2$)-alkyl, methoxy, fluorine;
R$_6$ represents a group of the formula a), b), c) or e),

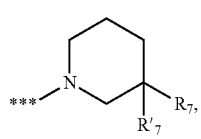
a)

-continued

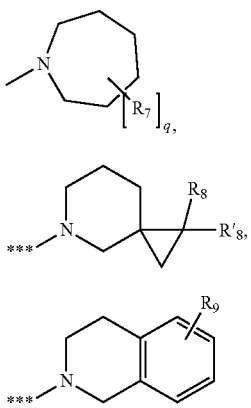

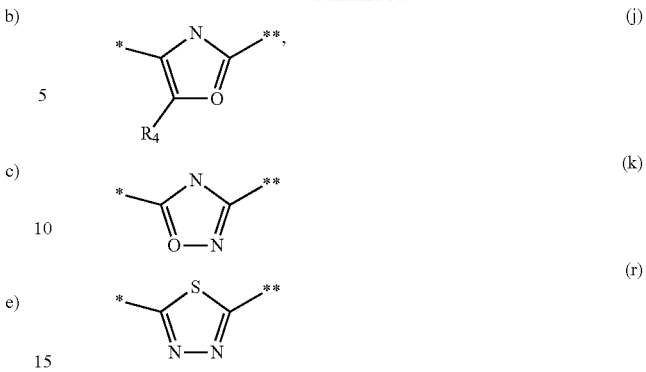

where *** marks the attachment to the adjacent piperidine ring,
  where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl,
    where $(C_1-C_4)$-alkyl may be substituted by methoxy, n-butoxy, cyclopropyl, cyclobutoxy and up to disubstituted by fluorine,
      where methoxy may be substituted by cyclopropyl, cyclobutyl, trifluoromethyl,
        where cyclopropyl may be substituted by monofluoromethyl, difluoromethyl, trifluoromethyl,
        where cyclobutyl may be up to disubstituted by fluorine,
  where n-butoxy may be up to disubstituted by fluorine,
    where $(C_1-C_2)$-alkoxy may be substituted by cyclopropyl, cyclobutyl, cyclobutoxy, trifluoromethyl and
      where cyclopropyl and cyclobutyl may be up to disubstituted by fluorine,
    where $(C_3-C_4)$-cycloalkoxy may be up to disubstituted by fluorine,
  where $R_8$ or $R'_8$ independently of one another represent hydrogen or fluorine,
    where $R_9$ represents hydrogen, $(C_1-C_4)$-alkyl, $(C_1-C_2)$-alkoxy, methoxyethyl, fluorine, chlorine;
n represents 0 or 1 and
m represents 1 or 2,
q represents 0 or 2,
or a salt, a solvate, or a solvate of a salt thereof.
3. The compound of claim 1, wherein
the aromatic 5-membered ring comprising X, Y, and Z has the structural formula h), i), j), k) or (r),

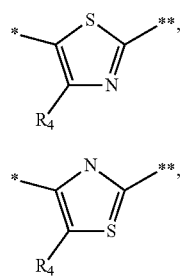

where * marks the attachment to the carbonyl group and marks the attachment to the nitrogen atom of the adjacent piperidine ring and
$R_1$ represents pyridinyl, pyrazolyl, thiazolyl, thienyl, phenyl,
  where pyridinyl may be substituted by 1 to 2 substituents independently of one another selected from the group of $(C_1-C_2)$-alkyl, fluorine, chlorine, trifluoromethyl, trifluoromethoxy,
  where pyrazolyl may be substituted by 1 to 2 substituents independently of one another selected from the group of $(C_1-C_2)$-alkyl, fluorine, chlorine, trifluoromethyl,
  where thiazolyl may be substituted by chlorine,
  where thienyl may be substituted by fluorine,
  where phenyl may be substituted by 1 to 2 substituents independently of one another selected from the group of $(C_1-C_2)$-alkyl, $(C_3-C_4)$-cycloalkyl, methoxy, cyano, hydroxy, fluorine, chlorine, trifluoromethyl;
$R_2$ represents hydrogen, methyl,
or
  together with the carbon atom to which $R_2$ is attached forms a cyclopropyl ring,
$R_3$ represents hydrogen, $(C_1-C_2)$-alkyl;
$R_4$ represents hydrogen, methyl, ethyl, cyclopropyl, trifluoromethyl, bromine, chlorine, phenyl;
  where phenyl may be substituted by chlorine,
$R_5$ represents hydrogen, fluorine;
$R_6$ represents a group of the formula a), b'), b"), c'), c") or e),

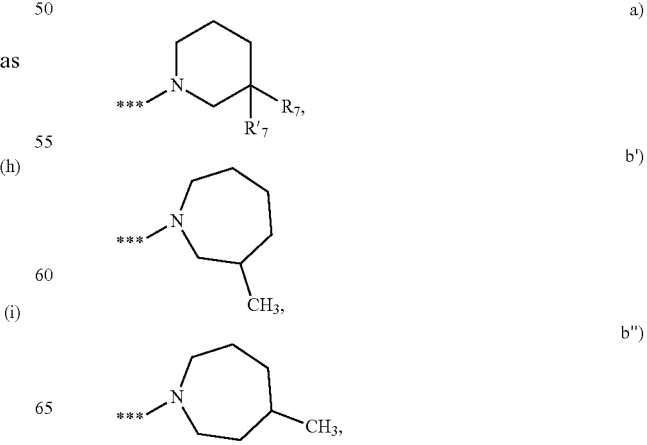

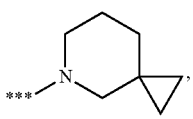

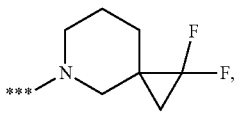

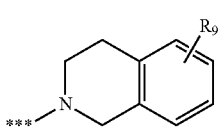

where *** marks the attachment to the adjacent piperidine ring, where $R_7$ or $R'_7$ independently of one another represent hydrogen, $(C_1-C_4)$-alkyl, $(C_3-C_4)$-cycloalkyl, $(C_1-C_2)$-alkoxy, $(C_3-C_4)$-cycloalkoxy, monofluoromethyl, difluoromethyl, trifluoromethyl, difluoromethoxy, phenyl, where $(C_1-C_4)$-alkyl may be substituted by methoxy, n-butoxy, cyclopropyl, cyclobutoxy and up to disubstituted by fluorine, where methoxy may be substituted by cyclopropyl, cyclobutyl, trifluoromethyl, where cyclopropyl may be substituted by monofluoromethyl, difluoromethyl, trifluoromethyl, where cyclobutyl may be up to disubstituted by fluorine, where n-butoxy may be up to disubstituted by fluorine, where $(C_1-C_2)$-alkoxy may be substituted by cyclopropyl, cyclobutyl, cyclobutoxy, trifluoromethyl and where cyclopropyl and cyclobutyl may be up to disubstituted by fluorine, where $(C_3-C_4)$-cycloalkoxy may be up to disubstituted by fluorine, where $R_9$ represents hydrogen, methyl, tert-butyl, methoxy, methoxymethyl, fluorine, chlorine;

n represents 0 or 1 and m represents 1 or 2, or a salt, a solvate, or a solvate of a salt thereof.

4. The compound of claim 1, wherein
the aromatic 5-membered ring comprising X, Y, and Z has the structural formula h'), i'), j') or k),

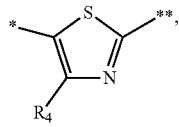

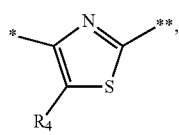

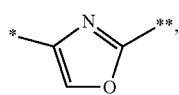

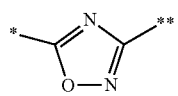

$R_1$ represents pyridinyl, 2-ethylpyridinyl, 4,6-dimethylpyridinyl, 3,5-difluoropyridinyl, 3-fluoropyridinyl, 4-trifluoromethylpyridinyl, 6-trifluoromethylpyridinyl, 5-chloro-3-fluoropyridinyl, 3-chloro-5-fluoropyridinyl, 3-methylpyridinyl, 4-methylpyridinyl, 6-methylpyridinyl, 3-chloropyridinyl, 5-chloropyridinyl, 6-trifluoromethoxypyridinyl, phenyl, 2-methylphenyl, 3-methylphenyl, 4-methylphenyl, 3-methoxyphenyl, 4-trifluoromethylphenyl, 2-chlorophenyl, 3-chlorophenyl, 4-chlorophenyl, 2-fluorophenyl, 3-fluorophenyl, 4-fluorophenyl, 3-hydroxyphenyl, 2,5-difluorophenyl, 5-chloro-2-hydroxyphenyl, 5-fluoro-2-methoxyphenyl, 5-chloro-2-fluorophenyl, 2-chloro-5-fluorophenyl, 2-chloro-4-fluorophenyl, 3-cyano-4-fluorophenyl, 2-cyclopropylphenyl, 4-chloro-1-methyl-1H-pyrazolyl, 5-chloro-1,3-thiazolyl, 5-fluoro-2-thienyl;

$R_2$ represents hydrogen or methyl;

$R_3$ represents hydrogen, methyl;

$R_4$ represents hydrogen, ethyl, trifluoromethyl;

$R_5$ represents hydrogen, fluorine;

$R_6$ represents a group of the formula a), c') or c'')

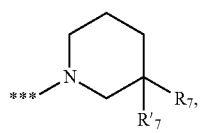

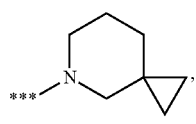

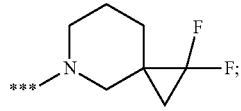

where *** marks the attachment to the adjacent piperidine ring, where $R_7$ and $R'_7$ independently of one another represent hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine;

n represents 0 or 1 and
m represents 1,
or a salt, a solvate, or a solvate of a salt thereof.

5. The compound of claim 1, wherein
the aromatic 5-membered ring comprising X, Y, and Z has the structural formula h')

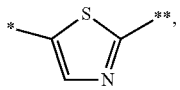

R₁ represents pyridinyl, 2-ethylpyridinyl, 4,6-dimethylpyridinyl, 3,5-difluoropyridinyl, 3-fluoropyridinyl, 4-trifluoromethylpyridinyl, 6-trifluoromethylpyridinyl, 5-chloro-3-fluoropyridinyl, 3-chloro-5-fluoropyridinyl, 3-methylpyridinyl, 4-methylpyridinyl, 6-methylpyridinyl, 3-chloropyridinyl, 5-chloropyridinyl, 6-trifluoromethoxypyridinyl, phenyl, 2-methylphenyl, 3-methylphenyl, 4-methylphenyl, 3-methoxyphenyl, 4-trifluoromethylphenyl, 2-chlorophenyl, 3-chlorophenyl, 4-chlorophenyl, 2-fluorophenyl, 3-fluorophenyl, 4-fluorophenyl, 3-hydroxyphenyl, 2,5-difluorophenyl, 5-chloro-2-hydroxyphenyl, 5-fluoro-2-methoxyphenyl, 5-chloro-2-fluorophenyl, 2-chloro-5-fluorophenyl, 2-chloro-4-fluorophenyl, 3-cyano-4-fluorophenyl, 2-cyclopropylphenyl, 4-chloro-1-methyl-1H-pyrazolyl, 5-chloro-1,3-thiazolyl, 5-fluoro-2-thienyl;

R₂ represents hydrogen or methyl;

R₃ represents hydrogen;

R₅ represents hydrogen, fluorine;

R₆ represents a group of the formula a), c') or c")

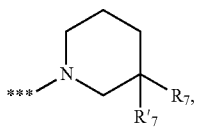

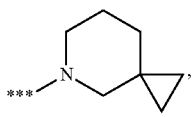

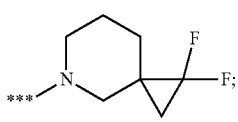

where *** marks the attachment to the adjacent piperidine ring,
where R₇ and R'₇ independently of one another represent hydrogen, methyl, ethyl, n-propyl, isopropyl, tert-butyl, 2-fluoroethyl, cyclopropyl, cyclobutyl, cyclopropylmethyl, methoxy, ethoxy, methoxymethyl, monofluoromethyl, difluoromethyl, trifluoromethyl, difluoromethoxy, 3,3-difluorocyclobutylmethoxy, cyclobutylmethoxy, cyclopropylmethoxy, cyclopropylmethoxymethyl, cyclobutyloxymethyl, 3-fluorobutyloxymethyl, 3,3-difluorocyclobutylmethoxymethyl, 2,2,2-trifluoroethoxy, 2,2,2-trifluoroethoxymethyl, 2,2-difluorocyclopropylmethoxy, cyclobutyloxy, 3,3-difluorocyclobutyloxy, fluoromethylcyclopropylmethoxy, difluoromethylcyclopropylmethoxy, trifluoromethylcyclopropylmethoxy, fluorine;

n represents 0 or 1 and m represents 1, or a salt, a solvate, or a solvate of a salt thereof.

6. A process for preparing a compound of formula (I) according to claim 1, or a salt, a solvate, or a solvate of a salt thereof, comprising

[A] reacting a compound of formula (II)

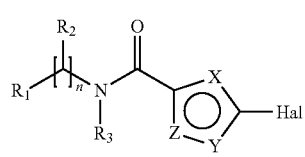

in which

X, Y, Z, R₁, R₂, R₃ and R₄ and n are as defined in claim 1, and

Hal represents a leaving group, in the presence of a base with a compound of formula (III)

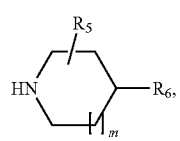

in which

R₅ and R₆ and m are as defined in claim 1, to give a compound of formula (I-A)

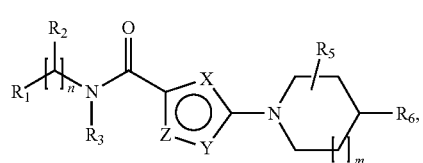

wherein the compound of formula (I-A) is the compound of formula (I);

or

[B] reacting a compound of formula (IV)

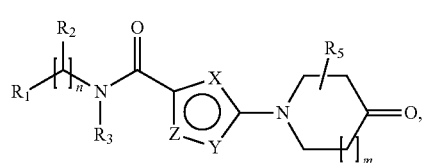

in which

X, Y, Z, R₁, R₂, R₃, R₄ and R₅ and n and m are as defined in claim 1, with a compound of formula (V)

in which
R₆ is as defined in claim 1,
in the presence of a reducing agent to give a compound of formula (I-B)

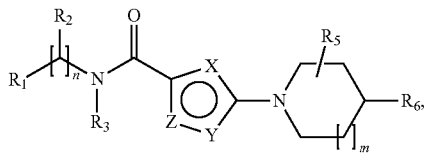

wherein the compound of formula (I-B) is the compound of formula (I);
or
[C] reacting a compound of formula (VI)

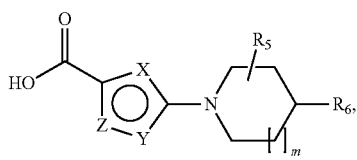

in which
X, Y, Z, R₄, R₅ and R₆ and n and m are as defined in claim 1,
with a compound of formula (VII)

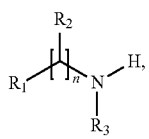

in which
R₁, R₂ and R₃ and n are as defined in claim 1,
in the presence of a condensating or activating agent to give a compound of formula (I-C)

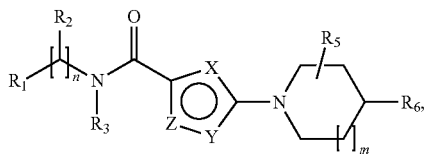

wherein the compound of formula (I-C) is the compound of formula (I).

7. A method of modulating an α2C-adrenergic receptor in a human or animal in need thereof, comprising administering an effective amount of a compound according to claim 1, or a solvate, a salt, or a solvate of the salt thereof.

8. A method for treatment of sleep-induced breathing difficulties by modulating an α2C-adrenergic receptor in a human or animal in need thereof, comprising administering an effective amount of a compound according to claim 1, or a solvate, a salt, or a solvate of the salt thereof, wherein the sleep-induced breathing difficulties are selected from the group consisting of obstructive sleep apnoea, primary snoring, obstructive snoring, central sleep apnea, primary sleep apnoea of infancy, central sleep apnoea as a result of the use of medicaments or the use of other substances, and postoperative apnoea.

9. The method of claim 8, wherein the obstructive sleep apnoea is obstructive sleep apnoea in adults or obstructive sleep apnoea in children.

10. A pharmaceutical composition, comprising a compound according to claim 1, or a salt, a solvate, or a solvate of a salt thereof, in combination with one or more inert, nontoxic, pharmaceutically suitable excipients.

11. A pharmaceutical combination, comprising a compound according to claim 1, or a salt, a solvate, or a solvate of a salt thereof, in combination with one or more further active compounds selected from the group consisting of respiratory stimulants, psychostimulating compounds, serotonin reuptake inhibitors, noradrenergic, serotonergic and tricyclic antidepressants, P2X3 antagonists, sGC stimulators, mineralocorticoid receptor antagonists, antiinflammatory drugs, immunomodulators, immunosuppressives and cytotoxic drugs.

12. A method for treatment of sleep-induced breathing difficulties by modulating an α2C-adrenergic receptor in a human or animal in need thereof, comprising administering to the human or animal in need thereof an effective amount of a pharmaceutical composition according to claim 10, wherein the sleep-induced breathing difficulties are selected from the group consisting of obstructive sleep apnoea, primary snoring, obstructive snoring, central sleep apnoea, primary sleep apnoea of infancy, central sleep apnoea as a result of the use of medicaments or the use of other substances, and postoperative apnoea.

13. A method for treatment of sleep-induced breathing difficulties by modulating an α2C-adrenergic receptor in a human or animal in need thereof, comprising administering to the human or animal in need thereof an effective amount of a pharmaceutical combination according to claim 11, wherein the sleep-induced breathing difficulties are selected from the group consisting of obstructive sleep apnoea, primary snoring, obstructive snoring, central sleep apnoea, primary sleep apnoea of infancy, central sleep apnoea as a result of the use of medicaments or the use of other substances, and postoperative apnoea.

14. A method for treatment of obstructive sleep apnoea in a subject in need thereof, comprising administering an effective amount of a compound according to claim 1, or a solvate, a salt, or a solvate of the salt thereof.

15. The pharmaceutical composition of claim 10, wherein the compound according to claim 1 is

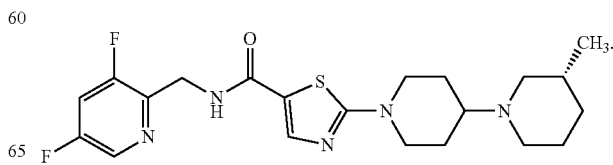

16. The pharmaceutical composition of claim 10, wherein the compound according to claim 1 is

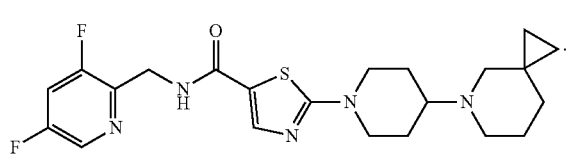 [SMILES: O=C(NCc1ncc(F)cc1F)c1cnc(N2CCC(N3CCCC4(CC4)C3)CC2)s1]

17. The pharmaceutical composition of claim 10, wherein the compound according to claim 1 is

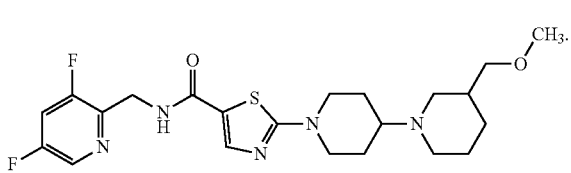 [SMILES: COCC1CCCN(C2CCN(c3ncc(C(=O)NCc4ncc(F)cc4F)s3)CC2)C1]

18. The method of claim 14, wherein the compound according to claim 1 is

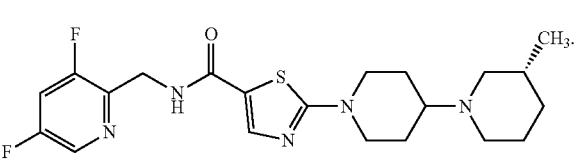 [SMILES: C[C@@H]1CCCN(C2CCN(c3ncc(C(=O)NCc4ncc(F)cc4F)s3)CC2)C1]

19. The method of claim 14, wherein the compound according to claim 1 is

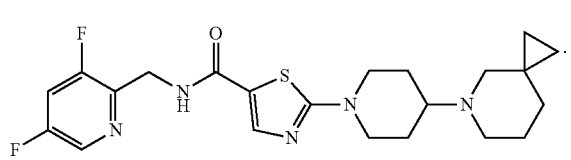

20. The method of claim 14, wherein the compound according to claim 1 is

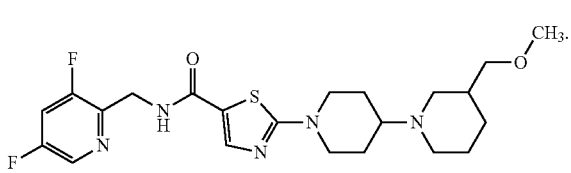 [SMILES: COCC1CCCN(C2CCN(c3ncc(C(=O)NCc4ncc(F)cc4F)s3)CC2)C1]

21. The compound of claim 1, wherein the compound is

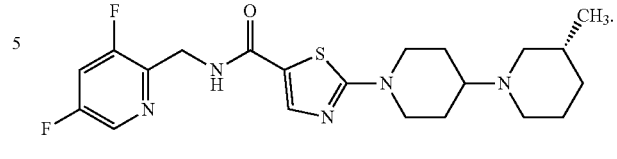

22. The compound of claim 1, wherein the compound is

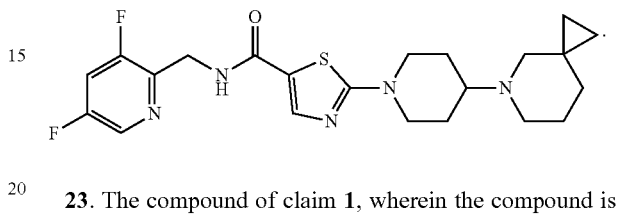

23. The compound of claim 1, wherein the compound is

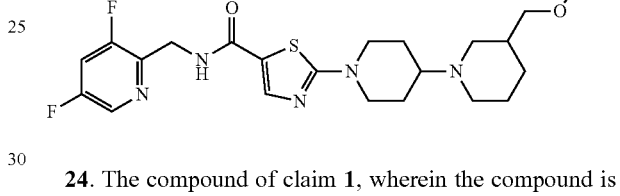

24. The compound of claim 1, wherein the compound is

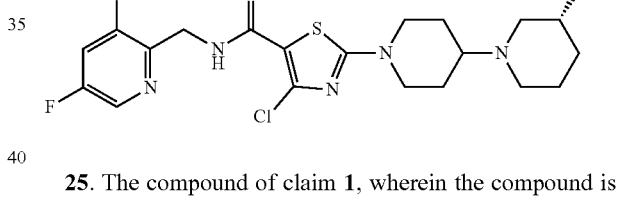

25. The compound of claim 1, wherein the compound is

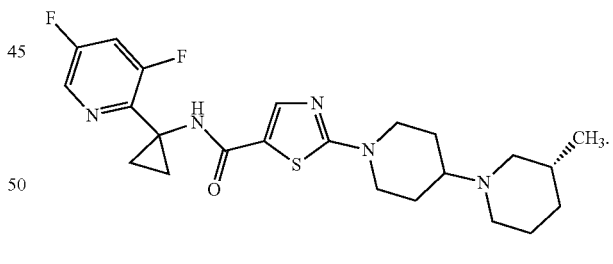

* * * * *